US009115697B2

(12) United States Patent
Lucas

(10) Patent No.: US 9,115,697 B2
(45) Date of Patent: Aug. 25, 2015

(54) FLUID INTERACTING DEVICE

(76) Inventor: Jeffrey M. Lucas, Hopkins, MN (US)

(*) Notice: Subject to any disclaimer, the term of this patent is extended or adjusted under 35 U.S.C. 154(b) by 681 days.

(21) Appl. No.: 12/862,537

(22) Filed: Aug. 24, 2010

(65) Prior Publication Data
US 2011/0076144 A1  Mar. 31, 2011

Related U.S. Application Data

(60) Provisional application No. 61/236,773, filed on Aug. 25, 2009, provisional application No. 61/239,207, filed on Sep. 2, 2009, provisional application No. 61/261,601, filed on Nov. 16, 2009.

(51) Int. Cl.
*F03D 3/02* (2006.01)
*F03D 3/06* (2006.01)
*F03B 17/06* (2006.01)
*F04D 33/00* (2006.01)

(52) U.S. Cl.
CPC .............. *F03D 3/068* (2013.01); *F03B 17/067* (2013.01); *F04D 33/00* (2013.01); *F05B 2260/503* (2013.01); *Y02E 10/28* (2013.01); *Y02E 10/74* (2013.01)

(58) Field of Classification Search
CPC ....... F03D 3/068; F03B 17/067; F04D 33/00; F05B 2260/503
USPC ......... 416/111, 79, 110, 120, 8, 99, 101, 117; 415/5, 8, 60, 70
See application file for complete search history.

(56) References Cited

U.S. PATENT DOCUMENTS

| 662,944 | A | * | 12/1900 | Jones | 416/41 |
| 2,986,949 | A | | 6/1961 | Lancaster et al. | |
| 4,097,190 | A | * | 6/1978 | White | 416/117 |
| 4,137,009 | A | | 1/1979 | Telford | |
| 5,193,978 | A | * | 3/1993 | Gutierrez | 416/24 |
| 6,065,289 | A | | 5/2000 | Phillips | |
| 6,158,953 | A | * | 12/2000 | Lamont | 415/4.4 |
| 6,279,219 | B1 | | 8/2001 | Ohsawa | |
| 6,784,566 | B2 | | 8/2004 | Thomas | |
| 6,849,023 | B1 | | 2/2005 | Kerr | |
| 7,083,382 | B2 | | 8/2006 | Ursua | |
| 7,188,719 | B2 | | 3/2007 | Kerr | |

(Continued)

FOREIGN PATENT DOCUMENTS

WO    WO 2010/124692 A1    11/2010

OTHER PUBLICATIONS

Cheboxarov, V. et al., "Vertical Air Circulation in a Low-Speed Lateral Flow Wind Turbine with Rotary Blades," *Technical Physics Letters*, vol. 34, No. 4, pp. 52-55 (2008).

(Continued)

*Primary Examiner* — Nathaniel Wiehe
*Assistant Examiner* — Kayla McCaffrey

(57) ABSTRACT

A rotary turbine including at least one blade is disclosed. The rotary turbine includes a blade arrangement in which the orientation of the at least one blade movably changes relative to the fluid flow and also changes relative to an orbital path taken by the rotary turbine thereby increasing flow area usage and minimizing friction. Certain embodiments of the present disclosure include a rotary turbine with blade orientations that are linearly coupled to the orbital orientation of the turbine. Other embodiments of the present disclosure include a rotary turbine with blade orientations that are non-linearly coupled to the orbital orientation of the turbine.

31 Claims, 75 Drawing Sheets

(56) References Cited

U.S. PATENT DOCUMENTS

| | | | |
|---|---|---|---|
| 2004/0164561 A1* | 8/2004 | Nagawa et al. | 290/55 |
| 2008/0095608 A1* | 4/2008 | Boatner | 415/4.2 |
| 2008/0206055 A1 | 8/2008 | Godsk et al. | |

OTHER PUBLICATIONS

Takao, M. et al., "A Straight-bladed Vertical Axis Wind Turbine with a Directed Guide Vane Row," *Journal of Fluid Science and Technology*, vol. 3, No. 3, pp. 379-386 (2008).

Tangler, J., "The Evolution of Rotor and Blade Design," *Presented at the American Wind Energy Association WindPower 2000*, Palm Springs, California, pp. 1-9 (Apr. 30-May 4, 2000).

Wind turbine, From Wikipedia, the free encyclopedia, 16 pages (Dec. 10, 2008).

Wind turbine, Wikipedia, http://en.wikipedia.org/wiki/Wind_turbine, 10 pages (Nov. 10, 2009).

Wind turbine: Definition from Answers.com, http://www.answers.com/topic/wind-turbine, 16 pages (Date Printed Nov. 12, 2009).

WindScrew, Drawings, 2 pages (Date Unknown).

WindTurbine, photo, 1 page (Nov. 29, 2006).

* cited by examiner

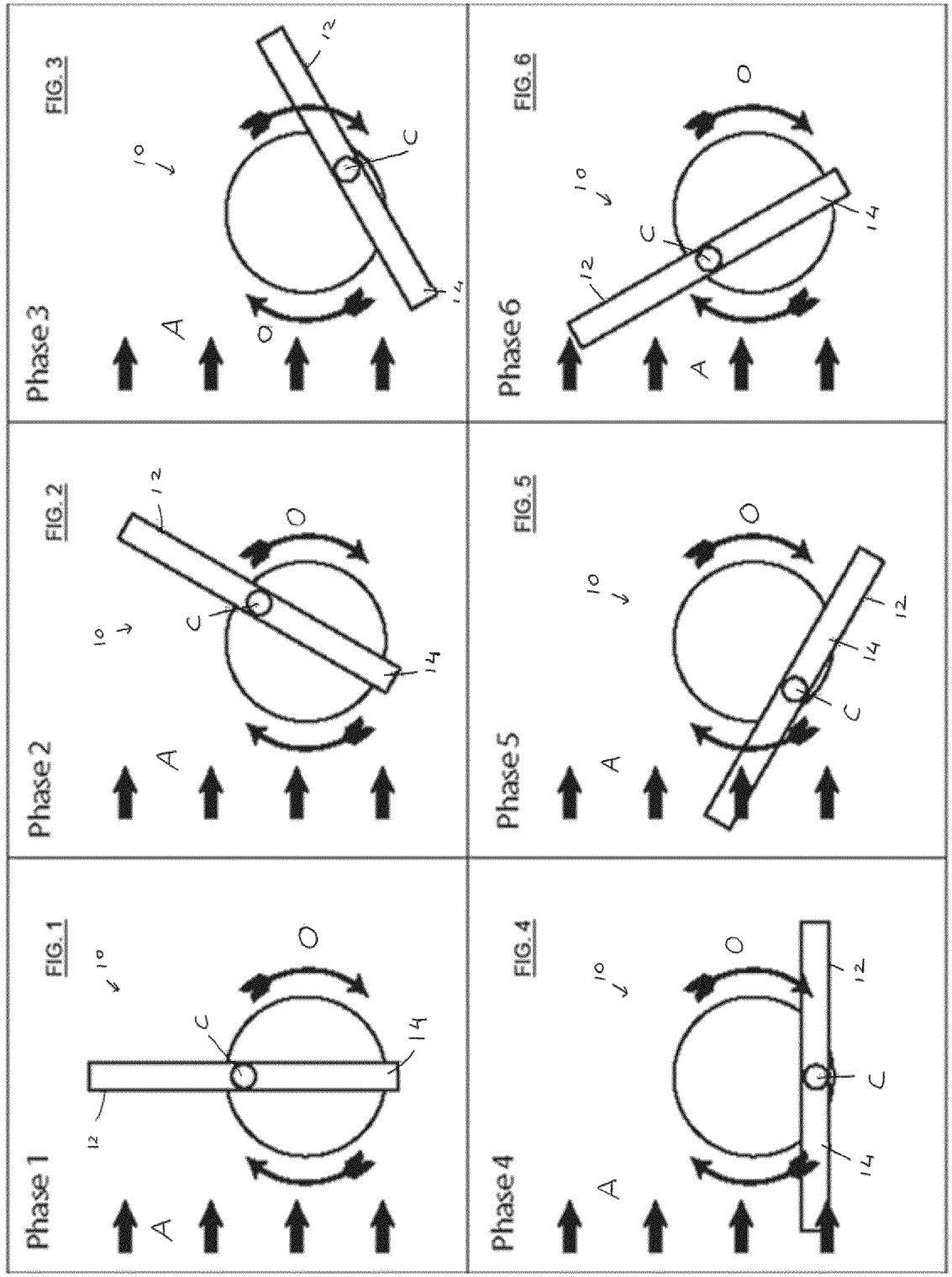

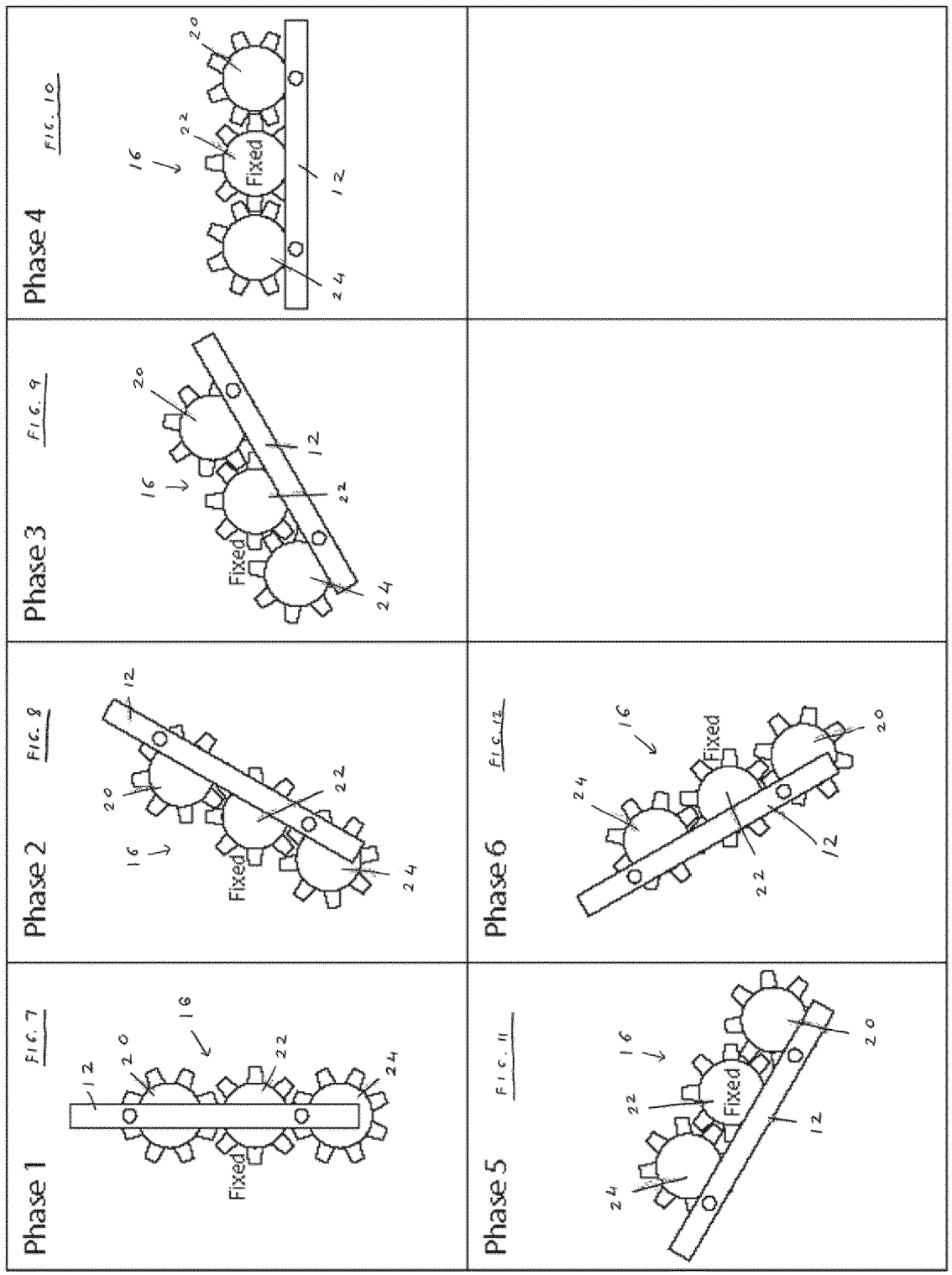

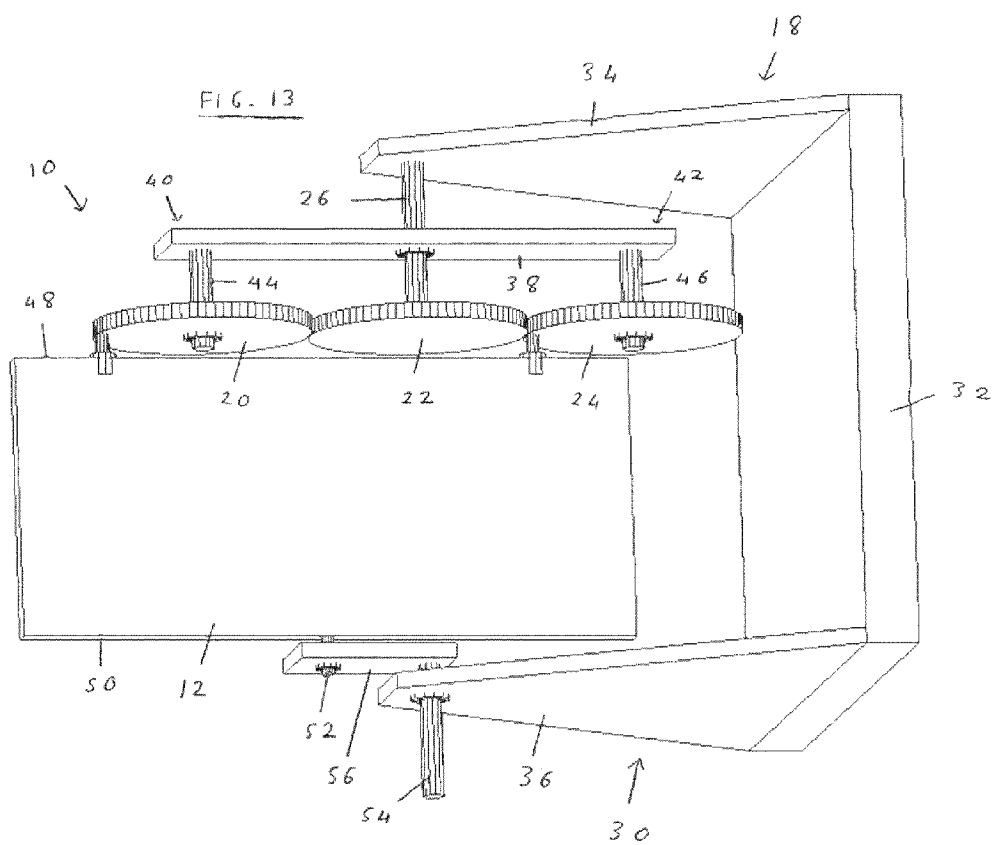

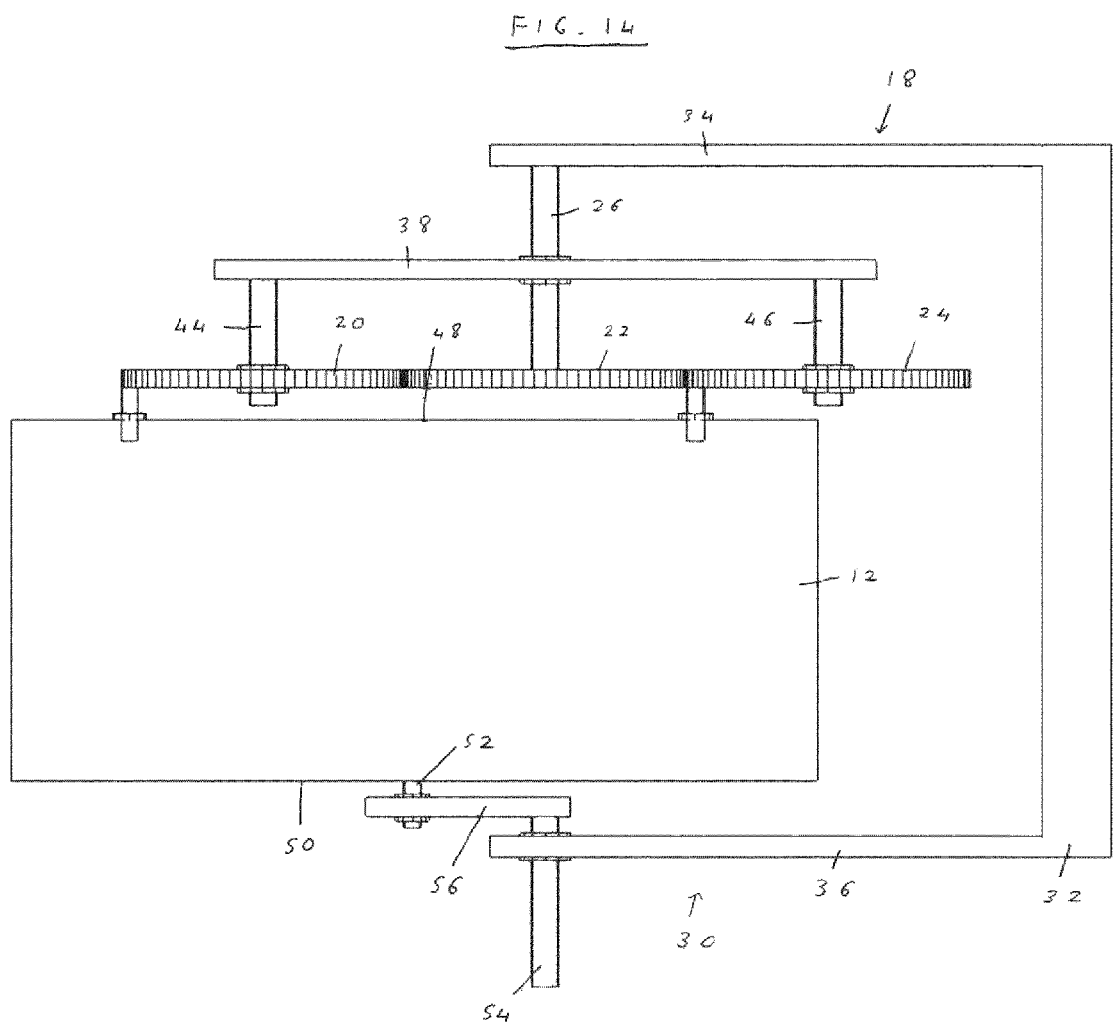

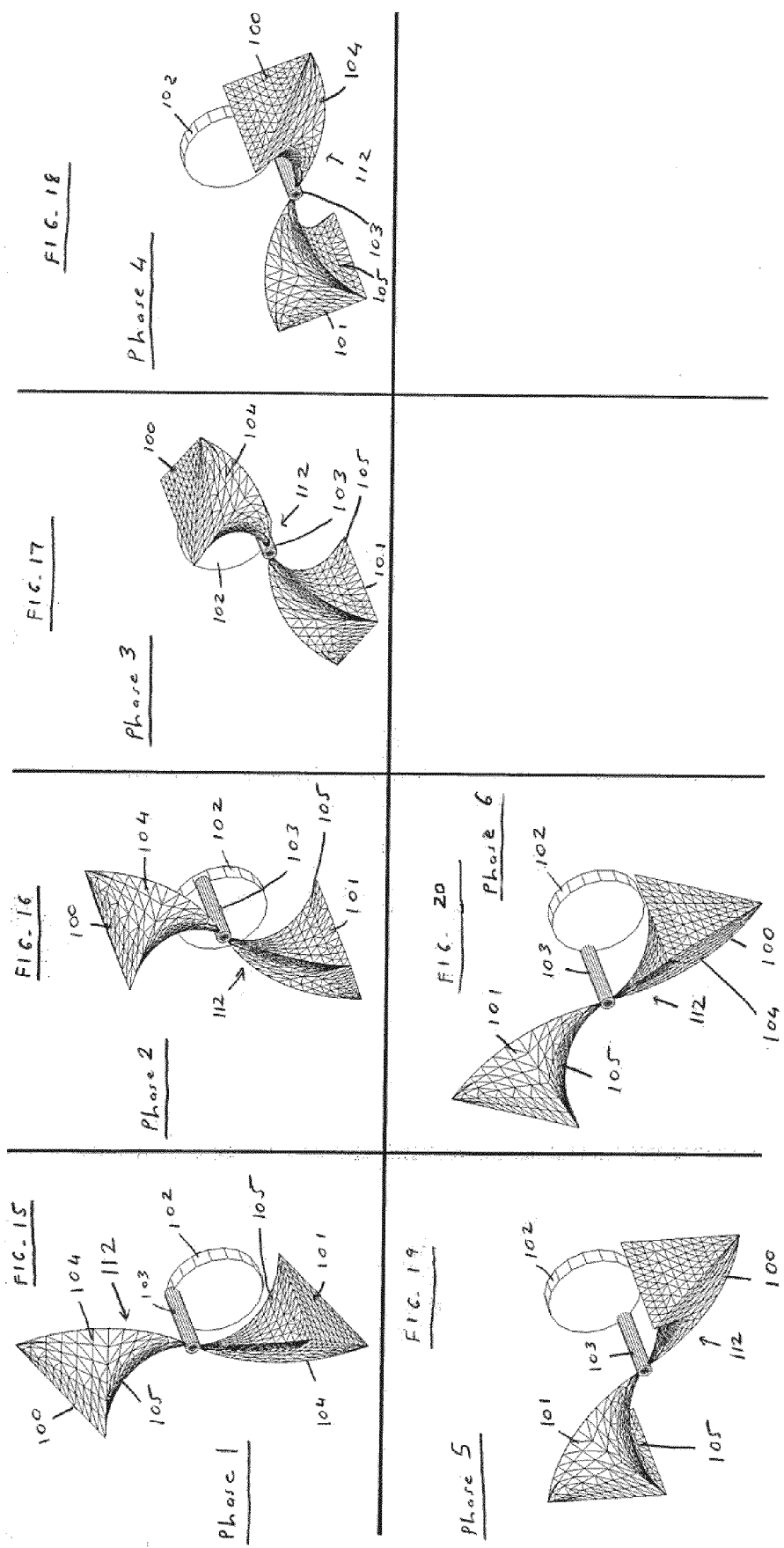

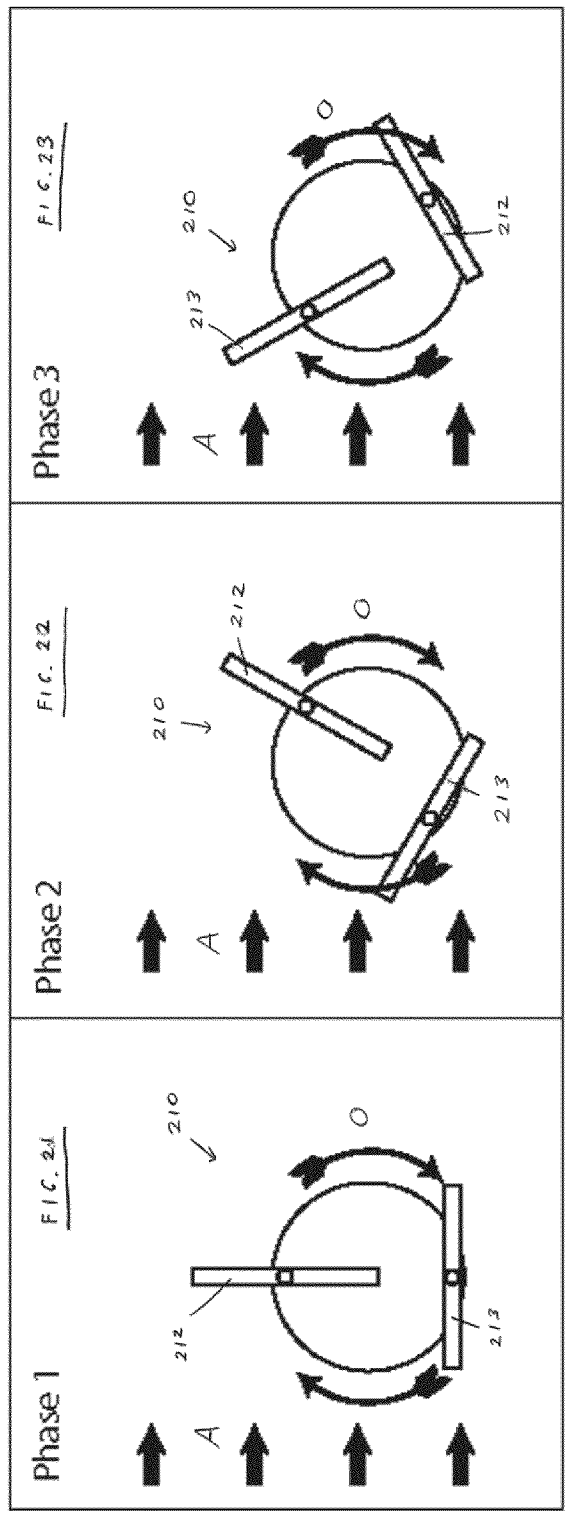

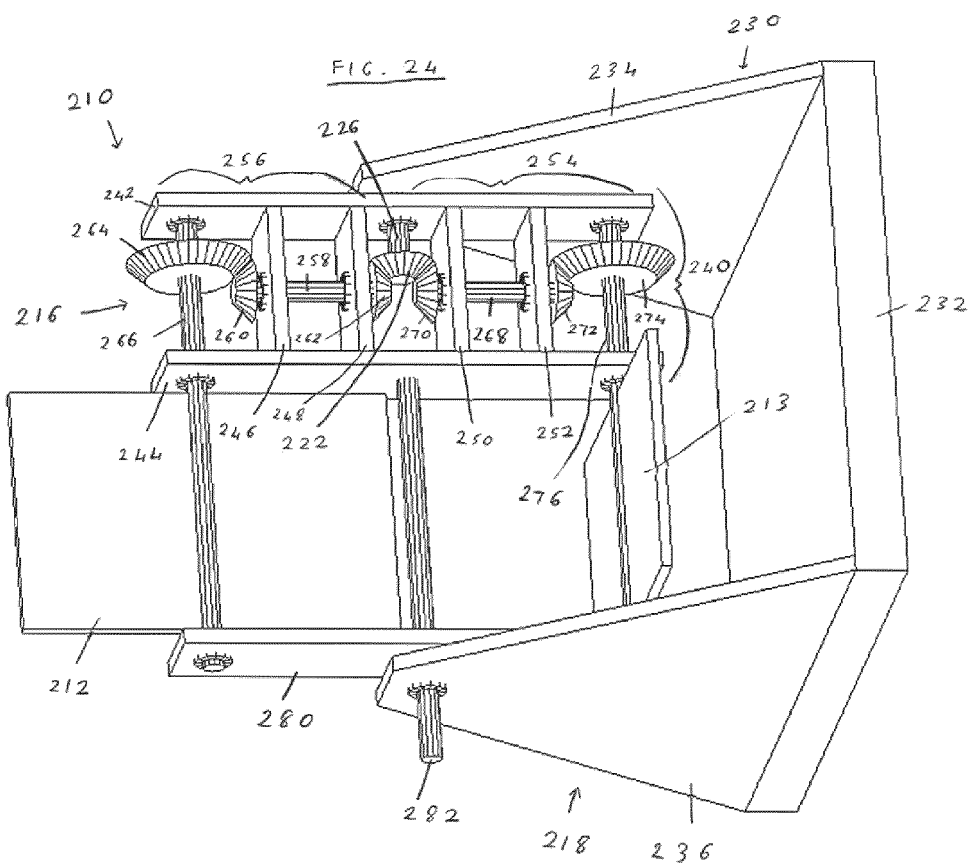

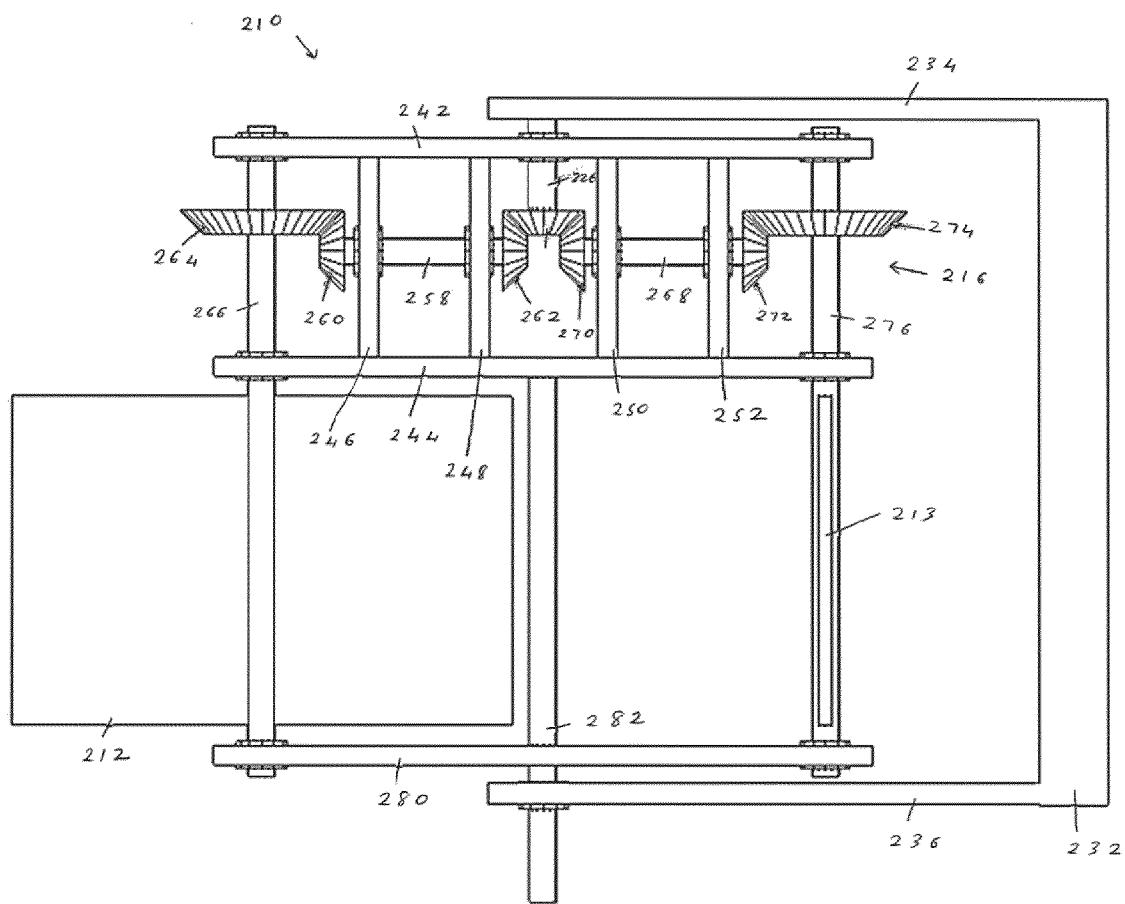

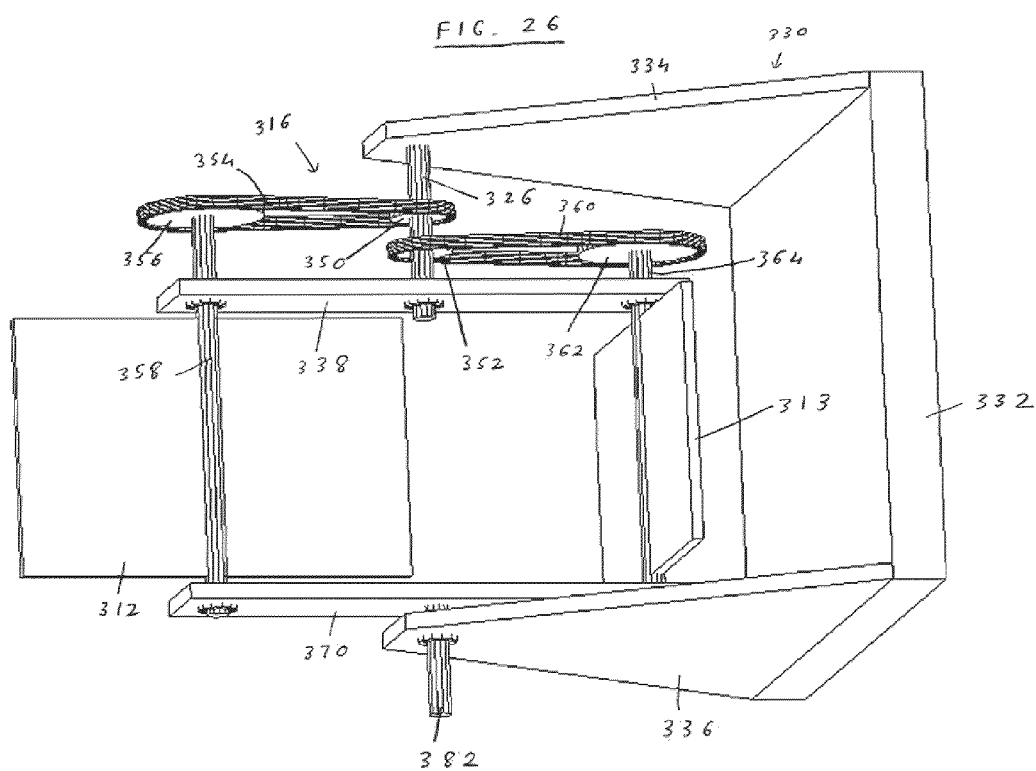

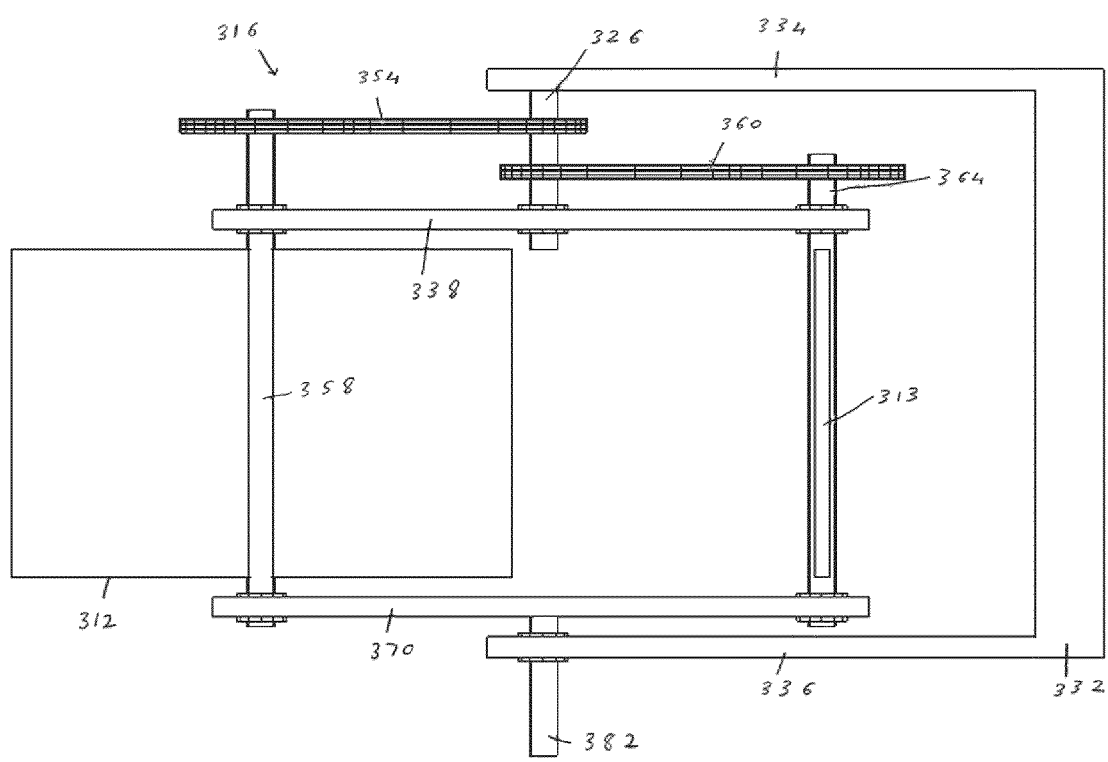

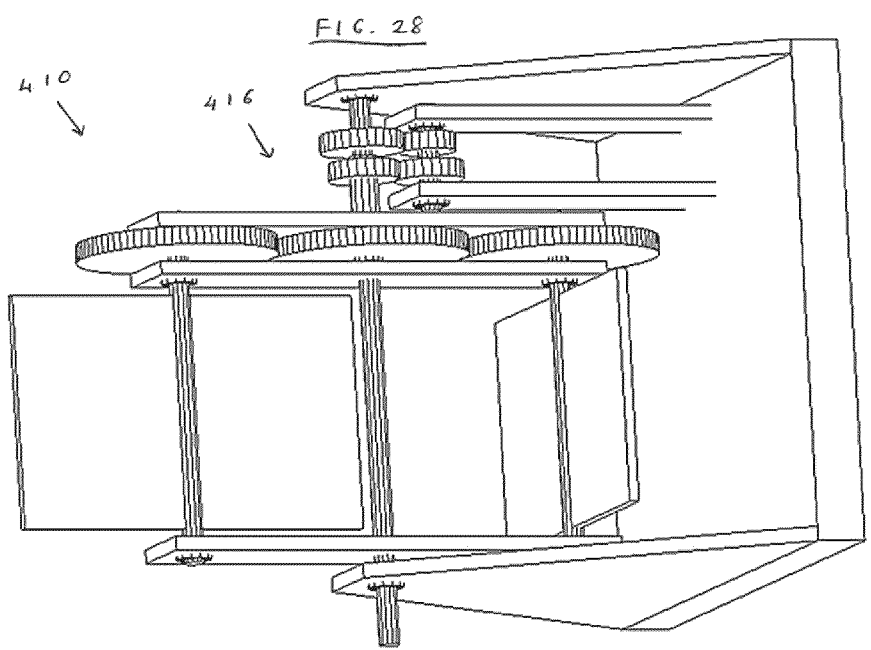

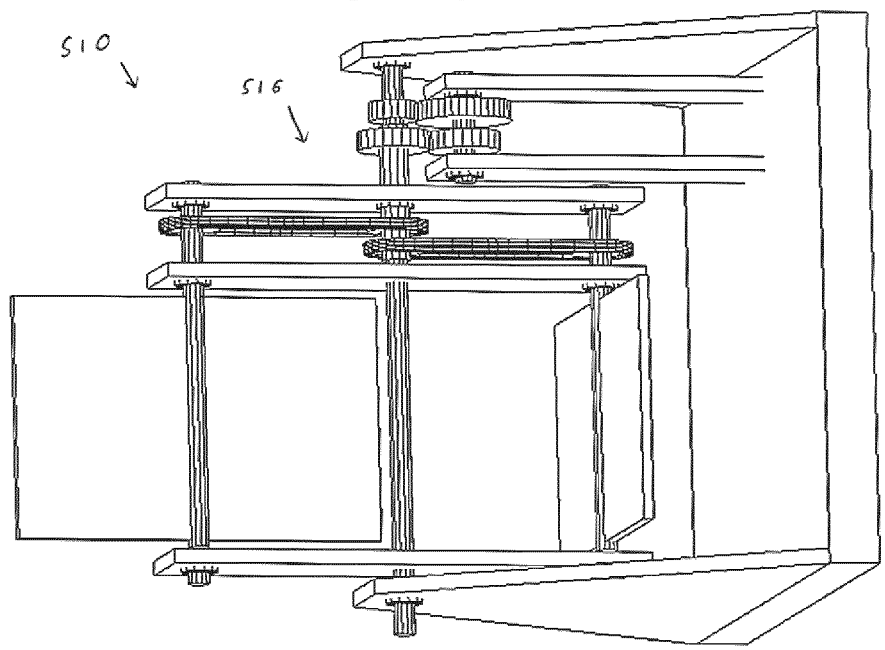

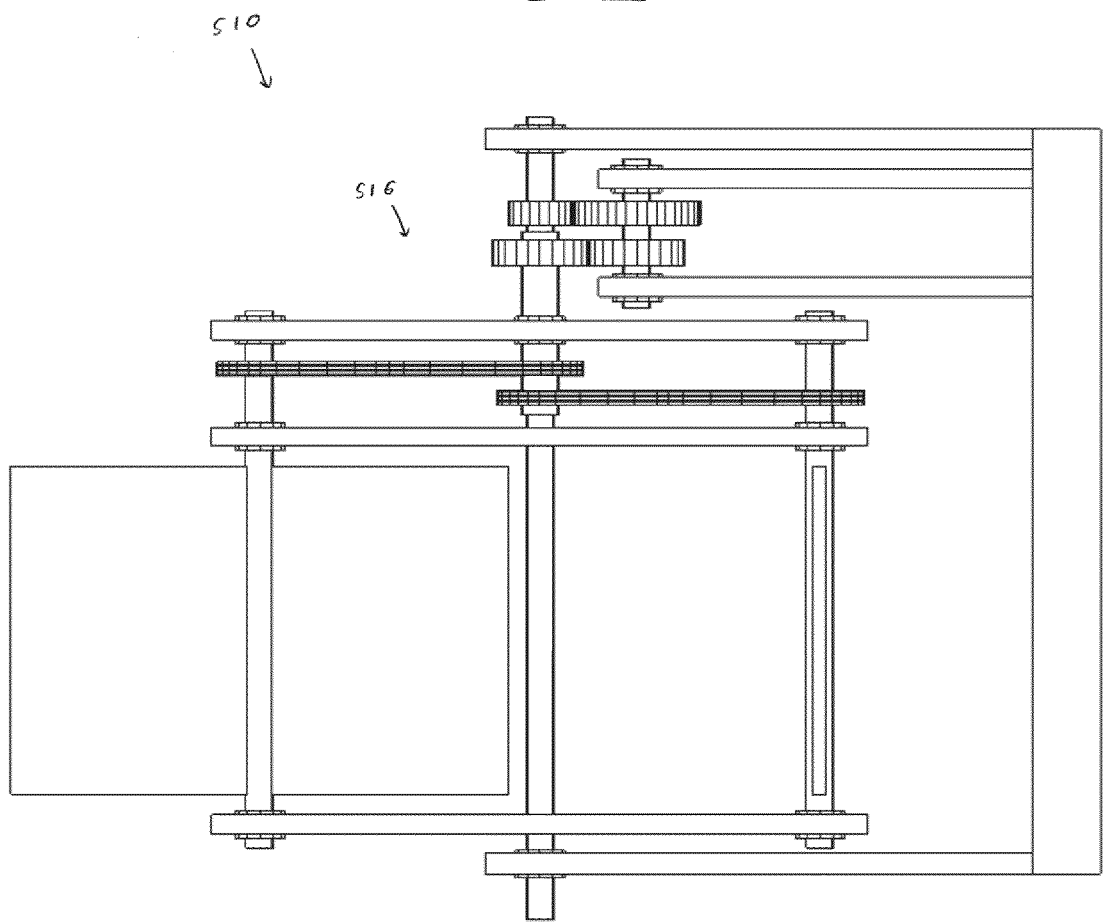

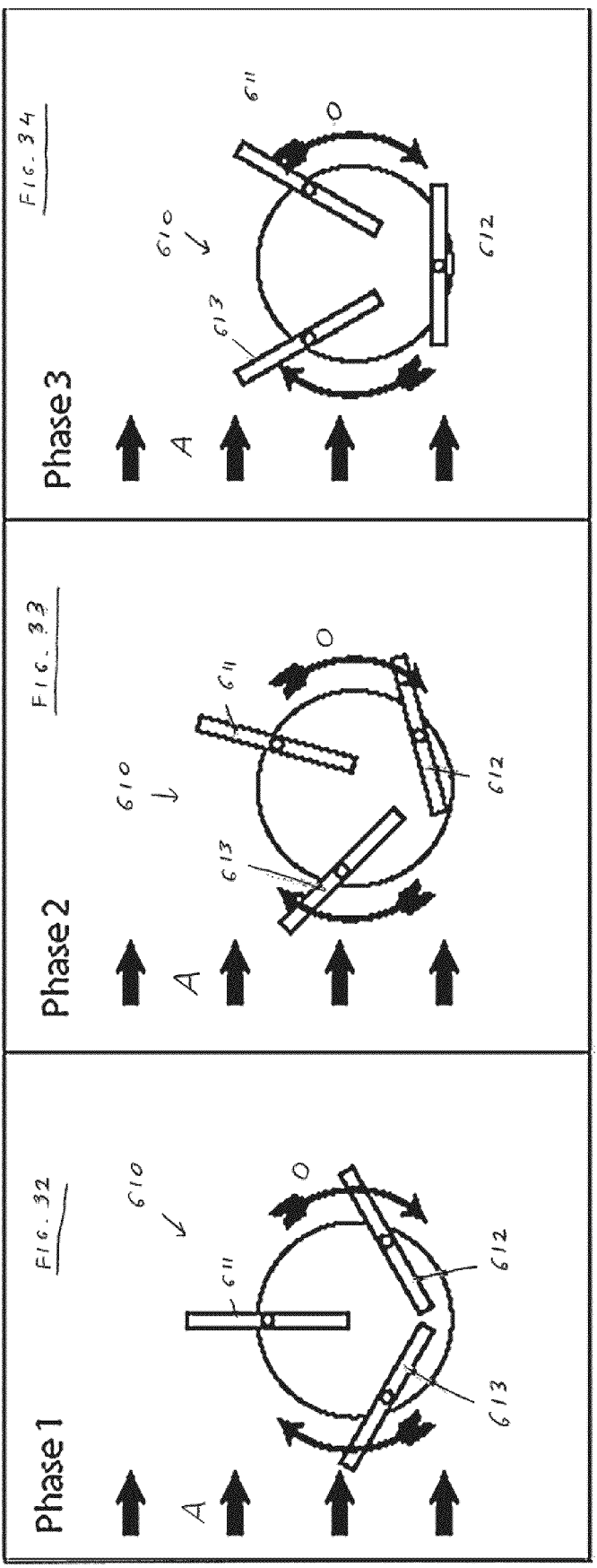

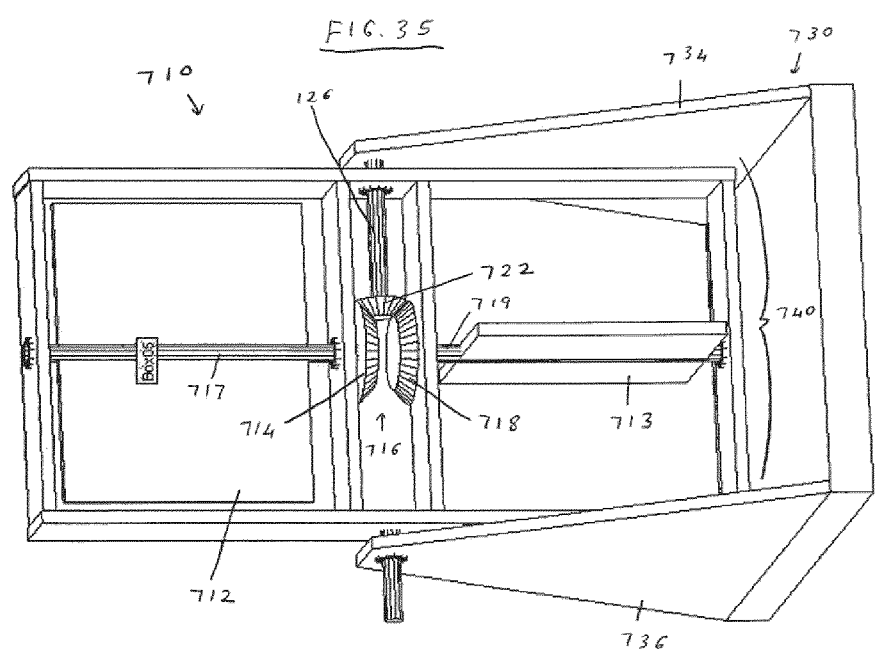

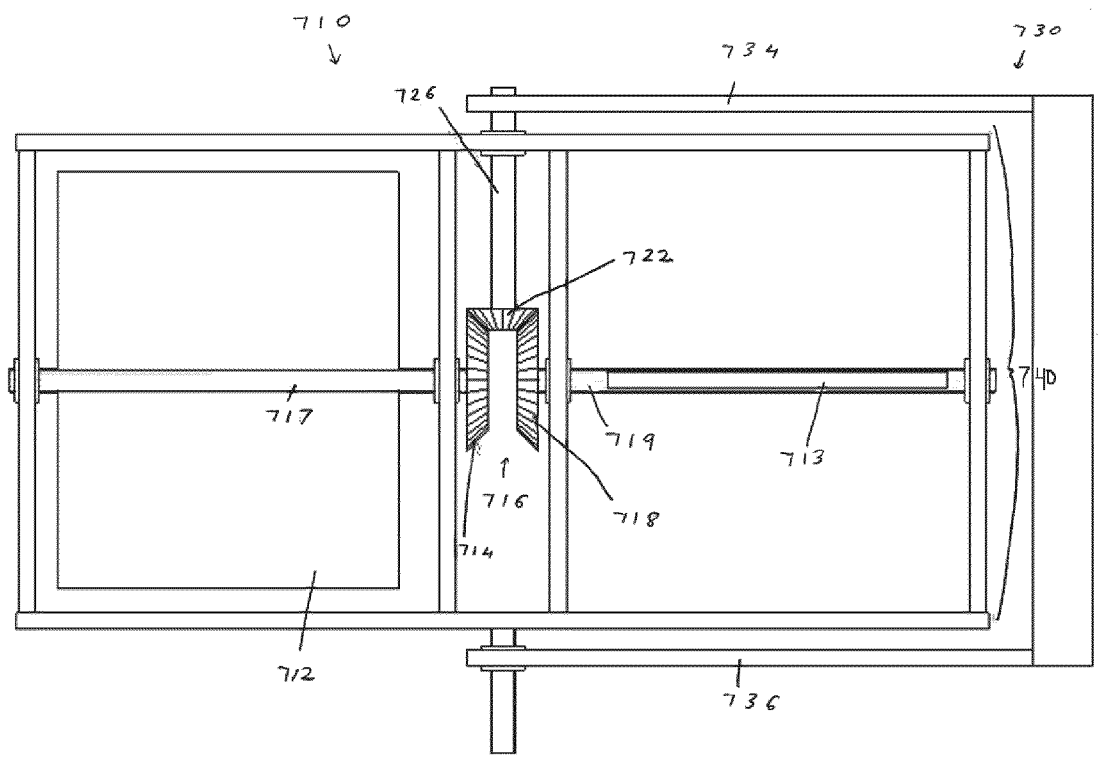

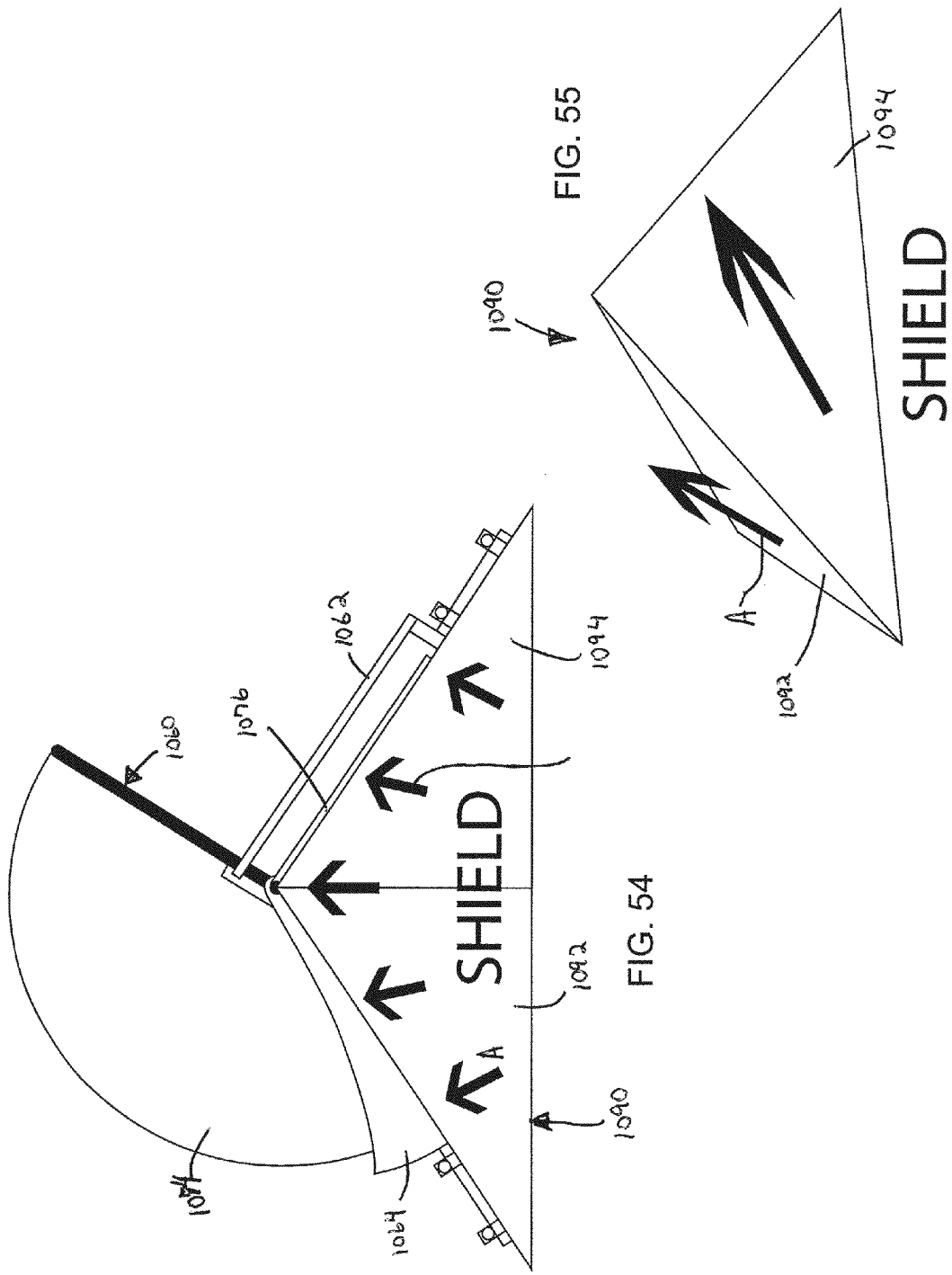

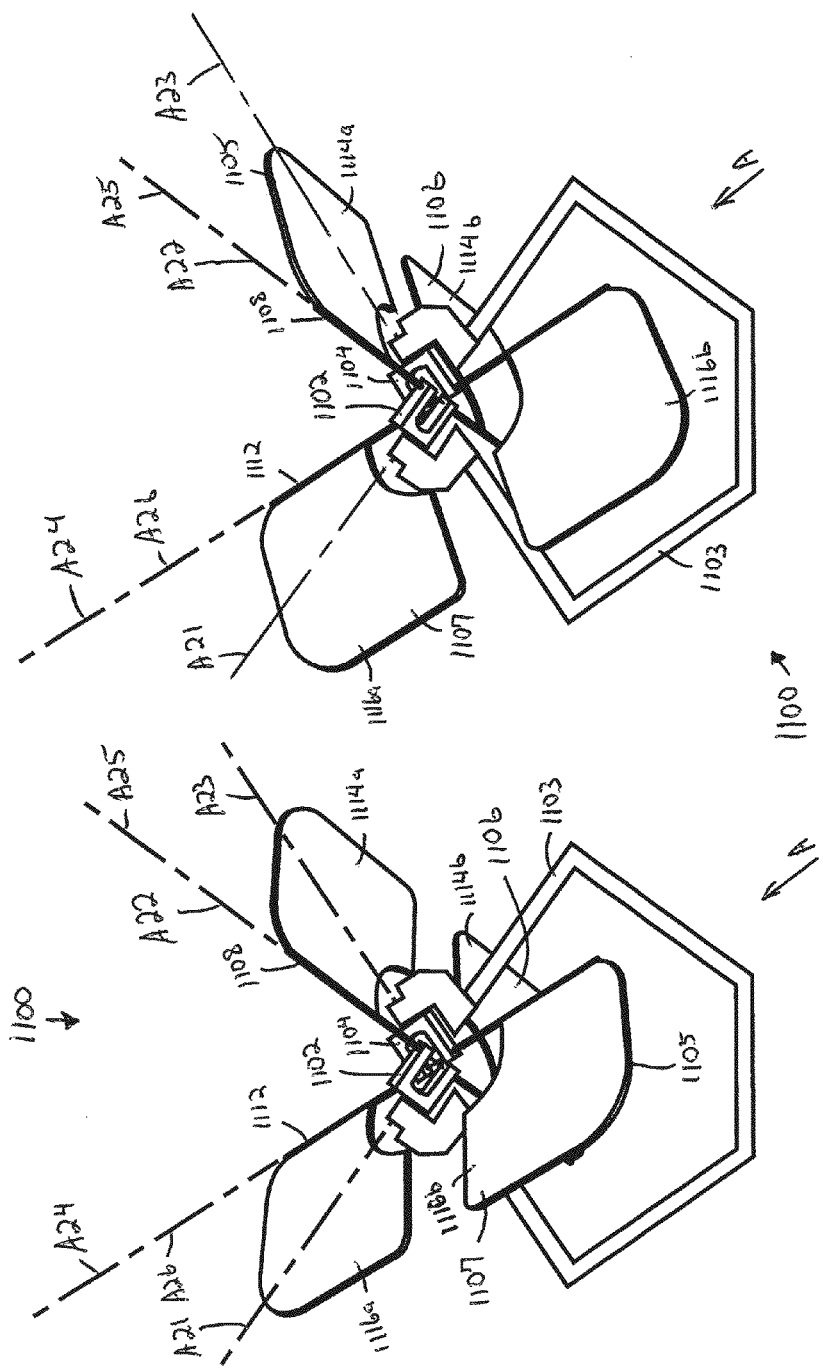

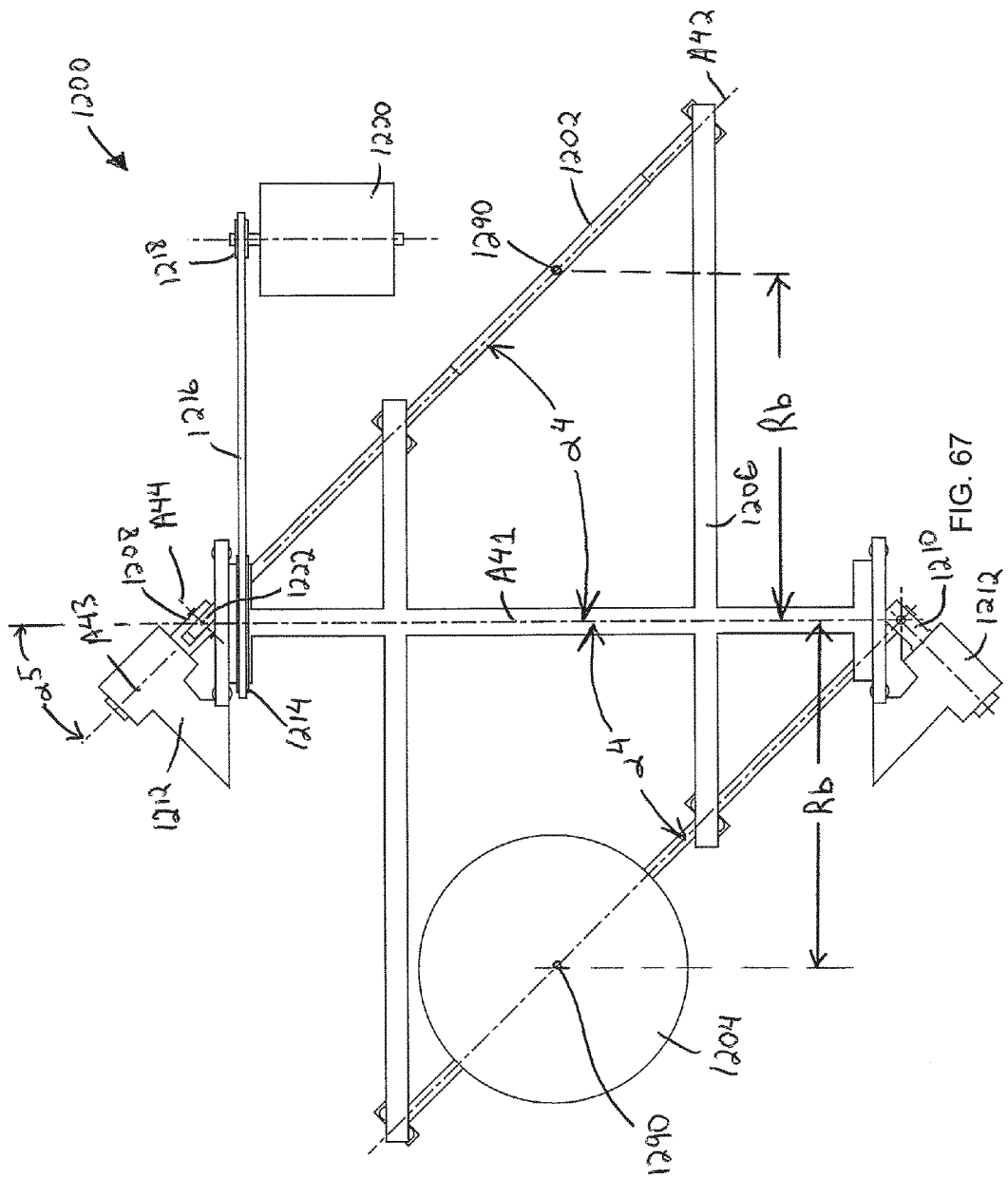

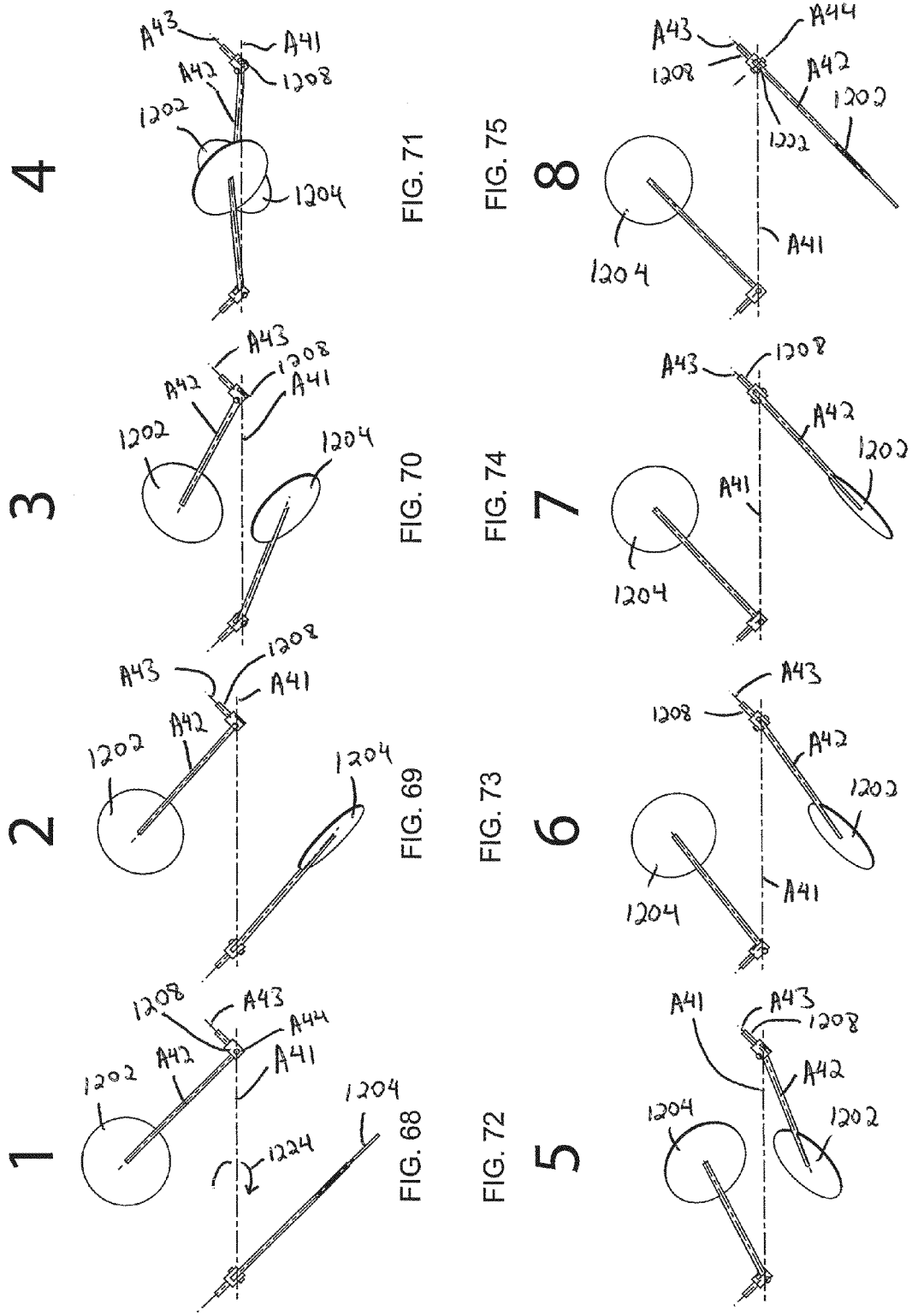

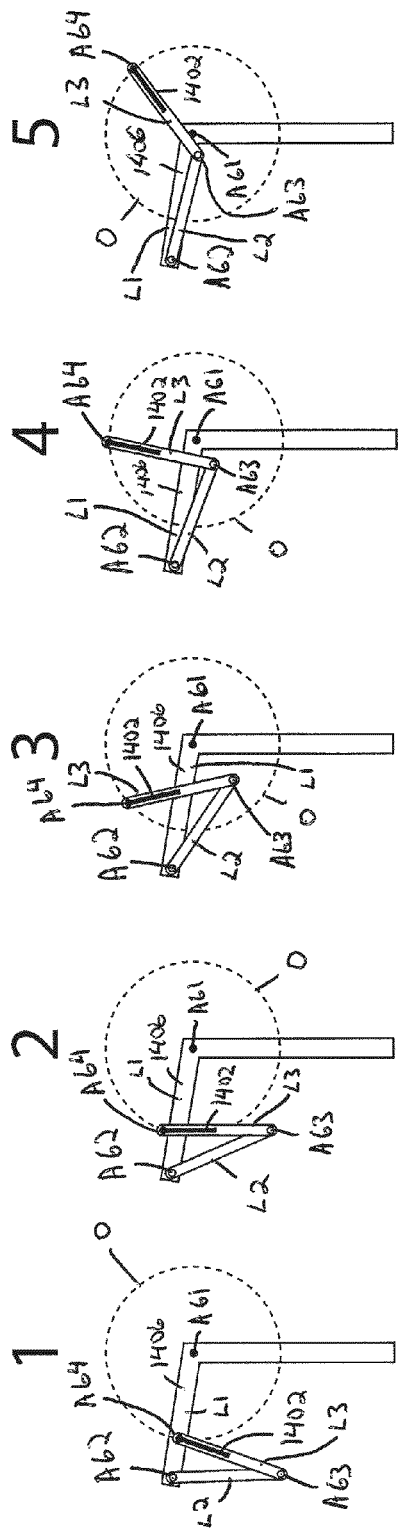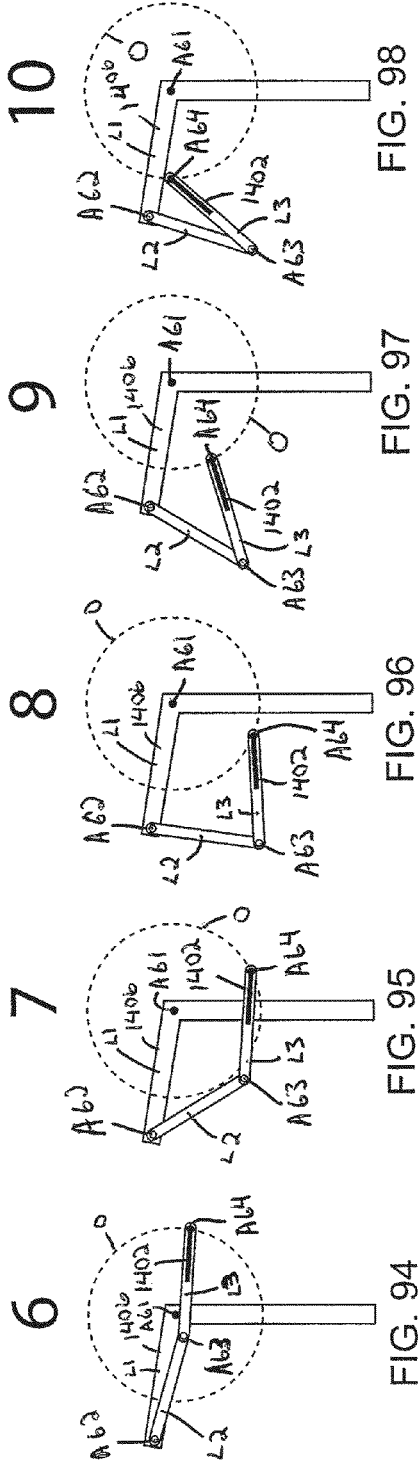

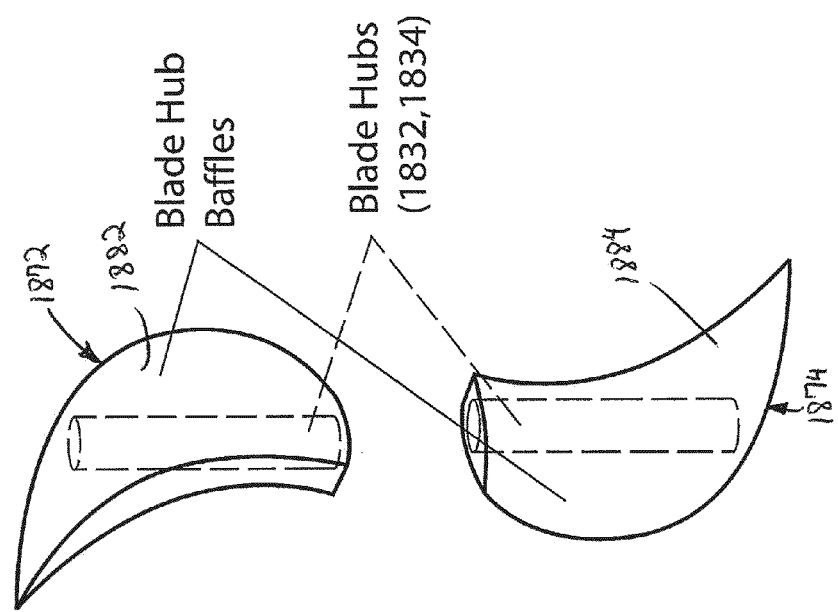
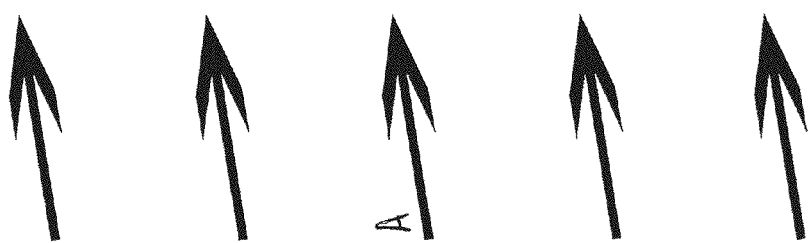
FIG. 113

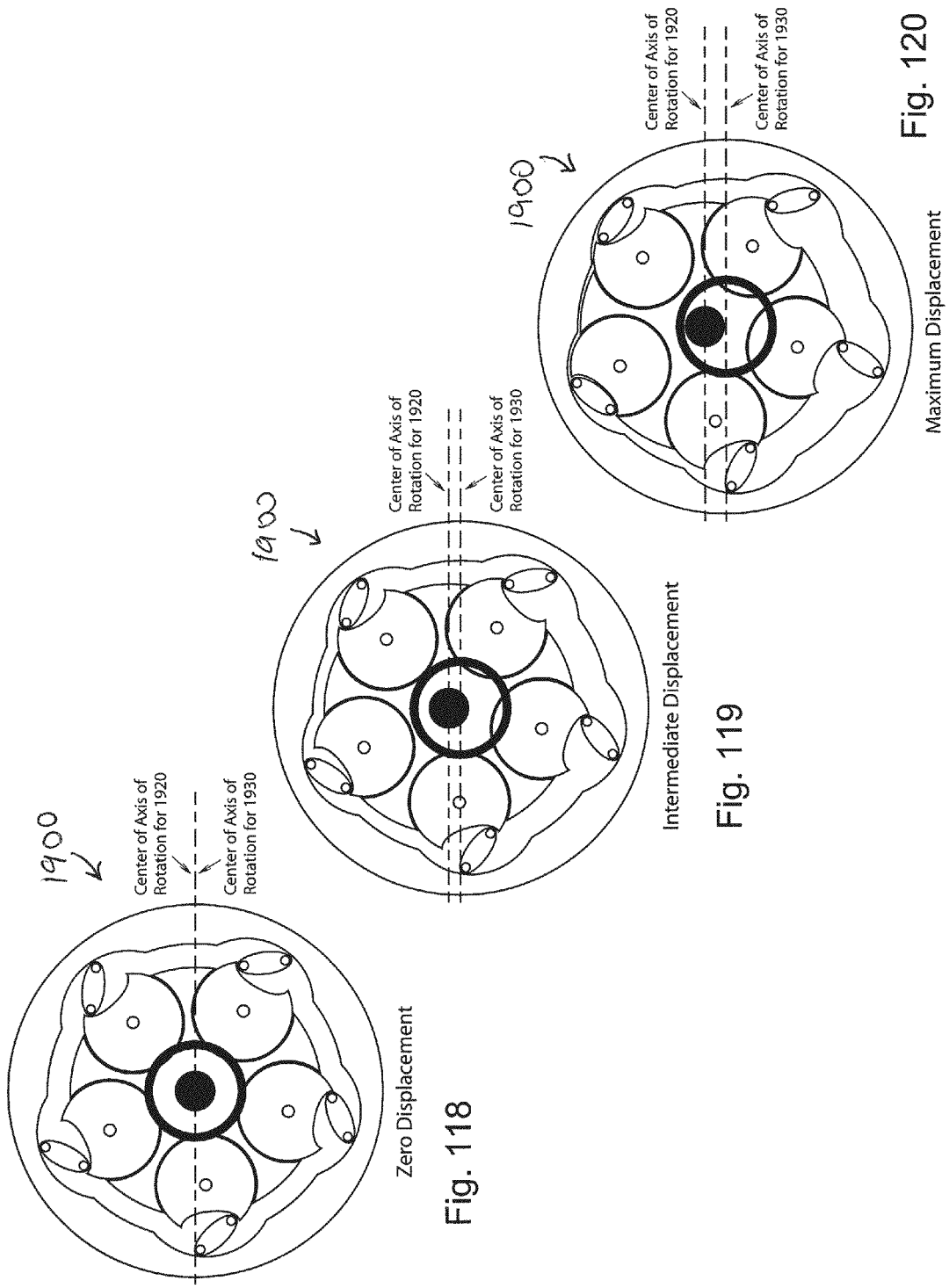

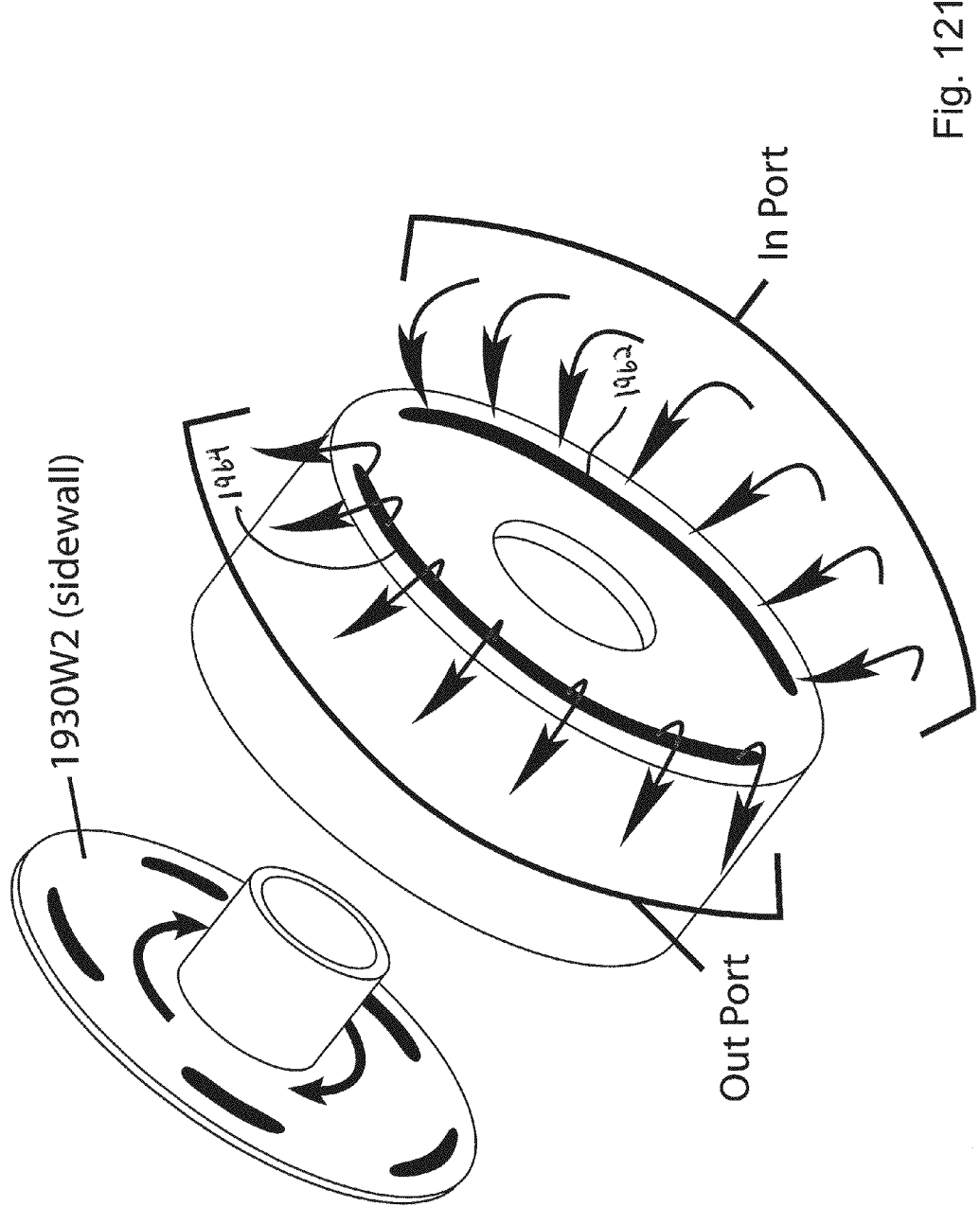

FLUID INTERACTING DEVICE

CROSS REFERENCE TO RELATED APPLICATIONS

This application claims the benefit of U.S. Provisional Patent Application Ser. No. 61/236,773, filed Aug. 25, 2009, U.S. Provisional Patent Application Ser. No. 61/239,207, filed Sep. 2, 2009, and U.S. Provisional Patent Application Ser. No. 61/261,601, filed Nov. 16, 2009, which applications are incorporated herein by reference in their entirety.

FIELD

The inventive aspects of this disclosure pertain to devices for harvesting or producing fluid flow. More particularly, the disclosure pertains to rotary turbines and pumps.

BACKGROUND

For millennia people have been contemplating ways to harvest and/or produce fluid flow for numerous uses, for example, from grinding flour to human flight. Whether one is producing fluid flow, for example, for flight, or harvesting fluid flow, for example, to move a vessel across a lake, the principles used are similar.

Depending upon the type of fluid, the application, and the space available for the application, different types of devices have been employed for harvesting and/or producing fluid flow. For example, sailboats are some of the earliest and most efficient vessels that have harvested wind flow for travel. By employing large sails, the boat makers are able to harvest large areas of flowing air. The shear volume of captured energy provides plenty of thrust, even at fairly low wind speeds. Sails are designed to make good use of the available space in a watercraft and can be quite efficient given the space limitations.

Since density of water is higher than that of air, boat makers have resorted to devices such as propellers for low-volume, high speed applications in watercraft. Even though the surface area available on a propeller might be much smaller than that of a sail, the high rotational speed of the propeller against a higher density fluid makes for an efficient fluid flow mechanism.

Larger blades have also been employed for providing flow in fluids such as water. One example is a paddlewheel. Paddlewheels provide for a large surface area and can be efficient fluid movers like sails. However, since paddlewheels are rotated in a rotational direction generally perpendicular to the water flow, they cannot be fully submersed in water in order to operate properly. The design of a paddlewheel makes it an efficient fluid flow device when the paddlewheel is about halfway or more out of the water. In this manner, the paddlewheel is able to take advantage of the difference in densities between water and air in moving a watercraft in the desired direction. If a paddlewheel is fully submerged in water, the paddlewheel will tend to drive the water in a circle rather than transforming the rotational movement into translational movement.

A downside of most fluid harvesting and/or producing devices is less than ideal efficiency. For example, in applications such as wind harvesting, using devices such as conventional propellers has the disadvantage of reduced surface area available for harvesting energy. However, smaller propeller blades are used so as not to reduce the overall fluid flow by deflecting it off the blades in other directions. Using devices with larger surface areas, such as conventional turbines, also has disadvantages. Although turbines can be more efficient than propellers in certain fluid flow applications because they can reduce the deflection issues that remain prevalent in wind harvesting mechanisms, turbines typically have the disadvantage of additional friction produced from having more surface area moving at an angle to fluid flow (i.e., more drag).

Pumps are devices that typically produce fluid flow within a housing. Pumps typically draw in a fluid through an inlet on the housing and expel the fluid through an outlet on the housing. Certain pumps are positive displacement pumps. Positive displacement pumps expel a given volume of fluid per cycle of the pump at a given displacement setting of the pump. Certain positive displacement pumps are variable displacement pumps that can be set at a range of displacement settings. Other positive displacement pumps are fixed displacement pumps that have a fixed displacement setting. Certain pumps are rotodynamic pumps in which kinetic energy is added to the fluid by increasing the flow velocity. This increase in kinetic energy can be converted to potential energy (i.e., pressure) when the fluid flow velocity is reduced. Rotodynamic pumps are not typically positive displacement pumps.

Improvements in fluid flow devices are desired. Optimizing speed and torque of the devices by making optimal uses of space and flow direction are important. Maximizing flow area usage, minimizing friction through flow direction matching, and the ability to provide full fluid submersion without creating circular/counter-flow are desired.

SUMMARY

In the described embodiments, the examples of rotary turbines and pumps are configured such that the orientation of the blade(s)/vanes of the rotary turbines/pumps change relative to the fluid flow and also relative to an orbital path taken by the rotary turbine/pump. As described, in certain embodiments, the change in blade/vane orientation can occur axially with respect to the orbital path taken by the turbine. In other embodiments, the change in blade/vane orientation can occur radially, wherein the blade(s)/vanes rotate radially to the orbital path of the turbine/pump. Other angles or orientations of change with respect to the orbital path are certainly possible. The number and the shape of the blades/vanes of the turbine/pump may vary. The change in the blade/vane orientation with respect to the orbital path of the blade(s)/vane may be accomplished through various connections, linkages, and/or gearing arrangements.

The orientation of the blade(s)/vanes of the rotary turbines/pumps can change in a linear relationship with the orbital orientation of the turbine/pump (e.g., the blade(s)/vanes can be rotationally linked to a hub of the rotary turbine/pump by a gear set). Alternatively, the orientation of the blade(s)/vanes of the rotary turbines/pumps can change in a non-linear relationship with the orbital orientation of the turbine/pump (e.g., the blade(s)/vanes can be rotationally linked to a hub of the rotary turbine/pump by a linkage with a non-linear input-output relationship).

BRIEF DESCRIPTION OF THE DRAWINGS

The accompanying drawings, which are incorporated in and constitute a part of the specification, illustrate several aspects of the present disclosure and together with the description, serve to explain the principles of the disclosure. A brief description of the drawings is as follows:

FIG. 1 illustrates phase 1 of a cycle of a first embodiment of a rotary turbine having features that are examples of inventive aspects in accordance with the principles of the present disclosure, the rotary turbine including one blade;

FIG. 2 illustrates phase 2 of the cycle of the rotary turbine of FIG. 1;

FIG. 3 illustrates phase 3 of the cycle of the rotary turbine of FIG. 1;

FIG. 4 illustrates phase 4 of the cycle of the rotary turbine of FIG. 1;

FIG. 5 illustrates phase 5 of the cycle of the rotary turbine of FIG. 1;

FIG. 6 illustrates phase 6 of the cycle of the rotary turbine of FIG. 1;

FIG. 7 illustrates a top view of a gear arrangement configured for changing the orientation of the blade of the rotary turbine of FIGS. 1-6, the rotary turbine shown in phase 1 of its cycle;

FIG. 8 illustrates the gear arrangement of FIG. 7 in phase 2 of the cycle of the rotary turbine of FIGS. 1-6;

FIG. 9 illustrates the gear arrangement of FIG. 7 in phase 3 of the cycle of the rotary turbine of FIGS. 1-6;

FIG. 10 illustrates the gear arrangement of FIG. 7 in phase 4 of the cycle of the rotary turbine of FIGS. 1-6;

FIG. 11 illustrates the gear arrangement of FIG. 7 in phase 5 of the cycle of the rotary turbine of FIGS. 1-6;

FIG. 12 illustrates the gear arrangement of FIG. 7 in phase 6 of the cycle of the rotary turbine of FIGS. 1-6;

FIG. 13 illustrates a perspective view of the gear arrangement of FIG. 7;

FIG. 14 illustrates a side view of the gear arrangement of FIG. 13;

FIG. 15 illustrates phase 1 of a cycle of another embodiment of a single-blade rotary turbine having similar features to that of the rotary turbine of FIGS. 1-6;

FIG. 16 illustrates phase 2 of the cycle of the rotary turbine of FIG. 15;

FIG. 17 illustrates phase 3 of the cycle of the rotary turbine of FIG. 15;

FIG. 18 illustrates phase 4 of the cycle of the rotary turbine of FIG. 15;

FIG. 19 illustrates phase 5 of the cycle of the rotary turbine of FIG. 15;

FIG. 20 illustrates phase 6 of the cycle of the rotary turbine of FIG. 15;

FIG. 21 illustrates phase 1 of a cycle of a third embodiment of a rotary turbine having features that are examples of inventive aspects in accordance with the principles of the present disclosure, the rotary turbine similar to the rotary turbine of FIGS. 1-6 and including two blades;

FIG. 22 illustrates phase 2 of the cycle of the rotary turbine of FIG. 21;

FIG. 23 illustrates phase 3 of the cycle of the rotary turbine of FIG. 21;

FIG. 24 illustrates a perspective view of a gear arrangement configured for changing the orientation of the blades of the rotary turbine of FIGS. 21-23;

FIG. 25 illustrates a side view of the gear arrangement of FIG. 24;

FIG. 26 illustrates a perspective view of a chain arrangement configured for changing the orientation of the blades of the rotary turbine of FIGS. 21-23;

FIG. 27 illustrates a side view of the chain arrangement of FIG. 26;

FIG. 28 illustrates a perspective view of another gear arrangement configured for changing the orientation of the blades of the rotary turbine of FIGS. 21-23;

FIG. 30 illustrates a perspective view of a gear and chain arrangement configured for changing the orientation of the blades of the rotary turbine of FIGS. 21-23;

FIG. 31 illustrates a side view of the gear and chain arrangement of FIG. 30;

FIG. 32 illustrates phase 1 of a cycle of a fourth embodiment of a rotary turbine having features that are examples of inventive aspects in accordance with the principles of the present disclosure, the rotary turbine similar to the rotary turbine of FIGS. 21-23 and including three blades;

FIG. 33 illustrates phase 2 of the cycle of the rotary turbine of FIG. 32;

FIG. 34 illustrates phase 3 of the cycle of the rotary turbine of FIG. 32;

FIG. 35 illustrates a perspective view of an example gear arrangement configured for changing the orientation of the blades of a two-blade rotary turbine in a radial direction with respect to the orbital path of the blade;

FIG. 36 illustrates a side view of the gear arrangement of FIG. 35;

FIG. 54 illustrates the side view of the rotary turbine of FIG. 51 with a fluid shield/fluid deflector;

FIG. 55 illustrates a perspective view of the fluid shield/fluid deflector of FIG. 54;

FIG. 58 illustrates the perspective view of phase 3 of the cycle of the rotary turbine of FIG. 56;

FIG. 59 illustrates the perspective view of phase 4 of the cycle of the rotary turbine of FIG. 56;

FIG. 67 illustrates a side view of the rotary turbine of FIG. 66 at phase 8 of its cycle;

FIG. 68 illustrates the side view, rotated ninety degrees counter-clockwise, of the two blades and certain components of their orientation control linkage of the rotary turbine of FIG. 66 at phase 1 of its cycle;

FIG. 69 illustrates the side view, rotated ninety degrees counter-clockwise, of the two blades and certain components of their orientation control linkage of the rotary turbine of FIG. 66 at phase 2 of its cycle;

FIG. 70 illustrates the side view, rotated ninety degrees counter-clockwise, of the two blades and certain components of their orientation control linkage of the rotary turbine of FIG. 66 at phase 3 of its cycle;

FIG. 71 illustrates the side view, rotated ninety degrees counter-clockwise, of the two blades and certain components of their orientation control linkage of the rotary turbine of FIG. 66 at phase 4 of its cycle;

FIG. 72 illustrates the side view, rotated ninety degrees counter-clockwise, of the two blades and certain components of their orientation control linkage of the rotary turbine of FIG. 66 at phase 5 of its cycle;

FIG. 73 illustrates the side view, rotated ninety degrees counter-clockwise, of the two blades and certain components of their orientation control linkage of the rotary turbine of FIG. 66 at phase 6 of its cycle;

FIG. 74 illustrates the side view, rotated ninety degrees counter-clockwise, of the two blades and certain components of their orientation control linkage of the rotary turbine of FIG. 66 at phase 7 of its cycle;

FIG. 75 illustrates the side view, rotated ninety degrees counter-clockwise, of the two blades and certain components of their orientation control linkage of the rotary turbine of FIG. 66 at phase 8 of its cycle;

FIG. 89 illustrates a schematic side view of one of the blades of the rotary turbine of FIG. 87 at phase 1 of its cycle;

FIG. 90 illustrates a schematic side view of one of the blades of the rotary turbine of FIG. 87 at phase 2 of its cycle;

FIG. 91 illustrates a schematic side view of one of the blades of the rotary turbine of FIG. 87 at phase 3 of its cycle;

FIG. 92 illustrates a schematic side view of one of the blades of the rotary turbine of FIG. 87 at phase 4 of its cycle;

FIG. 93 illustrates a schematic side view of one of the blades of the rotary turbine of FIG. 87 at phase 5 of its cycle;

FIG. 94 illustrates a schematic side view of one of the blades of the rotary turbine of FIG. 87 at phase 6 of its cycle;

FIG. 95 illustrates a schematic side view of one of the blades of the rotary turbine of FIG. 87 at phase 7 of its cycle;

FIG. 96 illustrates a schematic side view of one of the blades of the rotary turbine of FIG. 87 at phase 8 of its cycle;

FIG. 97 illustrates a schematic side view of one of the blades of the rotary turbine of FIG. 87 at phase 9 of its cycle;

FIG. 98 illustrates a schematic side view of one of the blades of the rotary turbine of FIG. 87 at phase 10 of its cycle;

FIG. 113 is a perspective view that illustrates a pair of baffles that can be included on the turbine of FIG. 104;

FIG. 118 illustrates the side cross-sectional view of the pump of FIG. 114 set at a zero displacement setting;

FIG. 119 illustrates the side cross-sectional view of the pump of FIG. 114 set at an intermediate displacement setting;

FIG. 120 illustrates the side cross-sectional view of the pump of FIG. 114 set at a maximum displacement setting;

FIG. 121 illustrates a perspective view of an inlet and an outlet port of the pump of FIG. 114; and FIG. 122 illustrates a side view of a prior art vane pump.

DETAILED DESCRIPTION

Figure 29:
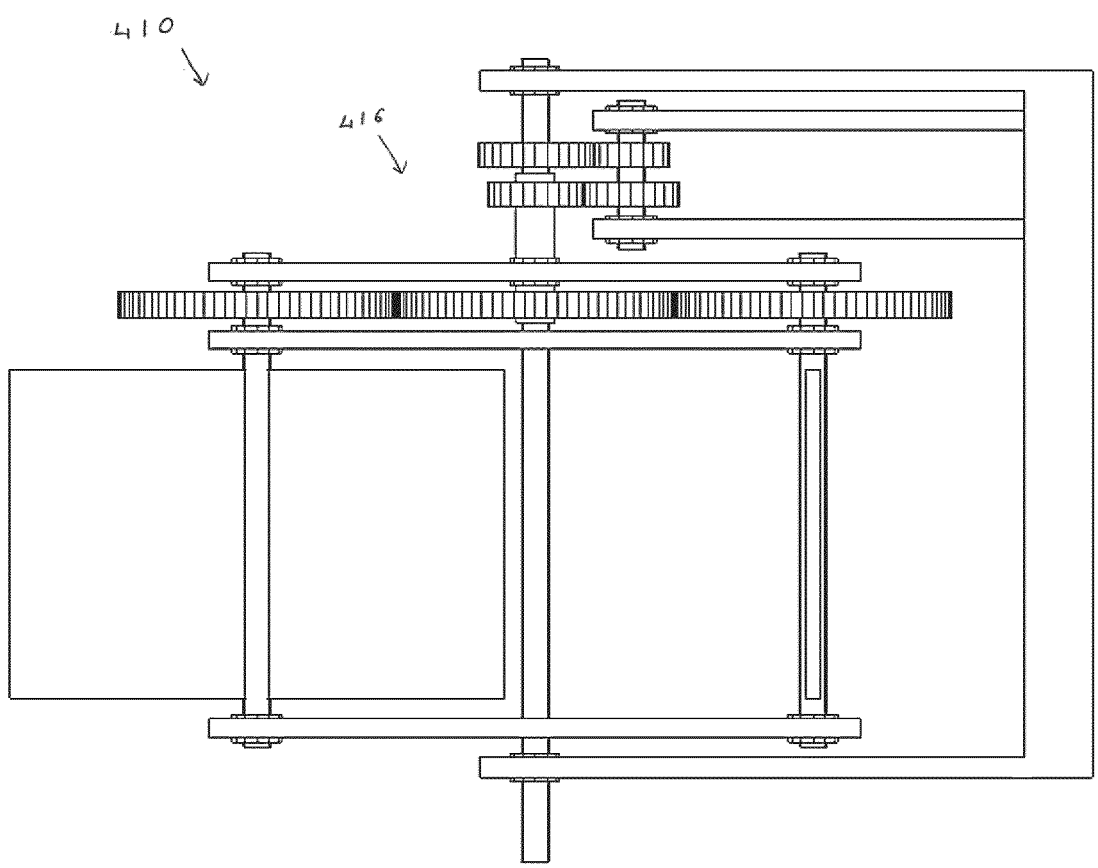
FIG. 29 illustrates a side view of the gear arrangement of FIG. 28.
Figure 37:
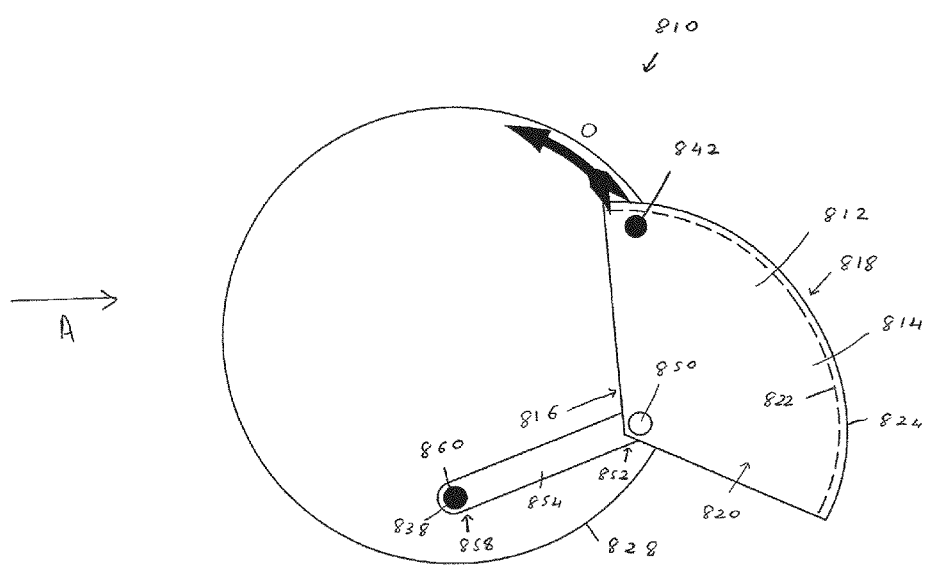
FIG. 37 illustrates phase 1 of a cycle of a fifth embodiment of a rotary turbine having features that are examples of inventive aspects in accordance with the principles of the present disclosure, the rotary turbine shown with one blade, the linkage configured for changing the orientation of the blade with respect to the orbital path of the rotary turbine also shown.
Figure 38:
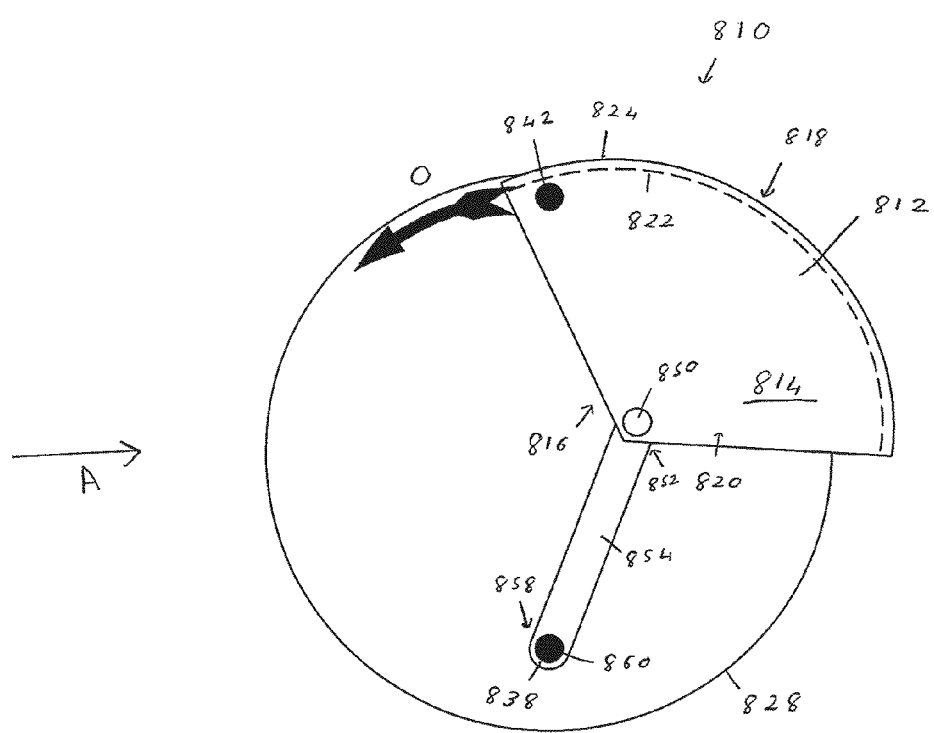
FIG. 38 illustrates phase 2 of the cycle of the rotary turbine of FIG. 37.
Figure 39:
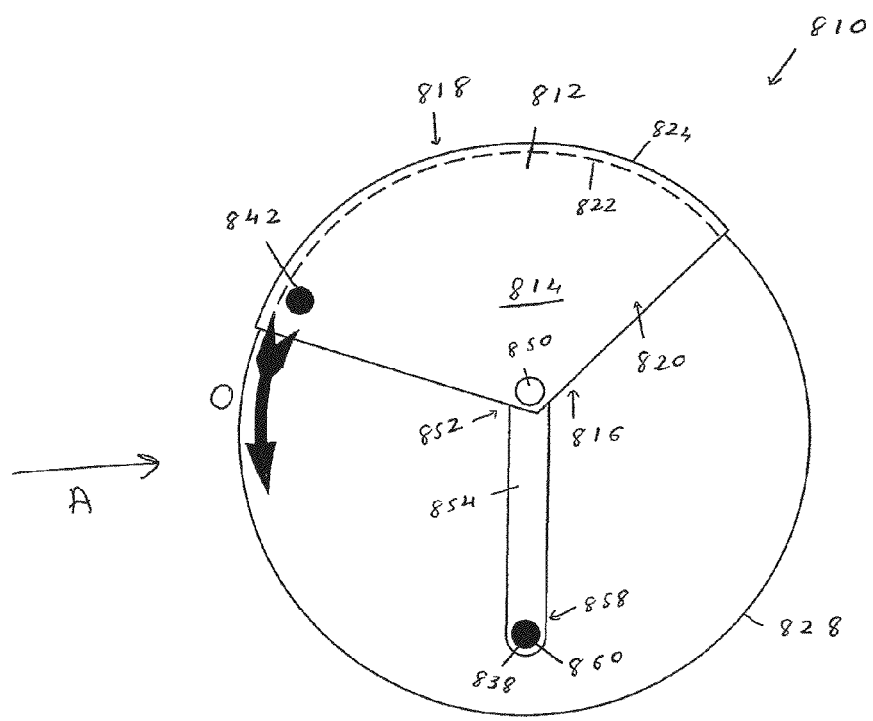
FIG. 39 illustrates phase 3 of the cycle of the rotary turbine of FIG. 37.
Figure 40:
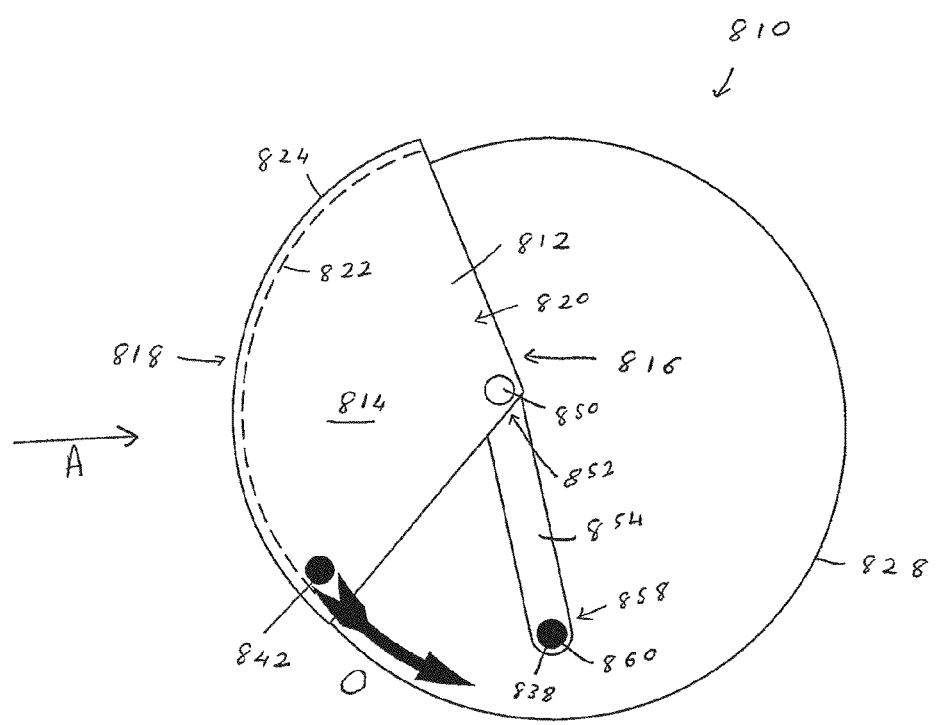
FIG. 40 illustrates phase 4 of the cycle of the rotary turbine of FIG. 37.

Reference will now be made in detail to the exemplary aspects of the present inventive features that are illustrated in the accompanying drawings. Wherever possible, the same reference numbers will be used throughout the drawings to refer to the same or like parts.

The following disclosure relates to devices for harvesting or producing fluid flow. According to one example, the fluid flow device might be a rotary turbine, wherein the harvested fluid is wind. It should be noted that although the following disclosure describes and illustrates a fluid flow device in the form of a rotary turbine, the inventive features disclosed herein may be applicable to all types of fluid devices, whether used for harvesting fluid energy or used for producing fluid flow (e.g., hydronic heating system fluid pumps, aircraft propellers and turbines, fans, blowers, etc.). The types of fluids involved can certainly vary.

In the described embodiments, the examples of rotary turbines are configured such that the orientation of the blade(s) of the rotary turbines change relative to the fluid flow and also relative to an orbital path taken by the rotary turbine. As will be clear from the following disclosure, the orbital path taken by the rotary turbines might be circular or of other shapes. As will be described, in certain embodiments, the change in blade orientation can occur axially with respect to the orbital path taken by the turbine. In other embodiments, the change in blade orientation can occur radially, wherein the blades rotate radially to the orbital path of the turbine. As will be described, the change in blade orientation can occur at many different angles with respect to the orbital path taken by the turbine.

Although the following embodiments are described with respect to having a certain number and shape of blades, such numbers and shapes of the blades may certainly vary. Also, even though the rotary turbines will be described as having blades, the structures that are used to harvest or produce fluid flow may be referred to by other names such as baffles, panels, etc. and virtually any structure that can be used to harvest or produce fluid flow may be used with respect to the examples shown and described.

The change in blade orientation with respect to the orbital path of the rotary turbines may be accomplished through various connections, linkages, and/or gearing arrangements. Although a number of arrangements will be described herein, other arrangements will be familiar to one of ordinary skill in the art and the arrangements described herein should be not used to limit the inventive features of the disclosure. Moreover, the described arrangements are specific to the blade movements shown in the disclosure. Depending upon a desired movement for the blade(s) or the desired change in orientation with respect to the orbital path of a rotary turbine, other arrangements are certainly possible.

In certain example embodiments, blade orientation is linked with turbine orbital orientation by a gear set and/or a chain and sprocket set. Other fixed ratio drive components (e.g., a driveshaft, a timing belt and pulley set, etc.) can be included with and/or substituted for the gear set and/or the chain and sprocket set. As these depicted gear and sprocket sets are of a fixed ratio, the relationship between the blade orientation and the turbine orbital orientation varies linearly in these examples. The fixed ratio drive components above can be replaced by components and/or component sets that have a variable gear ratio. Such turbines with variable ratio components can have a non-linear relationship between the blade orientation and the turbine orbital orientation. Examples of such variable ratio components include an eccentric spur gear pair, non-circular gear pairs (e.g., an elliptical gears pair, a heart-shaped gear wheel pair, etc.), cams or cam pairs (e.g., a conjugate cam pair, a globoidal cam, a barrel cam, etc.), crank and slider sets, Geneva wheels, programmable actuators, etc. An example of a conjugate cam pair is given at U.S. Pat. No. 2,986,949 where an indexing cam structure is described. Indexing or non-indexing conjugate cam pairs can be included in various embodiments of the present disclosure. An example of a globoidal cam is given at U.S. Pat. No. 6,279,219 where an indexing cam structure is described. Indexing or non-indexing globoidal cams can be included in various embodiments of the present disclosure.

FIGS. 1-6 illustrate a first example embodiment of a rotary turbine (i.e., a fluid handling device) 10 having features that are examples of inventive aspects in accordance with the principles of the present disclosure. FIGS. 1-6 illustrate the rotary turbine 10 from a top view, wherein six phases of a complete cycle of the rotary turbine 10 are shown. In the depicted example, the rotary turbine 10 is shown to include one blade 12 that might be used to harvest or produce fluid flow. Wind is the depicted example fluid. As shown through FIGS. 1-6, the rotary turbine 10 is configured such that the orientation of the blade 12 not only changes relative to the wind flow direction as represented by A but also with respect to the orbital path (e.g., circular) of the turbine 10 represented by O. In the illustrated example, the wind flow A is in a direction generally from left to the right, thus creating an orbital path O in the clockwise direction.

Still referring to FIGS. 1-6, during phase 1 (FIG. 1) of the cycle of the rotary turbine 10, the blade 12 is oriented generally perpendicular to wind flow A. At this point in the cycle, the torque generated by the wind on this particular embodiment of the turbine 10 is at a maximum level. As the rotary turbine 10 continues to go through its cycle, as shown, for example, in FIGS. 2 and 3, the wind deflects the blade 12 to provide for a main circular path O for the turbine 10. As the blade 12 rotates, however, the orientation of the blade 12 also changes with respect to this orbital path O. As shown through phases 2-3 of the cycle (FIGS. 2-3), as the blade 12 starts to turn clockwise due to the wind flow A, although the center point C of the blade 12 follows the circular path represented by O, the body 14 of the blade 12 rotates with respect to the circular path O and starts approaching a tangent T of the circular path O. By the time the blade 12 has reached phase 4 of the cycle (FIG. 4), the body 14 of the blade 12 is oriented generally tangential to the orbital path O and oriented generally parallel to the direction of the wind flow A. At phase 4 of the cycle, the drag or deflection from the wind is minimized. As the rotary turbine 10 continues its cycle through phases 5 and 6 (FIGS. 5 and 6), the blade 12 starts to move away from a tangential orientation with respect to the orbital path O and starts approaching the perpendicular orientation shown in phase 1 (FIG. 1) of the cycle.

As discussed above and as will be described in further detail below, the turbine 10 shown in FIGS. 1-6 may be formed through various arrangements that can provide the pattern followed by the blade 12 thereof.

FIGS. 7-14 illustrate one example gearing arrangement 16 for mounting the blade 12 to a fixture or a housing 18 to form a rotary turbine 10 that provides the pattern shown through phases 1-6 in FIGS. 1-6. The gearing arrangement 16 shown in FIGS. 7-14 includes three gears 20, 22, and 24 having the same number of gear teeth. The middle gear 22 is considered a fixed gear and the first and the third gears 20, 24 are configured to rotate around the middle fixed gear 22 to provide the change in orientation of the blade 12 as demonstrated in FIGS. 7-12.

It will be noted that although the middle gear 22 is considered a fixed gear, it is only fixed with respect to the direction of the wind. It is configured to be adjustable to account for any changes in the direction of the wind. As will be discussed in further detail below, the shaft 26, connected to the fixed gear 22, may be coupled to and intermittently or dynamically guided by a high torque motor, actuator, turning vane, etc. that allows adjustment of the orientation of the turbine 10 or the shaft 26 such that it can be rotated to adjust the orientation of the turbine 10 with respect to the wind direction. The orientation adjustment of the turbine 10 can occur while the turbine 10 is running or while it is stopped.

Now referring to FIGS. 13 and 14, the blade 12 and the gearing arrangement 16 are shown as being mounted on the fixture 18 (i.e., housing) to form a turbine 10. It will be noted that the fixture 18 shown in FIGS. 13 and 14 is simply one representative example of a structure that can be used to configure the gearing arrangement 16 shown in FIGS. 7-12 to rotate the blade 12 in accordance with the phases demonstrated in FIGS. 7-12. Different fixtures or housings may certainly be used. In the example shown, the fixture 18 includes a C-shaped main housing 30 defining a base 32 and two arms 34, 36 extending from the base 32. The middle gear 22 is fixedly attached to the upper arm 34 of the main housing 30 through the shaft 26. As discussed before, the shaft 26 may be considered fixed so as to be coupled and intermittently or dynamically guided by a high-torque motor, actuator, turning vane, etc. The shaft 26 extends through a bar 38. The first and the third gears 20, 24 that rotate around the middle fixed gear 22 are attached to the bar 38 adjacent the first and second ends 40, 42 of the bar 38. The first and third gears 20, 24 are attached to the bar 38 through shafts 44, 46 and are rotatable with respect to the shafts 44, 46.

All rotatable connections may be established through bearings or other types of friction-reducing mechanisms.

The first and third gears 20, 24 are rotatably coupled to a first side 48 of the blade body 14. As the blade body 14 rotates, the first and third gears 20, 24 rotate around the fixed middle gear 22 to provide the change in orientation shown in FIGS. 7-12.

Attached at an opposite second end 50 of the blade body 14 is a shaft 52 fixedly coupled thereto. The shaft 52 is coupled to what is considered an output shaft 54 of the turbine 10 through a second bar 56. The second bar 56 is rotatably coupled to the second end 50 of the blade body 14 through the shaft 52 and is fixedly coupled to the output shaft 54 of the turbine 10. The output shaft 54 extends through the second arm 36 of the main housing 30 and rotates as wind flow is harvested by the blade 12.

Depending upon the different applications the rotary turbine 10 is used for, the output shaft 54 may be coupled to different mechanisms. For example, according to one example embodiment, the output shaft 54 may be coupled to a generator for production of electricity. Different gearing arrangements may be used to transfer the rotational motion of the output shaft 54 to the generator.

As noted previously, the gearing arrangement 16 and the fixture 18 for supporting the gearing arrangement 16 shown in FIGS. 7-14 is only one example of the type of coupling arrangements that can be used to provide the desired movement for the blade 12 and to harvest the wind flow and transform it into rotational energy through the output shaft 54. Other types of coupling arrangements are certainly possible.

In the phases illustrated in FIGS. 1-6, the direction of the wind extends generally from left to the right. During phase 1 of the cycle, the blade body 14 is oriented perpendicular to the wind direction A. In phase 4 of the cycle, the blade body 14 is oriented parallel to the wind direction A. As discussed above, it would be advantageous to be able to adjust the orientation of the rotary turbine 10 to account for any changes in wind direction A. Thus, it would be advantageous to adjust the blade 12 such that it is always oriented perpendicular to the wind direction A during phase 1 of the cycle.

The rotary turbines described herein are preferably configured such that the blade(s) can be set to any direction/orientation to account for variations in wind direction A. As discussed above, the fixture 18 and gearing arrangement 16 shown in FIGS. 7-14 and also the connection arrangements that will be discussed below allow adjustment of the blade(s) with respect to wind direction A. Once the blade(s) is adjusted, the blade(s) follows the same relative pattern as shown through phases 1-6 of the cycle.

As discussed above, even though the middle gear 22 is considered a fixed gear wherein the first and third gears 20, 24 rotate around it, the middle gear 22 is ideally fixed only with respect to the general wind direction A. As such, the shaft 26 of the fixed gear 22 may be coupled to and intermittently or dynamically guided by a high-torque motor, actuator, turning vane, etc., allowing rotatable adjustment of the fixed gear 22 to maintain the orientation of the turbine 10 with respect to the general wind direction A. The actual wind direction can vary from the general wind direction A at any given moment. The orientation adjustment of the turbine 10 can occur automatically and continuously while the turbine 10 is running or while it is stopped.

As mentioned above, although the blade 12 illustrated in the rotary turbine of FIGS. 1-6 includes a blade body 14 with a flat, planar configuration, depending upon the application, virtually any shape may be used for the blade 12.

For example, another embodiment for a single blade design is shown in FIGS. 15-20. In its simplest form, the single blade 112 defines two end portions 100, 101 coupled to a rotary fixture 102 through a rotatable shaft 103. The two end portions 100, 101 define both convex and concave curvatures 104, 105 configured to maximize the amount of torque created as the blade 112 goes through the cycles shown in FIGS. 1-6. The convexity and the concavity of the two ends 100, 101 of the blade 112 oppose each other so as to limit the reverse torque or deflection that might be experienced on a planar blade as it goes through cycles 1-6, shown in FIGS. 1-6.

Referring to FIGS. 15-20, for example, when the blade 112 is at phase 1 of the cycle, the concave curvature 105 of the upper end (first end) 100 of the blade 112 opposes the wind flow, harvesting the energy. The convex curvature 104 of the lower end (second end) 101 of the blade 112 also opposes the wind flow, however, reducing the drag or deflection that might be experienced on an otherwise flat, planar blade. The two ends 100, 101 are curved such that, as the rotary turbine goes through its cycle through the rest of the phases 2-6, the two ends 100, 101 work together to minimize the deflection and to maximize the torque created with respect to the wind flow. For example, as shown in FIG. 18, during phase 4, when the blade 112 is generally oriented parallel to the direction of the wind flow A, the curvature 104 of the second end 101 reduces drag while the curvature 105 of the first end 100 utilizes the wind flow to create a downward push on the blade 112 to move it toward phase 5 (please see FIG. 19), at which point the second end 101 starts taking over in capturing the wind flow (e.g., as in phase 6 shown in FIG. 20).

As noted above, in addition to different shaped blades, the rotary turbines described herein can include any number of blades, given the spatial availability and depending upon the need and the application. For example, an embodiment of a rotary turbine 210 that includes two blades 212, 213, wherein both blades simultaneously change their orientation as they travel in an orbital path O is shown in FIGS. 21-23. An embodiment of a rotary turbine 610 that includes three blades 611, 612, 613, wherein all three blade simultaneously change their orientation as they travel in an orbital path O is shown in FIGS. 32-34.

As in the single-blade turbine 10, the blades 212, 213 of a dual-blade turbine 210 can be coupled to a fixture or a housing 218 to form a rotary turbine 210 through various coupling arrangements that can provide the pattern to be followed by both of the blades 212, 213. FIGS. 24 and 25 illustrate one example of a gearing arrangement 216 that provides the pattern shown in the cycle illustrated in FIGS. 21-23. As shown in FIGS. 21-23, the rotary turbine 210 is configured such that while one of the blades 212 is oriented perpendicular to the wind direction A, the other blade 213 is oriented parallel to the wind direction A, in phase 1 of the cycle.

The gearing arrangement 216 shown in FIGS. 24-25 is configured to keep the relative orientation of the two blades 212, 213 in the positions shown in FIGS. 21-23. In the gearing arrangement 216 shown in FIGS. 24-25, a C-shaped main housing 230 defines a base 232 and two arms 234, 236 extending from the base 232. A fixed middle gear 222 extends from the upper arm 234 of the main housing 230 via a shaft 226. As in the earlier described embodiment, although the middle gear 222 is considered a fixed gear, it is only fixed with respect to the direction of the wind A. It is configured to be adjustable to account for any changes in the direction of the wind A. The shaft 226, connected to the fixed gear 222, may be coupled to and intermittently or dynamically guided by a high-torque motor, actuator, turning vane, etc. that allows adjustment of the orientation of the turbine 210 or the shaft 226 such that it can be rotated to adjust the orientation of the turbine 210 with respect to the wind direction A. The orientation adjustment of the turbine 210 can occur while the turbine 210 is running or while it is stopped.

A subassembly 240 including first and second parallel bars 242, 244 and four shorter crossbars 246, 248, 250, 252 is rotatably coupled to the fixed gear shaft 226. The subassembly 240 includes a right assembly 254 and a left assembly 256 that is similar to the right assembly 254. The left assembly 256 includes a shaft 258 with two gears 260, 262 attached at the ends thereof, the shaft 258 extending through the crossbars 246, 248. One of the two gears 260, 262 meshes with a larger gear 264 coupled to a shaft 266 connected to the first blade 212. The other of the two gears 260, 262 meshes with the fixed gear 222. The right assembly 254 also includes a shaft 268 with two gears 270, 272 attached at the ends thereof, the shaft 270 extending through the crossbars 250, 252. One of the two gears 270, 272 meshes with a larger gear 274 coupled to a shaft 276 connected to the second blade 213. The other of the two gears 270, 272 meshes with the fixed gear 222. The shafts 266, 276 connecting the first and second blades 212, 213, respectively, extend through a third bar 280 located adjacent the second arm 236 of the main housing 230. An output shaft 282 connects the subassembly 240 and the third bar 280 and extends through the second arm 236 of the main housing 230. Again, the output shaft 282, depending upon the application for the rotary turbine 210, may be coupled to a variety of different mechanisms. For example, according to one example embodiment, the output shaft 282 may be coupled to a generator.

As shown in the cycle of FIGS. 21-23, as the first blade 212 catches wind flow, it not only starts to rotate the entire turbine 210 clockwise, but also starts turning clockwise relative to the circular path O of the turbine 210. The first and the second blades 212, 213 each follow a similar pattern illustrated for the single blade turbine 10 in FIGS. 1-6.

The gearing arrangement 216, shown in FIGS. 24 and 25, is configured to provide the rotation of the turbine 210 and the blades 212, 213 thereof illustrated in FIGS. 21-23. Referring to FIGS. 24-25, as the first blade 212 catches the wind and the second blade 213 cuts trough the wind, the entire assembly of blades and gears rotates about the output shaft 282 and the fixed gear shaft 226. Being fixed to the output shaft 282, the rotating assembly causes the output shaft 282 to rotate. Being rotatably coupled about the fixed gear shaft 226 and having gear teeth enmeshed with the gear shaft 226, the gearing arrangement causes the blades 212, 213 to follow the pattern of FIGS. 21-23.

As the entire subassembly 240 rotates, the output shaft 282 of the rotary turbine 210 also rotates, transforming the translational wind energy into rotational energy. In the gearing arrangement 216 shown in FIGS. 24-25, the larger gears 264, 274 coupled to the first and second blades 212, 213, respectively, have twice as many gear teeth as the smaller gears 260, 262, 270, 272, and 222. In this manner, through one full revolution of the subassembly 240 (also the output shaft 282), the first blade 212 and the second blade 213 switch relative positions (see FIGS. 21-23). When the subassembly 240 has gone through its rotation twice, the first blade 212 goes through one complete cycle and the second blade 213 also goes through one complete cycle.

Also, as mentioned above for the example embodiment of the single blade turbine 10, the dual bladed rotary turbine 210 is configured such that the blades 212, 213 can be set to any direction to match the direction of the wind to maximize the efficiency. The fixture 218 and gearing arrangement 216 shown in FIGS. 24-25 allow adjustment of the blades 212, 213 with respect to wind direction A. Once the blades 212, 213 are adjusted, they follow the same relative pattern as shown through phases 1-3 of FIGS. 21-23.

As discussed above, even though the middle smaller gear 222 may be considered a fixed gear, it is only fixed with respect to the wind direction. As such, the shaft 226 of the fixed gear 222 may be coupled to and intermittently or dynamically guided by a high-torque motor, actuator, turning vane, etc., allowing rotatable adjustment of the fixed gear 222 to maintain the orientation of the turbine 210 with respect to the wind direction A. The orientation adjustment of the turbine 210 can occur while the turbine 210 is running or while it is stopped.

As noted above, the gearing arrangement 216 and the fixture 218 for supporting the gearing arrangement 216 shown in FIGS. 24-25 is only one example of the type of coupling arrangements that can be used to provide the desired movement for the dual-bladed turbine 210 and to harvest the wind flow to transform it into a rotational energy through the output shaft 282. Other types of coupling arrangements are certainly possible.

FIGS. 26-27 illustrate another example coupling arrangement 316 that utilizes chains and sprockets for providing the rotational pattern of the blades shown in FIGS. 21-23. In the embodiment shown in FIGS. 26-27, a C-shaped housing 330 defines first and second arms 334, 336 extending from a base 332. A first shaft 326 is fixed to the first arm 334 and extends through a first bar 338. Again, the first shaft 326 is considered fixed relative only to the general wind direction A. It is can be coupled to a high-torque motor, actuator, turning vane, etc. and can allow adjustability of the blade with respect to the wind direction and can be locked or actively controlled during operation.

Still referring to FIGS. 26-27, the fixed shaft 326 includes thereon two smaller sized sprockets 350, 352. The first small sprocket 350 is attached via a first chain 354 to first large sprocket 356 which is fixed to a shaft 358 coupled to the first blade 312. The second small sprocket 352 is attached via a second chain 360 to a second large sprocket 362 that is fixed to a shaft 364 coupled to the second blade 313. The shafts 358, 364 coupled to the blades 312, 313, respectively, extend through a second bar 370 located adjacent the second arm 336 of the housing 330. The second bar 370 includes an output shaft 382 of the turbine 310, which extends through the second arm 336 of the C-shaped housing 330.

As the first blade 312 catches the wind and the second blade 313 cuts through the wind, the entire assembly of blades and chains and sprockets rotates about the output shaft 382 and the fixed sprocket shaft 326. Being fixed to the output shaft 382, the rotating assembly causes the output shaft 382 to rotate. Being rotatably coupled about the fixed sprocket shaft 326 and having the sprockets 356 and 362 chained to the fixed sprockets 350 and 352 that are fixed to sprocket shaft 326, the chain and sprocket arrangement causes the blades 312, 313 to follow the pattern of FIGS. 21-23. The sprocket and chain arrangement 316 of FIGS. 26-27 is configured such that the first and second blades 312, 313 of the rotary turbine 310 follow the cycle shown in FIGS. 21-23. In the depicted embodiment, the larger sprockets 356, 362 are twice the size of the smaller sprockets 350, 352 to cause the relative movement of the blades shown in FIGS. 21-23.

As discussed above, the sprocket and chain arrangement 316 can be adjusted with respect to the general wind direction A by intermittently or dynamically guiding the fixed shaft 326 (e.g., through a high-torque motor, actuator, turning vane, etc.).

As discussed previously, there may be numerous connection/coupling arrangements that can be utilized to provide the relative movement of the blades shown in FIGS. 21-23. The arrangements disclosed and described herein are simply some of the numerous possible arrangements and the inventive aspects of the disclosure should not be limited to these examples illustrated.

FIGS. 28-29 illustrate, for example, another type of a gearing arrangement 416 suitable for the dual-blade rotary turbine 410. FIGS. 30-31 illustrate, for example, an arrangement 516 suitable for the dual-blade turbine 510 that utilizes a combination of gears and also chains and sprockets.

Features and the specific operation of the connection/coupling arrangements illustrated in the disclosure will not be discussed in further detail noting that one skilled in the art will fully appreciate the operational aspects of these arrangements for providing the desired movement of the blades of the rotary turbines described herein.

Referring now to FIGS. 32-34, the three-blade rotary turbine 610 is illustrated. The three blade turbine 610 utilizes the same principles as the earlier described one-blade and dual-blade turbines 10, 210. The three blade turbine 610 can include any of the previously described coupling arrangements and combinations thereof for coupling the blades 611, 612, 613 to a fixture or housing to provide the pattern followed by the blades 611, 612, 613 shown in FIGS. 32-34.

Although in the earlier described embodiments of the turbines, the blades and the coupling arrangements are configured such that the change in blade orientation occurs axially to the orbital path O taken by the turbine, in other embodiments, the change in blade orientation can occur in other directions or angles. For example, the change in blade orientation can occur radially, wherein the blades rotate radially with respect to the orbital path of the turbine. Please see FIGS. 35 and 36 for an example embodiment of a rotary turbine 710 that includes blades 712, 713, wherein the change in blade orientation is radial to the orbital path O of the turbine 710.

An axial change in orientation, as used herein, means that the axis of rotation for the individual blades is parallel to the rotational axis of the orbital path O. A radial change in orientation, as used herein, means that the axis of rotation for the individual blades is perpendicular to the rotational axis of the orbital path O.

As noted above, in other embodiments, the change in orientation of the blades may be in any angle or direction with respect to the rotational axis of the orbital path of the turbine.

Still referring to FIGS. 35 and 36, in the radial coupling arrangement 716, a subassembly 740 including two blades 712, 713 is positioned between the arms 734, 736 of a C-shaped housing 730. As the first blade 712 rotates, a first larger gear 714 coupled to a shaft 717 attached to the first blade 712 rotates with respect to a fixed gear 722. This in turn rotates the entire subassembly 740. As the subassembly 740 starts rotating, a second larger gear 718 coupled to a shaft 719 attached to the second blade 713 starts rotating around the fixed gear 722, rotating the second blade 713. In this manner, while the subassembly 740 of the rotary turbine 710 rotates in a circular path O, the first and second blades 712, 713 rotate in an axis perpendicular to the orbital path O of the rotary turbine 710.

Again, as in the coupling arrangements discussed above, the fixed gear 722 may be considered fixed with respect to the general wind direction A. As such, the fixed gear 722 can be adjusted with respect to the wind direction A by unlocking, rotating, and locking or otherwise controlling the fixed shaft 726 (e.g., through a high-torque motor, actuator, turning vane, etc.). In this manner, the blades 712, 713 are initially set and/or continuously adjusted to a desired orientation with respect to the wind flow to maximize turbine efficiency.

In certain example embodiments above, blade orientation is linked with turbine orbital orientation by a gear set and/or a chain and sprocket set. As these depicted gear and sprocket sets are of a fixed gear ratio, the relationship between the blade orientation and the turbine orbital orientation varies linearly in these examples. The fixed ratio gear sets and/or the fixed ratio chain and sprocket sets above can be replaced by components and/or component sets that have a variable gear ratio. Such turbines with variable ratio components can have a non-linear relationship between the blade orientation and the turbine orbital orientation. Examples of such variable ratio components include an eccentric spur gear pair, non-circular gear pairs (e.g., an elliptical gears pair, a heart-shaped gear wheel pair, etc.), cams or cam pairs (e.g., a conjugate cam pair, a globoidal cam, a barrel cam, etc.), crank and slider sets, Geneva wheels, programmable actuators, etc.

FIGS. 37-43 illustrate a fifth embodiment of a rotary turbine (i.e., a fluid handling device) 810 having features that are examples of inventive aspects in accordance with the principles of the present disclosure. Even though the rotary turbine can include any number of blades, the rotary turbine 810 is shown in FIGS. 37-43 to include one blade 812. In FIGS. 37-42, six different phases of a complete cycle of the rotary turbine 810 are illustrated. For the purpose of discussion, the phase depicted at FIG. 37 will be referred to as phase 1, the phase depicted at FIG. 38 will be referred to as phase 2, the phase depicted at FIG. 39 will be referred to as phase 3, the phase depicted at FIG. 40 will be referred to as phase 4, the phase depicted at FIG. 41 will be referred to as phase 5, and the phase depicted at FIG. 42 will be referred to as phase 6. The complete cycle of the rotary turbine 810 could be broken down into a different number of phases (e.g., 4 phases, 9 phases, etc.). The motion from phase to phase can be generally continuous. The operation of the coupling arrangement of the turbine 810, including the linkage configured for changing the orientation of the blade 812 with respect to the orbital path O of the turbine 810, can be seen through the different phases of the cycle of the rotary turbine 810.

Figure 46:
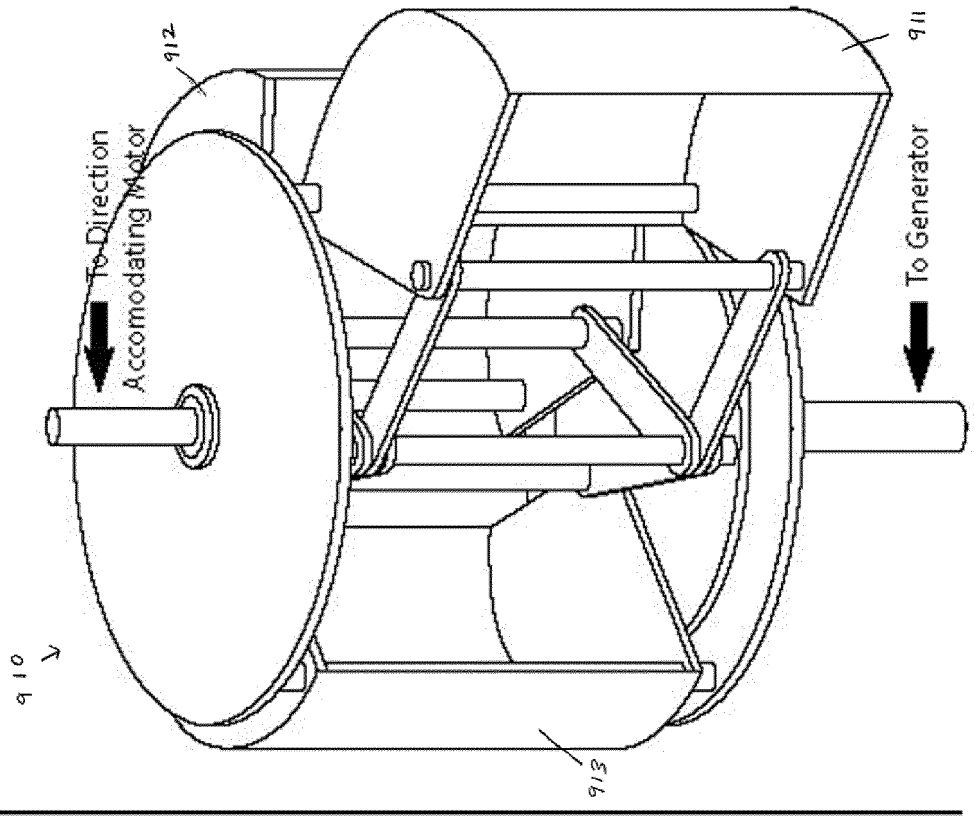
FIG. 46 illustrates a perspective view of the rotary turbine of FIGS. 44-45.

Referring now to FIGS. 37-42 and 46 (FIG. 46 illustrates a three-blade version of the turbine), the blade 812 includes a body 814 defining a front end 816 and a rear end 818. The front end 816 of the blade 812 is configured as a wind catching portion 820 of the blade 812. The wind catching portion 820 might define a concave surface 822 of a bucket type structure. The concave surface 822 has a relatively high coefficient of aerodynamic drag when facing into the wind. The rear end 818 of the blade 812 defines a convex surface 824 designed for cutting through the wind with minimal deflection. The convex surface 824 has a relatively low coefficient of aerodynamic drag when facing into the wind.

Figure 41:
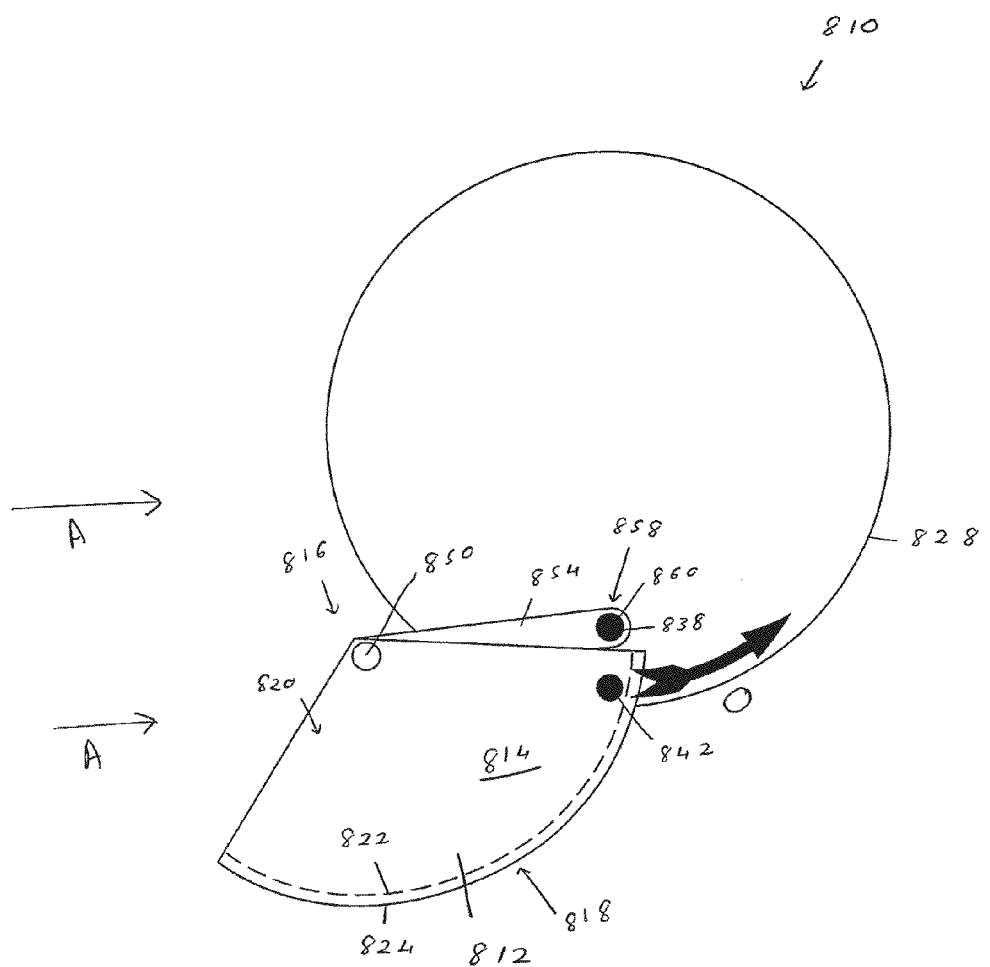
FIG. 41 illustrates phase 5 of the cycle of the rotary turbine of FIG. 37.
Figure 42:
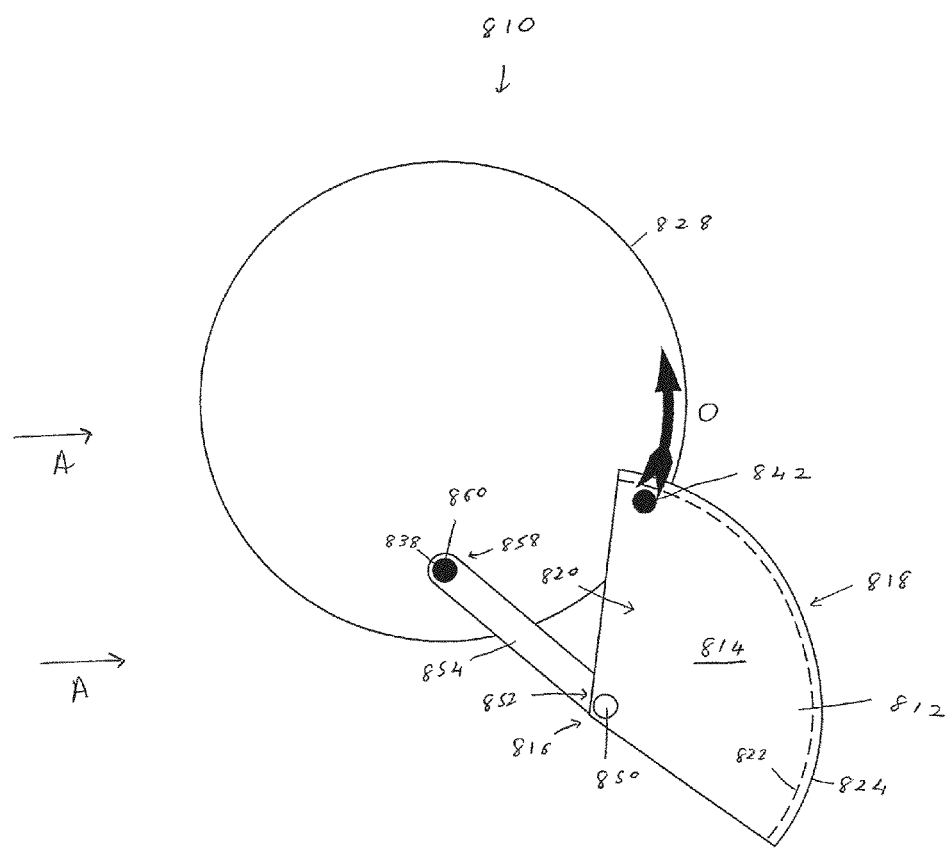
FIG. 42 illustrates phase 6 of the cycle of the rotary turbine of FIG. 37.

As shown in FIGS. 37-42, the rotary turbine 810 is configured such that the blade 812 radially extends as far outwardly as possible based on the coupling arrangement when the wind catching portion 820 of the body 814 is facing the wind flow A (please see FIGS. 41-42). This arrangement maximizes the moment arm and the torque available. This radial extension of the blade 812 will be referred to as the reach of the blade 812.

The turbine 810 is configured such that the orientation of the blade 812 changes as the blade 812 moves through the phases of the cycle (please see FIGS. 37-40). When the blade 812 is moving through phases 1-4 (toward a return portion of the cycle), the blade 812 is pulled in toward the center of the circular path O thereby reducing the reach of the blade 812. In this manner, as the blade 812 is pulled closer to toward the center of the circular path O, the convex rear surface 824 is exposed to the wind flow and is able to glide therethrough with minimal deflection. Wind induced torque on the blade 812 during the return portion of the turbine's 810 cycle is thus reduced by a reduced moment arm (i.e., a shorter reach) of the blade 812 and the lower coefficient of aerodynamic drag of the convex rear surface 824. The effects of the shorter reach and the lower coefficient of drag are compounded and thereby produce relatively low wind induced blade 812 torque during the blade 812 return portion of the cycle of the turbine 810.

Figure 43:
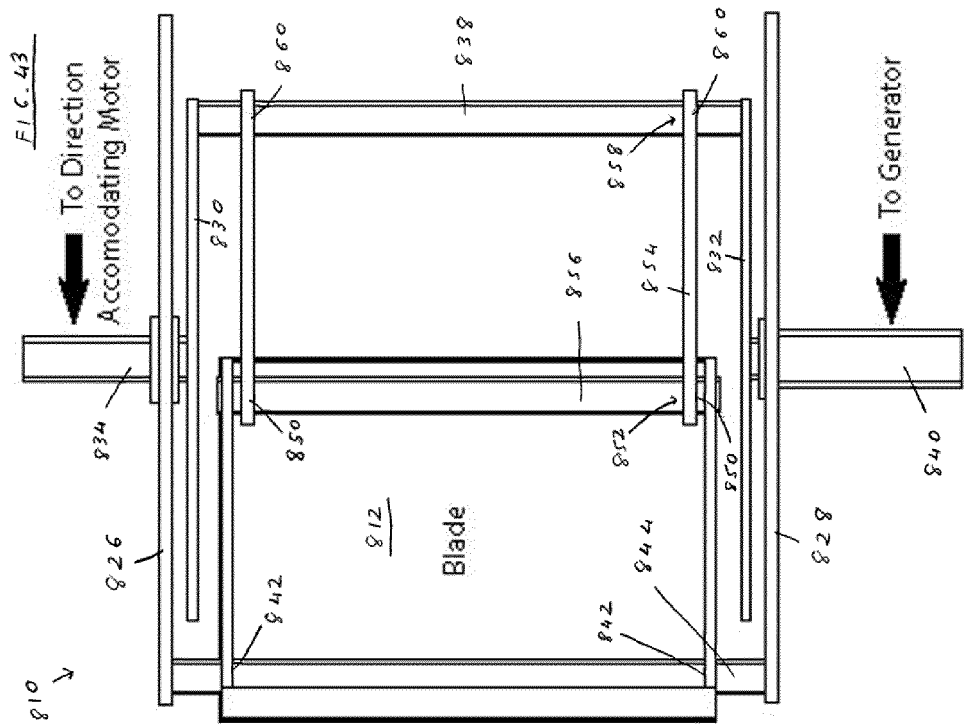
FIG. 43 illustrates a side view of the rotary turbine of FIGS. 37-42.

FIG. 43 illustrates a side view of the rotary turbine 810 of FIGS. 37-42 including one sample linkage configuration for providing the movement illustrated in FIGS. 37-42. Referring to FIGS. 37-43, in the embodiment illustrated, the rotary turbine 810 includes a rotating top plate 826 and a rotating bottom plate 828 (i.e., rotatable plates). The rotating top and bottom plates 826, 828 are fixedly coupled to an output shaft 840. In the depicted embodiment, the top and bottom plates 826, 828 are rotatably coupled to top and bottom control plates 830, 832, respectively, along an axis that generally coincides with an axis of the output shaft 840. In the depicted embodiment, a turbine control shaft 834 is rotationally coupled with the top and bottom control plates 830, 832, and an axis of the turbine control shaft 834 generally coincides with the axis of the output shaft 840. The two control plates 830, 832 are coupled together with a control shaft 838 and position the control shaft 838. By rotating the turbine control shaft 834, the circumferential position of the control shaft 838 can be adjusted and/or controlled. The turbine control shaft 834 can be rotated with respect to ground by a high torque motor and/or other means. In other embodiments, the control shaft's 838 radial position can also be adjusted (e.g. with a radially oriented linear actuator connected between the top and bottom control plates 830, 832 and the control shaft 838). In still other embodiments, the position of the control shaft 838 can be adjusted and/or controlled by other means. The control shaft 838 can be adjusted while the rotary turbine 810 is running and/or while the rotary turbine 810 is not running.

As shown in FIG. 43, the top rotating plate 826 is rotatably coupled to the top control plate 830 via the turbine control shaft 834. The turbine control shaft 834, as in the embodiments described earlier, is preferably oriented with respect to the wind direction and can be rotated to change the direction of the blade(s) 812 of the turbine 810 for adjusting the orientation of the rotary turbine 810. The bottom rotating plate 828 is rotationally coupled to the output shaft 840 that might be coupled to a generator for utilizing the rotational energy harvested from the translational wind flow.

If the wind direction is different than what the turbine 810 is set for, the orientation of the turbine 810 can be changed. By rotating the turbine control shaft 834, the top and bottom control plates 830, 832, as well as the control shaft 838, connecting the control plates 830, 832, can be intermittently or dynamically moved with respect to the general wind direction A for maximum efficiency. The orientation adjustment of the rotary turbine 810 can occur while the rotary turbine 810 is running or stopped (e.g., by a control system and actuators, by a turning vane, by the high torque motor, etc.). By circumferentially adjusting the position of the control shaft 838, the wind catching orientation of the turbine 810 (i.e., the rotational positions about the turbine 810 at which the blade 812 is in its wind catching configuration) can be adjusted. By radially adjusting the position of the control shaft 838, the reach of the blade 812 can be adjusted (i.e., increased and decreased).

As shown in FIGS. 37-42, the blade 812 is coupled to the top and bottom rotating plates 826, 828 through a first connection 842. The first connection 842 is established through a shaft 844 fixed to the top and bottom rotating plates 826, 828. The blade 812 pivots about the shaft 844. It should be noted that, for simplicity and ease of illustration and description, only the bottom rotating plate 828 is shown in FIGS. 37-42. In the example embodiment, the blade 812 is also coupled to the top rotating plate 826 in the same manner that it is coupled to the bottom rotating plate 828, as shown in FIG. 43.

Still referring to FIGS. 37-42, the turbine 810 includes a second connection 850. The second connection 850 is a pivotal connection between one end 852 of a link 854 and a shaft 856 connected to the blade 812. Still referring to FIGS. 37-42, an opposite end 858 of the link 854 is connected to the control shaft 838 that connects together the control plates 830, 832. This provides a third connection 860, which is a pivotable connection.

As the rotating plates 826, 828 rotate, the control plates 830, 832, as well as, the control shaft 838 can remain stationary. Since the blade 812 is attached to the rotating plates 826, 828 through the first connection 842 and also attached to the control shaft 838 through the link 854 at the second and third connections 850, 860, the blade 812 follows the path illustrated in FIGS. 37-42. In this manner, at the position wherein the concave surface 822 defined by the wind catching portion 820 of the blade 812 is facing the wind flow for harvesting the wind flow (i.e., at a working portion of the cycle), the reach of the blade 812 is extended out from the center of the orbital path to maximize the torque on the turbine 810. Wind induced torque on the blade 812 during the working portion of the turbine's 810 cycle is thus increased by an increased moment arm (i.e., a longer reach) of the blade 812 and the higher coefficient of aerodynamic drag of the concave surface 822. The effects of the longer reach and the higher coefficient of drag are compounded and thereby produce relatively high wind induced blade 812 torque during the blade 812 working portion of the cycle of the turbine 810. As mentioned above, when the blade 812 is turning against the wind flow, as in phases 1-4, the blade 812 is pulled in toward the center of the path of the turbine 810 as the convex surface 824 of the blade 812 (matching the circular curvature of the rotating plates 826, 828) cuts through the wind flow to minimize deflection and the wind induced blade 812 torque. The wind induced blade 812 torque generally occurs in opposite directions during the working portion and the return portion of the blade's 812 cycle. By maximizing the wind induced blade 812 torque during the working portion and minimizing the wind induced blade 812 torque during the return portion, the wind induced blade 812 torque of the working portion prevails and can be substantially harvested by the generator.

The blade 812 of the rotary turbine 810 is oriented with respect to the rotary turbine 810 by an equivalent of a four bar linkage. A first link of the four bar linkage can be considered a ground link and includes a frame of the rotary turbine 810 that holds the output shaft 840 rotation axis with respect to the third connection 860. A second link of the four bar linkage includes the link 854 which is rotatably mounted on the third connection 860 and includes the second connection 850. A third link of the four bar linkage includes the blade 812 that is rotatably connected to the second connection 850 and also rotatably mounted on the first connection 842 of the top and bottom rotating plates 826, 828 (via the shaft 844). The fourth link of the four bar linkage includes the top and bottom rotating plates 826, 828 that includes the first connection 842 and is rotatably mounted along the rotation axis of the output shaft 840. In certain embodiments, the four bar linkage of the rotary turbine 810 can have characteristics of a crank and rocker mechanism.

Figure 45:
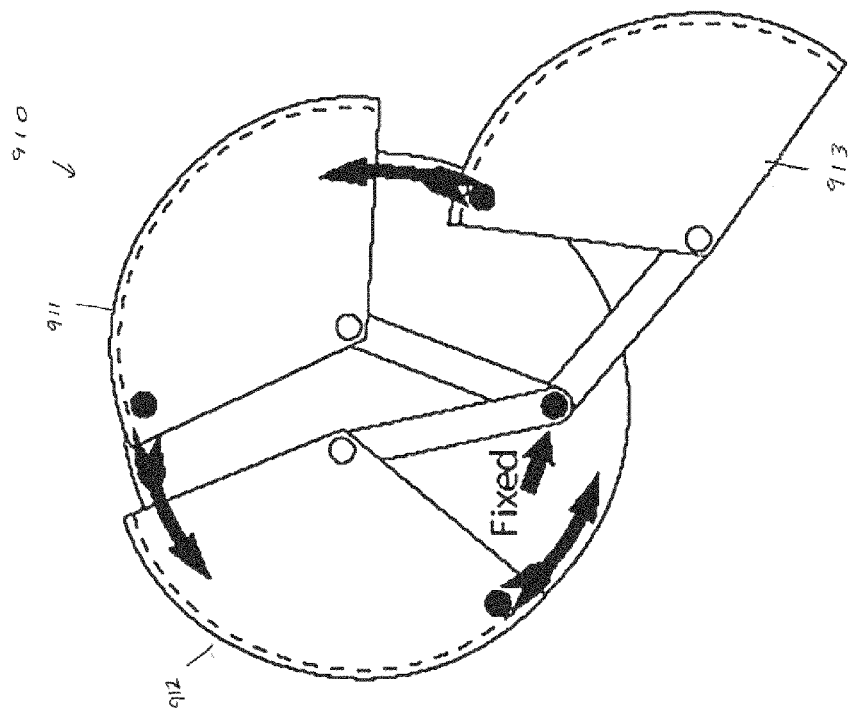
FIG. 45 illustrates phase 2 of the cycle of the rotary turbine of FIG. 44.
Figure 44:
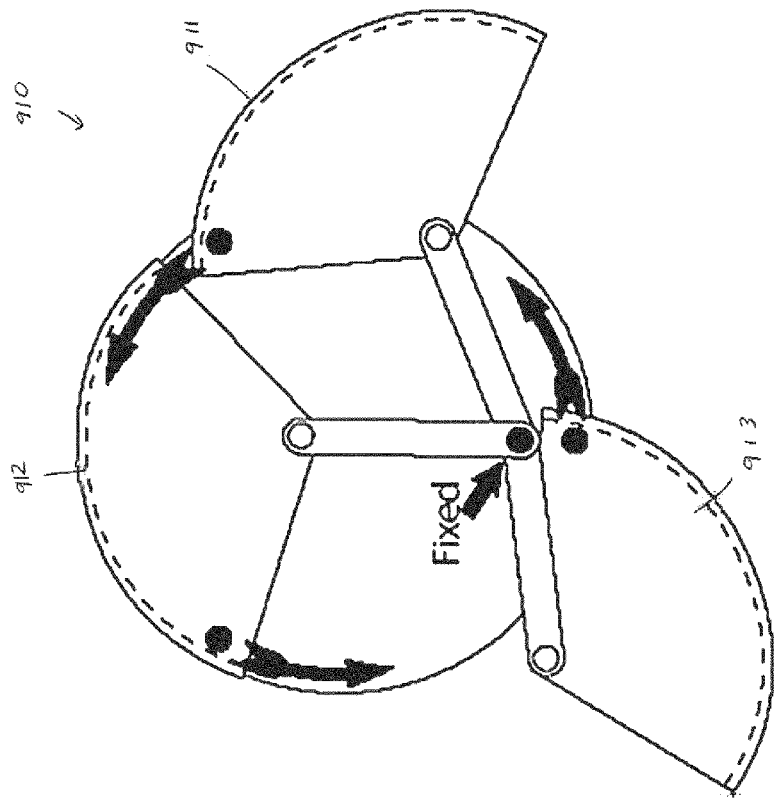
FIG. 44 illustrates phase 1 of a cycle of a sixth embodiment of a rotary turbine having features that are examples of inventive aspects in accordance with the principles of the present disclosure, the rotary turbine similar to the rotary turbine of FIGS. 37-42 and shown with three blades, the linkage configured for changing the orientation of the blades with respect to the orbital path of the rotary turbine also shown.

FIGS. 44-46 illustrate a rotary turbine 910 having similar operational characteristics to that of FIGS. 37-43. However, the embodiment shown in FIGS. 44-46 includes three blades 911, 912, 913. The coupling arrangement for each of the three blades 911, 912, 913, including the linkage configured for changing the orientation of the blades 911, 912, 913 with respect to the orbital path of the turbine 910, can be seen through the two different phases of the cycle of the rotary turbine 910 in FIGS. 44-45. A four bar linkage is formed for each of the three blades 911, 912, 913 of the rotary turbine 910 in a similar manner to the four bar linkage of the rotary turbine 810.

As shown in FIGS. 44-45, each of the three blades 911, 912, 913 include the first, second and third connections (842, 850, and 860) described above for the single blade rotary turbine 810 of FIGS. 37-43. As shown in FIG. 44, when the three-blade turbine 910 is at phase 1 of its cycle, the first blade 911 is positioned at phase 1 (of the single blade version in FIG. 37), the second blade 912 is positioned at phase 3 (of the single blade version in FIG. 39), and the third blade 913 is positioned at phase 5 (of the single blade version in FIG. 41). As shown in FIG. 45, when the three-blade turbine 910 is at phase 2 of its cycle, the first blade 911 is positioned at phase 2 (of the single blade version in FIG. 38), the second blade 912 is positioned at phase 4 (of the single blade version in FIG. 40), and the third blade 913 is positioned at phase 6 (of the single blade version in FIG. 42).

FIG. 46 illustrates a perspective view of the rotary turbine 910 of FIGS. 44-45 that includes the three blades 911, 912, 913. As discussed above, each of the three blades 911, 912, 913 is coupled to the turbine 910 with a linkage configuration that is similar to the single blade version and operates in a similar manner as the single blade version.

Although one example embodiment of a blade is shown for the rotary turbine of FIGS. 37-46, it should be noted that the shapes of the blade(s) may vary depending upon the application and the need. Although the rotary turbine has been illustrated with a single blade or with three blades, any number of blades could be utilized considering spatial limitations. Although in the illustrated embodiments, the blade(s) 812, 911, 912, 913 is anchored to the control and rotating plates such that it swings out (i.e., reaches) about as far from the center of the orbital path as possible, in other embodiments, the blade(s) 812, 911, 912, 913 can be anchored closer to the middle of the orbital path (e.g., to improve dynamic balance of the rotary turbine 910, to reduce any counter balancing applied when the blade(s) 812, 911, 912, 913 is going back to phases 1-4, to optimize performance, to meet size requirements, etc.). The linear actuator, mentioned above, can vary and/or control the reach of the blade(s) 812, 911, 912, 913 while the turbine 810, 910 is running in response to wind conditions, power demand from the generator, etc.

A general rotational axis (e.g., the axis of the output shaft 840) of the rotary turbine 810, 910 can be generally vertical in certain configurations. In such configurations, the rotary turbine 810, 910 can be steered into the general wind direction A by controlling and/or adjusting the control shaft 838. In other configurations, the general rotational axis of the rotary turbine 810, 910 can be generally horizontal. In such configurations, the rotary turbine 810, 910 can be steered into the general wind direction A by mounting the rotary turbine 810, 910 on a platform, mount, stand, frame, etc. that is rotatable.

The changing orientation of the blade(s) 812, 911, 912, 913 of the rotary turbines 810, 910 with respect to the orbital path of the turbine 810, 910 is generally variable throughout the cycle of the rotary turbine 810, 910. For example, the blade 812 orientation changes slowly between phases 2 (FIG. 38) and 3 (FIG. 39) and 4 (FIG. 40) with respect to the orbital path of the turbine 810. This is in contrast to the blade 812 orientation changing rapidly between phases 4 (FIG. 40) and 5 (FIG. 41) and between phases 1 (FIG. 37) and 2 (FIG. 38) with respect to the orbital path of the turbine 810.

Figures 47, 48:
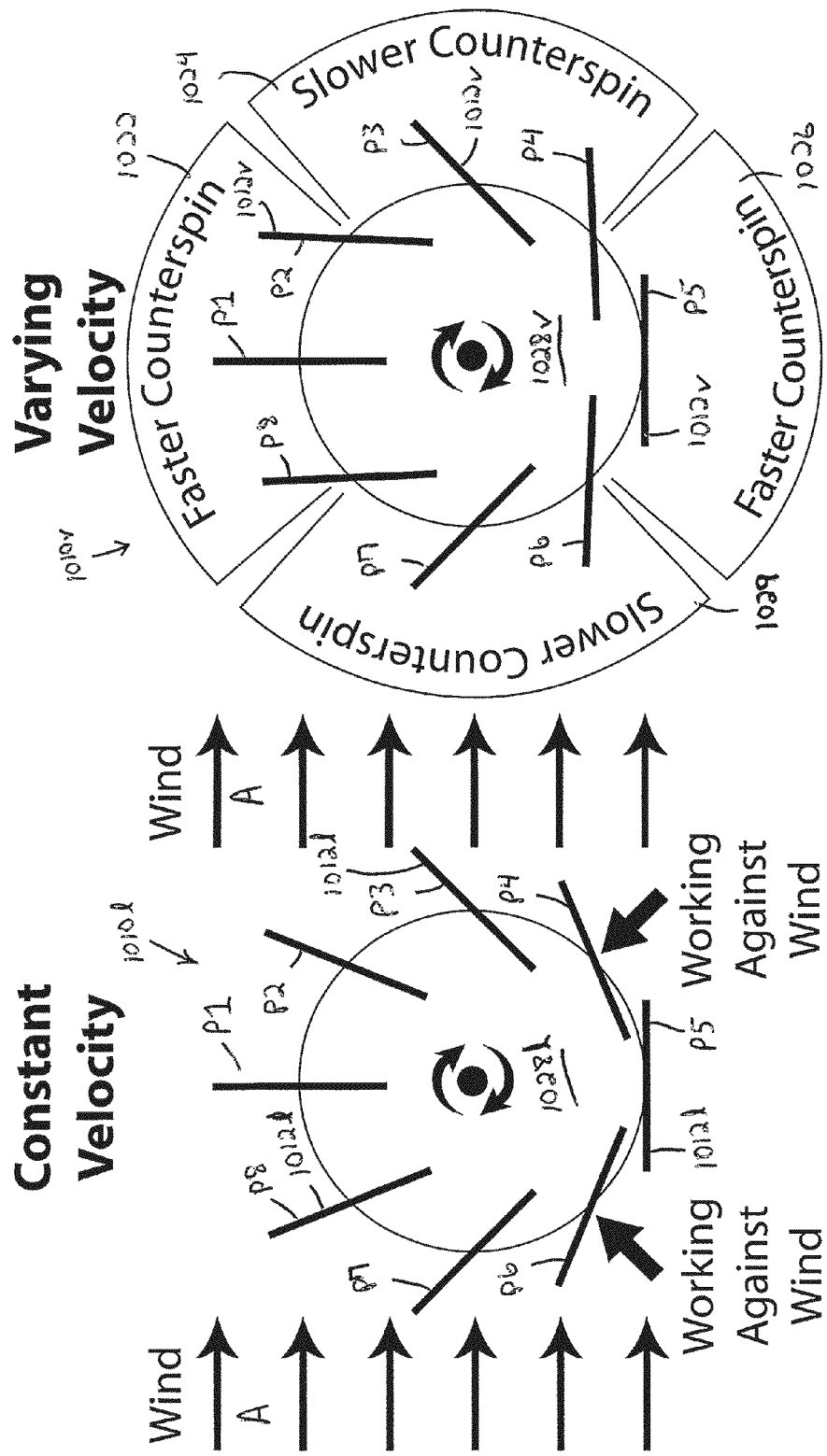
FIG. 47 is a schematic illustration illustrating a rotary turbine having a linear relationship between a blade angle and an angular position of the blade as it orbits about the rotary turbine.
FIG. 48 is a schematic illustration illustrating a rotary turbine having a non-linear relationship between a blade angle and an angular position of the blade as it orbits about the rotary turbine.
Figure 49:
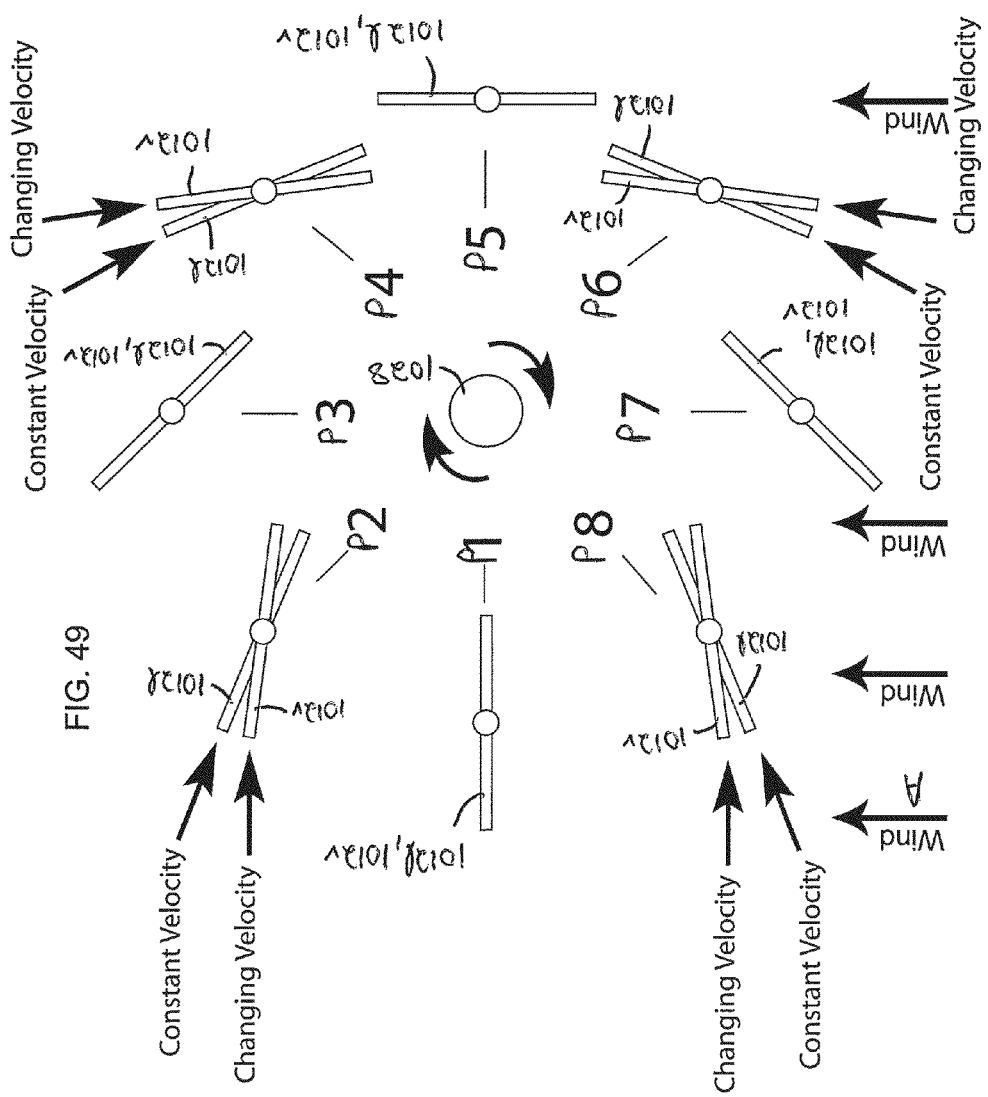
FIG. 49 is a schematic illustration comparing the rotary turbine of FIG. 47 with the rotary turbine of FIG. 48.

FIGS. 47-49 illustrate and compare changing orientations of blades with respect to an orbital path of a turbine and with respect to the general wind direction A. In particular, FIG. 47 illustrates a rotary turbine 1010*l* that includes blades 1012*l* that orbit as a hub 1028*l* of the rotary turbine 1010*l* rotates. As the turbine 1010*l* cycles, the relationship between the blade 1012*l* orientation and the hub 1028*l* orientation varies linearly as in the examples of FIGS. 13, 24, 26, 28, 30, and 35.

FIG. 48 illustrates a rotary turbine 1010*v* that includes blades 1012*v* that orbit as a hub 1028*v* of the rotary turbine 1010*v* rotates. As the turbine 1010*v* cycles, the relationship between the blade 1012*v* orientation and the hub 1028*v* orientation varies non-linearly. In the example depicted at FIG. 48, the blades 1012*v* are generally oriented perpendicular to the general wind direction A during a working portion 1022 of the turbine 1010*v* cycle. In this example, a relatively fast counter-spin (counter-clockwise relative to the hub 1028*v*) is applied to the blade 1012*v* as the hub 1028*v* rotates (clockwise) the blade 1012*v* through the working portion 1022. The blades 1012*v* are generally oriented parallel to the general wind direction A during a return portion 1026 of the turbine 1010*v* cycle. In this example, a relatively fast counter-spin (counter-clockwise relative to the hub 1028*v*) is applied to the blade 1012*v* as the hub 1028*v* rotates (clockwise) the blade 1012*v* through the return portion 1026. A transitioning portion 1024 of the turbine 1010*v* cycle is included after the working portion 1022 and before the return portion 1026. The transitioning portion 1024 can have a slower counter-spin (counter-clockwise relative to the hub 1028*v*), no counter-spin (rotating clockwise with the hub 1028*v*), or even a reverse counter-spin (rotating clockwise faster than the hub 1028*v*). A transitioning portion 1029 of the turbine 1010*v* cycle is included after the return portion 1026 and before the working portion 1022. The transitioning portion 1029 can have a slower counter-spin (counter-clockwise relative to the hub 1028*v*), no counter-spin (rotating clockwise with the hub 1028*v*), or even a reverse counter-spin (rotating clockwise faster than the hub 1028*v*). As depicted at FIG. 48, the portions 1022, 1024, 1026, 1029 of the turbine 1010*v* cycle are shown as approximately equal in angular duration. In other embodiments of the present disclosure, the portions 1022, 1024, 1026, 1029 may or may not be equal in angular duration. The spin/counter-spin rates of the blade 1012*v* can be modified appropriately to accommodate various angular durations of the portions 1022, 1024, 1026, 1029 of the turbine 1010*v* cycle.

FIG. 49 illustrates the blade 1012*v* orientation overlaid on the blade 1012*l* orientation at various locations of the rotary turbine's 1010*v* and 1010*l* cycles. The hubs 1028*l*, 1028*v* are collectively illustrated as a hub 1028. The spin/counter-spin applied to the blade 1012*v* at FIG. 49 is slightly different than the spin/counter-spin applied to the blade 1012*v* at FIG. 48. As illustrated, the non-linearly varying blade 1012*v* orientation of the rotary turbine 1010*v* keeps the blade 1012*v* more nearly perpendicular to the general wind direction A compared to the linearly varying blade 1012*l* orientation of the rotary turbine 1010*l* during the working portion 1022 of the cycle. In addition, the non-linearly varying blade 1012*v* orientation of the rotary turbine 1010*v* keeps the blade 1012*v* more nearly parallel to the general wind direction A compared to the linearly varying blade 1012*l* orientation of the rotary turbine 1010*l* during the return portion 1026 of the cycle. The rotary turbine 1010*v* therefore can have higher wind energy conversion efficiency than the rotary turbine 1010*l*.

Figure 50:
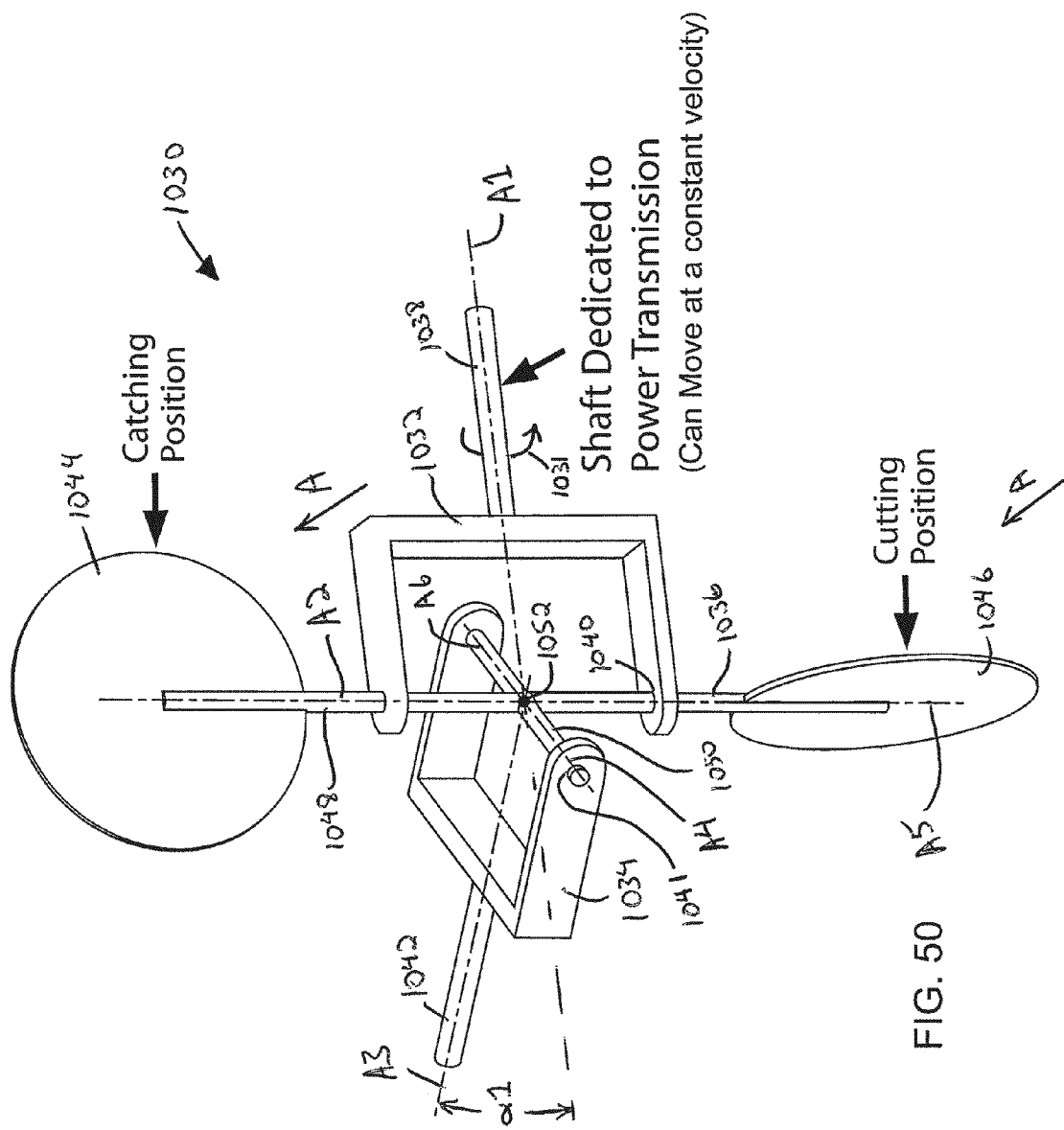
FIG. 50 illustrates a perspective view of a seventh embodiment of a rotary turbine having features that are examples of inventive aspects in accordance with the principles of the present disclosure, the rotary turbine shown with two blades turned by a linkage that changes the orientation of the blades non-linearly with respect to the blades orbital position about the rotary turbine.

FIG. 50 illustrates a seventh embodiment of a rotary turbine (i.e., a fluid handling device) 1030 having features that are examples of inventive aspects in accordance with the principles of the present disclosure. In particular, the rotary turbine 1030 includes a power transmission yoke 1032 and a blade steering yoke 1034 that each are rotatably attached to a blade assembly 1036. The power transmission yoke 1032 defines an axis A1 (e.g., a first axis) that is generally perpendicular to an axis A2 (e.g., a second axis), also defined by the yoke 1032. In the depicted embodiment, the axis A1 is defined by a shaft 1038 of the yoke 1032, and the axis A2 is defined by one or more bores 1040 included on a fork of the yoke 1032. The blade steering yoke 1034 defines an axis A3 (e.g., a third axis) that is generally perpendicular to an axis A4 (e.g., a fourth axis), also defined by the yoke 1034. In the depicted embodiment, the axis A3 is defined by a shaft 1042 of the yoke 1034, and the axis A4 is defined by one or more bores 1041 included on a fork of the yoke 1034. The yokes 1032, 1034 can be substantially similar to each other, as depicted, or the yokes 1032, 1034 can include significant differences. As shown, the yokes 1032, 1034 have a fork-like configuration. In other embodiments, the yokes 1032, 1034 can have other configurations.

The axes A1, A3 of the yokes 1032, 1034 can be rotatably mounted on a common frame (not shown) and thereby be connected to the ground or a turbine steering platform that is mounted on the ground or other structure. The axes A1, A3 can be held at an angle α1 from each other as shown at FIG. 50 (a plane of the angle α1 is not parallel with a viewing plane of FIG. 50). In the depicted embodiment, the angle α1 is forty-five degrees. In other embodiments, the angle α1 can be greater than or less than forty-five degrees. In certain embodiments, the angle α1 can be fixed. In certain embodiments, the angle α1 can be varied while the turbine 1030 is running. Varying the angle α1 can, for example, optimize the efficiency of the turbine 1030 in a given operating environment. In certain embodiments, the angle α1 can be varied while the turbine 1030 is stopped.

The depicted blade assembly 1036 includes a first blade 1044 and a second blade 1046 connected together by a first shaft 1048. The first and the second blades 1044, 1046 are shown as planar circular plates. In other embodiments, the blades 1044, 1046 can be of any general shape and/or configuration. The first blade 1044 is angularly offset from the second blade 1046 by ninety degrees along an axis A5 of the first shaft 1048. The blade assembly 1036 includes a second shaft 1050 that is oriented perpendicular to the first shaft 1048 and defines an axis A6. As shown, the axis A6 of the second shaft 1050 is oriented at an angle forty-five degrees from perpendicular (i.e., normal) to both the first and the second blades 1044, 1046.

The rotary turbine 1030 is assembled such that the axes A2 and A5 are aligned, and the axes A4 and A6 are aligned. Certain aspects of the rotary turbine 1030 thus appear similar to a U-joint (i.e., a universal joint, a Cardan joint, a Hardy-Spicer joint, or a Hooke's joint). The shafts 1038, 1042 are indeed rotationally coupled to each other as in a U-joint.

The rotary turbine 1030 steers the blades 1044, 1046, relative to the general wind direction A, as the rotary turbine 1030 progresses through its cycle. In particular, as illustrated at FIG. 50, the general wind direction A is perpendicular to the first blade 1044, parallel to the second blade 1046, and perpendicular to the axis A1 of the shaft 1038 of the power transmission yoke 1032. The blade assembly 1036 is oriented by the blade steering yoke 1034 in cooperation with the power transmission yoke 1032. In particular, at the point of the rotary turbine's 1030 cycle shown at FIG. 50, the forty-five degree angular offset between the axes A1 and A3 is added to the forty-five degree angle between the axis A6 and the normal to the first blade 1044. This orients the first blade 1044 normal to the general wind direction A. At the same point of the rotary turbine's 1030 cycle, the forty-five degree angular offset between the axes A1 and A3 is subtracted from the forty-five degree angle between the axis A6 and the normal to the second blade 1046. This orients the second blade 1046 parallel to the general wind direction A. Thus, the first blade 1044 is in a wind catching position while the second blade 1046 is in a wind cutting position, and the first blade 1044 is driven into the page (at FIG. 50) and the shaft 1038 of the power transmission yoke 1032 is rotated in a rotational direction 1031. The shaft 1038 can be coupled to a generator and thereby produce electricity. Alternatively, a motor can drive the shaft 1038 and thereby produce fluid flow.

As the cycle of the rotary turbine 1030 continues, the blade steering yoke 1034 continues to steer the blade assembly 1036 and thereby the blades 1044, 1046. In particular, as the blade steering yoke 1034 is rotated ninety degrees, the forty-five degree angular offset between the axes A1 and A3 is neither added nor subtracted from the forty-five degree angles between the axis A6 and the normals to the first and the second blades 1044, 1046. As the blade steering yoke 1034 is rotated one hundred-eighty degrees (from the angular position at FIG. 50), the forty-five degree angular offset between the axes A1 and A3 is added to the forty-five degree angle between the axis A6 and the normal to the second blade 1046. At the same point of the rotary turbine's 1030 cycle, the forty-five degree angular offset between the axes A1 and A3 is subtracted from the forty-five degree angle between the axis A6 and the normal to the first blade 1044. Thus, the second blade 1046 is in the wind catching position, normal to the wind direction A, while the first blade 1044 is in a wind cutting position, parallel to the wind direction A, and the second blade 1046 is driven by the wind and the shaft 1038 of the power transmission yoke 1032 is further rotated in the rotational direction 1031.

As the cycle of the rotary turbine 1030 continues, the blade steering yoke 1034 continues to steer the blade assembly 1036. In particular, as the blade steering yoke 1034 is rotated two hundred seventy degrees (from the angular position at FIG. 50), the forty-five degree angular offset between the axes A1 and A3 is neither added nor subtracted from the forty-five degree angles between the axis A6 and the normals to the first and the second blades 1044, 1046. As the cycle of the rotary turbine 1030 continues, the cycle is repeated.

Figure 61:
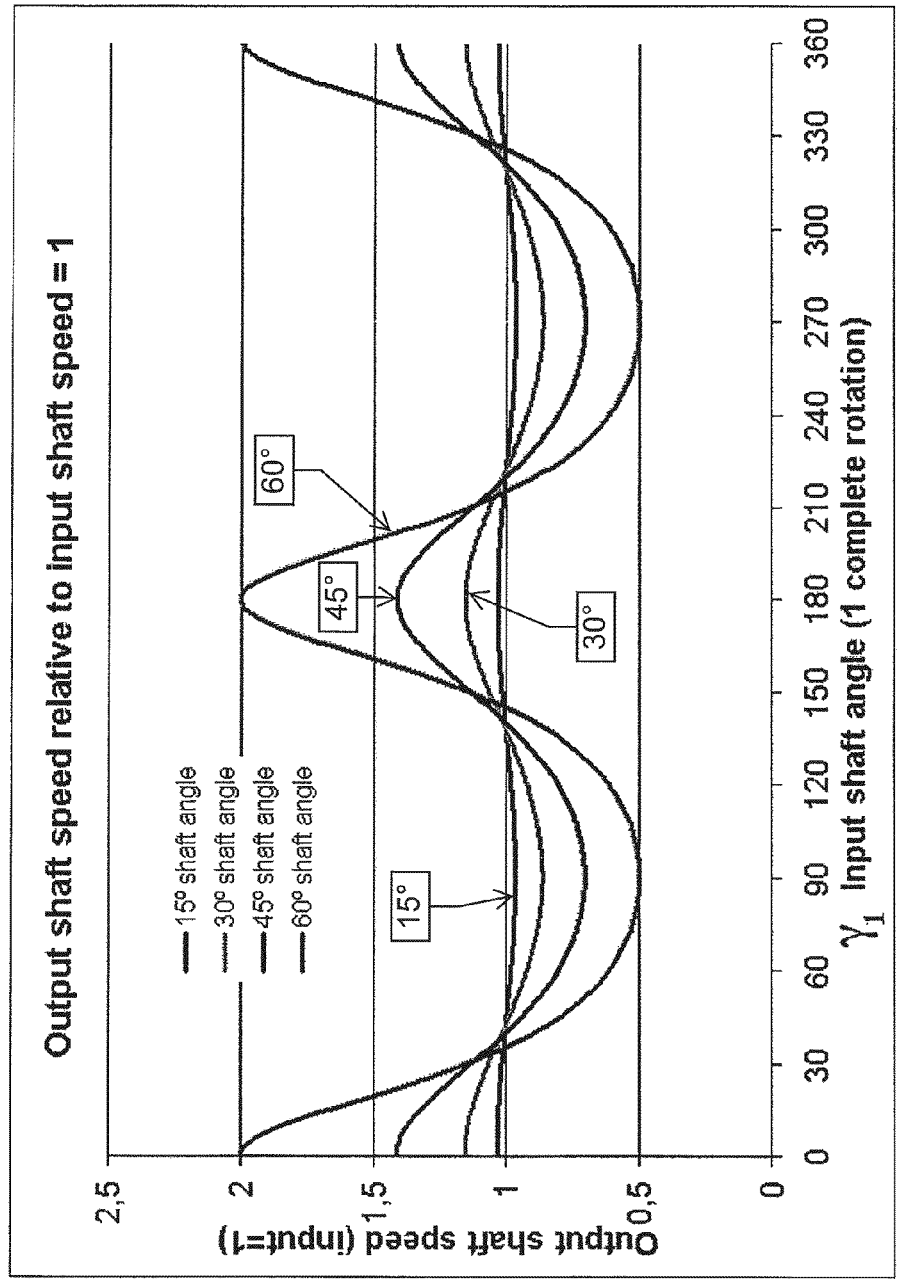
FIG. 61 illustrates a variable relationship between an input shaft rotational speed and an output shaft rotational speed of a gimbal or a U-joint at four selected angles between the input shaft and the output shaft.

The blade steering mechanism of the rotary turbine 1030 can be described as a Crossed Axes Blade Steering mechanism (i.e., a CABS mechanism). In particular, the axes A1, A2, A3, and A4 all mutually intersect at a point 1052. (The axes A1, A3, A5, and A6 also all mutually intersect at the point 1052.) The CABS mechanism is non-linear and characterized by certain U-joint characteristics. The shafts 1038, 1042 are indeed rotationally coupled to each other as in the U-joint, and the shafts 1048, 1050 can function as a cross-shaft (i.e. a spider) of the U-joint. In particular, as illustrated at FIG. 61, the shaft 1042 of the blade steering yoke 1034 (referred to as the output shaft at FIG. 61) varies in rotationally velocity with respect to the shaft 1038 of the power transmission yoke 1032 (referred to as the input shaft at FIG. 61). The shafts 1048, 1050 also vary in rotational velocity about their axes A2, A4 in comparison to the rotational velocity of the shaft 1038 of the yoke 1032 about its axis A1.

The varying velocity characteristics of the CABS mechanism can result in the blades 1044, 1046 rotating slowly when in the wind catching and wind cutting portions of the turbine's 1030 cycle, and also can result in the blades 1044, 1046 rotating quickly when in the transitioning portions of the turbine's 1030 cycle. This effect is similar to the effect illustrated at FIGS. 48 and 49 and the benefits are also similar to those described above in regards to FIGS. 47-49. In particular, the blade 1012v is held perpendicular or more nearly perpendicular to the general wind direction A through the working portion 1022 (illustrated at FIG. 48) of the turbine's 1010v cycle by varying the blade's 1012v rotational velocity. Similarly, the rotational velocity of the blade 1044, as shown at FIG. 50, is varied at the wind catching position to increase the projected area of the blade 1044 facing the general wind direction A. The blade 1012v is held parallel or more nearly parallel to the general wind direction A through the return portion 1026 of the turbine's 1010v cycle by varying the blade's 1012v rotational velocity. Similarly, the rotational velocity of the blade 1046, as shown at FIG. 50, is varied at the wind cutting position to reduce the projected area of the blade 1046 facing the general wind direction A. As the turbine 1030 rotates from the position illustrated at FIG. 50, the blades 1044, 1046 rotate through the remaining portion of the wind catching and wind cutting positions respectively and then enter into transitioning portions of the turbine's 1030 cycle. The blade 1012v is rotated quickly relative to the general wind direction A through the transitioning portions 1024, 1029. Similarly, the blades 1044, 1046 are rotated quickly through the transitioning portions of the turbine's 1030 cycle.

In certain embodiments, the shaft 1038 can be run at a constant velocity. In other embodiments, the shaft 1038 can be run at varying velocities throughout the cycle of the rotary turbine 1030. In still other embodiments, the shaft 1038 can be run at varying velocities throughout the cycle and/or from cycle to cycle of the rotary turbine 1030 (e.g., faster as the wind gusts).

Figure 51:
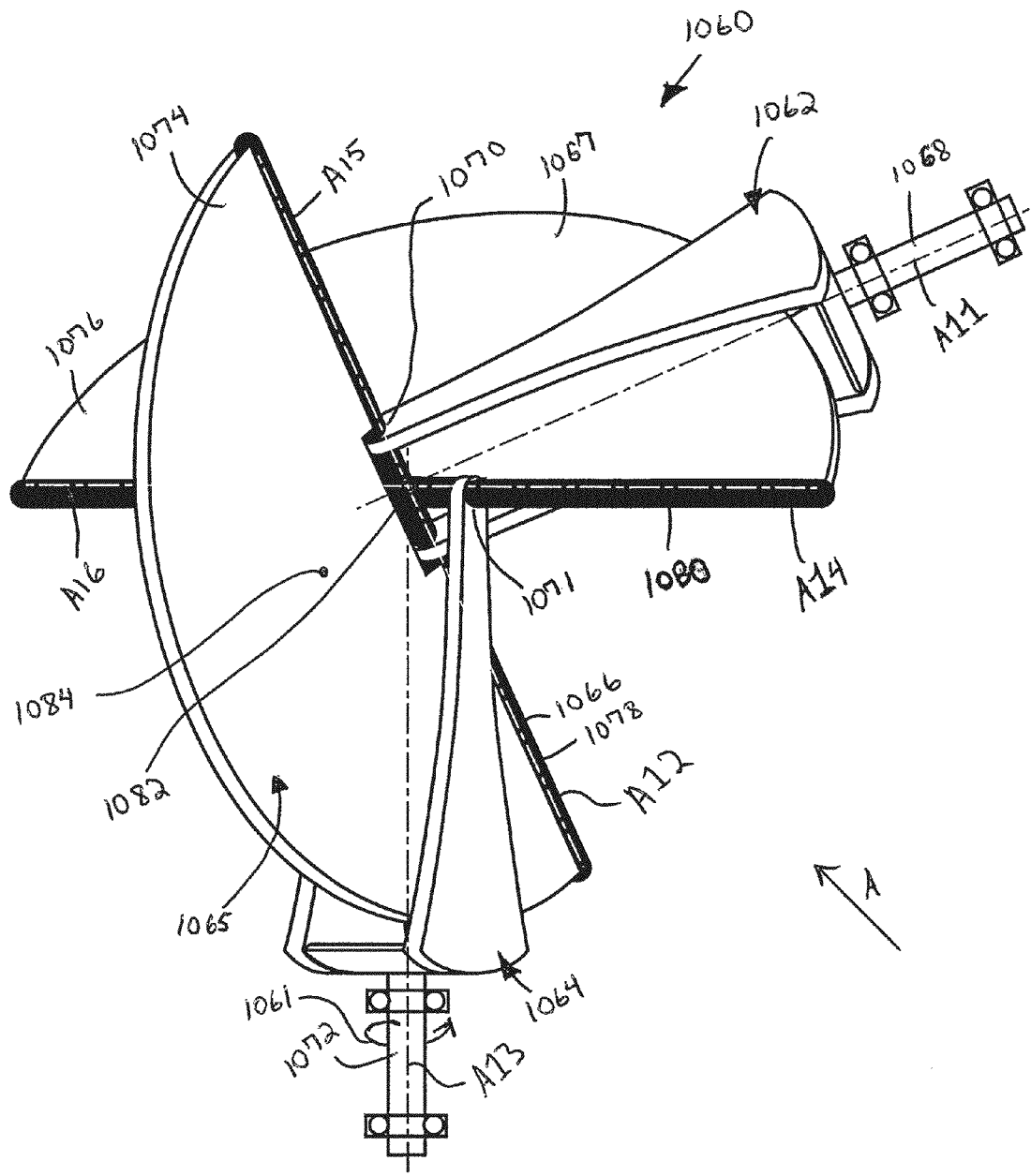
FIG. 51 illustrates a perspective view of an eighth embodiment of a rotary turbine having features that are examples of inventive aspects in accordance with the principles of the present disclosure, the rotary turbine shown with two blades turned by a linkage that changes the orientation of the blades non-linearly with respect to the blades orbital position about the rotary turbine.
Figure 53:
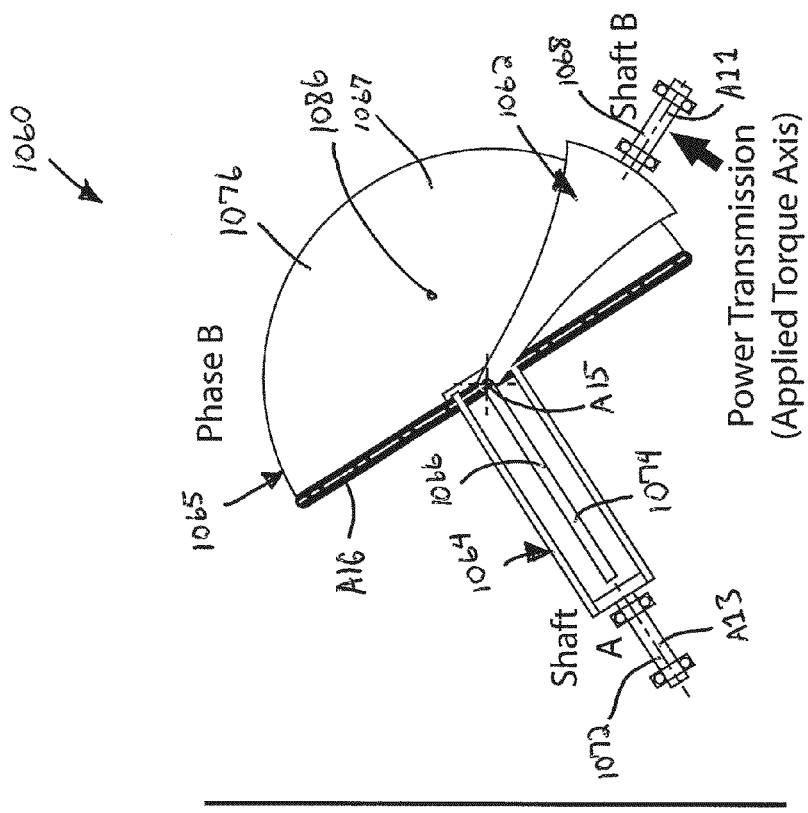
FIG. 53 illustrates the side view of the rotary turbine of FIG. 51 at phase B of its cycle.
Figure 52:
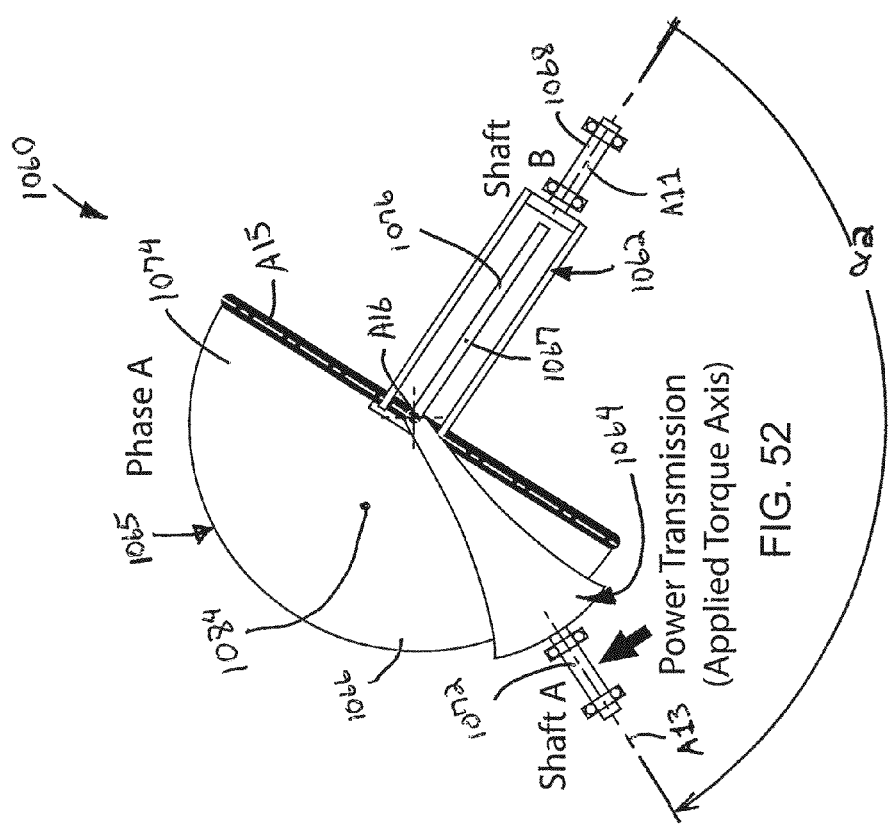
FIG. 52 illustrates a side view of the rotary turbine of FIG. 51 at phase A of its cycle.

FIGS. 51-54 illustrate an eighth embodiment of a rotary turbine (i.e., a fluid handling device) 1060 having features that are examples of inventive aspects in accordance with the principles of the present disclosure. In particular, the rotary turbine 1060 includes a first yoke 1062 rotatably attached to a first blade assembly 1066 and a second yoke 1064 rotatably attached to a second blade assembly 1067. In the depicted embodiment, the first blade assembly 1066 and the second blade assembly 1067 are integrated into a combined blade assembly 1065. The rotary turbine 1060 employs a CABS mechanism (see above) to steer the first and the second blades assemblies 1066, 1067 throughout the cycle of the rotary turbine 1060. The first and the second yokes 1062, 1064 are illustrated as each being a power transmission yoke and a blade steering yoke. The first yoke 1062 defines an axis A11 that is generally perpendicular to an axis A12, also defined by the first yoke 1062. In the depicted embodiment, the axis A11 is defined by a shaft 1068 of the first yoke 1062, and the axis A12 is defined by one or more bores 1070 included on a fork of the first yoke 1062. The second yoke 1064 defines an axis A13 that is generally perpendicular to an axis A14, also defined by the second yoke 1064. In the depicted embodiment, the axis A13 is defined by a shaft 1072 of the second yoke 1064, and the axis A14 is defined by one or more bores 1071 included on a fork of the second yoke 1064. The yokes 1062, 1064 can be substantially similar to each other, as depicted, or the yokes 1062, 1064 can include significant differences. The axes A11, A13 of the yokes 1062, 1064 can be rotatably mounted on a common frame (not shown) and thereby be connected to the ground or a turbine steering platform that, in turn, is mounted on the ground or other structure. The axes A11, A13 can be held at an angle α2 from each other as shown at FIG. 52. In the depicted embodiment, the angle α2 is about 113 degrees. In other embodiments, the angle α2 ranges between about 120 degrees and about 105 degrees. In still other embodiments, the angle α2 ranges between about 135 degrees and about 91 degrees. In yet other embodiments, the dimensional values of the angle α2 are not limited to those shown or described above. As shown, the yokes 1062, 1064 have a fork-like configuration. In other embodiments, the yokes 1062, 1064 can have other configurations.

As mentioned above, the depicted combined blade assembly 1065 includes the first blade assembly 1066 and the second blade assembly 1067. As depicted, the first blade assembly 1066 includes a first shaft 1078 and a first blade 1074, and the second blade assembly 1067 includes a second shaft 1080 and a second blade 1076. The first and the second shafts 1078, 1080 can be fixedly attached to each other at a point 1082. Alternatively, the first and the second shafts 1078, 1080 can be rotatably attached to each other at the point 1082. As depicted, the first blade 1074 can be fixedly mounted to the first shaft 1078, and the second blade 1076 can be fixedly mounted to the second shaft 1080. Alternatively, the first blade 1074 can be hingedly mounted to the first shaft 1078, and the second blade 1076 can be hingedly mounted to the second shaft 1080. By fixedly attaching the first and the second shafts 1078, 1080 to each other and by fixedly mounting the blades 1074, 1076 to the shafts 1078, 1080, the combined blade assembly 1065 moves as a single kinematic object. The blades 1074, 1076 of such a kinematically combined blade assembly 1065 are ideally positioned ninety degrees from each other. The first blade 1074 is angularly offset from the second blade 1076 by ninety degrees along an axis (not shown) that is perpendicular to an axis A15 of the first shaft 1078 and perpendicular to an axis A16 of the second shaft 1080. The first and the second blades 1074, 1076 are shown as planar semi-circular plates. In other embodiments, the blades 1074, 1076 can be of any general shape and/or configuration.

The rotary turbine 1060 is assembled such that the axes A12 and A15 are aligned, and the axes A14 and A16 are aligned. Certain aspects of the rotary turbine 1060 thus appear similar to the U-joint. The shafts 1068, 1072 are indeed rotationally coupled to each other as in the U-joint, and the shafts 1078, 1080 can function as a cross-shaft (i.e. a spider) of the U-joint. As the turbine 1060 cycles, the first blade 1074 is guided between the fork of the second yoke 1064, and the second blade 1076 is guided between the fork of the first yoke 1062. In embodiments including the kinematically combined blade assembly 1065, orientations of the blades 1074, 1076 can be guided such that the blades 1074, 1076 are positioned between the forks of the yokes 1064, 1062 by the kinematic action of the kinematically combined shafts 1078, 1080 and their interaction with the yokes 1062, 1064. In other embodiments, the blades 1074, 1076 can be guided by other means including the kinematic action of the kinematically combined shafts 1078, 1080 in combination with other linkages, gear sets, cams, etc.

The rotary turbine 1060 thereby steers the blades 1074, 1076, relative to the general wind direction A, as the rotary turbine 1060 progresses through its cycle. In particular, as illustrated at FIGS. 51 and 52, the first blade 1074 generally faces into the wind direction A, and the second blade 1076 generally cuts into the wind direction A at a position of the turbine's 1060 cycle labeled "Phase A" (see FIG. 52). In addition, a center of pressure 1084 of the wind acting on the first blade 1074 is offset from the axis A13 imparting a torque on the shaft 1072 when the turbine 1060 is at "Phase A". This torque urges the shaft 1072 to rotate in a rotational direction 1061 (see FIG. 51). Thus, the first blade 1074 is in a wind catching position while the second blade 1076 is in a wind cutting position, and the first blade 1074 is predominantly driven into the page (at FIGS. 51 and 52) and the shaft 1072 of the second yoke 1064 is rotated in the rotational direction 1061. The shaft 1072 can be coupled to a generator and thereby produce electricity. Alternatively, a motor can drive the shaft 1072 and thereby produce fluid flow.

As the cycle of the rotary turbine 1060 continues, the yokes 1062, 1064 and the shafts 1078, 1080 continue to steer the blade assembly 1065 and thereby the blades 1074, 1076. In particular, as the yokes 1062, 1064 are rotated ninety degrees (from the angular position at FIGS. 51 and 52), the second blade 1076 is in the wind catching position, normal to the wind direction A, while the first blade 1074 is in the wind cutting position, parallel to the wind direction A, and the second blade 1076 is driven by the wind and the shaft 1068 of the first yoke 1062 is further rotated (with the blade 1076 predominantly driven into the page (at FIG. 53). This position of the turbine's 1060 cycle is labeled "Phase B" at FIG. 53. The shaft 1068 can be coupled to a generator and thereby produce electricity. Alternatively, a motor can drive the shaft 1068 and thereby produce fluid flow. As the cycle of the rotary turbine 1060 continues, the cycle is repeated.

In the depicted embodiment, the shaft 1072 and the shaft 1068 harness power from the combined blade assembly 1065. In the depicted embodiment, the shaft 1072 and the shaft 1068 alternate harnessing power from the combined blade assembly 1065 at various phases of the cycle of the turbine 1060. Since power is transmitted through the shafts 1072 and 1068, either of these two shafts individually can be coupled to a generator and, if desired, coupled through an additional U-joint rotationally offset and angularly adjusted to level out the variance in velocity. In other embodiments, the shafts 1068, 1072 can be coupled by a coupling mechanism and the harnessed power can be combined into a common output shaft. For example, the shaft 1068 can be rotationally coupled to a first input shaft and the shaft 1072 can be rotationally coupled to a second input shaft of a differential gear set (e.g., a gear set similar to an automotive differential gear set but with the axle shafts serving as input shafts and the pinion shaft serving as an output shaft). The output shaft of the differential gear set can be coupled to a generator and thereby produce electricity. In other embodiments, the shafts 1072 and 1068 can be electrically coupled to produce electricity. For example, a first generator, rotationally coupled to the shaft 1072, can be electrically coupled to a second generator, rotationally coupled to the shaft 1068. The electrical coupling between the first and the second generators can include a control system and/or sensors. The electrical coupling between the first and the second generators can include analogue and/or digital electrical circuits.

Alternatively, a motor can drive an input shaft of a differential gear set or other suitable coupling mechanism. The differential gear set can split the power of the input shaft into two output shafts (e.g. as in the automotive differential gear set). One of the output shafts of the differential gear set can be rotationally coupled to the shaft 1068, and the other output shaft of the differential gear set can be rotationally coupled to the shaft 1072. The single motor can thereby power the rotary turbine 1060 and produce fluid flow. In other embodiments, the shafts 1072 and 1068 can be electrically coupled to receive input power. For example, a first motor, rotationally coupled to the shaft 1072, can be electrically coupled to a second motor, rotationally coupled to the shaft 1068. The electrical coupling between the first and the second motors can include a control system and/or sensors. The electrical coupling between the first and the second motors can include analogue and/or digital electrical circuits.

In still other embodiments, the shafts 1072 and 1068 can be electrically coupled to produce and/or receive power. For example, a first motor-generator, rotationally coupled to the shaft 1072, can be electrically coupled to a second motor-generator, rotationally coupled to the shaft 1068.

The blade steering mechanism of the rotary turbine 1060 can also be described as a Crossed Axes Blade Steering mechanism (i.e., a CABS mechanism). In particular, the axes A11, A12, A13, and A14 all mutually intersect at the point 1082. (The axes A11, A13, A15, and A16 also all mutually intersect at the point 1082.) As mentioned above, the CABS mechanism is non-linear and characterized by certain U-joint characteristics. In particular, as illustrated at FIG. 61, the shaft 1068 of the first yoke 1062 varies in rotationally velocity with respect to the shaft 1072 of the second yoke 1064. In certain embodiments, either shaft 1068, 1072 can be run at a constant velocity. In other embodiments, the shafts 1068, 1072 can be run at varying velocities throughout the cycle of the rotary turbine 1060. In still other embodiments, the shafts 1068, 1072 can be run at varying velocities throughout the cycle and/or from cycle to cycle of the rotary turbine 1060 (e.g., faster as the wind gusts).

FIG. 54 illustrates the rotary turbine (i.e., a fluid handling device) 1060 with a deflector 1090. The deflector 1090 can be used with the rotary turbine 1060 in both power harvesting and fluid flow producing applications. The deflector 1090 can provide at least two benefits to the rotary turbine 1060. The first benefit is shielding portions of the rotary turbine 1060 when they run counter to the wind direction A at certain portions of the rotary turbine's 1060 cycle. The second benefit is diverting and concentrating fluid flow toward the blades 1074, 1076 during their working portion of the rotary turbine's 1060 cycle. In the depicted deflector 1090 (see FIG. 55), a first surface 1092 and a second surface 1094 are included on the deflector 1090. The surfaces 1092, 1094 can be positioned such that the deflector 1090 is effective throughout the cycle of the rotary turbine 1060. For example, in wind harvesting applications, the wind direction A can be diverted by the deflector 1090 and be focused on the blade 1074 at and around the Phase A of the turbine's 1060 cycle (see FIG. 54). The wind direction A can also be diverted by the deflector 1090 and be focused on the blade 1076 at and around the Phase B of the turbine's 1060 cycle.

FIGS. 56-60 illustrate a ninth embodiment of a rotary turbine (i.e., a fluid handling device) 1100 having features that are examples of inventive aspects in accordance with the principles of the present disclosure. In particular, the rotary turbine 1100 includes a first yoke 1102 rotatably attached to a first blade assembly 1106 and a second yoke 1104 rotatably attached to a second blade assembly 1107. In the depicted embodiment, the first blade assembly 1106 and the second blade assembly 1107 are integrated into a combined blade assembly 1105. The rotary turbine 1100 employs a CABS mechanism (see above) to steer the first and the second blades assemblies 1106, 1107 throughout the cycle of the rotary turbine 1100. The first and the second yokes 1102, 1104 are illustrated as each being a power transmission yoke and a blade steering yoke. The first yoke 1102 defines an axis A21 that is generally perpendicular to an axis A22, also defined by the first yoke 1102. In the depicted embodiment, the axis A21 can be defined by a shaft of the first yoke 1102, and the axis A22 can be defined by one or more bores included on a fork of the first yoke 1102. The second yoke 1104 defines an axis A23 that is generally perpendicular to an axis A24, also defined by the second yoke 1104. In the depicted embodiment, the axis A23 can be defined by a shaft of the second yoke 1104, and the axis A24 can be defined by one or more bores included on a fork of the second yoke 1104. The yokes 1102, 1104 can be substantially similar to each other, as depicted, or the yokes 1102, 1104 can include significant differences. The axes A21, A23 of the yokes 1102, 1104 can be rotatably mounted on a common frame 1103 and thereby be connected to the ground or a turbine steering platform that, in turn, is mounted on the ground or other structure. The axes A21, A23 can be held at an angle from each other. As shown, the yokes 1102, 1104 have a fork-like configuration. In other embodiments, the yokes 1102, 1104 can have other configurations.

As mentioned above, the depicted combined blade assembly 1105 includes the first blade assembly 1106 and the second blade assembly 1107. As depicted, the first blade assembly 1106 includes a first shaft 1108, a first blade 1114a, and a second blade 1114b; and the second blade assembly 1107 includes a second shaft 1112, a third blade 1116a, and a fourth blade 1116b. The first and the second shafts 1108, 1112 can be fixedly attached to each other at a point. Alternatively, the first and the second shafts 1108, 1112 can be rotatably attached to each other at the point. As depicted, the first and the second blades 1114a, 1114b can be fixedly mounted to the first shaft 1108, and the third and the fourth blades 1116a, 1116b can be fixedly mounted to the second shaft 1112. Alternatively, the first and the second blades 1114a, 1114b can be hingedly mounted to the first shaft 1108, and the third and the fourth blades 1116a, 1116b can be hingedly mounted to the second shaft 1112. By fixedly attaching the first and the second shafts 1108, 1112 to each other and by fixedly mounting the blades 1114a, 1114b, 1116a, 1116b to the shafts 1108, 1112, the combined blade assembly 1105 moves as a single kinematic object. The first pair of blades 1114a, 1114b of such a kinematically combined blade assembly 1105 is ideally positioned ninety degrees from the second pair of blades 1116a, 1116b. The first pair of blades 1114a, 1114b is angularly offset from the second pair of blades 1116a, 1116b by ninety degrees along an axis (not shown) that is perpendicular to an axis A25 of the first shaft 1108 and perpendicular to an axis A26 of the second shaft 1112. The first, second, third, and fourth blades 1114a, 1114b, 1116a, 1116b are shown as planar plates. In other embodiments, the blades 1114a, 1114b, 1116a, 1116b can be of any general shape and/or configuration.

The rotary turbine 1100 is assembled such that the axes A22 and A25 are aligned, and the axes A24 and A26 are aligned. Certain aspects of the rotary turbine 1100 thus appear similar to the U-joint. The yokes 1102, 1104 are indeed rotationally coupled to each other as in the U-joint, and the shafts 1108, 1112 can function as a cross-shaft (i.e. a spider) of the U-joint. As the turbine 1100 cycles, the first pair of blades 1114a, 1114b is guided around the frame 1103, and the second pair of blades 1116a, 1116b is also guided around the frame 1103. In particular, a gap is formed between the first pair of blades 1114a, 1114b, and another gap is formed between the second pair of blades 1116a, 1116b. The gaps between the blades 1114a, 1114b and 1116a, 1116b and the frame 1103 are configured such that no collision occurs between the blades 1114a, 1114b, 1116a, 1116b and the frame 1103 while the turbine 1100 cycles in normal operation. In embodiments including the kinematically combined blade assembly 1105, orientations of the blades 1114a, 1114b and 1116a, 1116b and their gaps can be guided such that the gaps between the blades 1114a, 1114b and 1116a, 1116b are positioned over portions of the frame 1103 by the kinematic action of the kinematically combined shafts 1108, 1112 and their interaction with the yokes 1102, 1104. In other embodiments, the blades 1114a, 1114b, 1116a, 1116b and their gaps can be guided by other means similar to the means mentioned above with respect to the rotary turbine 1060.

Figures 56, 57:
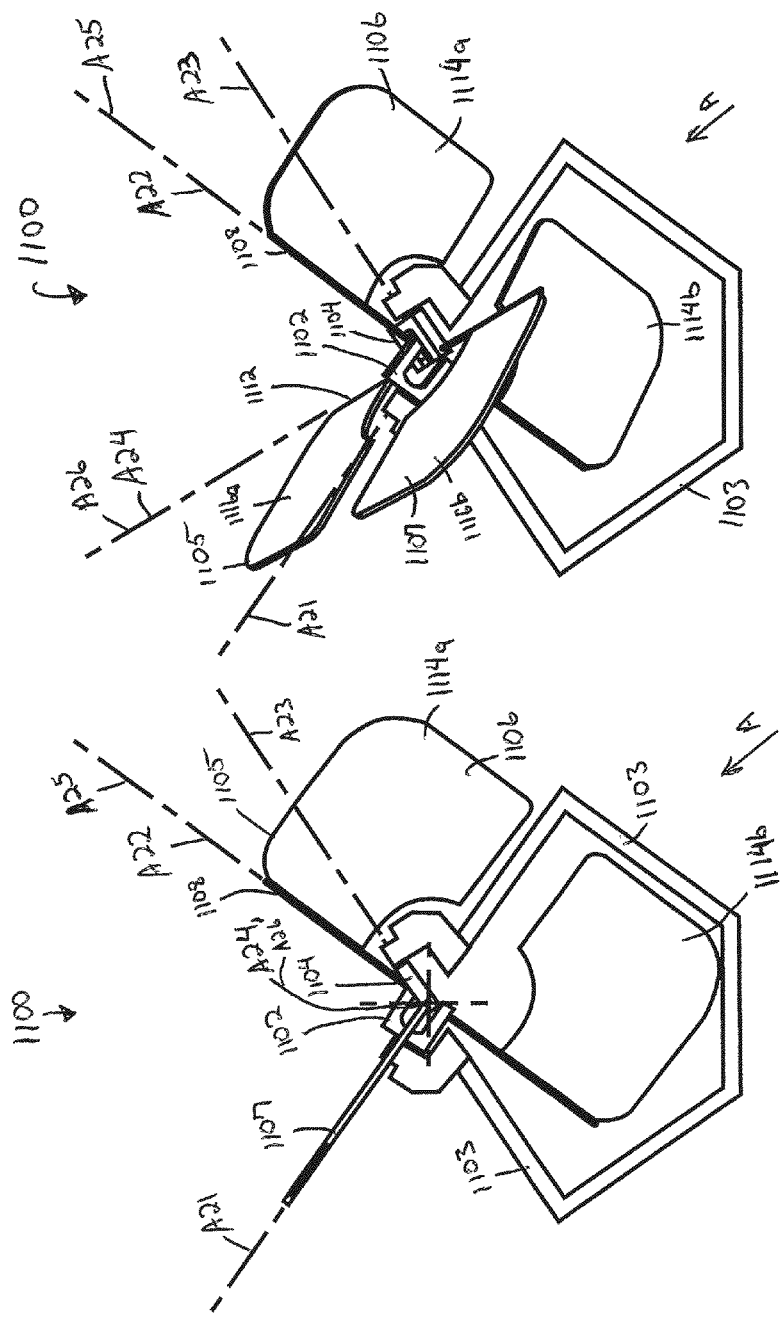
FIG. 56 illustrates a perspective view of phase 1 of a cycle of a ninth embodiment of a rotary turbine having features that are examples of inventive aspects in accordance with the principles of the present disclosure, the rotary turbine shown with two sets of blades turned by a linkage that changes the orientation of the blade sets non-linearly with respect to the blade sets' orbital position about the rotary turbine.
FIG. 57 illustrates the perspective view of phase 2 of the cycle of the rotary turbine of FIG. 56.

The rotary turbine 1100 thereby steers the blades 1114a, 1114b, 1116a, 1116b, relative to the general wind direction A (directly into the page), as the rotary turbine 1100 progresses through its cycle. In particular, as illustrated at FIG. 56, the first pair of blades 1114a, 1114b generally faces into the wind direction A, and the second pair of blades 1116a, 1116b generally cuts into the wind direction A at a position of the turbine's 1100 cycle illustrated at FIG. 56. In addition, a center of pressure of the wind acting on the first pair of blades 1114a, 1114b is offset from the axis A23 and thus imparts a torque on the yoke 1104 when the turbine 1100 is at this position. This torque urges the yoke 1104 to rotate. Thus, the first pair of blades 1114a, 1114b is in a wind catching position while the second pair of blades 1116a, 1116b is in a wind cutting position, and the first pair of blades 1114a, 1114b is predominantly driven into the page (at FIG. 56) and the yoke 1104 is rotated. The yoke 1104 can be coupled to a generator and thereby produce electricity. Alternatively, a motor can drive the yoke 1104 and thereby produce fluid flow.

Figure 60:
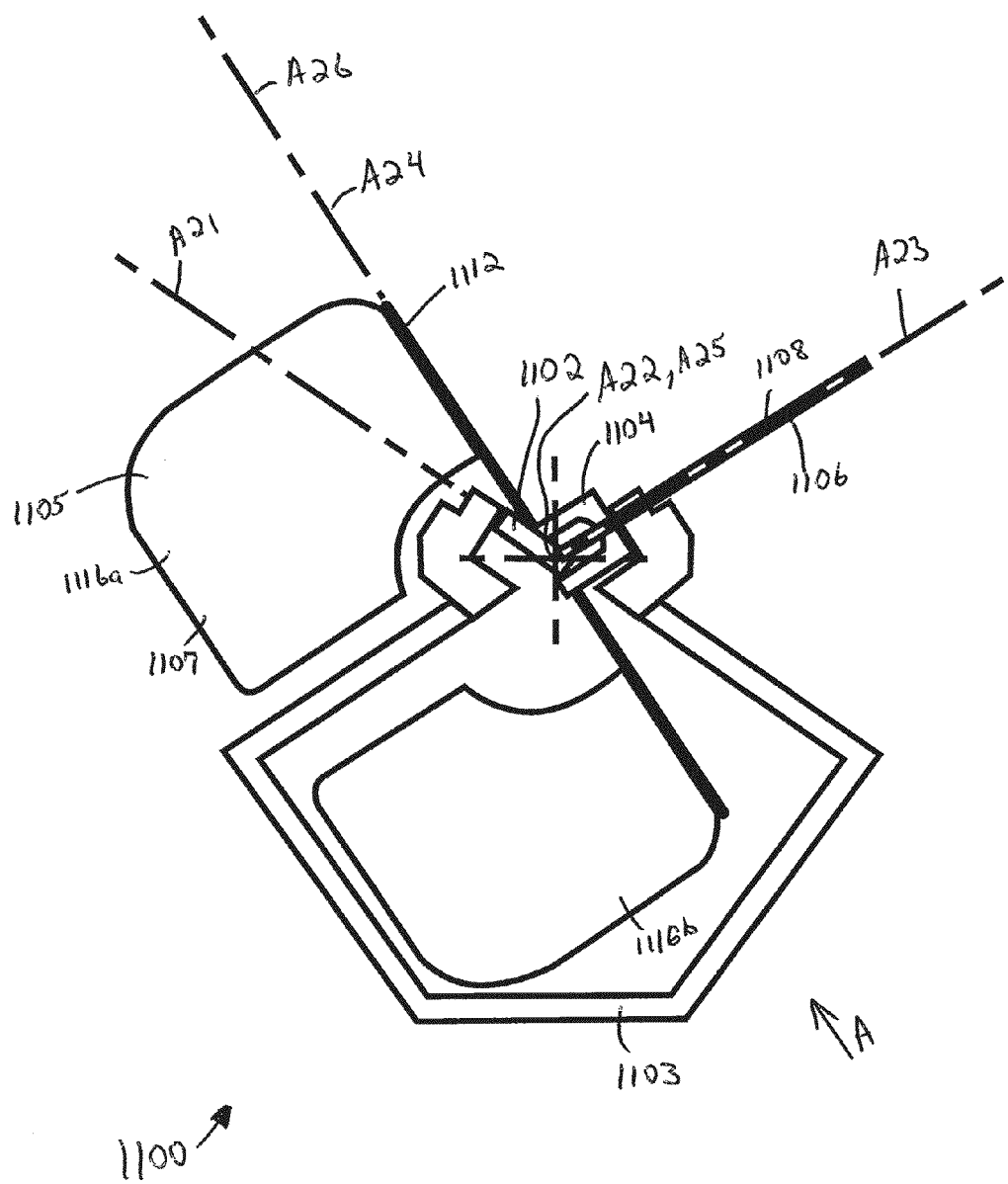
FIG. 60 illustrates the perspective view of phase 5 of the cycle of the rotary turbine of FIG. 56.

As the cycle of the rotary turbine 1100 continues, the yokes 1102, 1104 and the shafts 1108, 1112 continue to steer the blade assembly 1105 and thereby the blades 1114a, 1114b, 1116a, 1116b. In particular, as the yokes 1102, 1104 are rotated, the turbine 1100 reaches a position illustrated at FIG. 57 and then FIG. 58, and then FIG. 59 and then FIG. 60. The position illustrated at FIG. 60 is ninety degrees from the angular position at FIG. 56. At this position, the second pair of blades 1116a, 1116b is in the wind catching position while the first pair of blades 1114a, 1114b is in the wind cutting position, and the second pair of blades 1116a, 1116b is driven by the wind and the yoke 1102 is further rotated (with the blades 1116a, 1116b predominantly driven into the page (at FIG. 60). The yoke 1102 can be coupled to a generator and thereby produce electricity. Alternatively, a motor can drive the yoke 1102 and thereby produce fluid flow. As the cycle of the rotary turbine 1100 continues, a second quarter (i.e. from 90 degrees to 180 degrees) of the cycle is executed. The second quarter of the cycle is similar to the first quarter but with the second pair of blades 1116a, 1116b starting at a center of their working position.

The blade steering mechanism of the rotary turbine 1100 can also be described as a Crossed Axes Blade Steering mechanism (i.e., a CABS mechanism). In particular, the axes A21, A22, A23, and A24 all mutually intersect at a point. (The axes A21, A23, A25, and A26 also all mutually intersect at the same point.) Other aspects of the rotary turbine 1100 are similar to aspects of the rotary turbine 1060 discussed above. These aspects include the non-linear CABS mechanism and adaptation for use with a deflector.

FIGS. 62-65 illustrate a tenth embodiment of a rotary turbine (i.e., a fluid handling device) 1130 having features that are examples of inventive aspects in accordance with the principles of the present disclosure. In particular, the rotary turbine 1130 includes a power transmission yoke 1132 and a blade steering yoke 1134 that each are rotatably attached to three blade assemblies 1136a, 1136b, and 1136c. The power transmission yoke 1132 defines an axis A31 that is generally perpendicular to an axis A32a, an axis A32b, and an axis A32c, also defined by the yoke 1132. In the depicted embodiment, the axis A31 is defined by a shaft 1138 of the yoke 1132, and the axes A32a, A32b, A32c are defined by one or more bores 1140a, 1140b, and 1140c included on forks of the yoke 1132. The blade steering yoke 1134 defines an axis A33 that is generally perpendicular to an axis A34a, an axis A34b, and an axis A34c, also defined by the yoke 1134. In the depicted embodiment, the axis A33 is defined by a shaft 1142 of the yoke 1134, and the axes A34a, A34b, A34c are defined by one or more bores 1141a, 1141b, and 1141c included on forks of the yoke 1134.

The yokes 1132, 1134 can include similarities to each other, as depicted, and the yokes 1132, 1134 can include differences. In particular, the forks or other axes A32a, A32b, A32c, A34a, A34b, A34c defining features on one or both of the yokes 1132, 1134 can include differences that allow for the kinematic movement of the rotary turbine 1130. As depicted, the axes A34a, A34b, A34c are rotatably moveable relative to each other about the axis A33. As depicted, the axes A34a, A34b, are also rotatably moveable relative to the shaft 1142 of the yoke 1134. As depicted, the axes A34c rotationally moves with the shaft 1142. If the shaft 1142 is free to rotate and if two of the three axes A34a, A34b, A34c are free to rotate with respect to the shaft 1142, the one remaining axis A34a, A34b, or A34c can be either fixed with respect to the shaft 1142 or be free to rotate about the shaft 1142. Alternatively, if the shaft 1142 is not free to rotate, all three of the axes A34a, A34b, A34c must be free to rotate about the shaft 1142. In either case, all axes A34a, A34b, A34c must be free to rotate independently.

Figure 62:
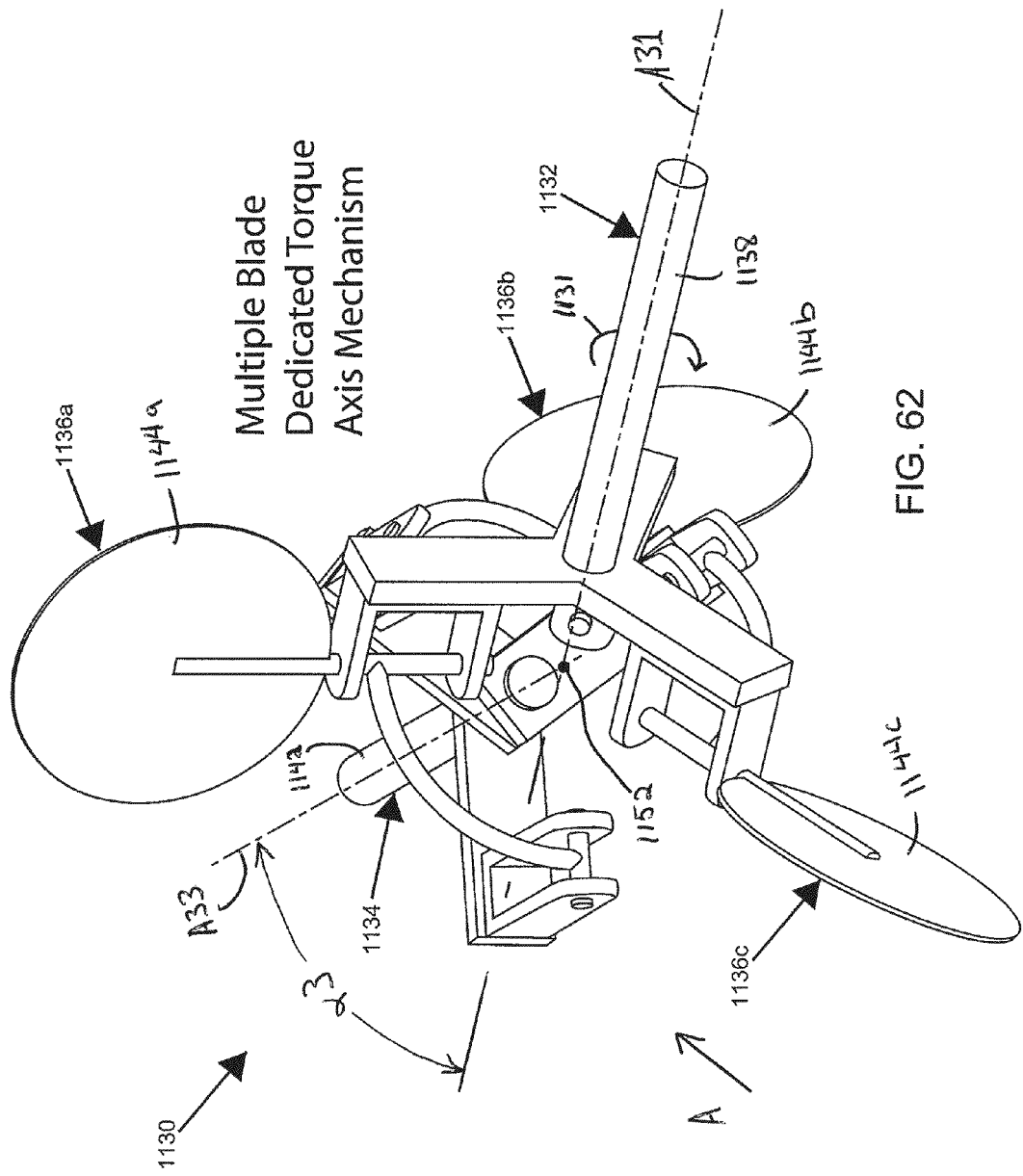
FIG. 62 illustrates a perspective view of a tenth embodiment of a rotary turbine having features that are examples of inventive aspects in accordance with the principles of the present disclosure, the rotary turbine shown with three blades turned by a linkage that changes the orientation of the blades non-linearly with respect to the blades' orbital position about the rotary turbine.
Figure 63:
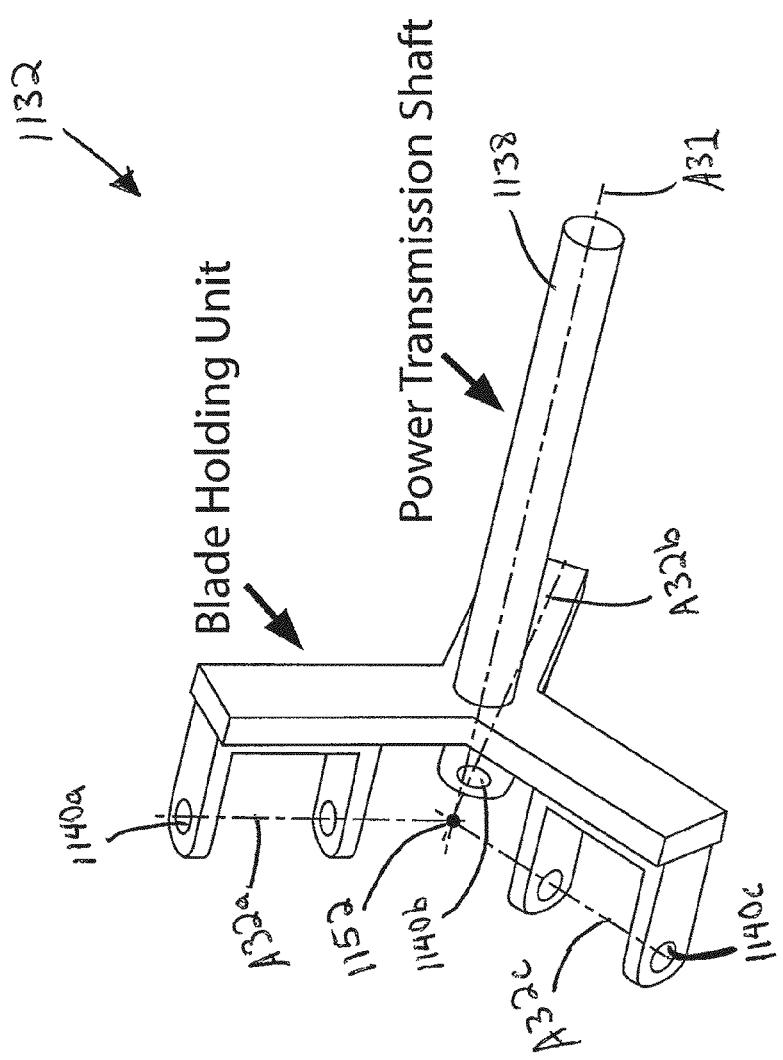
FIG. 63 illustrates a perspective view of a blade holding unit of the rotary turbine of FIG. 62.
Figure 64:
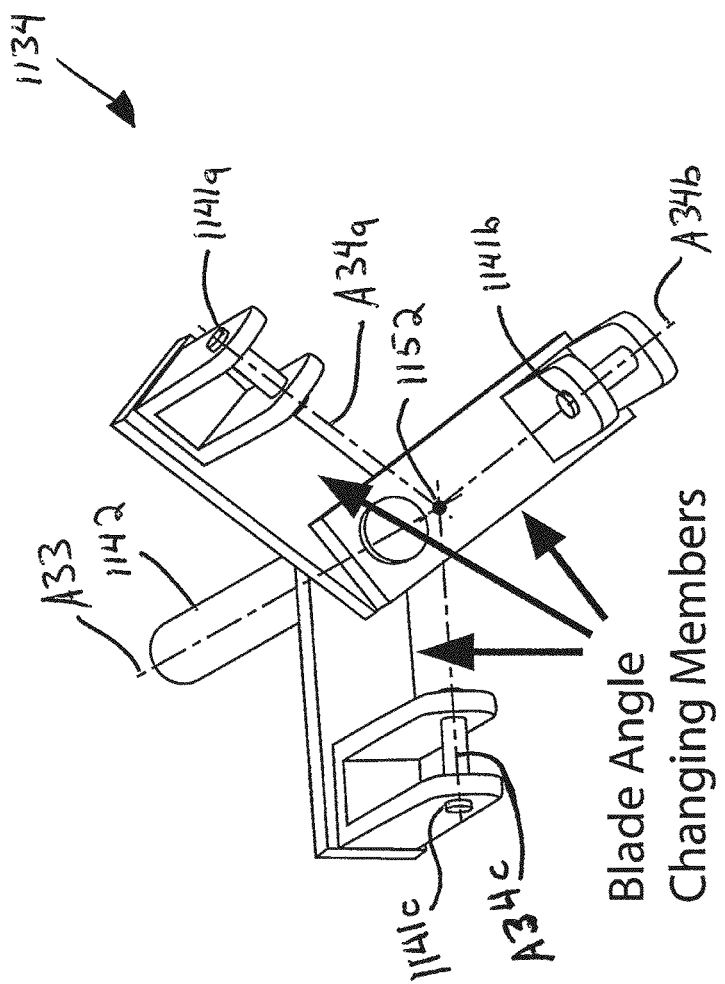
FIG. 64 illustrates a perspective view of a blade turning unit of the rotary turbine of FIG. 62.
Figure 65:
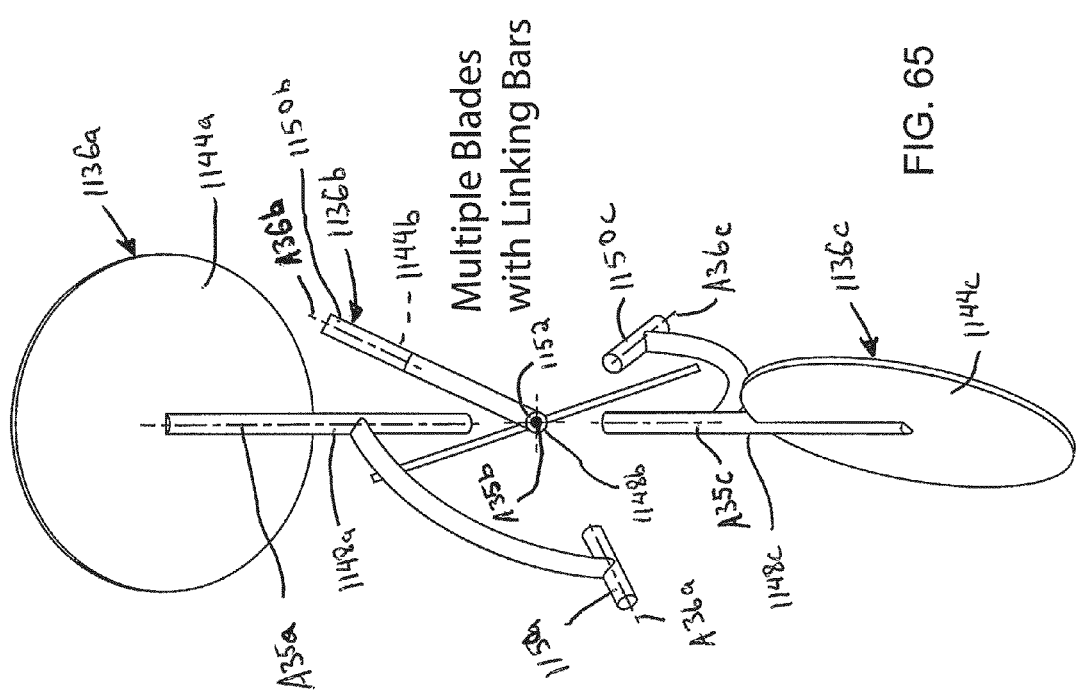
FIG. 65 illustrates a perspective view of the three blades and certain linkage components of the rotary turbine of FIG. 62.

The axes A31, A33 of the yokes 1132, 1134 can be rotatably mounted on a common frame (not shown) and thereby be connected to the ground or a turbine steering platform that is mounted on the ground or other structure. The axes A31, A33 can be held at an angle α3 from each other as shown at FIG. 62 (a plane of the angle α3 is not parallel with a viewing plane of FIG. 62). In the depicted embodiment, the angle α3 is forty-five degrees. In other embodiments, the angle α3 can be greater than or less than forty-five degrees. As shown, the yokes 1132, 1134 have a configuration that includes forks. In other embodiments, the yokes 1132, 1134 can have other configurations including configurations without forks.

The depicted blade assemblies 1136a, 1136b, and 1136c each include a first blade 1144a, 1144b, and 1144c respectively. In other embodiments, the blade assemblies 1136a, 1136b, 1136c can each include a second blade similar to the second blade 1046 of the blade assembly 1036, discussed above. By including the second blades, the rotary turbine 1130 would include six blades rather than three. The blades 1144a, 1144b, 1144c are each connected to a first shaft 1148a, 1148b, and 1148c, respectively. The blades 1144a, 1144b, 1144c are each shown as planar circular plates. In other embodiments, the blades 1144a, 1144b, 1144c can be of any general shape and/or configuration. The blade assemblies 1136a, 1136b, 1136c each include a second shaft 1150a, 1150b, and 1150c, respectively, that are oriented perpendicular to the first shafts 1148a, 1148b, 1148c, respectively, and define axes A36a, A36b, and A36c, respectively. As shown, the axes A36a, A36b, A36c of the second shafts 1150a, 1150b, 1150c are oriented at an angle forty-five degrees from perpendicular (i.e., normal) to their respective blades 1144a, 1144b, 1144c about respective axes A35a, A35b, A35c of the first shafts 1148a, 1148b, 1148c.

The rotary turbine 1130 is assembled such that the axes A32a, A32b, A32c are respectively aligned with the axes A35a, A35b, A35c, and the axes A34a, A34b, A34c are respectively aligned with the axes A36a, A36b, A36c. The rotary turbine 1130 is a CABS mechanism (described above). The shafts 1138, 1142 are rotationally coupled to each other as in the other CABS mechanism described above.

The rotary turbine 1130 steers the blades 1144a, 1144b, 1144c, relative to the general wind direction A, as the rotary turbine 1130 progresses through its cycle. In particular, as illustrated at FIG. 62, the general wind direction A is perpendicular to the blade 1144a, skew to the blade 1144b, skew to the blade 1144c, and perpendicular to the axis A31 of the shaft 1138 of the power transmission yoke 1132. The blade assemblies 1136a, 1136b, 1136c are each oriented by the blade steering yoke 1134 in cooperation with the power transmission yoke 1132. In particular, at the point of the rotary turbine's 1130 cycle shown at FIG. 62, the forty-five degree angular offset between the axes A31 and A33 is added to the forty-five degree angle between the axis A36a and the normal to the blade 1144a. This orients the blade 1144a normal to the general wind direction A. At the same point of the rotary turbine's 1130 cycle, the forty-five degree angular offset between the axes A31 and A33 is partially subtracted from the forty-five degree angle between the axes A36b, A36c and the normal to the blades 1144b, 1144c, respectively. This orients the blades 1144b, 1144c skew to the general wind direction A. Thus, the blade 1144a is in a wind catching position while the blades 1144b, 1144c are at least partially in a wind cutting position, and the blade 1144a is driven into the page (at FIG. 62) and the shaft 1138 of the power transmission yoke 1132 is rotated in a rotational direction 1131. The shaft 1138 can be coupled to a generator and thereby produce electricity. Alternatively, a motor can drive the shaft 1138 and thereby produce fluid flow.

As the cycle of the rotary turbine 1130 continues, the blade steering yoke 1134 continues to steer the blade assemblies 1136a, 1136b, 1136c and thereby the blades 1144a, 1144b, 1144c. In particular, as the blade steering yoke 1134 is rotated ninety degrees, the forty-five degree angular offset between the axes A31 and A33 is neither added nor subtracted from the forty-five degree angle between the axis A36a and the normal to the blade 1144a. As the blade steering yoke 1134 is rotated one hundred-eighty degrees (from the angular position at FIG. 62), the forty-five degree angular offset between the axes A31 and A33 is subtracted from the forty-five degree angle between the axis A36a and the normal to the blade 1144a. Thus, the blade 1144a is in a wind cutting position, parallel to the wind direction A.

As the cycle of the rotary turbine 1130 continues, the blade steering yoke 1134 continues to steer the blade assemblies 1136a, 1136b, 1136c. In particular, as the blade steering yoke 1134 is rotated two hundred seventy degrees (from the angular position at FIG. 62), the forty-five degree angular offset between the axes A31 and A33 is neither added nor subtracted from the forty-five degree angle between the axis A36a and the normal to the blade 1144a. As the cycle of the rotary turbine 1130 continues, the cycle is repeated.

The blade assemblies 1136b, 1136c are the same or similar to the blade assembly 1136a. The blade assemblies 1136b, 1136c follow the same cyclical behavior of the blade assembly 1136a. The blade assemblies 1136a, 1136b, 1136c are typically positioned around the turbine 1130 on equal spacings. Thus, the three blade assemblies 1136a, 1136b, 1136c follow each other by about 120 degrees in the cycle of the rotary turbine 1130.

The differences that allow for the kinematic movement of the rotary turbine 1130 (e.g., the axes A34a, A34b being rotatably moveable relative to the shaft 1142 of the yoke 1134 about the axis A33) can cause some differences in the cyclical behavior of the blade assemblies 1136a, 1136b, 1136c. A compensation means (e.g., a compensating mechanism, variations to the blade assemblies 1136a, 1136b, 1136c, etc.) can be included to minimize or eliminate these differences. The varying velocities of blade angle changing members that guide the axes A34a, A34b, A34c around the shaft 1142 and/or kinematic movement of the turbine 1130 can cause axial translations along and about the axes A34a, A34b, A34c. These axial translations between members connected across the axes A34a, A34b, A34c can be accommodated with linear bearings in the bores 1141a, 1141b, 1141c, flexible materials in the curved portions of the blade assemblies 1136a, 1136b, 1136c, and/or other means of mechanical compensation.

As mentioned above, the blade steering mechanism of the rotary turbine 1130 can be described as a Crossed Axes Blade Steering mechanism (i.e., a CABS mechanism). In particular, the axes A31, A32a, A32b, A32c, A33, A34a, A34b, and A34c can all mutually intersect at a point 1152. (The axes A31, A33, A35a, A35b, A35c, A36a, A36b, and A36c can also all mutually intersect at the point 1152.) The CABS mechanism is non-linear and can be characterized by certain gimbal and/or U-joint characteristics. The shafts 1138, 1142 are rotationally coupled to each other. In particular, as illustrated at FIG. 61, the shaft 1142 of the blade steering yoke 1134 (referred to as the output shaft at FIG. 61) varies in rotationally velocity with respect to the shaft 1138 of the power transmission yoke 1132 (referred to as the input shaft at FIG. 61). The shafts 1148a, 1148b, 1148c, 1150a, 1150b, 1150c also vary in rotational velocity about their axes A35a, A35b, A35c, A36a, A36b, A36c in comparison to the rotational velocity of the shaft 1138 of the yoke 1132 about its axis A31.

The varying velocity characteristics of the CABS mechanism can result in the blades 1144a, 1144b, 1144c rotating slowly when in the wind catching and wind cutting portions of the turbine's 1130 cycle, and also can result in the blades 1144a, 1144b, 1144c rotating quickly when in the transitioning portions of the turbine's 1130 cycle. This effect is similar to the effect illustrated at FIGS. 48 and 49 and the benefits are also similar to those described above in regards to FIGS. 47-49. In particular, the blade 1012v is held perpendicular or more nearly perpendicular to the general wind direction A through the working portion 1022 (illustrated at FIG. 48) of the turbine's 1010v cycle by varying the blade's 1012v rotational velocity. Similarly, the rotational velocity of the blades 1144a, 1144b, 1144c are varied at the wind catching position to increase the projected area of the blades 1144a, 1144b, 1144c when in their working portion of the turbine's 1130 cycle. The blade 1012v is held parallel or more nearly parallel to the general wind direction A through the return portion 1026 of the turbine's 1010v cycle by varying the blade's 1012v rotational velocity. Similarly, the rotational velocity of the blades 1144a, 1144b, 1144c are varied at the wind cutting position to reduce the projected area of the blades 1144a, 1144b, 1144c when in their return portion of the turbine's 1130 cycle. As the turbine 1130 rotates, the blades 1144a, 1144b, 1144c cyclically rotate through the wind catching and wind cutting portions and through transitioning portions of the turbine's 1130 cycle. The blade 1012v is rotated quickly relative to the general wind direction A through the transitioning portions 1024, 1029. Similarly, the blades 1144a, 1144b, 1144c are rotated quickly through the transitioning portions of the turbine's 1130 cycle. As with the turbine 1010v, the transitioning portions of the turbine's 1130 cycle are between the wind catching and wind cutting portions.

In certain embodiments, the shaft 1138 can be run at a constant velocity. In other embodiments, the shaft 1138 can be run at varying velocities throughout the cycle of the rotary turbine 1130. In still other embodiments, the shaft 1138 can be run at varying velocities throughout the cycle and/or from cycle to cycle of the rotary turbine 1130 (e.g., faster as the wind gusts).

The seventh, eighth, ninth, and tenth embodiments of the present disclosure, described above, are all CABS (i.e., Crossed Axes Blade Steering) mechanisms. The CABS mechanisms of the seventh, eighth, ninth, and tenth embodiments each have at least one blade assembly 1036, 1065, 1066, 1067, 1105, 1106, 1107, 1136a, 1136b, 1136c that rotationally oscillates about its mounting axis throughout the cycle of the rotary turbine 1030, 1060, 1100, and 1130.

FIGS. 66-75, 78, and 79 illustrate an eleventh embodiment of a rotary turbine (i.e., a fluid handling device) 1200 having features that are examples of inventive aspects in accordance with the principles of the present disclosure. In particular, the rotary turbine 1200 includes a first blade assembly 1202, a second blade assembly 1204, a hub 1206, a first blade steering yoke 1208, a second blade steering yoke 1210, a support frame 1212, an output pulley 1214 (e.g., a belt pulley, a sprocket, etc.), a drive member 1216 (e.g., a belt, a roller chain, etc.), a generator (or motor) pulley 1218 (e.g., a belt pulley, a sprocket, etc.), and a generator (or a motor) 1220.

The first and the second blade assemblies 1202, 1204 are substantially similar. Likewise, the first and the second blade steering yokes 1208, 1210 are substantially similar. As depicted, the first blade assembly 1202 and the first blade steering yoke 1208 are 180 degrees out of phase with the second blade assembly 1204 and the second blade steering yoke 1210 in the cycle of the rotary turbine 1200. The rotary turbine 1200 can include a single blade assembly 1202 and a single blade steering yoke 1208. A rotary turbine similar to the rotary turbine 1200 can include more than two blade assemblies 1202, 1204 and more than two blade steering yokes 1208, 1210. As depicted, the first blade assembly 1202 and the first blade steering yoke 1208 are mounted opposite the second blade assembly 1204 and the second blade steering yoke 1210 on the hub 1206 and on the support frame 1212, as illustrated at FIG. 67. This opposed mounting configuration facilitates the inclusion of two blade assemblies 1202, 1204 in the rotary turbine 1200.

The assembled hub 1206 defines an axis A41 (e.g., a first axis) that is also defined by the support frame 1212. The assembled hub 1206 is rotatably mounted on the support frame 1212 about the axis A41. The assembled hub 1206 also defines an axis A42 (e.g., a second axis) that is also defined by the blade assembly 1202. The assembled blade assembly 1202 is rotatably mounted on the hub 1206 about the axis A42. The assembled blade steering yoke 1208 defines an axis A43 (e.g., a third axis) that is also defined by the support frame 1212. The assembled blade steering yoke 1208 is rotatably mounted on the support frame 1212 about the axis A43. The assembled blade steering yoke 1208 also defines an axis A44 (e.g., a fourth axis) that is also defined by the assembled blade assembly 1202. The assembled blade assembly 1202 is rotatably connected to the blade steering yoke 1208 about the axis A44.

The axes A41 and A42 define an angle α4 as illustrated at FIG. 67. In the depicted embodiment, the angle α4 is forty-five degrees. In other embodiments, the angle α4 can be greater than or less than forty-five degrees. The axes A41 and A43 define an angle α5 as illustrated at FIG. 67. In the depicted embodiment, the angle α5 is forty-five degrees. In other embodiments, the angle α5 can be greater than or less than forty-five degrees. The angles α4 and α5 are shown as being equal. As shown, the yokes 1208, 1210 have a fork-like configuration. In other embodiments, the yokes 1208, 1210 can have other configurations.

The blade assembly 1202 includes a blade illustrated as a planar circular plate. In other embodiments, the blade of the blade assembly 1202 can be of any general shape and/or configuration. The axis A44, defined by the blade assembly 1202, is perpendicular to the axis A42, also defined by the blade assembly 1202. As depicted, the axis A44, defined by the blade assembly 1202, is also perpendicular to the planar plate of the blade. The blade of the blade assembly 1202, 1204 can define a centroid 1290 radially spaced from the axis A41 by a distance Rb (see FIG. 67). The centroid 1290 can be a center of pressure of impinging wind and/or other aerodynamic forces placed on the blade assembly 1202, 1204 by the wind. The aerodynamic forces include a component that is perpendicular to the axis A41. As the aerodynamic forces act on the blade assembly 1202, 1204 at a distance from the axis A41, a net torque is produced on the hub 1206, and the hub 1206 is thereby urged to rotate about the axis A41 in a rotational direction 1224 (see FIG. 66). The rotational movement under the net torque can be harnessed by the generator 1220 and converted into power. Components of the aerodynamic forces that are parallel to the axis A41 can have little or no direct effect in producing the net torque on the hub 1206. As depicted, the centroid 1290 is generally coincident with the axis A42. In this configuration, little or no net torque is placed on the blade assembly 1202 about the axis A42. In other embodiments, the centroid 1290 can be spaced from the axis A42 and thereby produce a net torque on the blade assembly 1202. This net torque can be harvested as power. In certain embodiments, the components of the aerodynamic forces that are parallel to the axis A41 can be harvested by the blade assembly 1202 via a net torque about the axis A42 that is transferred through the turbine 1200.

The rotary turbine 1200 includes a CABS (i.e., Crossed Axes Blade Steering) mechanism as the axes A41, A42, A43, and A44 all intersect at a common point 1222. The axes A42 and A43 become coaxial at a certain position of the cycle of the rotary turbine 1200 (see FIG. 66). Unlike the CABS mechanisms of the rotary turbines 1030, 1060, 1100, and 1130, the blade assemblies 1202, 1204 of the rotary turbine 1200 do not rotationally oscillate about both of their two mounting axes throughout the cycle of the rotary turbine 1200 when in normal operation. Instead, the blade assembly 1202 rotates in a single rotational direction about the axis A42 with respect to the hub 1206 (see graph at FIG. 81). The blade assembly 1202 does oscillate about the axis A44 with respect to the blade steering yoke 1208 (see graph at FIG. 81).

Like the CABS mechanisms of the rotary turbines 1030, 1060, 1100, and 1130, the blade assemblies 1202, 1204 of the rotary turbine 1200 vary in rotational velocity throughout the cycle of the rotary turbine 1200 when in normal operation. The varying velocity of the blade assemblies 1202, 1204 can benefit the relative orientation between the blade assemblies 1202, 1204 and the general wind direction A (see FIGS. 66 and 78-80). The varying velocity characteristics of the CABS mechanism can result in the blade assemblies 1202, 1204 rotating at varying speeds when passing through and transitioning between the wind catching and wind cutting portions of the turbine's 1200 cycle.

Figure 80:
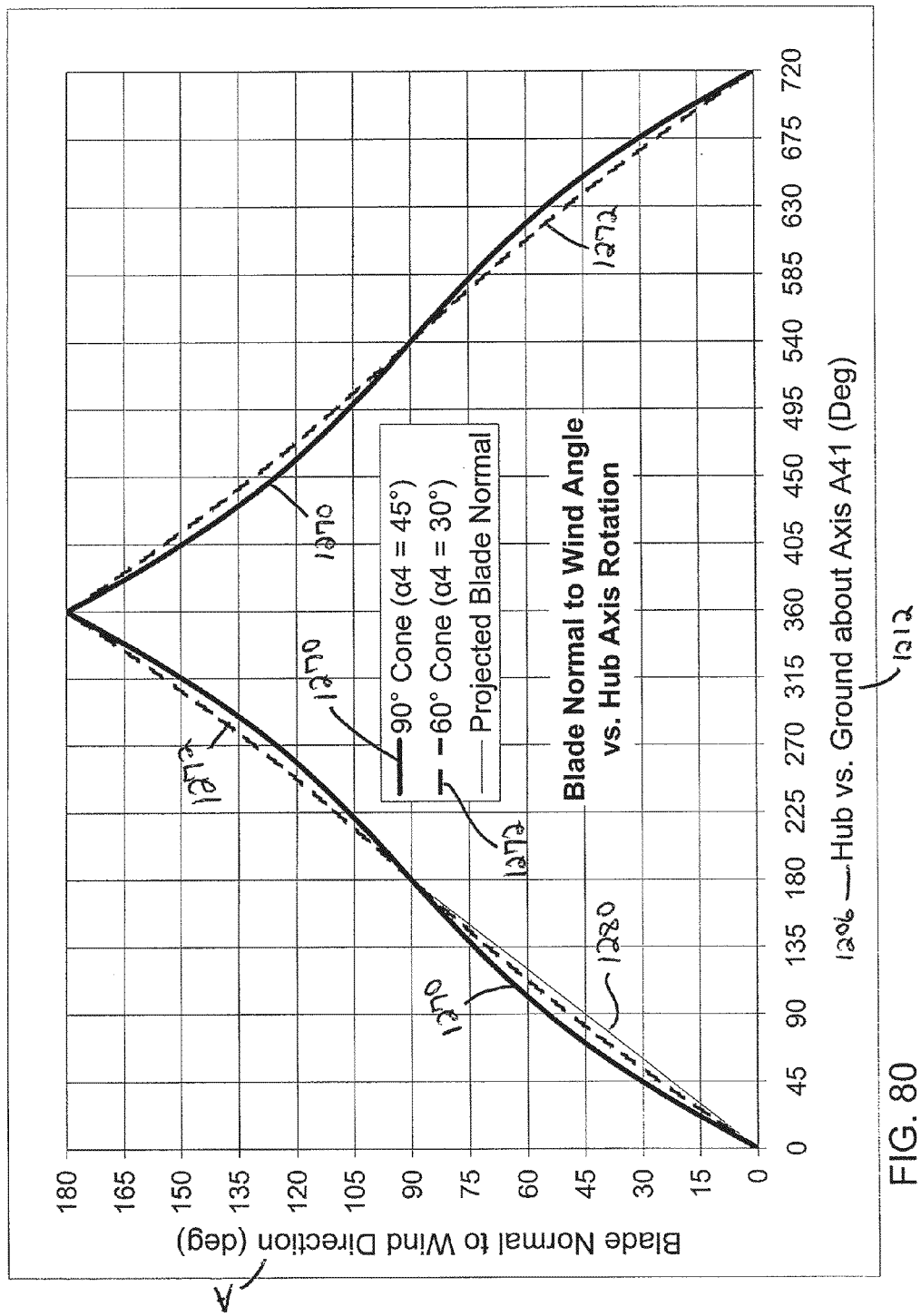
FIG. 80 is a graph of an angle between a wind direction and a blade normal of one of the blades of FIG. 66 of the rotary turbines of FIGS. 66 and 76 as a hub of the turbines progresses through its cycle with respect to the ground.

In the depicted embodiment, with the angles α4 and α5 equal to forty-five degrees, an angle between a normal to the blade of the blade assembly 1202 and the general wind direction A is graphed at FIG. 80 vs. a rotational position of the hub 1206, about the axis A41 with respect to the support frame 1212 (e.g., the ground), as graph 1270. The graph 1270 at FIG. 80 starts with the blade of the blade assembly 1202 normal to the wind direction A (i.e., 0 degrees) and the hub 1206 in the position illustrated at FIG. 68 (i.e., at 0 degrees about the axis A41 with respect to the support frame 1212). FIG. 80 also includes a graph 1272 showing the same relationship but with the angles α4 and α5 equal to thirty degrees (see FIG. 67).

Figure 81:
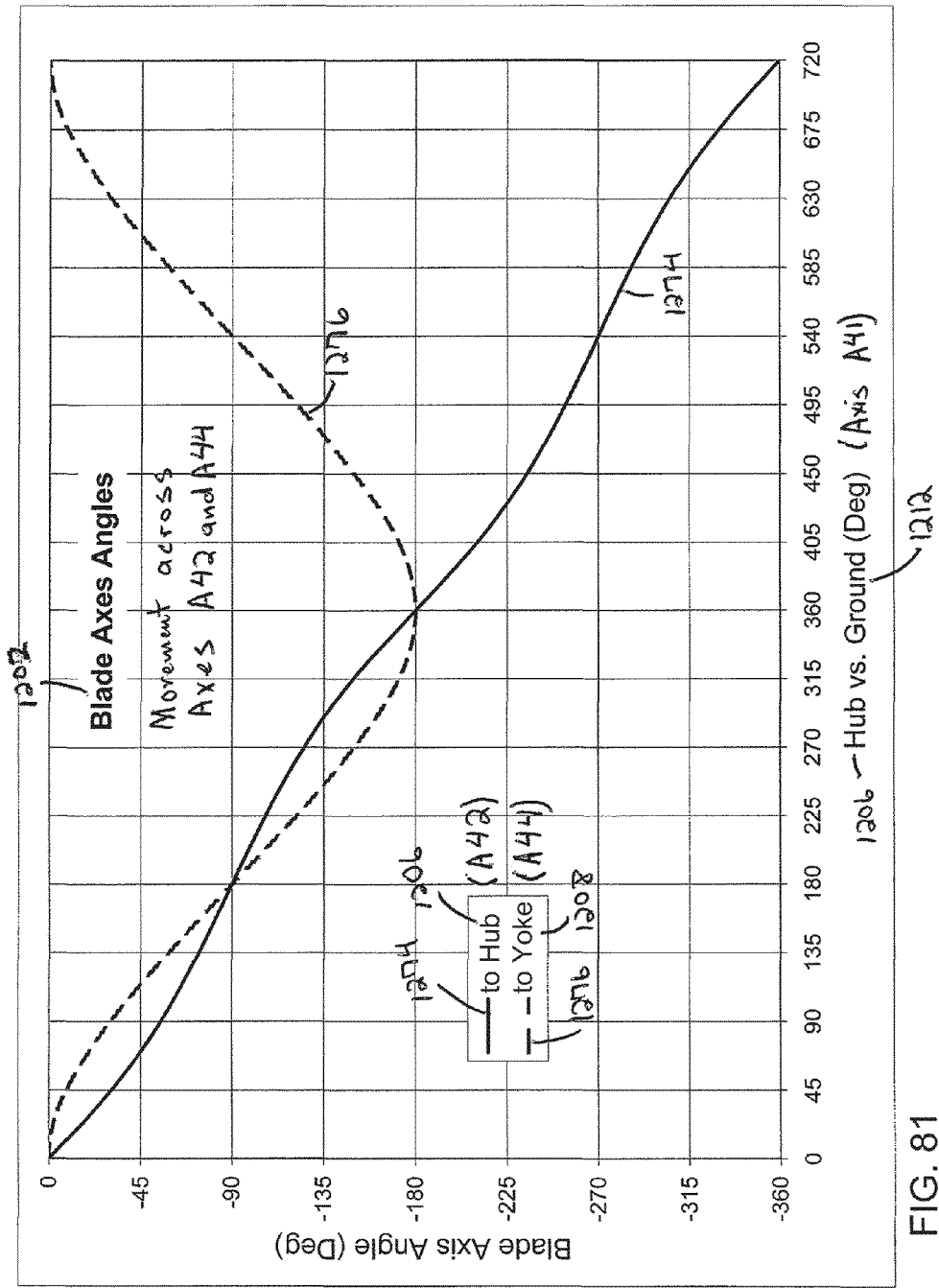
FIG. 81 is a graph of an angle between one of the blades of FIG. 66 of the rotary turbines of FIGS. 66 and 76 and a yoke of the turbines and an angle between the blades and the hub of FIG. 80 as the hub of the turbines progresses through its cycle with respect to the ground.

FIG. 81 illustrates a variable angular relationship that the blade assembly 1202 has with its mounts about its mounting axes A42 and A44. In particular, the blade assembly 1202 rotates continuously in a single rotational direction about the axis A42 with respect to the hub 1206 as the rotational position of the hub 1206 moves with respect to the support frame 1212 about the axis A41, and this relationship is graphed as graph 1274 at FIG. 81. The blade assembly 1202 oscillates about the axis A44 with respect to the yoke 1208 as the rotational position of the hub 1206 moves with respect to the support frame 1212 about the axis A41, and this relationship is graphed as graph 1276 at FIG. 81. The graphs 1274 and 1276 at FIG. 81 start with the hub 1206 in the position illustrated at FIG. 68 (i.e., at 0 degrees about the axis A41 with respect to the support frame 1212). The graph 1274 starts with the blade assembly 1202 in the position illustrated at FIG. 68 (i.e., at 0 degrees about the axis A42 with respect to the hub 1206). The graph 1276 starts with the blade assembly 1202 in the position illustrated at FIG. 68 (i.e., at 0 degrees about the axis A44 with respect to the yoke 1208). Thus, when the axis A42 is perpendicular to the axis A43 about the axis A44 as shown at FIG. 68, the graph 1276 indicates an angle of 0 degrees. In addition, when the axis A42 is parallel to the axis A43 about the axis A44 as shown at FIG. 75, the graph 1276 indicates an angle of −90 degrees. As the turbine 1200 continues its cycle, the axis A42 again becomes perpendicular to the axis A43 about the axis A44 but in a perpendicular position opposite from that shown at FIG. 68, and the graph 1276 indicates an angle of −180 degrees. The blade assembly 1202 thus oscillates about the axis A44 by ±90° with respect to the yoke 1208 from where the axes A42 and A43 are parallel.

Figure 82:
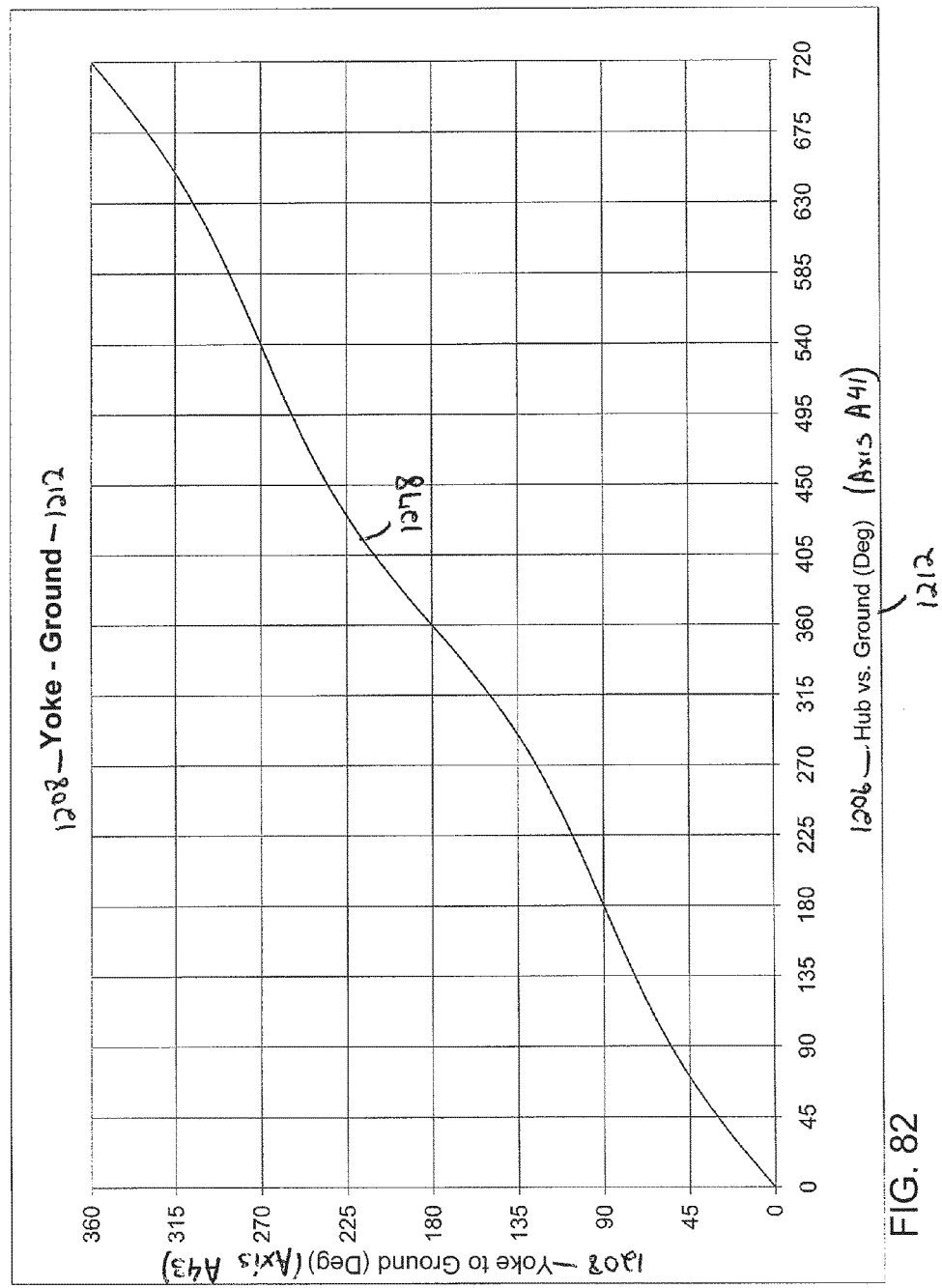
FIG. 82 is a graph of an angle between the yoke of FIG. 81 of the rotary turbines of FIGS. 66 and 76 and the ground as the hub of the turbines progresses through its cycle with respect to the ground.

FIG. 82 illustrates a variable angular relationship the blade steering yoke 1208 has with the support frame 1212 about the axis A43. In particular, the blade steering yoke 1208 rotates continuously in a single rotational direction about the axis A43 with respect to the support frame 1212 as the rotational position of the hub 1206 moves with respect to the support frame 1212 about the axis A41, and this relationship is graphed as graph 1278 at FIG. 82. The graph 1278 at FIG. 82 starts with the hub 1206 in the position illustrated at FIG. 68 (i.e., at 0 degrees about the axis A41 with respect to the support frame 1212). The graph 1278 starts with the yoke 1208 in the position illustrated at FIG. 68 (i.e., at 0 degrees about the axis A43 with respect to the support frame 1212). The graphs 1270, 1274, 1276, 1278 of FIGS. 80-82 are reflective of the turbine 1200 with the angles α4 and α5 equal to forty-five degrees.

As discussed above, the components of the aerodynamic forces that are spaced from the axis A41 and perpendicular to the axis A41 can produce the net torque on the hub 1206 that can be transformed into power output by the turbine 1200. Similarly, components of the aerodynamic forces that are spaced from the axis A42 and perpendicular to the axis A42 can produce a net torque on the blade assembly 1202 that can be transformed into power output by the turbine 1200. Since the axes A41 and A42 are angularly offset from each other, components of the aerodynamic forces that are parallel to one of the axes A41, A42 will not be parallel to the other of the axes A41, A42. In this way, components of the aerodynamic forces parallel to the axis A41 can be harvested by the blade assembly 1202 via the axis A42 and contribute to the power output of the turbine 1200.

As an angular change in the normal of the blade of the blade assembly 1202 relative to a tangent of a main circular path about the axis A41 will affect torque output differently than angular changes in the normal relative to the axis A41, components of the normal can be relevant to the performance of the turbine 1200. For example, tilt of the normal of the blade relative to the axis A41 creates an upward or downward aerodynamic force component (i.e., an axial force) parallel to the axis A41. This axial force component will not be directly converted into output torque of the hub 1206 about the axis A41. The tilt of the normal of the blade relative to the axis A41 also creates a circumferential aerodynamic force component (i.e., a tangential force) perpendicular to the axis A41. This tangential force component can be directly converted into the output torque of the hub 1206 about the axis A41.

As the blade normal and the various angles can be graphed with respect to the cycle of the turbine 1200, a component of the blade normal of the blade assembly 1202 can be graphed. For example, the blade normal graphed at the graph 1270 at FIG. 80 can be projected onto a plane perpendicular to the axis A41 (e.g., a plane that includes the main circular path of the blade assembly 1202). Graph 1280 at FIG. 80 plots an angle between this projected blade normal and the general wind direction A. As the angle graphed at the graph 1280 can relate to the tangential force component directly converted into the output torque of the hub 1206, the graph 1280 can be relevant to the performance of the turbine 1200.

Figure 78:
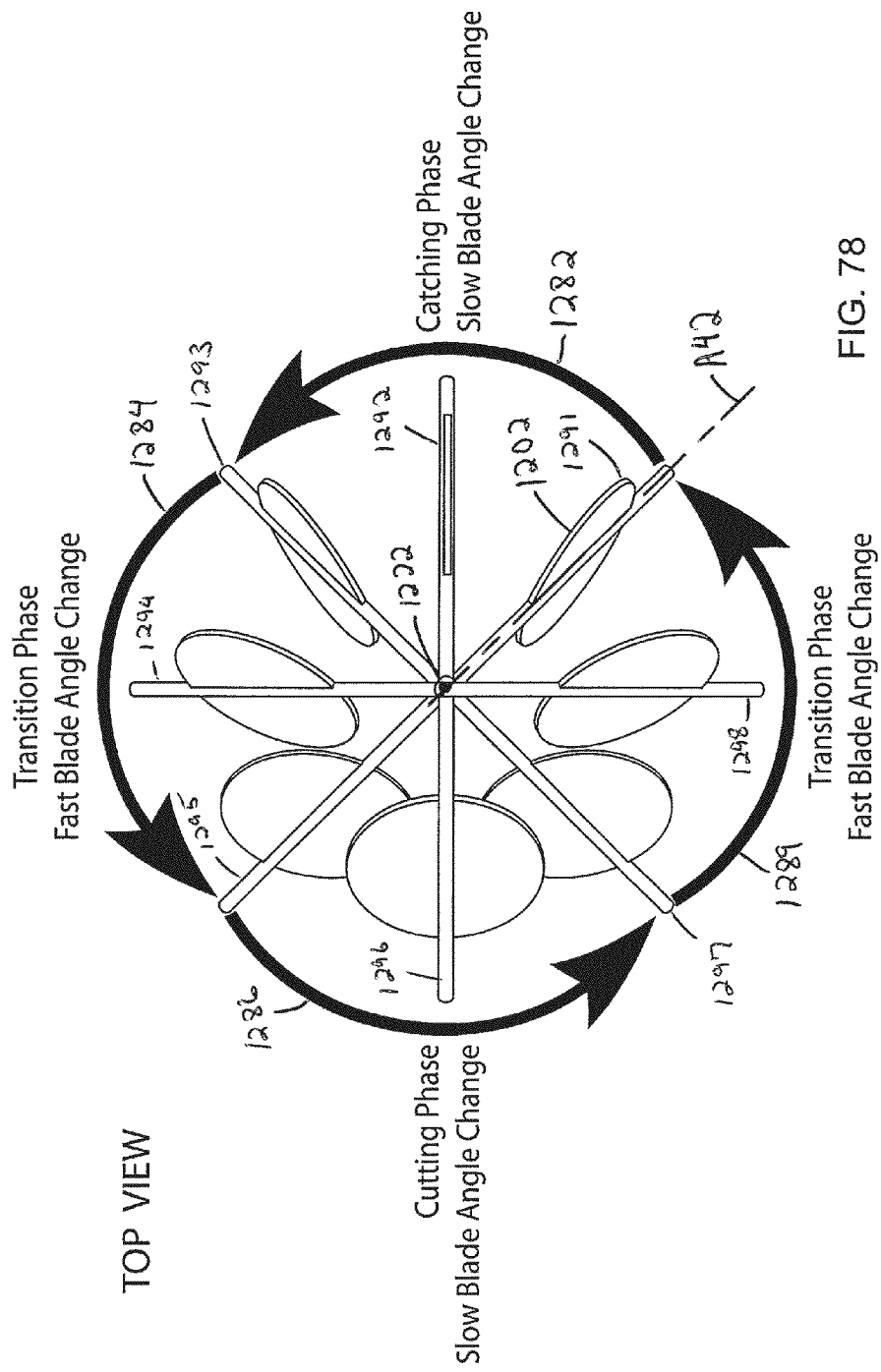
FIG. 78 schematically illustrates a top plan view of one of the blades of FIG. 66 of the rotary turbines of FIGS. 66 and 76, the blade superimposed at eight locations of the turbines' cycle.
Figure 79:
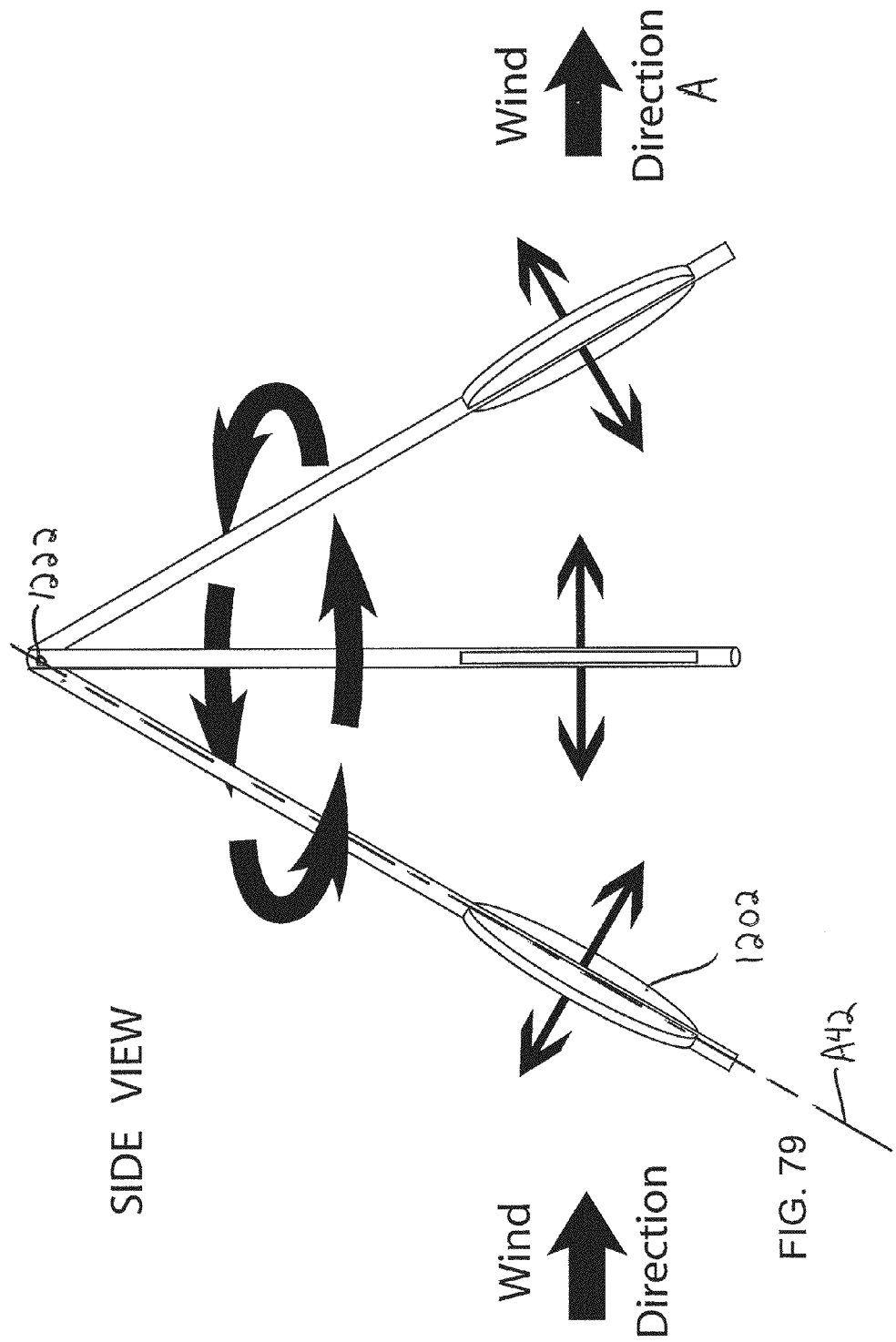
FIG. 79 schematically illustrates a side elevation view of one of the blades of FIG. 66 of the rotary turbines of FIGS. 66 and 76, the blade superimposed at three locations of the turbines' cycle.

The effect graphed at FIGS. 80-82 and illustrated at FIG. 78 is similar to the effect illustrated at FIGS. 48 and 49 and the benefits can also be similar to those described above in regards to FIGS. 47-49. In particular, the blade 1012v is held perpendicular or more nearly perpendicular to the general wind direction A through the working portion 1022 (illustrated at FIG. 48) of the turbine's 1010v cycle by varying the blade's 1012v rotational velocity with a mechanism. Similarly, a position of the blade assemblies 1202, 1204 is held perpendicular or more nearly perpendicular to the general wind direction A by the CABS mechanism at the wind catching position when the blade assemblies 1202, 1204 are in their working portion 1282 of the turbine's 1200 cycle (see FIG. 78). The blade 1012v is held parallel or more nearly parallel to the general wind direction A through the return portion 1026 of the turbine's 1010v cycle by varying the blade's 1012v rotational velocity with the mechanism. Similarly, the position of the blade assemblies 1202, 1204 is held parallel or more nearly parallel to the general wind direction A by the CABS mechanism at the wind cutting position when the blade assemblies 1202, 1204 are in their return portion 1286 of the turbine's 1200 cycle (see FIG. 78). As the turbine 1200 rotates, the blade assemblies 1202, 1204 are moved through the wind catching and wind cutting portions 1282, 1286 and through transitioning portions 1284, 1289 of the turbine's 1200 cycle (see FIG. 78) by the CABS mechanism. As with the turbine 1010v, the transitioning portions 1284, 1289 of the turbine's 1200 cycle are between the wind catching 1282 and wind cutting 1286 portions.

Figure 66:
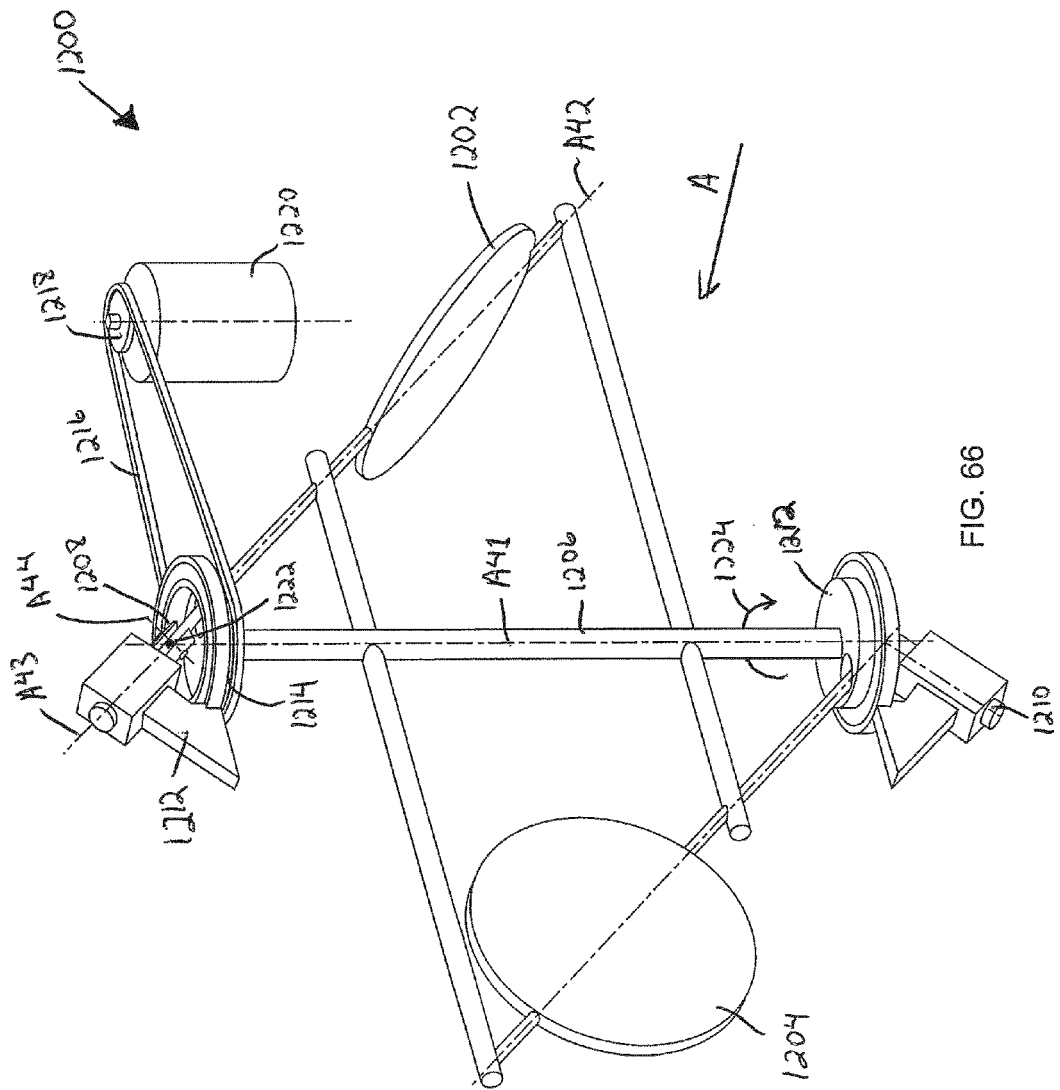
FIG. 66 illustrates a perspective view of phase 8 of a cycle of an eleventh embodiment of a rotary turbine having features that are examples of inventive aspects in accordance with the principles of the present disclosure, the rotary turbine shown with two blades turned by a linkage that changes the orientation of the blades non-linearly with respect to the blades' orbital position about the rotary turbine.
Figure 76:
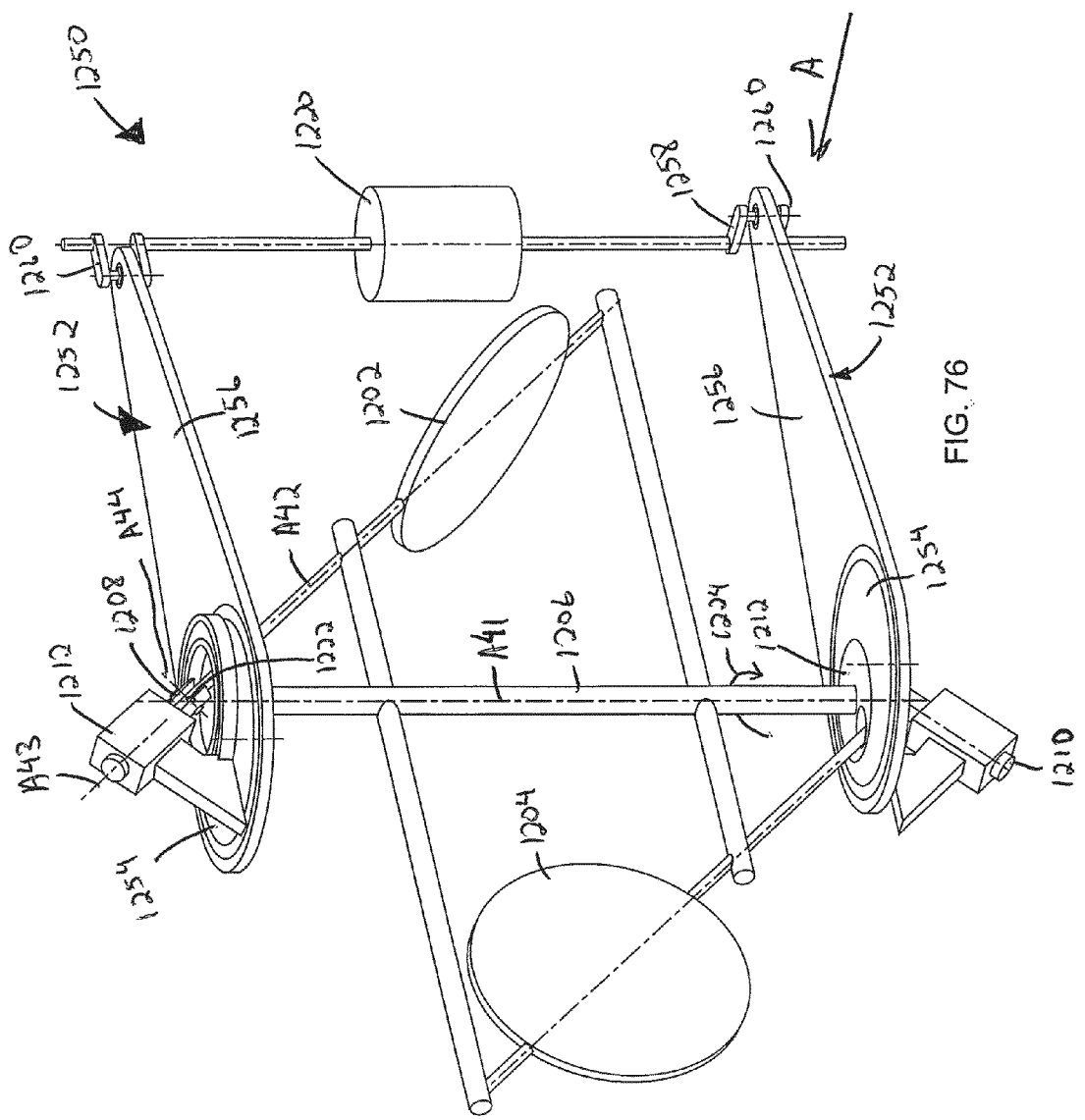
FIG. 76 illustrates a perspective view of phase 8 of a cycle of a twelfth embodiment of a rotary turbine having features that are examples of inventive aspects in accordance with the principles of the present disclosure, the rotary turbine similar to the rotary turbine of FIGS. 66-75.
Figure 77:
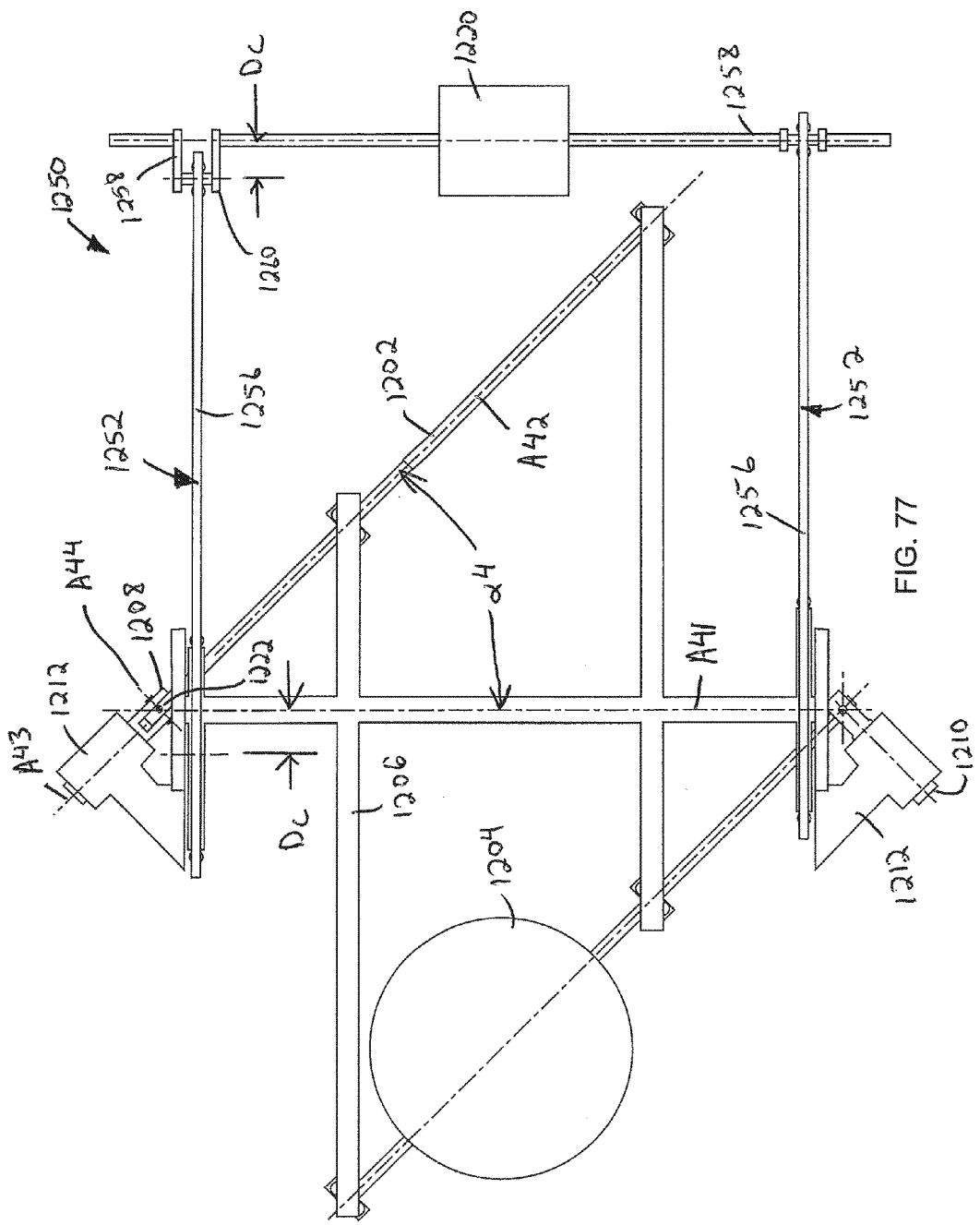
FIG. 77 illustrates a side view of the rotary turbine of FIG. 76 at phase 8 of its cycle.

The axes A41, A42, A43, and A44 of the rotary turbine 1200 are kinematically coupled to provide the blade assemblies 1202, 1204 with the positionally varying characteristics described above and graphed at FIGS. 80-82. In particular, as illustrated at FIGS. 66, 67, and 75, the axes A42 and A43 are coaxially aligned with each other when the blade assembly 1202 is at or near a center of its return portion 1286 of the cycle of the turbine 1200 (at a "Hub vs. Ground" position of 180 and 540 degrees at FIGS. 80-82 and a "Blade Axis Angle—to Yoke" of −90 degrees at FIG. 81). As this position in the cycle is reached, the relative rotational velocity of the blade assembly 1202 with respect to the hub 1206 about the axis A42 can momentarily reach a minimum (see FIG. 81). As this position in the cycle is reached, the relative rotational velocity of the yoke 1208 with respect to the support frame 1212 about the axis A43 can momentarily reach a minimum (see FIG. 82). As this position in the cycle is reached, the relative rotational velocity of the blade assembly 1202 with respect to the yoke 1208 about the axis A44 can momentarily reach a maximum (see FIG. 81). In positions of the cycle near this position in the cycle, the relative rotational velocity of the blade assembly 1202 with respect to the general wind direction A is reduced thus extending a portion 1286 of the cycle where the blade assembly 1202 is held in a wind cutting configuration (see FIGS. 78 and 80).

As illustrated at FIG. 68, the axes A42 and A43 are perpendicular with each other when the blade assembly 1202 is at or near a center of its working portion 1282 of the cycle of the turbine 1200 (at a "Hub vs. Ground" position of 0, 360, and 720 degrees at FIGS. 80-82). As this position in the cycle is reached, the relative rotational velocity of the blade assembly 1202 with respect to the hub 1206 about the axis A42 can momentarily reach a maximum (see FIG. 81). As this position in the cycle is reached, the relative rotational velocity of the yoke 1208 with respect to the support frame 1212 about the axis A43 can momentarily reach a maximum (see FIG. 82). As this position in the cycle is reached, the relative rotational velocity of the blade assembly 1202 with respect to the yoke 1208 about the axis A44 can momentarily reach a minimum and/or zero (see FIG. 81).

The combined effect of the interaction of the axes A41, A42, A43, and A44 of the CABS mechanism on the orientation of the blade assembly 1202 of the turbine 1200 as it cycles is illustrated at FIG. 78. In particular, FIG. 78 shows the blade assembly 1202 at eight different positions 1291, 1292, 1293, 1294, 1295, 1296, 1297, and 1298 of the cycle of the turbine 1200. For the purpose of illustration, the wind catching portion 1282 is illustrated as starting at position 1291, being centered at position 1292, and ending at position 1293. For the purpose of illustration, the transitioning portion 1284 is illustrated as starting at position 1293, being centered at position 1294, and ending at position 1295. For the purpose of illustration, the wind cutting portion 1286 is illustrated as starting at position 1295, being centered at position 1296, and ending at position 1297. For the purpose of illustration, the transitioning portion 1289 is illustrated as starting at position 1297, being centered at position 1298, and ending at position 1291. The portions 1282, 1284, 1286, and/or 1289 can be longer and/or shorter than those shown at FIG. 78.

At positions 1291, 1292, 1293 of the wind catching portion 1282, FIG. 78 shows a projected area of the blade of the blade assembly 1202 as nil (position 1292) or small (positions 1291 and 1293). The projected area of the blade of the blade assembly 1202 into the general wind direction A is therefore large throughout the wind catching portion 1282. As depicted, the large projected area into the wind direction A is substantially maintained throughout the wind catching portion 1282. Conversely, at positions 1295, 1296, 1297 of the wind cutting portion 1286, FIG. 78 shows a projected area of the blade of the blade assembly 1202 as large. The projected area of the blade of the blade assembly 1202 into the general wind direction A is therefore nil (position 1296) or small (positions 1295 and 1297) throughout the wind cutting portion 1286. As depicted, the nil or small projected area into the wind direction A is substantially maintained throughout the wind cutting portion 1282.

At positions 1293, 1294, 1295 of the transitioning portion 1284, FIG. 78 shows a projected area of the blade of the blade assembly 1202 as transitioning from small (position 1293) to large (position 1295). The projected area of the blade of the blade assembly 1202 into the general wind direction A therefore transitions from large (position 1293) to small (positions 1295) during the transitioning portion 1284. As depicted, transition from a large to a small projected area into the wind direction A is quickly accomplished through the transitioning portion 1284. Conversely, at positions 1297, 1298, 1291 of the transitioning portion 1289, FIG. 78 shows a projected area of the blade of the blade assembly 1202 as transitioning from large (position 1297) to small (position 1291). The projected area of the blade of the blade assembly 1202 into the general wind direction A therefore transitions from small (position 1297) to large (positions 1291) during the transitioning portion 1289. As depicted, transition from a small to a large projected area into the wind direction A is quickly accomplished through the transitioning portion 1289.

The CABS mechanism can be reconfigured to orient the blade assembly 1202 with respect to the general wind direction A in various configurations. For example, the configuration depicted at FIG. 75 (wind cutting) and the configuration depicted at FIG. 68 (wind catching) of the turbine 1202 can be reversed. In particular, as depicted, the axis A44, defined by the blade assembly 1202, is perpendicular to the planar plate of the blade. In an embodiment where the wind cutting and the wind catching portions 1286, 1282 of the cycle of the turbine 1202 are reversed, the axis A44 would remain perpendicular to the axis A42 but would be parallel to the planar plate of the blade, effectively swapping the wind cutting and the wind catching portions 1286, 1282 of the cycle of the turbine 1202 from that depicted at FIGS. 66-75. In embodiments with the wind cutting and the wind catching portions 1286, 1282 of the cycle of the turbine 1202 so reversed, the rotational direction 1224 (see FIG. 66) of the turbine 1200 would also be reversed.

The CABS mechanism of the rotary turbine 1200 steers the blade assemblies 1202, 1204, relative to the general wind direction A, as the rotary turbine 1200 progresses through its cycle. In particular, as illustrated at FIG. 66, the general wind direction A is perpendicular to the second blade assembly 1204, parallel to the first blade assembly 1202, and generally perpendicular to the axis A41 of the hub 1206. The blade assembly 1202 is oriented by the blade steering yoke 1208 in cooperation with the hub 1206. In particular, at the point of the rotary turbine's 1200 cycle shown at FIGS. 66, 67, and 75, the axes A41 and A44 momentarily align the axis A42 with the axis A43. This orients the first blade assembly 1202 parallel to the general wind direction A and thus positions the first blade assembly 1202 for the return portion 1286 of the cycle of the turbine 1200 (i.e., the wind cutting portion 1286). At a position offset 180 degrees in the cycle of the turbine 1200 from FIG. 75, illustrated at FIG. 68, the axis A44 (perpendicular to the page at FIG. 68), is mutually perpendicular to both the axes A42 and A43 and thereby orients the first blade assembly 1202 perpendicular to the general wind direction A and thus positions the first blade assembly 1202 for the working portion 1282 of the cycle of the turbine 1200 (i.e., the wind catching portion 1282).

FIGS. 68-75 sequentially illustrate the movement of the turbine 1200 through 180 degrees of its cycle. In particular, as the wind drives the blade assembly 1202 into the page, at FIG. 68, the hub 1206 is rotated in the rotational direction 1224 (see FIG. 66). This rotation of the hub 1206 causes the axis A42 to swivel (i.e. rotate) about the axis A41 of the hub 1206. The swiveling of the axis A42, in turn, rotates the blade steering yoke 1208 about the axis A43. As the blade steering yoke 1208 rotates about the axis A43, the common axis A44 (between the blade steering yoke 1208 and the blade assembly 1202) rotates the blade assembly 1202 about the axis A42. Thus, as the wind rotationally drives the hub 1206 of the turbine 1200 about the axis A41, the blade assembly 1202 is rotated about the axis A42. Furthermore, the rotation of the blade assembly 1202 is synchronized with the rotation of the hub 1206 such that the blade assembly 1202 faces the wind during the working portion 1282 of its cycle and cuts through the wind during the return portion 1286 of its cycle.

As the turbine 1200 is run through a given number of cycles, the blade assemblies 1202, 1204 and the blade steering yokes 1208, 1210 rotate half as many revolutions about their mounts as the hub 1206 rotates about the support frame 1212. This is reflected in the graphs 1270, 1272, 1274, 1276, and 1278 of FIGS. 80-82 as the hub 1206 takes two revolutions (i.e. 720 degrees of rotation about the axis A41) while the other rotational movements about the axes A42, A43, and A44 rotate or oscillated back to their starting positions. This is also reflected in that the blade assembly 1202 alternates between facing a first side (e.g., a first planar face) into the wind on one turbine 1200 cycle (i.e., 0°-360° about the axis A41 at FIGS. 80-82) and facing a second opposite side (e.g., a second planar face) into the wind on the next turbine 1200 cycle (i.e., 360°-720° about the axis A41 at FIGS. 80-82). As mentioned above, the blade assemblies 1202, 1204 and the blade steering yokes 1208, 1210 continue to rotate in a single rotational direction on their respective mounts to the hub 1206 and the support frame 1212 as the turbine 1200 cycles (assuming the turbine 1200 cycles in a single rotational direction).

As depicted, the output pulley 1214 is fixedly coupled to the hub 1206 and thereby drives the drive member 1216, and in turn, the generator pulley 1218 and the generator 1220. In other embodiments, the hub 1206 can be coupled to a generator or a motor by other means. In certain embodiments, the hub 1206 can be run at a constant velocity. In other embodiments, the hub 1206 can be run at varying velocities throughout the cycle of the rotary turbine 1200. In still other embodiments, the hub 1206 can be run at varying velocities throughout the cycle and/or from cycle to cycle of the rotary turbine 1200 (e.g., faster as the wind gusts).

In certain embodiments, the support frame 1212, and thereby the turbine 1200, can be steered into the general wind direction A by a mount, a control system and actuators, a turning vane, the high torque motor, etc. This turbine steering action can occur continuously or intermittently with the turbine 1200 cycling or stationary.

FIGS. 68-79 illustrate a twelfth embodiment of a rotary turbine 1250 having features that are examples of inventive aspects in accordance with the principles of the present disclosure. The rotary turbine 1250 is similar to the rotary turbine 1200 except that a double crankshaft and connecting rod assembly 1252 replaces the output pulley 1214, the drive member 1216, and the generator pulley 1218 in rotationally connecting the hub 1206 to the generator (or a motor) 1220. The double crankshaft and connecting rod assembly 1252 includes crank throws 1254, that are rotationally connected to the hub 1206; connecting rods 1256; and a crankshaft 1258, rotationally coupled to the generator (or a motor) 1220.

As depicted, two of the crank throws 1254 are mounted on the hub 1206 and are rotationally offset from each other by ninety degrees about the axis A41. The crank throws 1254 define a distance Dc (see FIG. 77) between the axis A41 and their rotatable connection axis to the connecting rods 1256. The crankshaft 1258 includes crank throws 1260 that also define the distance Dc between an axis of the crankshaft 1258 and an axis of the crank throws 1260. The connecting rods 1256 are also rotatably connected to the crank throws 1260 of the crankshaft 1258 about the axis of the crank throws 1260.

Figure 83:
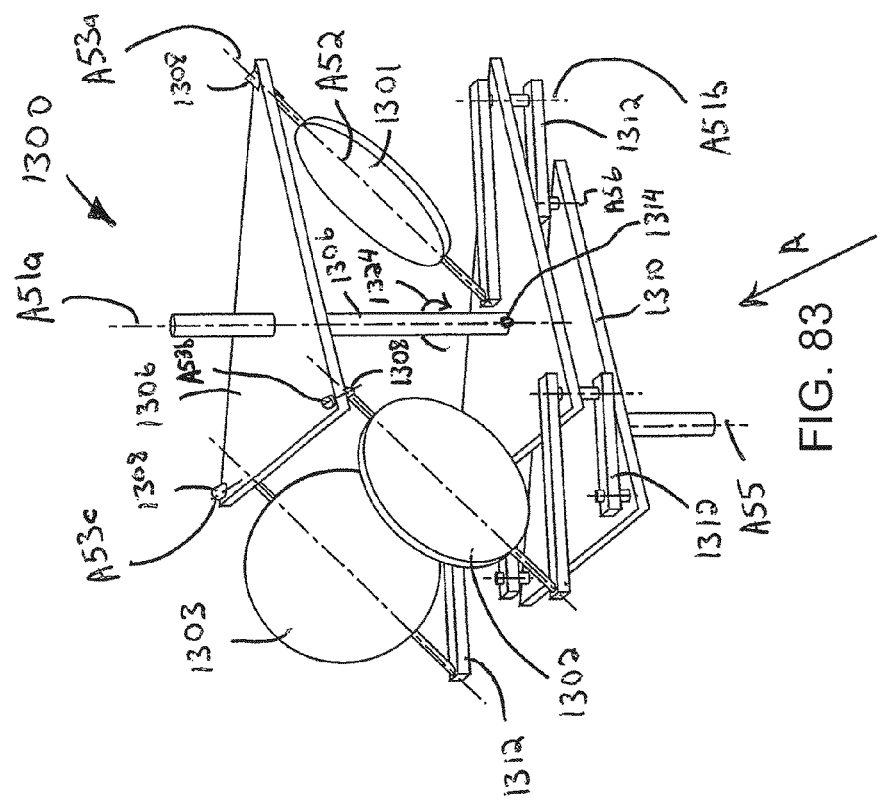
FIG. 83 illustrates a perspective view of a thirteenth embodiment of a rotary turbine having features that are examples of inventive aspects in accordance with the principles of the present disclosure, the rotary turbine shown with three blades turned by a linkage that changes the orientation of the blades non-linearly with respect to the blades' orbital position about the rotary turbine.
Figure 84:
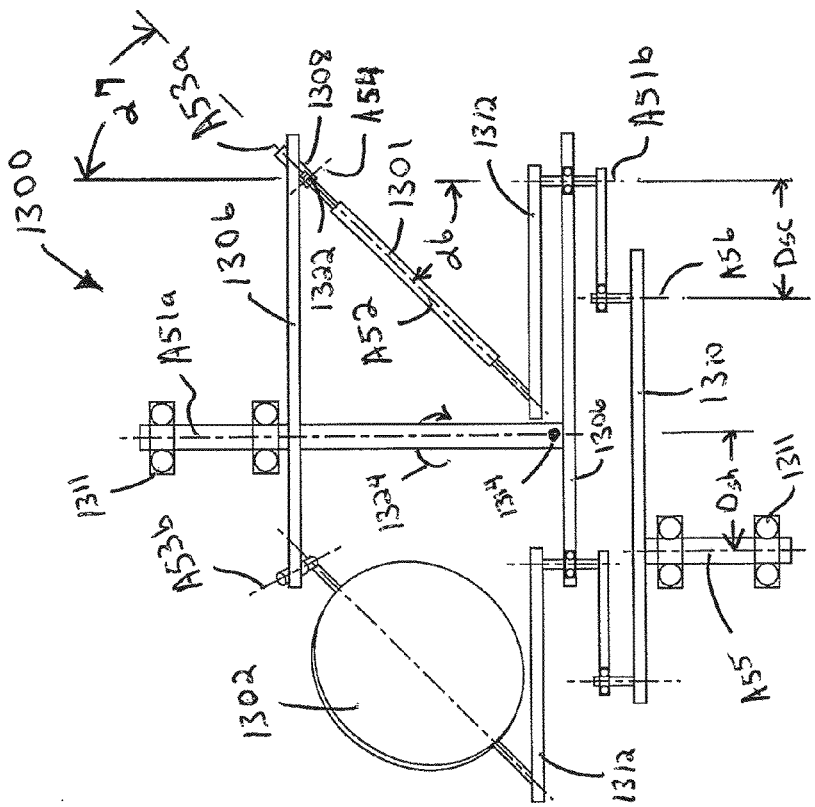
FIG. 84 illustrates a side view of the rotary turbine of FIG. 83.

FIGS. 83 and 84 illustrate a thirteenth embodiment of a rotary turbine (i.e., a fluid handling device) 1300 having features that are examples of inventive aspects in accordance with the principles of the present disclosure. The rotary turbine 1300 is similar to the rotary turbine 1200 and the rotary turbine 1250 in that it employs a CABS mechanism. The rotary turbine 1300 includes provisions that allow one or more blade assemblies to be mounted and steered on the turbine 1300. In the depicted embodiment, three blade assemblies 1301, 1302, and 1303 are mounted and steered on the turbine 1300. The rotary turbine 1300 also includes a hub 1306, blade steering yokes 1308, a support frame 1311, a blade steering hub 1310, and blade steering cranks 1312.

The blade assemblies 1301, 1302, 1303 are substantially similar to each other. Likewise, the blade steering yokes 1308 are substantially similar to each other, and the blade steering cranks 1312 are substantially similar to each other. As depicted, the blade assemblies 1301, 1302, 1303 and their respective blade steering yokes 1308 are 120 degrees out of phase with each other in the cycle of the turbine 1300. The rotary turbine 1300 can include a single blade assembly 1301, two blade assemblies 1301, 1302 or more than three blade assemblies 1301. The blade assemblies 1301, 1302, 1303 are radially spaced from an axis A51a of the hub 1306, and this radially spaced mounting configuration facilitates the inclusion of two or more blade assemblies 1301, 1302, 1303 in the rotary turbine 1300. In preferred multi-blade embodiments, the blade assemblies 1301, 1302, 1303 are equally spaced circumferentially about the axis A51a of the hub 1306 as illustrated at FIG. 83.

The assembled hub 1306 defines the axis A51a that is also defined by the support frame 1311. The assembled hub 1306 is rotatably mounted on the support frame 1311 about the axis A51a. The assembled hub 1306 also defines an axis A51b that is also defined by one of the blade steering cranks 1312. The assembled blade steering crank 1312 is rotatably mounted on the hub 1306 about the axis A51b. The assembled blade steering crank 1312 also defines an axis A52 that is also defined by the blade assembly 1301. The assembled blade assembly 1301 is rotatably mounted on the blade steering crank 1312 about the axis A52. The assembled blade steering yoke 1308 defines an axis A53a that is also defined by the hub 1306. The assembled blade steering yoke 1308 is rotatably mounted on the hub 1306 about the axis A53a. The hub 1306 also defines an axis A53b and an axis A53c. One of the other blade steering yokes 1308 is rotatably mounted on the hub 1306 about the axis A53b, and another of the other blade steering yokes 1308 is rotatably mounted on the hub 1306 about the axis A53c. The axes A51a, A53a, A53b, and A53c can all intersect with each other at a point 1314. The assembled blade steering yoke 1308 also defines an axis A54 that is also defined by the assembled blade assembly 1301. The assembled blade assembly 1301 is rotatably connected to the blade steering yoke 1308 about the axis A54.

The rotary turbine 1300 includes a CABS (i.e., Crossed Axes Blade Steering) mechanism as the axes A51b, A52, A53a, and A54 all intersect at a common point 1322. The axes A52 and A53a become coaxial at a certain position of the cycle of the rotary turbine 1300 (See FIGS. 83 and 84). Like the CABS mechanisms of the rotary turbines 1200 and 1250, the blade assemblies 1301, 1302, 1303 of the rotary turbine 1300 do not rotationally oscillate about both of their two mounting locations throughout the cycle of the rotary turbine 1300 when in normal operation. Instead, the blade assembly 1301 rotates in a single rotational direction about the axis A52 with respect to the blade steering crank 1312. The blade assembly 1301 does oscillate about the axis A54 with respect to the blade steering yoke 1308.

Like the CABS mechanisms of the rotary turbines 1030, 1060, 1100, 1130, 1200, and 1250, the blade assemblies 1301, 1302, 1303 of the rotary turbine 1300 vary in rotational velocity throughout the cycle of the rotary turbine 1300 when in normal operation. The varying velocity of the blade assemblies 1301, 1302, 1303 can benefit the relative orientation between the blade assemblies 1301, 1302, 1303 and the general wind direction A (see FIG. 83), as described earlier. The combined effect of the interaction of the axes A51b, A52, A53a, A54, A51a, A55, and A56 of the CABS mechanism is similar to the interaction of the axes A41, A42, A43, and A44 of the CABS mechanism of turbine 1200, discussed above and illustrated at FIG. 78. Although the axes A52 remains generally parallel to itself as the turbine 1300 cycles and the axes A42 of the turbine 1200 sweeps out a cone as the turbine 1200 cycles, the blade of the blade assembly 1301 of the turbine 1300 is oriented similarly to the blade of the blade assembly 1202 of the turbine 1200 as the turbines 1300, 1200 cycle.

The CABS mechanism can be reconfigured to orient the blade assemblies 1301, 1302, 1303, with respect to the general wind direction A in various configurations. For example, the configuration depicted at FIGS. 83 and 84 includes the blade assembly 1301 in the wind cutting position. This position of the blade assembly 1301 can be reversed. In particular, as depicted, the axis A54, defined by the blade assembly 1301 is perpendicular to the planar plate of the blade. In an embodiment where the wind cutting and the wind catching portions of the cycle of the turbine 1300 are reversed, the axis A54 would remain perpendicular to the axis A52 but would be parallel to the planar plate of the blade, effectively swapping the wind cutting and the wind catching portions of the cycle of the turbine 1300 from that depicted at FIGS. 83-84. In embodiments with the wind cutting and the wind catching portions of the cycle of the turbine 1300 so reversed, the rotational direction 1324 (see FIGS. 83 and 84) of the turbine 1300 would also be reversed.

The axes A51b and A52 define an angle α6 as illustrated at FIG. 84. In the depicted embodiment, the angle α6 is forty-five degrees. In other embodiments, the angle α6 can be greater than or less than forty-five degrees. The axes A51b and A53a define an angle α7 as illustrated at FIG. 84. In the depicted embodiment, the angle α7 is forty-five degrees. In other embodiments, the angle α7 can be greater than or less than forty-five degrees. The angles α6 and α7 are shown as being equal. The axes A51a and A51b are shown as being parallel. As shown, the yokes 1308 have a fork-like configuration. In other embodiments, the yokes 1308 can have other configurations.

The rotary turbine 1300 steers the blade assemblies 1301, 1302, 1303 relative to the general wind direction A, as the rotary turbine 1300 progresses through its cycle. In particular, as illustrated at FIG. 83, the general wind direction A is somewhat perpendicular to the blade assemblies 1302, 1303, parallel to the blade assembly 1301, and generally perpendicular to the axes A51a and A51b of the hub 1306. The blade assemblies 1301, 1302, 1303 are mounted and oriented by the blade steering yokes 1308 in cooperation with the blade steering cranks 1312. In particular, at the point of the rotary turbine's 1300 cycle shown at FIGS. 83 and 84, the axes A51b and A54 momentarily align the axis A52 with the axis A53a. This orients the blade assembly 1301 parallel to the general wind direction A and thus positions the blade assembly 1301 for the return portion of the cycle of the turbine 1300 (i.e., the wind cutting portion). Similar to the rotary turbines 1200 and 1250, at a position offset 180 degrees in the cycle of the turbine 1300 from FIGS. 83 and 84, the axis A54 is mutually perpendicular to both the axes A52 and A53a and thereby orients the blade assembly 1301 perpendicular to the general wind direction A and thus positions the blade assembly 1301 for the working portion of the cycle of the turbine 1300 (i.e., the wind catching portion).

Other aspects of the rotary turbine 1300 are similar to the rotary turbines 1200 and 1250. In particular, the blade assembly 1301 rotates about the axis A51b similar to the blade assembly 1202 rotating about the axis A41. The blade steering yoke 1308 steers the blade assembly 1301 via the axis A54 as the axis A52 swivels about the axis A51b, similar to the blade steering yoke 1208 steering the blade assembly 1202 via the axis A44 as the axis A42 swivels about the axis A41.

The axis A52 of the rotary turbine 1300 generally maintains a continuously parallel orientation to itself as it orbits the axis A51a as the turbine 1300 cycles. This is in contrast to the axis A42 of the rotary turbines 1200 and 1250 which sweeps a conical shape with a vertex at the point 1222 (see FIG. 77) as the turbines 1200 and 1250 cycle. To keep the axis A52 in the continuously parallel orientation, the blade steering hub 1310 rotates about an axis A55 in a single rotational direction and at the same rotational velocity as the hub 1306 rotates about the axis A51a. The axis A55 is parallel to the axis A51a. The blade steering crank 1312 is rotatably connected to the blade steering hub 1310 about an axis A56. The axis A56 is parallelly offset from the axis A51b by a distance Dsc that is equal to a distance Dsh between the axis A51a and the axis A55 (see FIG. 84). As the hubs 1306 and 1310 rotate together, the blade steering crank 1312 generally maintains a continuously parallel orientation to itself as it orbits the axis A51a. As the blade steering crank 1312 defines the axis A52, the orientation of the axis A52 is also parallelly maintained to itself as it orbits the axis A51a.

The axis A53a of the rotary turbine 1300 sweeps a conical shape with a vertex at the point 1314 (see FIG. 84) as the turbine 1300 cycles. This is in contrast to the axis A43 of the rotary turbines 1200, 1250 which maintains a continuously parallel orientation to itself as the turbines 1200, 1250 cycle. Thus, the axis A53a of the turbine 1300 takes on the conical sweeping nature of the axis A42 of the turbines 1200, 1250, and the axis A52 of the turbine 1300 takes on the continuously parallel nature of the axis A43 of the turbines 1200, 1250. This swapping of roles results in the angular movement of the blade assembly 1301 about the axis A52 being similar to the angular movement of the blade assembly 1202 about the axis A42, the angular movement of the blade assembly 1301 about the axis A54 being similar to the angular movement of the blade assembly 1202 about the axis A44, and the angular movement of the blade steering yoke 1308 about the axis A53a being similar to the angular movement of the blade steering yoke 1208 about the axis A43.

In certain embodiments, the support frame 1311, and thereby the turbine 1300, can be steered into the general wind direction A by a mount, a control system and actuators, a turning vane, the high torque motor, etc. This turbine steering action can occur continuously or intermittently with the turbine 1300 cycling or stationary.

Figures 85, 86:
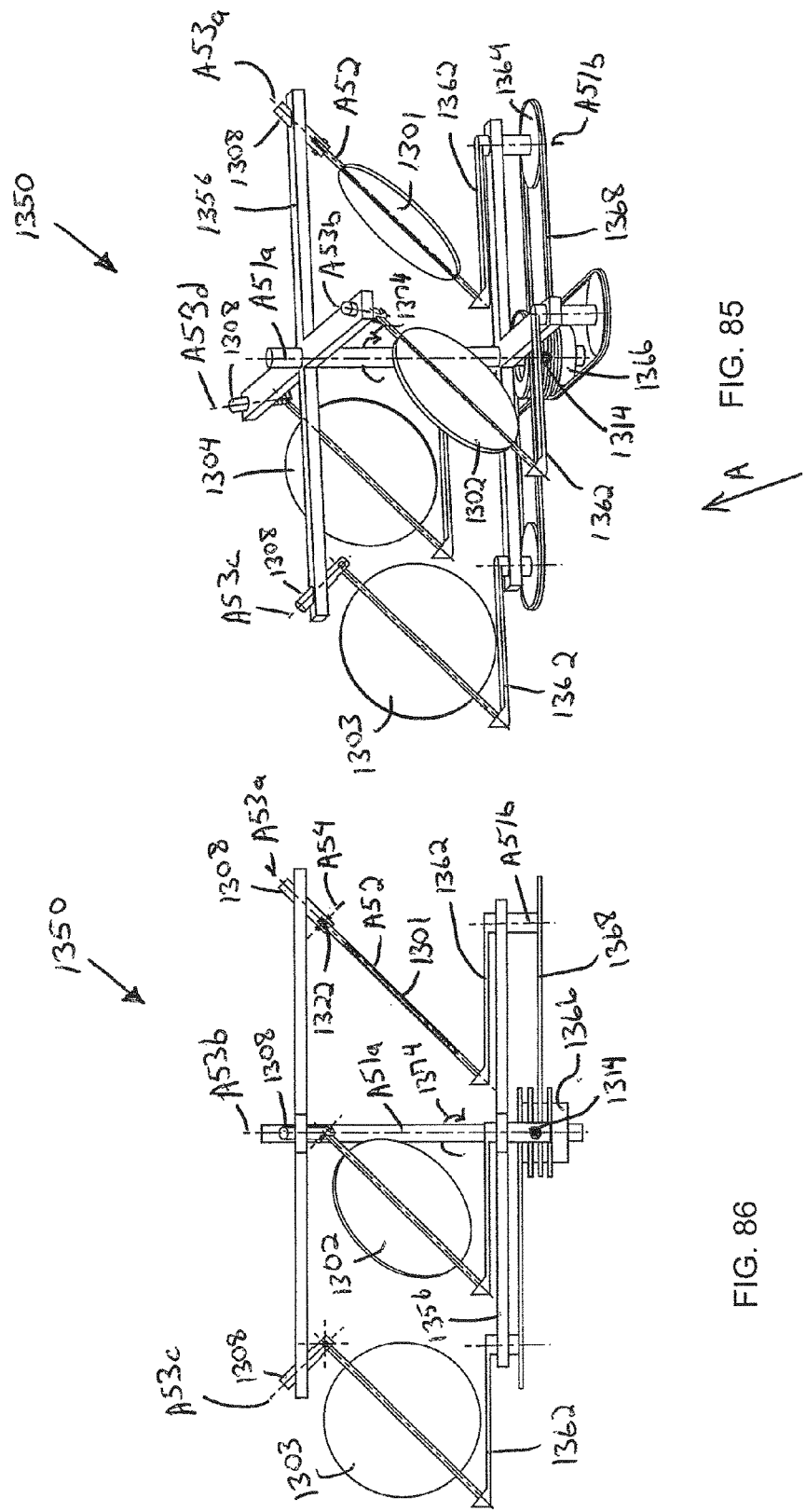
FIG. 85 illustrates a perspective view of a fourteenth embodiment of a rotary turbine having features that are examples of inventive aspects in accordance with the principles of the present disclosure, the rotary turbine similar to the rotary turbine of FIGS. 83 and 84.
FIG. 86 illustrates a side view of the rotary turbine of FIG. 85.

FIGS. 85 and 86 illustrate a fourteenth embodiment of a rotary turbine 1350 having features that are examples of inventive aspects in accordance with the principles of the present disclosure. The rotary turbine 1350 is similar to the rotary turbines 1200, 1250, and 1300 in that it employs a CABS mechanism. The rotary turbine 1350 is similar to the rotary turbine 1300 except that the blade steering cranks 1312 have been replaced by pulley driven (or sprocket driven) blade mounts 1362, an additional blade assembly 1304 has been added, and the hub 1306 has been replaced by a hub 1356 that supports the four blade assemblies 1301, 1302, 1303, 1304. The rotary turbine 1350 can include fewer than or more than four blade assemblies 1301, 1302, 1303, 1304. The blade assemblies 1301, 1302, 1303, 1304 are radially spaced from the axis A51a of the hub 1356, and this radially spaced mounting configuration facilitates the inclusion of two or more blade assemblies 1301, 1302, 1303, 1304 in the rotary turbine 1350. In preferred multi-blade embodiments, the blade assemblies 1301, 1302, 1303, 1304 are equally spaced circumferentially about the axis A51a of the hub 1356 as illustrated at FIG. 85.

The pulley driven blade mount 1362 includes a pulley 1364 rotationally synchronized with a central pulley 1366. The central pulley 1366 is mounted to a support frame (not shown) and is centered about the axis A51a of the hub 1356. A drive member 1368 rotationally couples the pulley 1364 of the pulley driven blade mount 1362 with the central pulley 1366. The pulley driven blade mount 1362 thereby generally maintains a continuously parallel orientation to itself as it orbits the axis A51a similar to the blade steering crank 1312 of the turbine 1300. The pulley driven blade mount 1362 defines the axis A52 for the turbine 1350, similar to the blade steering crank 1312 of the turbine 1300, and thus the orientation of the axis A52 is also parallelly maintained to itself as it orbits the axis A51a.

Like the CABS mechanisms of the rotary turbines 1030, 1060, 1100, 1130, 1200, 1250, and 1300, the blade assemblies 1301, 1302, 1303, 1304 of the rotary turbine 1350 vary in rotational velocity throughout the cycle of the rotary turbine 1350 when in normal operation. The varying velocity of the blade assemblies 1301, 1302, 1303, 1304 can benefit the relative orientation between the blade assemblies 1301, 1302, 1303, 1304 and the general wind direction A (see FIG. 85), as described earlier. The combined effect of the interaction of the axes A51b, A52, A53a, A54, and A51a of the CABS mechanism is similar to the interaction of the axes A41, A42, A43, and A44 of the CABS mechanism of turbine 1200, discussed above and illustrated at FIG. 78. Although the axes A52 remains generally parallel to itself as the turbine 1350 cycles and the axes A42 of the turbine 1200 sweeps out a cone as the turbine 1200 cycles, the blade of the blade assembly 1301 of the turbine 1300 is oriented similarly to the blade of the blade assembly 1202 of the turbine 1200 as the turbines 1350, 1200 cycle.

The CABS mechanism can be reconfigured to orient the blade assemblies 1301, 1302, 1303, 1304 with respect to the general wind direction A in various configurations. For example, the configuration depicted at FIGS. 85 and 86 includes the blade assembly 1301 in the wind cutting position and the blade assembly 1303 in the wind catching position. These positions of the blade assemblies 1301 and 1303 can be reversed. In particular, as depicted, the axis A54, defined by the blade assemblies 1301, 1303, is perpendicular to the planar plate of the blade. In an embodiment where the wind cutting and the wind catching portions of the cycle of the turbine 1350 are reversed, the axis A54 would remain perpendicular to the axis A52 but would be parallel to the planar plate of the blade, effectively swapping the wind cutting and the wind catching portions of the cycle of the turbine 1350 from that depicted at FIGS. 85-86. In embodiments with the wind cutting and the wind catching portions of the cycle of the turbine 1350 so reversed, the rotational direction 1374 (see FIGS. 85 and 86) of the turbine 1350 would also be reversed.

In certain embodiments, the support frame, and thereby the turbine 1350, can be steered into the general wind direction A (see FIG. 85) by a mount, a control system and actuators, a turning vane, the high torque motor, etc. In the embodiment illustrated at FIGS. 85 and 86, the steering of the turbine 1350 into the general wind direction A can be accomplished by rotating the central pulley 1366 relative to the ground (i.e. the earth). Such turbine steering actions can occur continuously or intermittently with the turbine 1350 cycling or stationary.

Figure 87:
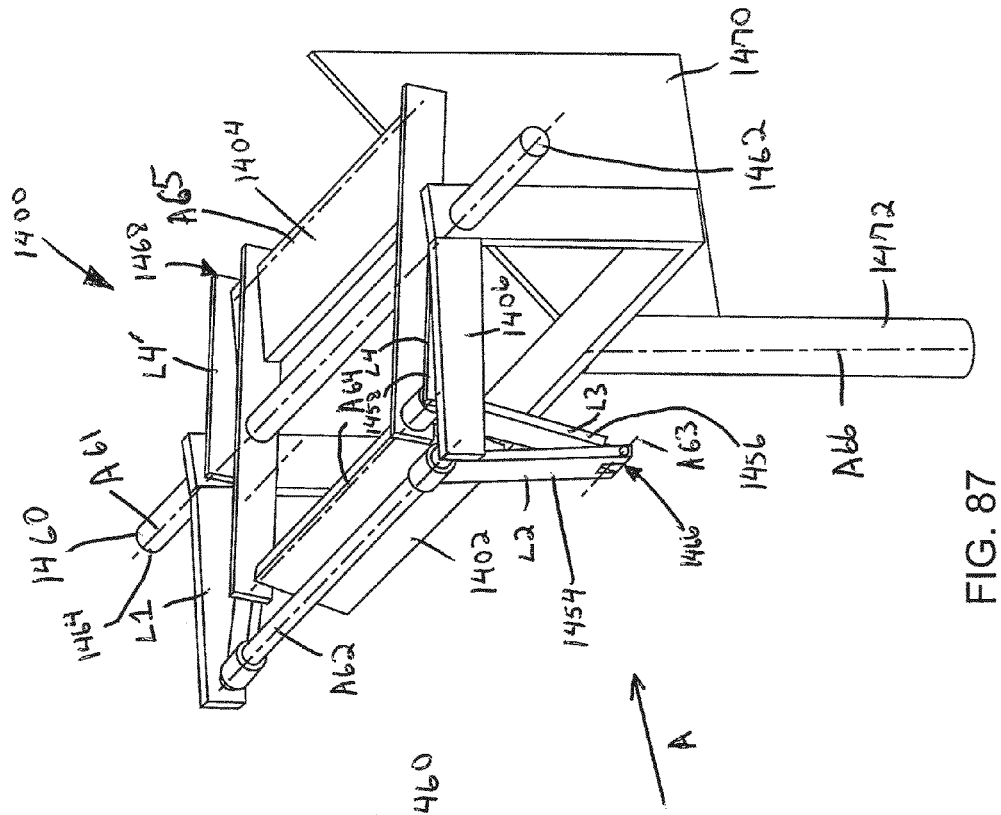
FIG. 87 illustrates a perspective view of phase 1 of a cycle of a fifteenth embodiment of a rotary turbine having features that are examples of inventive aspects in accordance with the principles of the present disclosure, the rotary turbine shown with two blades turned by a linkage that changes the orientation of the blades non-linearly with respect to the blades' orbital position about the rotary turbine.
Figure 88:
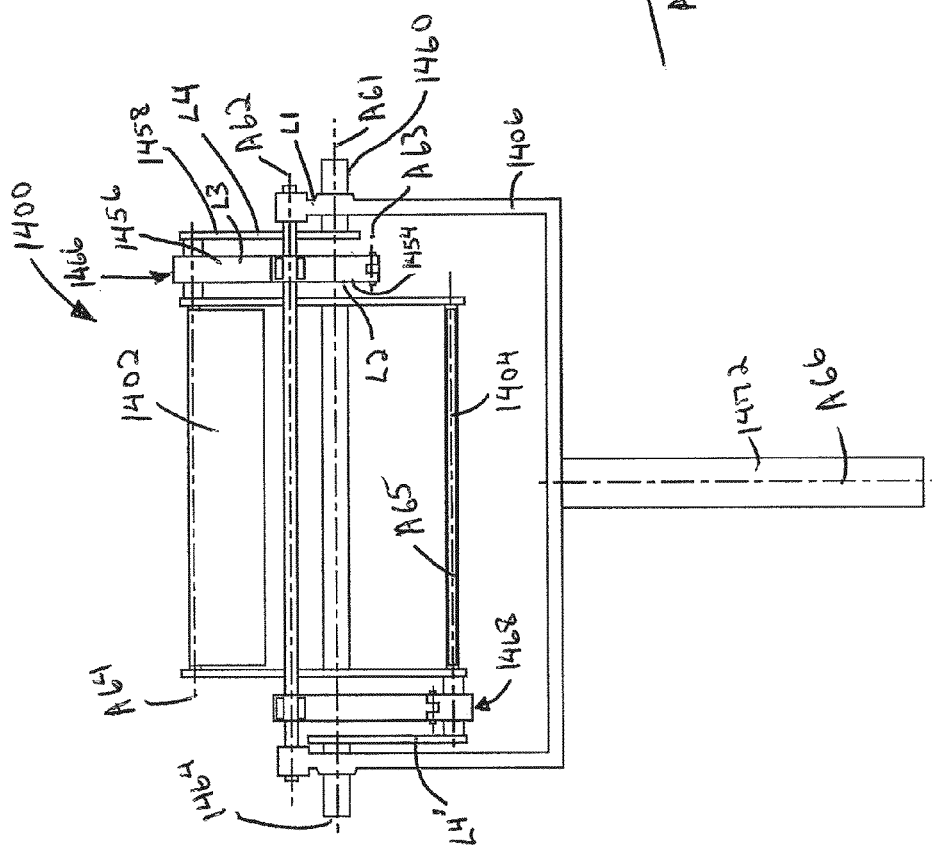
FIG. 88 illustrates a front view of the rotary turbine of FIG. 87 near phase 4 of its cycle.

FIGS. 87-98 illustrate a fifteenth embodiment of a rotary turbine (i.e., a fluid handling device) 1400 having features that are examples of inventive aspects in accordance with the principles of the present disclosure. Even though the rotary turbine 1400 can include any number of blades, the rotary turbine 1400 is shown at FIGS. 87 and 88 to include two blades 1402, 1404. In the depicted embodiment, the blades 1402, 1404 are illustrated as having a planar plate-like construction. In other embodiments, the blades 1402, 1404 can have other shapes and configurations.

At FIGS. 89-98, ten different phases of a complete cycle of the rotary turbine 1400 are illustrated. For the purpose of discussion, the phase depicted at FIG. 89 will be referred to as phase 1, the phase depicted at FIG. 90 will be referred to as phase 2, the phase depicted at FIG. 91 will be referred to as phase 3, the phase depicted at FIG. 92 will be referred to as phase 4, the phase depicted at FIG. 93 will be referred to as phase 5, the phase depicted at FIG. 94 will be referred to as phase 6, the phase depicted at FIG. 95 will be referred to as phase 7, the phase depicted at FIG. 96 will be referred to as phase 8, the phase depicted at FIG. 97 will be referred to as phase 9, and the phase depicted at FIG. 98 will be referred to as phase 10. The complete cycle of the rotary turbine 1400 could be broken down into a different number of phases (e.g., 4 phases, 9 phases, etc.). The motion from phase to phase can be generally continuous. The rotary turbine 1400 includes a coupling arrangement including linkages configured for changing the orientations of the blades 1402, 1404 with respect to an orbital path O of the turbine 1400.

The rotary turbine 1400 is similar to the rotary turbines 810 and 910 of FIGS. 37-46 in that the blades 1402, 1404 of the rotary turbine 1400 are oriented with respect to the rotary turbine 1400 by an equivalent of a four bar linkage 1466. In certain embodiments, the four bar linkage 1466 of the rotary turbine 1400 can have characteristics of a crank and rocker mechanism.

A first link L1 of the four bar linkage 1466 can be considered a ground link and includes a frame 1406 that defines a first axis A61 and a second axis A62. The first link L1 of the turbine 1400 is similar to the first link of the rotary turbine 810 that holds the output shaft 840 rotation axis (similar to the first axis A61) with respect to an axis of the third connection 860 (similar to the second axis A62).

A second link L2 of the four bar linkage 1466 includes a link 1454 that is rotatably mounted about the second axis A62 of the frame 1406 and is thereby connected to the first link L1. The second link L2 also defines a third axis A63 spaced from the second axis A62. The second link L2 of the turbine 1400 is similar to the second link of the four bar linkage of the turbine 810 that includes the link 854 which is rotatably mounted on the axis of the third connection 860 (similar to the second axis A62) and defines an axis of the second connection 850 (similar to the third axis A63).

A third link L3 of the four bar linkage 1466 includes a link 1456 that is rotatably mounted about the third axis A63, also defined by the second link L2. The third link L3 also defines a fourth axis A64 spaced from the third axis A63. Kinematic movement of the third link L3 matches kinematic movement of the blade 1402 as the turbine 1400 cycles. The third link L3 of the turbine 1400 is similar to the third link of the four bar linkage of the turbine 810 that includes the blade 812 that is rotatably connected to an axis of the second connection 850 (similar to the third axis A63) and also rotatably mounted on an axis of the first connection 842 (similar to the fourth axis A64) of the top and bottom rotating plates 826, 828.

A fourth link L4 of the four bar linkage 1466 includes a link 1458 that is rotatably mounted about the fourth axis A64, also defined by the third link L3. The fourth link L4 is rotatably mounted on the first axis A61 defined by the first link L1. At FIGS. 89-98, the fourth link L4 is not shown, but a path that the fourth axis A64 traces about the first axis A61 is shown as the orbital path O. The spacing between the fourth axis A64 and the first axis A61 is maintained by the fourth link L4. The fourth link L4 of the turbine 1400 is similar to the fourth link of the four bar linkage of the turbine 810 that includes the top and bottom rotating plates 826, 828 that include an axis of the first connection 842 (similar to the fourth axis A64) and is rotatably mounted along the rotation axis of the output shaft 840 (similar to the first axis A61).

The rotary turbine 1400 includes a central shaft 1460 that is rotationally coupled to the link 1458 and thus rotationally moves with the fourth link L4 about the first axis A61. The central shaft 1460 can be coupled to a motor or a generator, as discussed with the other embodiments of the present disclosure. By coupling the central shaft 1460 to the motor, the rotary turbine 1400 can induce fluid flow. By coupling the central shaft 1460 to a generator, the rotary turbine 1400 can harvest energy from fluid flow. The central shaft 1460 can have a crankshaft-like configuration. As depicted, a first throw of the central shaft 1460 includes the fourth link L4, near a first end 1462 of the central shaft 1460, and the fourth axis A64. The central shaft 1460 can also include a link L4', near a second end 1464 of the central shaft 1460, and an axis A65 that define a second throw of the central shaft 1460. The first throw is depicted 180 degrees out of phase with the second throw. The first throw allows the four bar linkage 1466 to swing through the first axis A61 without interfering with the central shaft 1460. The second throw allows another four bar linkage 1468 to swing through the first axis A61 without interfering with the central shaft 1460. The four bar linkage 1468 is similar to the four bar linkage 1466 but controls the blade 1404.

As depicted at FIG. 87, the rotary turbine 1400 includes a steering vane 1470 for steering the rotary turbine 1400 into the general wind direction A. The steering vane 1470 pivots the turbine 1400 about a steering axis A66 of a mounting shaft 1472. The mounting shaft 1472 is held by a rotatable mount (not shown). In other embodiments, the turbine 1400 can be steered into the general wind direction A (see FIG. 87) by other mounts, a control system and actuators, the high torque motor, etc.

Figure 99:
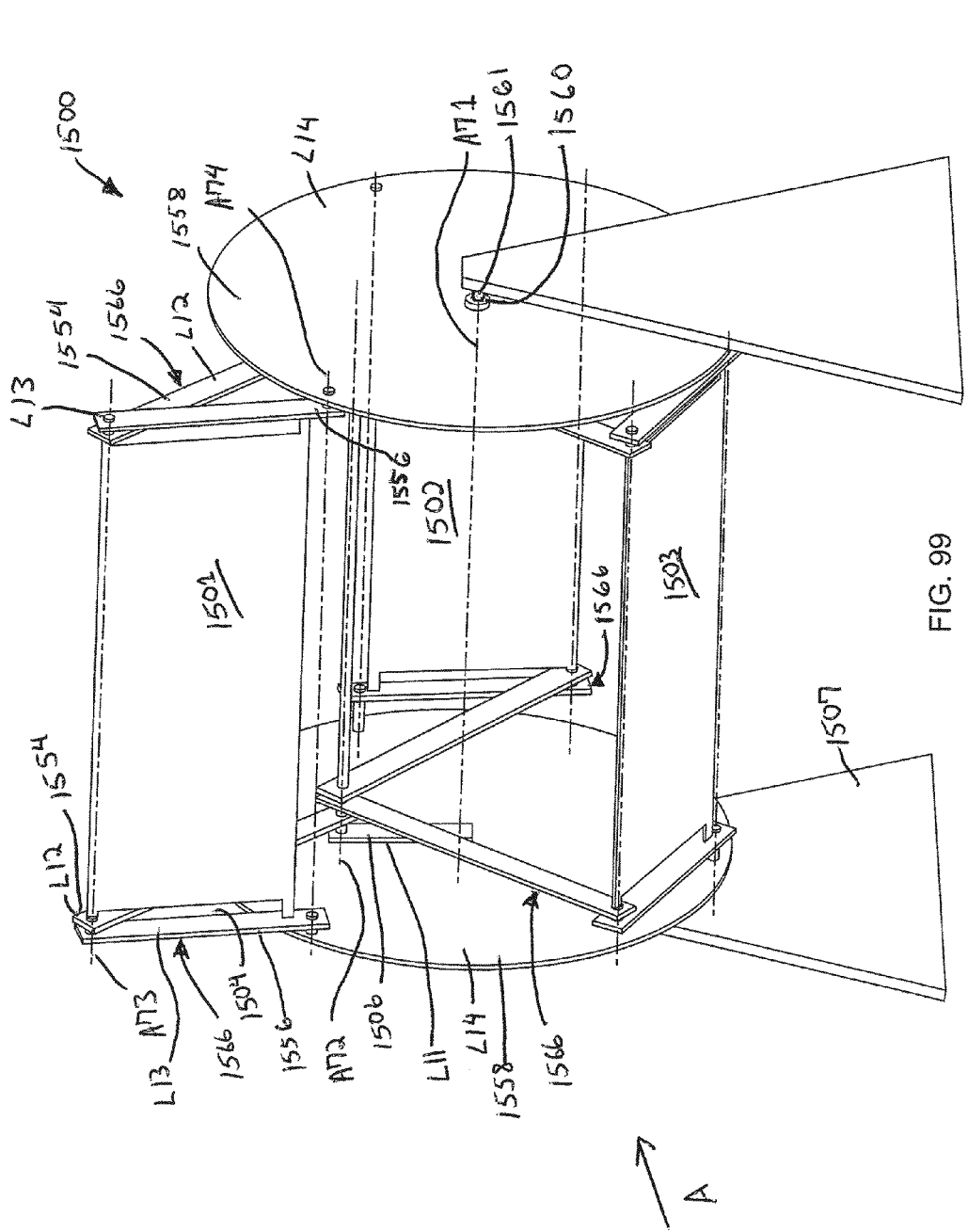
FIG. 99 illustrates a perspective view of a sixteenth embodiment of a rotary turbine having features that are examples of inventive aspects in accordance with the principles of the present disclosure, the rotary turbine similar to the rotary turbine of FIGS. 44-46.
Figure 100:
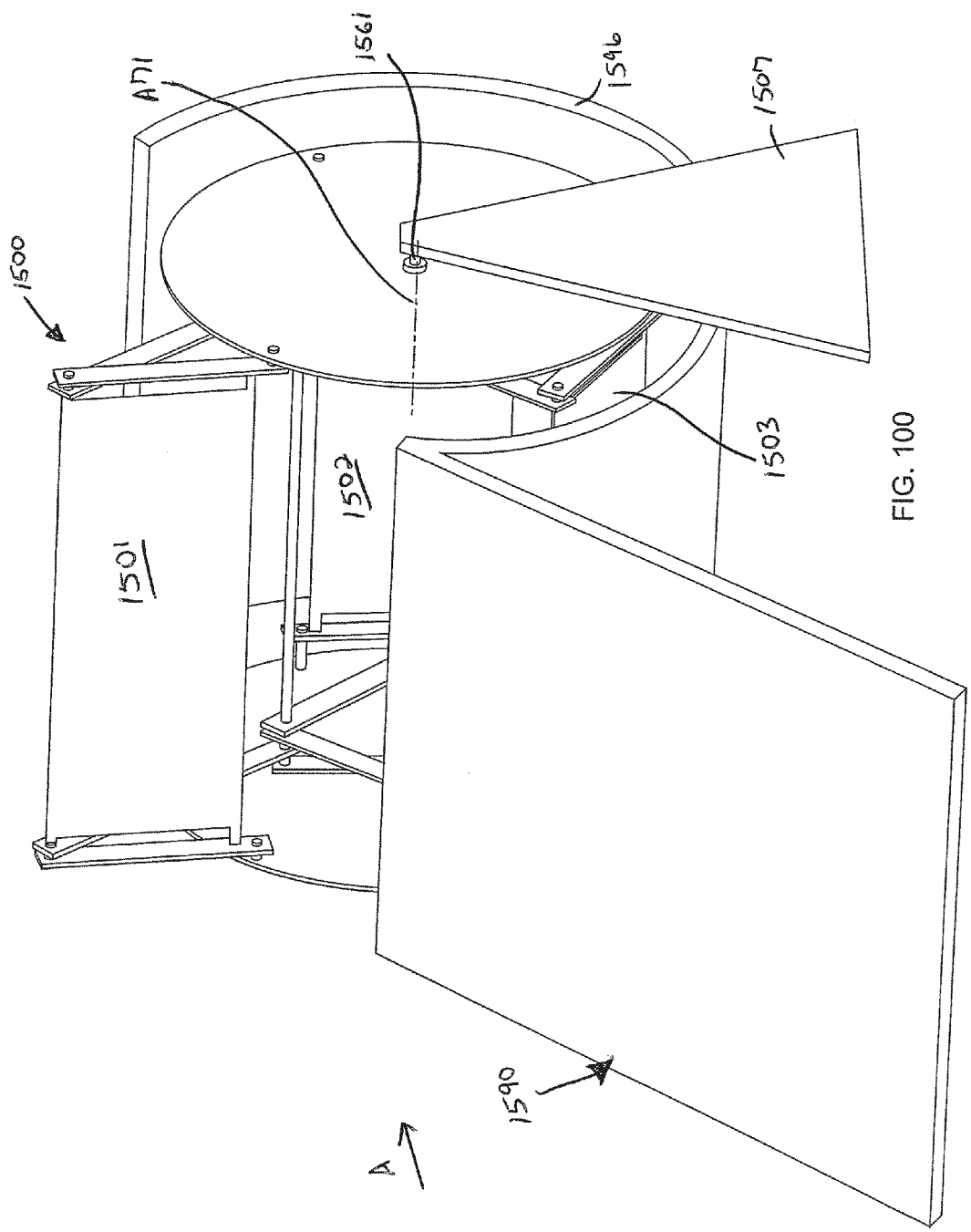
FIG. 100 illustrates the perspective view of the rotary turbine of FIG. 99 with a fluid shield/fluid deflector.

FIGS. 99-100 illustrate a sixteenth embodiment of a rotary turbine (i.e., a fluid handling device) 1500 having features that are examples of inventive aspects in accordance with the principles of the present disclosure. Even though the rotary turbine 1500 can include any number of blades, the rotary turbine 1500 is shown at FIGS. 99 and 100 to include three blades 1501, 1502, 1503. In the depicted embodiment, the blades 1501, 1502, 1503 are illustrated as having a planar plate-like construction. In other embodiments, the blades 1501, 1502, 1503 can have other shapes and configurations. The blades 1501, 1502, 1503 and linkages 1566 that control them are similar to each other but out of phase with each other. In the depicted embodiment, the blades 1501, 1502, 1503 and their respective control linkages 1566 are 120 degrees out of phase with each other. The blades 1501, 1502, 1503 can each include at least one slot 1504 that allows passage of the linkage 1566. As depicted, the blades 1501, 1502, 1503 each have one of the linkages 1566 on each end of each of the blades 1501, 1502, 1503.

The rotary turbine 1500 is similar to the rotary turbines 810 and 910 of FIGS. 37-46 and the rotary turbine 1400 of FIGS. 87-98 in that the blades 1501, 1502, 1503 of the rotary turbine 1500 are oriented with respect to the rotary turbine 1500 by an equivalent of a four bar linkage 1566. In certain embodiments, the four bar linkage 1566 of the rotary turbine 1500 can have characteristics of a crank and rocker mechanism.

A first link L11 of the four bar linkage 1566 can be considered a ground link and includes a link 1506. The link 1506 can be fixedly attached to a frame 1507 by a shaft 1561 that defines a first axis A71. The link 1506 defines a second axis A72 that is spaced from the first axis A71 that can also be defined by the link 1506. The first link L11 of the turbine 1500 is similar to the first link L1 of the rotary turbine 1400 with the first axis A71 being similar to the first axis A61 and the second axis A72 being similar to the second axis A62.

A second link L12 of the four bar linkage 1566 includes a link 1554 that is rotatably mounted about the second axis A72 of the frame 1506 and is thereby connected to the first link L11. The second link L12 also defines a third axis A73 spaced from the second axis A72. The second link L12 of the turbine 1500 is similar to the second link L2 of the four bar linkage 1466 of the turbine 1400 with the second axis A72 being similar to the second axis A62 and the third A73 axis being similar to the third axis A63.

A third link L13 of the four bar linkage 1566 includes a link 1556 that is rotatably mounted about the third axis A73, also defined by the second link L12. The third link L13 also defines a fourth axis A74 spaced from the third axis A73. Kinematic movement of the third link L13 matches kinematic movement of the blade 1501 as the turbine 1500 cycles. The third link L13 of the turbine 1500 is similar to the third link L3 of the four bar linkage 1466 of the turbine 1400 with the third axis A73 being similar to the third axis A63 and the fourth axis A74 being similar to the fourth axis A64.

A fourth link L14 of the four bar linkage 1566 includes a hub 1558 that rotatably mounts the fourth axis A74 of the third link L13. The fourth link L14 is rotatably mounted on the first axis A71 defined by the frame 1507 and the first link L1. The spacing between the fourth axis A74 and the first axis A71 is maintained by the fourth link L4. The hub 1558 can serve as the fourth link L14 for each of the four bar linkages 1566. The fourth link L14 of the turbine 1500 is similar to the fourth link L4 of the four bar linkage 1466 of the turbine 1400 and the fourth link of the four bar linkage of the turbine 810 that includes the top and bottom rotating plates 826, 828. The top and the bottom rotating plates 826, 828 include an axis of the first connection 842 (similar to the fourth axis A74) and are rotatably mounted along the rotation axis of the output shaft 840 (similar to the first axis A71).

The rotary turbine 1500 can include a power coupling 1560 (e.g., a pulley, a sprocket, a timing belt pulley, a gear, etc.) that is rotationally coupled to the hub 1558 and thus rotationally moves with the fourth link L14 about the first axis A71. The power coupling 1560 can be coupled to a motor or a generator, as discussed with the other embodiments of the present disclosure. By coupling the power coupling 1560 to the motor, the rotary turbine 1500 can induce fluid flow. By coupling the power coupling 1560 to a generator, the rotary turbine 1500 can harvest energy from fluid flow.

In the depicted embodiment, the first axis A71 is supported by/defined by the frame 1507 in a substantially horizontal orientation. In such embodiments, the frame 1507, and thereby the turbine 1500, can be steered into the general wind direction A by a mount, a control system and actuators, a turning vane, the high torque motor, etc. In other embodiments, the first axis A71 is supported by a frame in a substantially vertical orientation. In such embodiments, the turbine 1500 can be steered into the wind by rotating the shaft 1561 and thereby the link L11 about the first axis A71. Turbine steering actions can occur continuously or intermittently with the turbine 1500 cycling or stationary.

Figure 101:
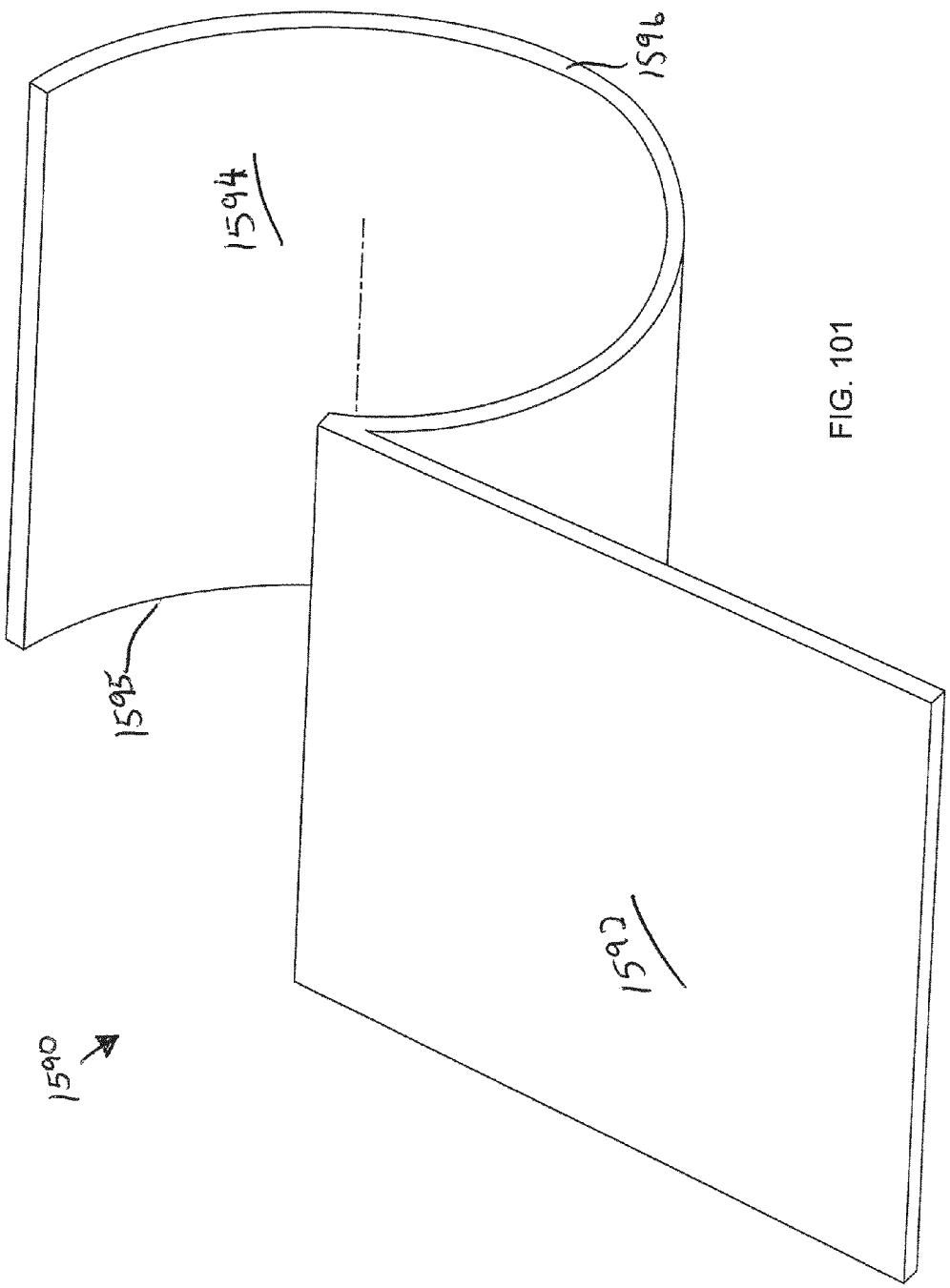
FIG. 101 illustrates a perspective view of the fluid shield/fluid deflector of FIG. 100.

FIG. 100 illustrates the rotary turbine 1500 with a deflector 1590. The deflector 1590 can be used with the rotary turbine 1500 in both power harvesting and fluid flow producing applications. The deflector 1590 can provide at least three benefits to the rotary turbine 1500. The first benefit is shielding portions of the rotary turbine 1500 when they run counter to the wind direction A at certain portions of the rotary turbine's 1500 cycle. The second benefit is diverting and concentrating fluid flow toward the blades 1501, 1502, 1503 during their working portion of the rotary turbine's 1500 cycle. The third benefit is encapsulating/entraining a rotational fluid flow within the deflector 1590. The rotational fluid flow interacts with the blades 1501, 1502, 1503 primarily during their non-working portion of the rotary turbine's 1500 cycle. In the depicted deflector 1590 (see FIG. 101), a gathering/shielding surface 1592 and an encapsulating/shielding surface 1594 are included on the deflector 1590. As depicted, the deflector 1590 is approximately the same width as the turbine 1500 and extends from a first side 1595 to a second side 1596. The surfaces 1592, 1594 can be positioned such that the deflector 1590 is effective throughout the cycle of the rotary turbine 1500. For example, in wind harvesting applications, the wind can be diverted by the gathering/shielding surface 1592 of the deflector 1590 and be focused on the blade 1501 as shown at FIG. 100. As the turbine 1500 advances, the wind direction A can be focused on the blade 1502 and then the blade 1503. During the return portion of the cycle of the blades 1501, 1502, 1503 of the turbine 1500, the encapsulating/shielding surface 1594 and/or the gathering/shielding surface 1592 can keep the wind from impinging on the blades 1501, 1502, 1503. The encapsulating/shielding surface 1594 can form a portion of a cylinder that is centered on the first axis A71 of the turbine 1500. The encapsulating/shielding surface 1594 can entrain fluid flow with the movement of the blades 1501, 1502, 1503 and thereby reduce fluid flow impinging on the blades 1501, 1502, 1503 during their return portion of the cycle. The first and the second sides 1595, 1596 of the deflector 1590, near the encapsulating/shielding surface 1594, can substantially or partially seal with the adjacent portions of the hub 1558. By shielding the blades 1501, 1502, 1503 from the wind during their return portion of the cycle, reverse torque from the blades 1501, 1502, 1503 on the power coupling 1560 can be reduced.

Figure 102:
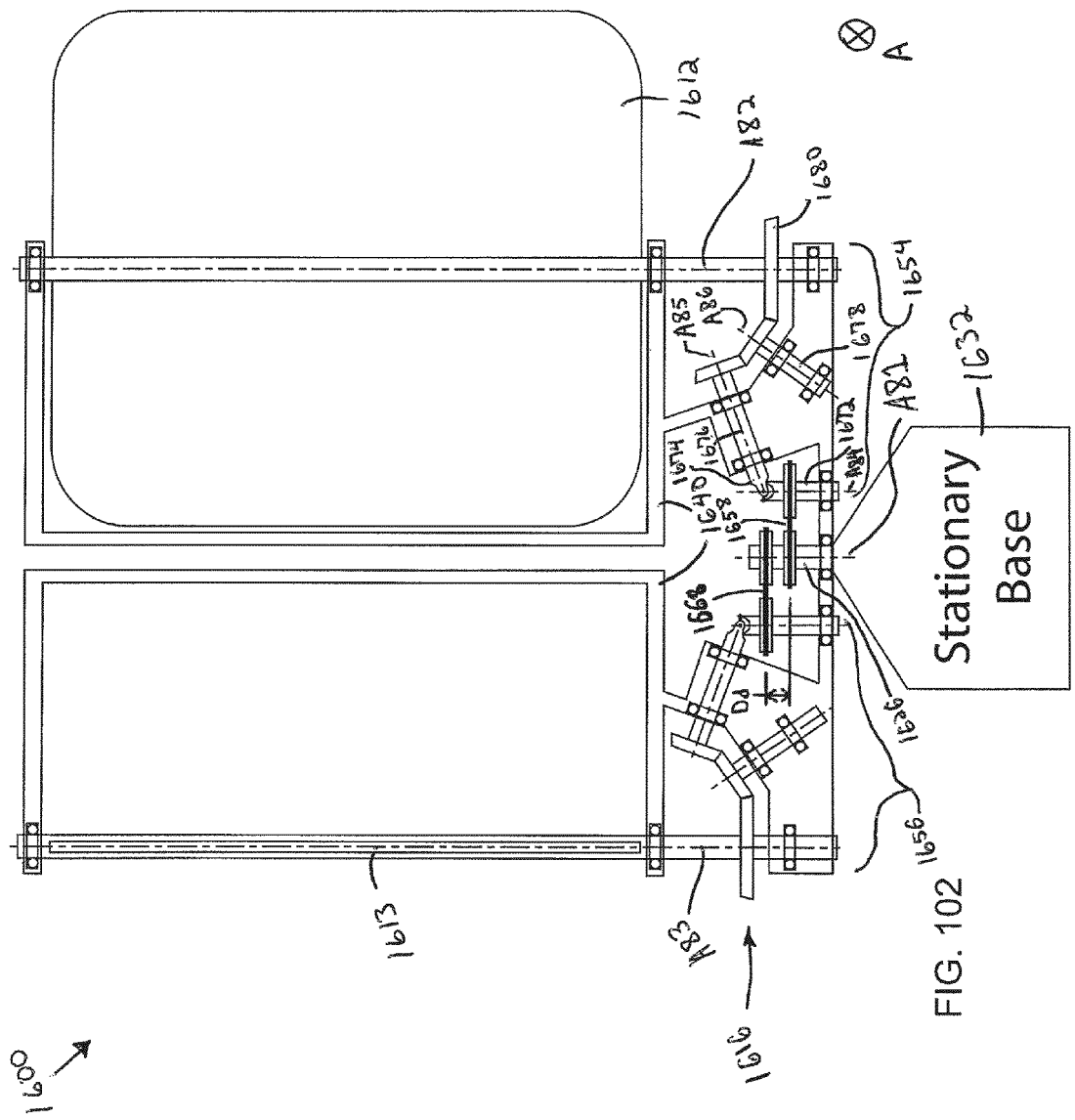
FIG. 102 illustrates a perspective view of a seventeenth embodiment of a rotary turbine having features that are examples of inventive aspects in accordance with the principles of the present disclosure, the rotary turbine shown with two blades turned by a linkage that changes the orientation of the blades non-linearly with respect to the blades' orbital position about the rotary turbine.

FIG. 102 illustrates a seventeenth embodiment of a rotary turbine (i.e., a fluid handling device) 1600 having features that are examples of inventive aspects in accordance with the principles of the present disclosure. Even though the rotary turbine 1600 can include any number of blades, the rotary turbine 1600 is shown at FIG. 102 to include two similar blades 1612, 1613 that each defines an axis A82 and A83, respectively. The turbine 1600 includes similarities with the turbine 210 of FIGS. 21-25 as a base 1632 defines an axis A81 substantially parallel to the axes A82, A83 defined by the blades 1612, 1613. The blades 1612, 1613 orbit about the axis A81 of the base 1632 as the blades 1612, 1613 each rotate about their respective axis A82, A83. This is similar to the blades 212, 213 orbiting about an axis of the base 232 as the blades 212, 213 each rotate about their respective axes. The rotation of the blades 1612, 1613 about their respective axis A82, A83 is coupled to the orbiting motion of the blades 1612, 1613 about the axis A81 of the base 1632 by a drive train 1616. This is similar to the rotation of the blades 212, 213 about their respective axis being coupled to the orbiting motion of the blades 212, 213 about the axis of the base 232 by the gearing arrangement 216.

A hub 1640 rotatably mounts the blades 1612, 1613 about their respective axes A82, A83 and is rotatably mounted about the axis A81 of the base 1632. The hub 1640 of the turbine 1600 can be coupled to a motor or a generator to either produce fluid flow or harvest fluid flow. The base 1632 includes a drive member 1626 centered on the axis A81. The drive member 1626 can be a gear, a pulley, a sprocket, a crankshaft, etc. The drive member 1626 is typically rotationally fixed to the base 1632 about the axis A81. However, the drive member 1626 can be rotated relative to the base 1632 about the axis A81 to steer the turbine 1600 into the general wind direction A (shown into the page ⊗ at FIG. 102). The hub 1640 includes a first drive train 1654 and a second drive train 1656 that is similar to the first drive train 1654. Both drive trains 1654 and 1656 are components of the drive train 1616. The first drive train 1654 can be offset from the second drive train 1656 by an offset distance Dd. The offset distance Dd can accommodate, for example, a drive member 1658 (e.g., a roller chain, a timing belt, etc.) and a drive member 1668 (e.g. a roller chain, a timing belt, etc.) sharing the drive member 1626 without interfering with each other. As the first drive train 1654 is similar to the second drive train 1656, further description of the first drive train 1654 will apply to the second drive train 1656 unless specifically noted.

The drive member 1658 of the drive train 1654 couples the drive member 1626 to an input 1672 of a variable ratio drive component 1674. The variable ratio drive component 1674 also includes an output 1676. The input 1672 of the variable ratio drive component 1674 can be rotatably mounted on the hub 1640 about an axis A84. Likewise, the output 1676 of the variable ratio drive component 1674 can be rotatably mounted on the hub 1640 about an axis A85. In the depicted embodiment, the variable ratio drive component 1674 is a U-joint. Certain characteristics of the U-joint are illustrated at FIG. 61. In particular, rotation rates between an input and an output of the U-joint vary if an input axis of the input is angled with respect to an output axis of the output as the U-joint rotates. As depicted, the turbine 1600 employs the varying rotation rates between the input and the output of the U-joint by including the input of the U-joint as the input 1672 of the variable ratio drive component 1674 and by including the output of the U-joint as the output 1676 of the variable ratio drive component 1674. Other variable ratio drive components can be used in addition to and/or as a replacement for the U-joint of the variable ratio drive component 1674. Examples of such variable ratio drive components include an eccentric spur gear pair, non-circular gear pairs (e.g., an elliptical gears pair, a heart-shaped gear wheel pair, etc.), cams or cam pairs (e.g., a conjugate cam pair, a globoidal cam, a barrel cam, etc.), crank and slider sets, Geneva wheels, programmable actuators, etc.

The output 1676 of the variable ratio drive component 1674 of the drive train 1654 is rotationally coupled to the blade 1612 about the axis A82. As depicted, the output 1676 is rotationally coupled to an intermediate gear 1678 that is rotatably mounted about an axis A86 to the hub 1640. The intermediate gear 1678, in turn, is rotationally coupled to a gear 1680 that is rotationally fixed to the blade 1612. The gear 1680 is rotatably mounted to the hub 1640 about the axis A82. As depicted, the drive train 1654 includes a gear reduction ratio of 2:1 between the drive member 1626 and the blade 1612. In particular, the gear 1680 is twice the diameter of the intermediate gear 1678. The gear reduction ratio of 2:1 is an average gear reduction ratio. The variable ratio drive component 1674 can momentarily result in gear ratios of the drive train 1654 that are higher and lower than 2:1.

The variable ratio drive component 1674 can improve the efficiency of the turbine 1600 as the orientations of the blades 1612, 1613 can be tailored for high efficiency or for maximum efficiency. The orientations of the blades 1612 and 1613 can be controlled to face the blades 1612, 1613 into the wind during a working portion of the cycle of the turbine 1600 and face the blades 1612, 1613 to cut through the wind during a return portion of the cycle, as discussed above in regards to FIGS. 48 and 49 and the blade 1012v. A cam based variable ratio drive component 1674 can be tailored to control the orientations of the blades 1612, 1613 to maximize the efficiency of the turbine 1600.

Figure 103:
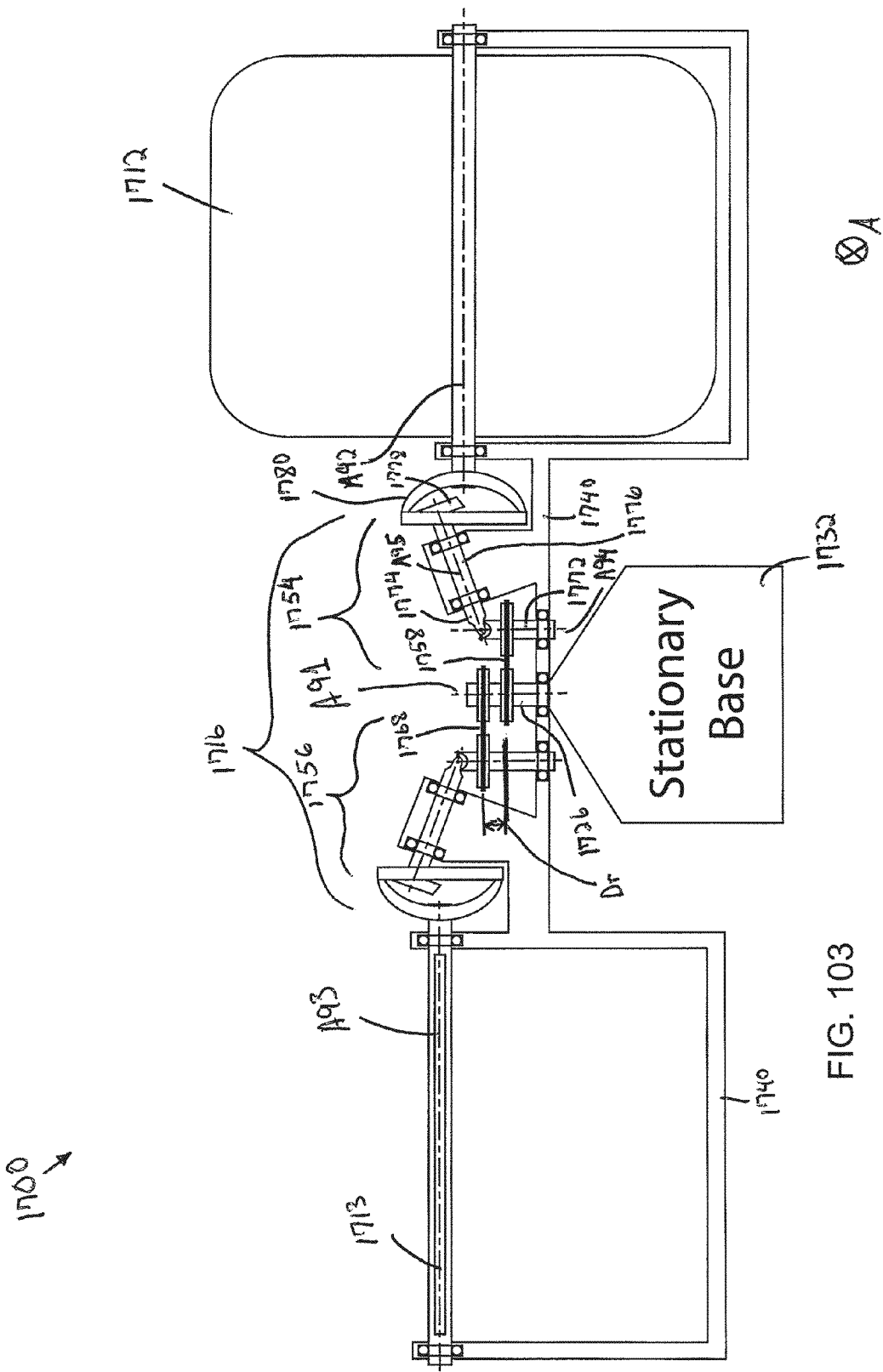
FIG. 103 illustrates a perspective view of an eighteenth embodiment of a rotary turbine having features that are examples of inventive aspects in accordance with the principles of the present disclosure, the rotary turbine shown with two blades turned by a linkage that changes the orientation of the blades non-linearly with respect to the blades' orbital position about the rotary turbine.

FIG. 103 illustrates an eighteenth embodiment of a rotary turbine (i.e., a fluid handling device) 1700 having features that are examples of inventive aspects in accordance with the principles of the present disclosure. Even though the rotary turbine 1700 can include any number of blades, the rotary turbine 1700 is shown at FIG. 103 to include two similar blades 1712, 1713 that each defines an axis A92 and A93, respectively. The turbine 1700 includes similarities with the turbine 710 of FIGS. 35 and 36 as a base 1732 defines an axis A91 substantially perpendicular to the axes A92, A93 defined by the blades 1712, 1713. The blades 1712, 1713 orbit about the axis A91 of the base 1732 as the blades 1712, 1713 each rotate about their respective axis A92, A93. This is similar to the blades 712, 713 orbiting about an axis of the housing 730 as the blades 712, 713 each rotate about their respective axes. The rotation of the blades 1712, 1713 about their respective axis A92, A93 is coupled to the orbiting motion of the blades 1712, 1713 about the axis A91 of the base 1732 by a drive train 1716. This is similar to the rotation of the blades 712, 713 about their respective axis being coupled to the orbiting motion of the blades 712, 713 about the axis of the housing 730 by the radial coupling arrangement 716.

A hub 1740 rotatably mounts the blades 1712, 1713 about their respective axes A92, A93 and is rotatably mounted about the axis A91 of the base 1732. The hub 1740 of the turbine 1700 can be coupled to a motor or a generator to either produce fluid flow or harvest fluid flow. The base 1732 includes a drive member 1726 centered on the axis A91. The drive member 1726 can be a gear, a pulley, a sprocket, a crankshaft, etc. The drive member 1726 is typically rotationally fixed to the base 1732 about the axis A91. However, the drive member 1726 can be rotated relative to the base 1732 about the axis A91 to steer the turbine 1700 into the general wind direction A (shown into the page ⊗ at FIG. 103). The hub 1740 includes a first drive train 1754 and a second drive train 1756 that is similar to the first drive train 1754. Both drive trains 1754 and 1756 are components of the drive train 1716. The first drive train 1754 can be offset from the second drive train 1756 by an offset distance Dr. The offset distance Dr can accommodate, for example, a drive member 1758 (e.g., a roller chain, a timing belt, etc.) and a drive member 1768 (e.g. a roller chain, a timing belt, etc.) sharing the drive member 1726 without interfering with each other. As the first drive train 1754 is similar to the second drive train 1756, further description of the first drive train 1754 will apply to the second drive train 1756 unless specifically noted.

The drive member 1758 of the drive train 1754 couples the drive member 1726 to an input 1772 of a variable ratio drive component 1774. The variable ratio drive component 1774 also includes an output 1776. The input 1772 of the variable ratio drive component 1774 can be rotatably mounted on the hub 1740 about an axis A94. Likewise, the output 1776 of the variable ratio drive component 1774 can be rotatably mounted on the hub 1740 about an axis A95. In the depicted embodiment, the variable ratio drive component 1774 is a U-joint. Certain characteristics of the U-joint are illustrated at FIG. 61. In particular, rotation rates between an input and an output of the U-joint vary if an input axis of the input is angled with respect to an output axis of the output as the U-joint rotates. As depicted, the turbine 1700 employs the varying rotation rates between the input and the output of the U-joint by including the input of the U-joint as the input 1772 of the variable ratio drive component 1774 and by including the output of the U-joint as the output 1776 of the variable ratio drive component 1774. Other variable ratio drive components can be used in addition to and/or as a replacement for the U-joint of the variable ratio drive component 1774. Examples of such variable ratio drive components were given above in the discussion of the rotary turbine 1600.

The output 1776 of the variable ratio drive component 1774 of the drive train 1754 is rotationally coupled to the blade 1712 about the axis A92. As depicted, the output 1776 is rotationally coupled to a gear 1780 that is rotationally fixed to the blade 1712. The gear 1780 is rotatably mounted to the hub 1740 about the axis A92. As depicted, the drive train 1754 includes a gear reduction ratio of 2:1 between the drive member 1726 and the blade 1712. In particular, the gear 1780 is twice the working diameter of a gear 1778 coupled to the output 1776 of the variable ratio drive component 1774. The gear reduction ratio of 2:1 is an average gear reduction ratio. The variable ratio drive component 1774 can momentarily result in gear ratios of the drive train 1754 that are higher and lower than 2:1.

The variable ratio drive component 1774 can improve the efficiency of the turbine 1700 as the orientations of the blades 1712, 1713 can be tailored for high efficiency or for maximum efficiency. The orientations of the blades 1712 and 1713 can be controlled to face the blades 1712, 1713 into the wind during a working portion of the cycle of the turbine 1700 and face the blades 1712, 1713 to cut through the wind during a return portion of the cycle, as discussed above in regards to FIGS. 48 and 49 and the blade 1012v. A cam based variable ratio drive component 1774 can be tailored to control the orientations of the blades 1712, 1713 to maximize the efficiency of the turbine 1700.

The rotary turbines 1600, 1700 are similar to each other but vary from each other in the relative orientations of the blades axes A82, A83, A92, A93 with respect to the base axes A81, A91. In particular, the turbine 1600 employs a parallel relationship between the blades axes A82, A83 and the base axis A81, and the turbine 1700 employs a perpendicular relationship between the blades axes A92, A93 and the base axis A91. Other embodiments of the present disclosure can employ a relative orientation between blades axes and a base axis that is neither perpendicular nor parallel. For example, the relative orientation between blades axes and the base axis can be angled and/or skew.

FIGS. 104-113 illustrates a nineteenth embodiment of a rotary turbine (i.e., a fluid handling device) 1800 having features that are examples of inventive aspects in accordance with the principles of the present disclosure. As depicted, the turbine 1800 includes a first blade 1802 and a second blade 1804, and the first blade 1802 is opposite the second blade 1804. As shown, the first blade 1802 is initially a right blade, and the second blade 1804 is initially a left blade. The blade 1802 includes an airfoil 1812, and the blade 1804 includes an airfoil 1814. The airfoil 1812 can be a mirror image of the airfoil 1814. The airfoils 1812, 1814 can be symmetric airfoils (i.e. symmetric about their chord lines). As shown, the airfoil 1812 is a mirror image of the airfoil 1814 but is offset in a vertical direction at a position of the cycle of the turbine 1800 depicted at FIGS. 104 and 108. The blade 1802 includes a blade root 1822, and the blade 1804 includes a blade root 1824. The blade 1802 is mounted on a blade hub 1832, and the blade 1804 is mounted on a blade hub 1834. The blade hub 1832 defines an axis A103 about which the blade 1802 rotates, and the blade hub 1834 defines an axis A104 about which the blade 1804 rotates. As depicted, the axes A103 and A104 are co-linear when the turbine 1800 is assembled. In other embodiments, the axes A103 and A104 can be parallel but offset from each other. The blade root 1822 can connect the airfoil 1812 to the blade hub 1832, and the blade root 1824 can connect the airfoil 1814 to the blade hub 1834. The blades 1802, 1804 are depicted in a cantilevered configuration. In other embodiments, the axes A103, A104 can be at angles to each other to accommodate more than two blades. In other embodiments, the turbine 1800 can have a single blade 1802.

As depicted, the blades 1802, 1804 include an airfoil type shape defined by the airfoils 1812, 1814 respectively. The airfoil 1812 includes a leading edge **1812*l* and a trailing edge 1812*t*, and the airfoil 1814 includes a leading edge 1814*l* and a trailing edge 1814*t* (see FIG. 104). In other embodiments, the blades 1802, 1804 can include other shapes and configurations (e.g., the plate-like configuration discussed above). As depicted, the airfoils 1812, 1814 of the blades 1802, 1804 are progressively swept rearward. In other embodiments, the airfoils 1812, 1814 of the blades 1802, 1804 can be straight, linearly swept rearward, progressively swept forward, linearly swept forward, tapered, elliptical, trapezoidal, and of other configurations known in the art of wings and airfoils. As depicted, the airfoils 1812, 1814 of the blades 1802, 1804 decrease in cross-sectional area as the blades 1812, 1814 extend from the blade roots 1822, 1824 to their respective wing tips 1842, 1844. An angle of attack of a cross-section of the airfoils 1812, 1814 of the blades 1802, 1804 can be varied as the blades 1802, 1804 extend from the blade roots 1822, 1824 to the wing tips 1842, 1844**.

The turbine 1800 includes a hub 1806 that also defines the axes A103 and A104. The hub 1806 rotates about an axis A101. In the depicted embodiment, the axis A101 is perpendicular to both the axes A103 and A104 and intersects the axes A103, A104 at a point 1807. In other embodiments, the axis A101 can be offset from one or both of the axes A103 and A104. As depicted, the hub 1806 includes a first bearing 1808 and a second bearing 1809. The first blade 1802 is mounted on the first bearing 1808, and the second blade 1804 is mounted on the second bearing 1809. The hub 1806 thus mounts both the first and the second blades 1802 and 1804. In other embodiments, a first hub rotating about the first axis A101 mounts the first blade 1802, and a second hub rotating about a second axis A102 mounts the second blade 1804. In such embodiments, the first and the second axes A101, A102 can be co-linear to each other or can be offset from each other when the turbine is assembled.

The turbine 1800 includes a blade steering assembly 1810. As depicted, the blade steering assembly 1810 includes a shaft 1816 and a gear 1826. The shaft 1816 and the gear 1826 are rotationally coupled (e.g., rotationally connected) to each other and centered about the axis A101. In the depicted embodiment, the shaft 1816 and the gear 1826 are stationary as the turbine 1800 cycles. The shaft 1816 can be rotationally coupled (e.g., rotationally connected) to the ground or a stand (not shown) that holds and orients the turbine 1800 with respect to the general wind direction A. The shaft 1816 can be rotated with respect to the ground or the turbine stand and thereby tune and/or adjust an angle of attack of the blades 1802, 1804 of the turbine into the general wind direction A.

The hub 1806 of the turbine 1800 can be rotatably mounted on the shaft 1816 and thereby receive at least a portion of its support from the shaft 1816.

The gear 1826 of the blade steering assembly 1810 meshes with a gear 1852 rotatably mounted about the axis A103 of the hub 1806 and a gear 1854 rotatably mounted about the axis A104 of the hub 1806. The gear 1852 is rotationally coupled (e.g., rotationally connected) to the blade hub 1832, and the gear 1854 is rotationally coupled (e.g., rotationally connected) to the blade hub 1834. As the hub 1806 of the turbine 1800 rotates about the axis A101, the gears 1826, 1852, 1854 rotate the blades 1802, 1804 about the axes A103, A104. As the blades 1802, 1804 are mounted about the hub 1806, the blades 1802, 1804 rotate about the axis A101 when the hub 1806 rotates about the axis A101. The blades 1802, 1804 thus rotate about the axis A101 and also rotate about the axes A103, A104 when the turbine 1800 cycles.

Figure 104:
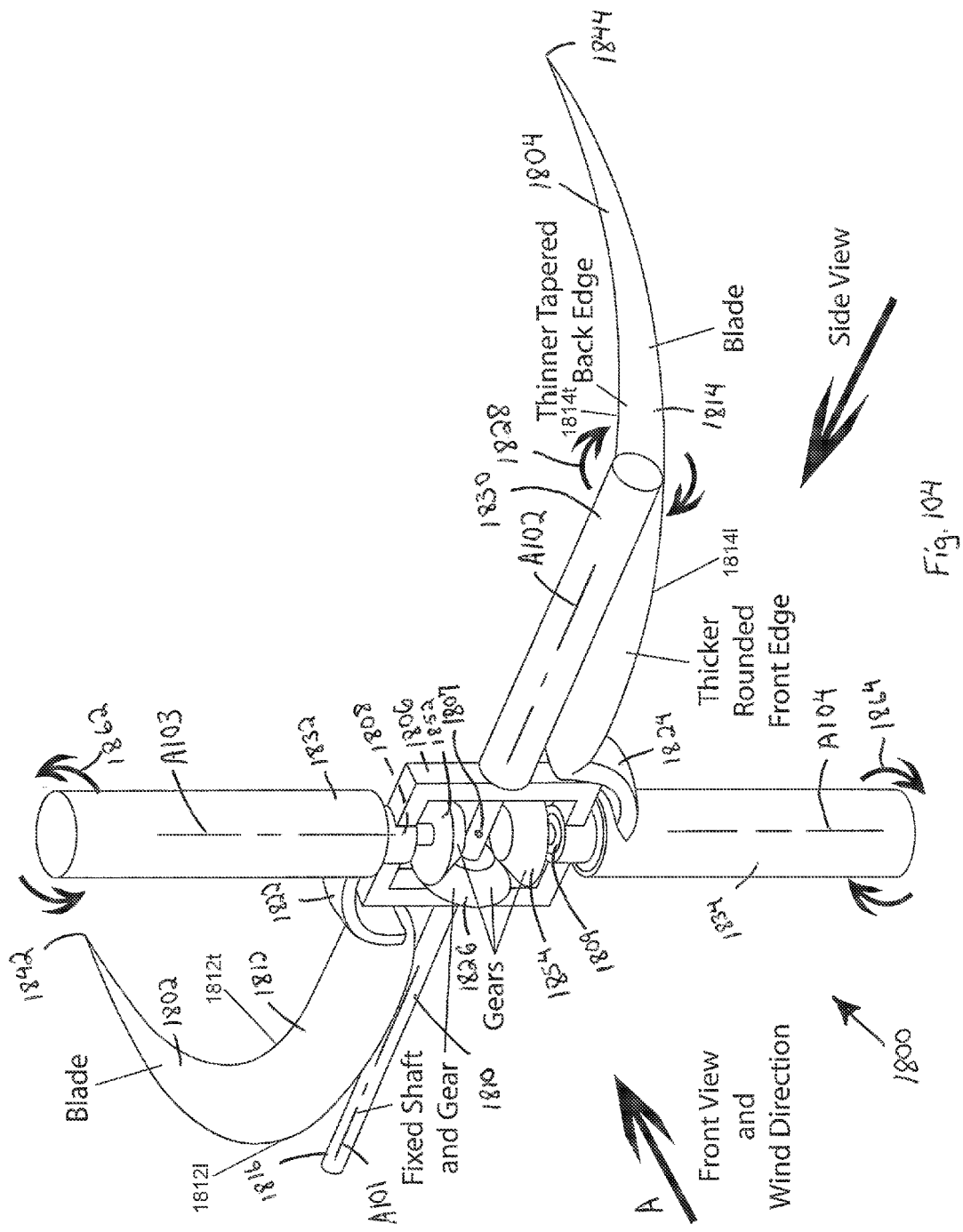
FIG. 104 illustrates a perspective view of a nineteenth embodiment of a rotary turbine having features that are examples of inventive aspects in accordance with the principles of the present disclosure, the rotary turbine shown with two airfoil blades orbiting about a first axis while turning about a second axis.

This compound rotation controls the orientation of the blades 1802, 1804 as the turbine 1800 cycles. In particular, as shown at FIG. 104, as the wind blows in the general wind direction A, the turbine 1800 rotates in a rotational direction 1828 about the axis A101. This, in turn, causes the blade 1802 to rotate in a rotational direction 1862 about the axis A103 and also causes the blade 1804 to rotate in a rotational direction 1864 about the axis A104. As the gears 1852 and 1854 mesh on opposite sides of the gear 1826, the rotational direction 1862 is opposite from the rotational direction 1864. In the depicted embodiment, the gears 1826, 1852, 1854 include an equal number of teeth, and thus the blades 1802, 1804 each rotate once about the axes A103, A104 for each rotation of the hub 1806 about the axis A101. The gears 1826, 1852, 1854 produce a linear relationship between the rotations 1862, 1864 of the blades 1802, 1804 about the axes A103, A104 and the rotation 1828 of the hub 1806 about the axis A101. In other embodiments, non-linear components can be added to or replace the gears 1826, 1852, 1854. Examples of such non-linear (i.e., variable ratio components) include an eccentric spur gear pair, non-circular gear pairs (e.g., an elliptical gears pair, a heart-shaped gear wheel pair, etc.), cams or cam pairs (e.g., a conjugate cam pair, a globoidal cam, a barrel cam, etc.), crank and slider sets, Geneva wheels, programmable actuators, etc.

This compound motion results in the blades 1802, 1804 swapping sides as the turbine 1800 cycles. In particular, as the hub 1806 rotates one-half turn about the axis A101 from the position shown at FIGS. 104 and 108, the blades 1802 and 1804 swap positions. The blades 1802, 1804 thus spend an equal portion of the cycle of the turbine 1800 on each side of the turbine 1800 and swap positions with each other every one-half turn of the hub 1806. As the blades 1802, 1804 are shown as substantially similar blades, the swapped portions of the cycle of the turbine 1800 appears and functions substantially the same. The wing tips 1842, 1844 each trace out a path as the turbine 1800 cycles. The path of the wing tips 1842, 1844 resembles a FIG. 8 bent across its middle.

The blades 1802, 1804 can provide power to the turbine 1800 by virtue of a first torque component applied to the hub 1806 in the rotational direction 1828. This first torque component is typically transmitted from the blades 1802, 1804 to the hub 1806 via a bending load across the bearings 1808, 1809. The blades 1802, 1804 can provide power to the turbine 1800 by virtue of a second torque component applied to the blade hubs 1832, 1834 in the rotational directions 1862, 1864. This second torque component is typically transmitted from the blades 1802, 1804 to the hub 1806 via a torsional load through the blade hubs 1832, 1834 and into the gears 1852, 1854. The gears 1852, 1854 typically react the torsional load against the gear 1826 and the bearings 1808, 1809 and thereby urge the hub 1806 to rotate in the rotational direction 1828. The first and the second torque components can be produced by the turbine 1800 simultaneously.

Figure 105:
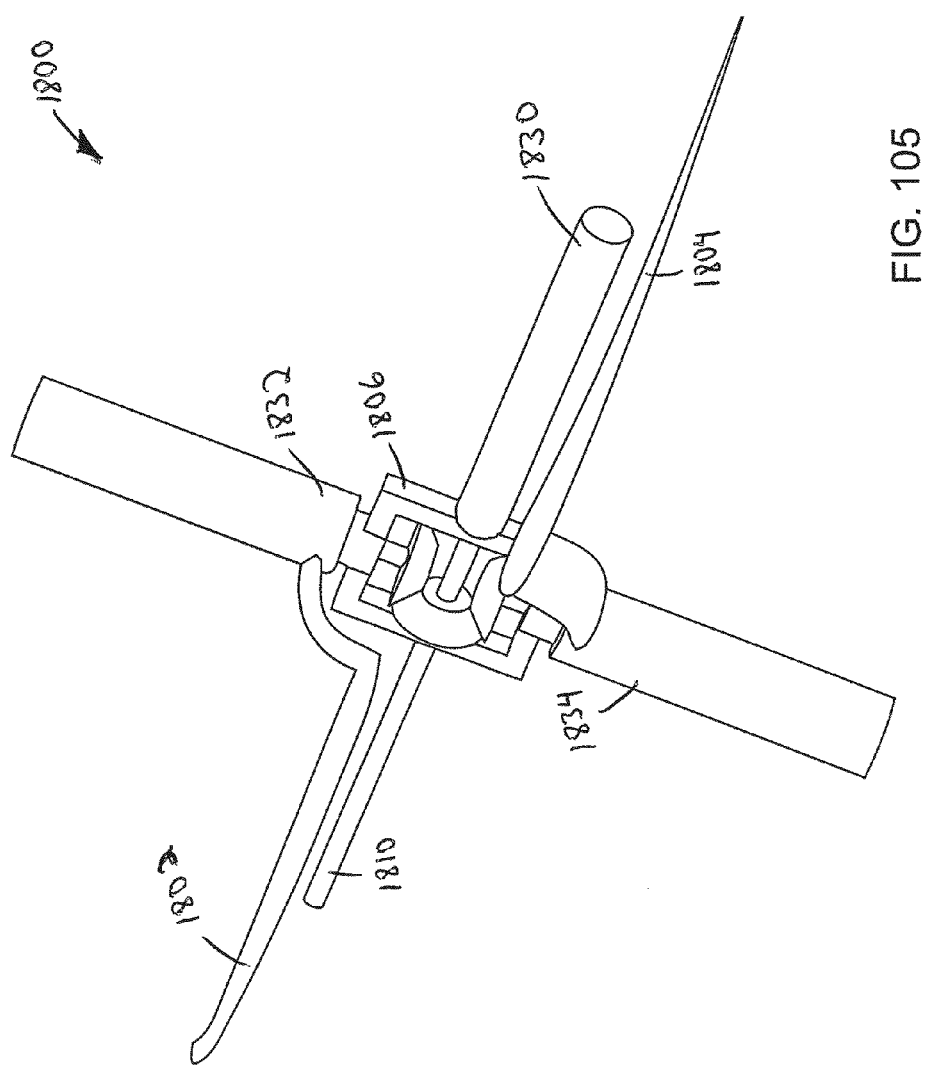
FIG. 105 illustrates the turbine of FIG. 104 at another position in its cycle in the same perspective view of FIG. 104.
Figure 106:
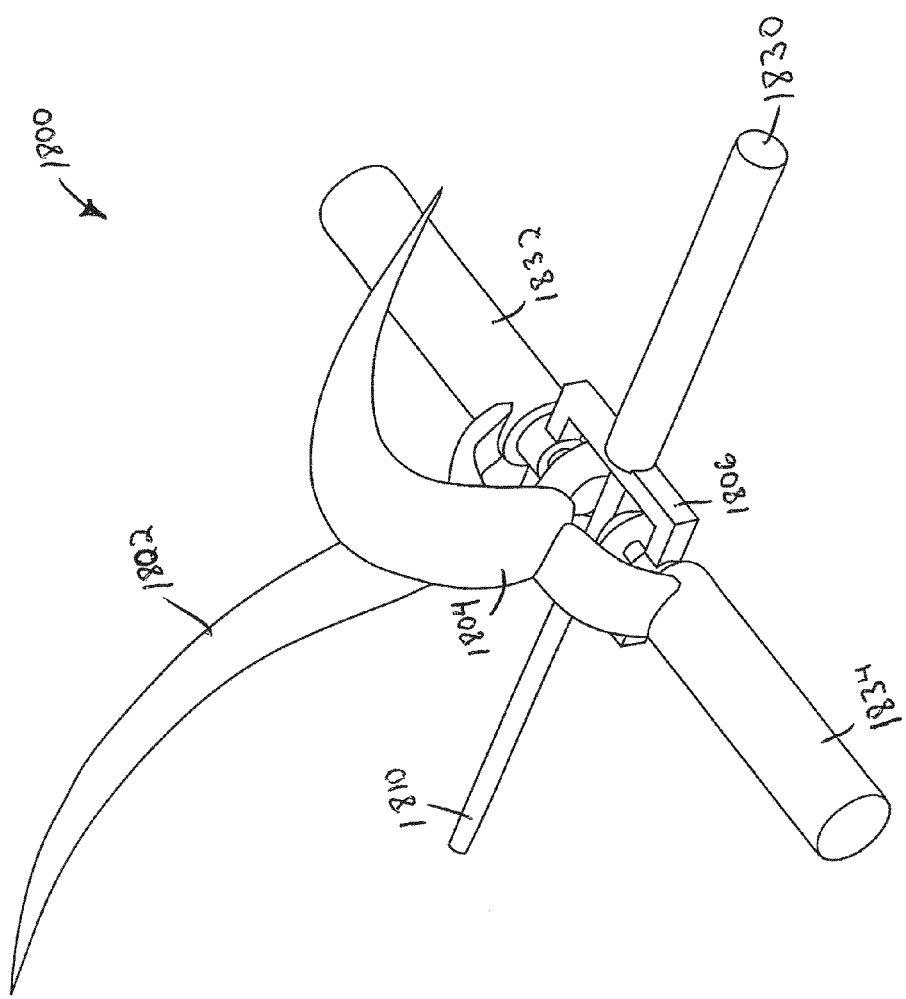
FIG. 106 illustrates the turbine of FIG. 104 at still another position in its cycle in the same perspective view of FIG. 104.
Figure 107:
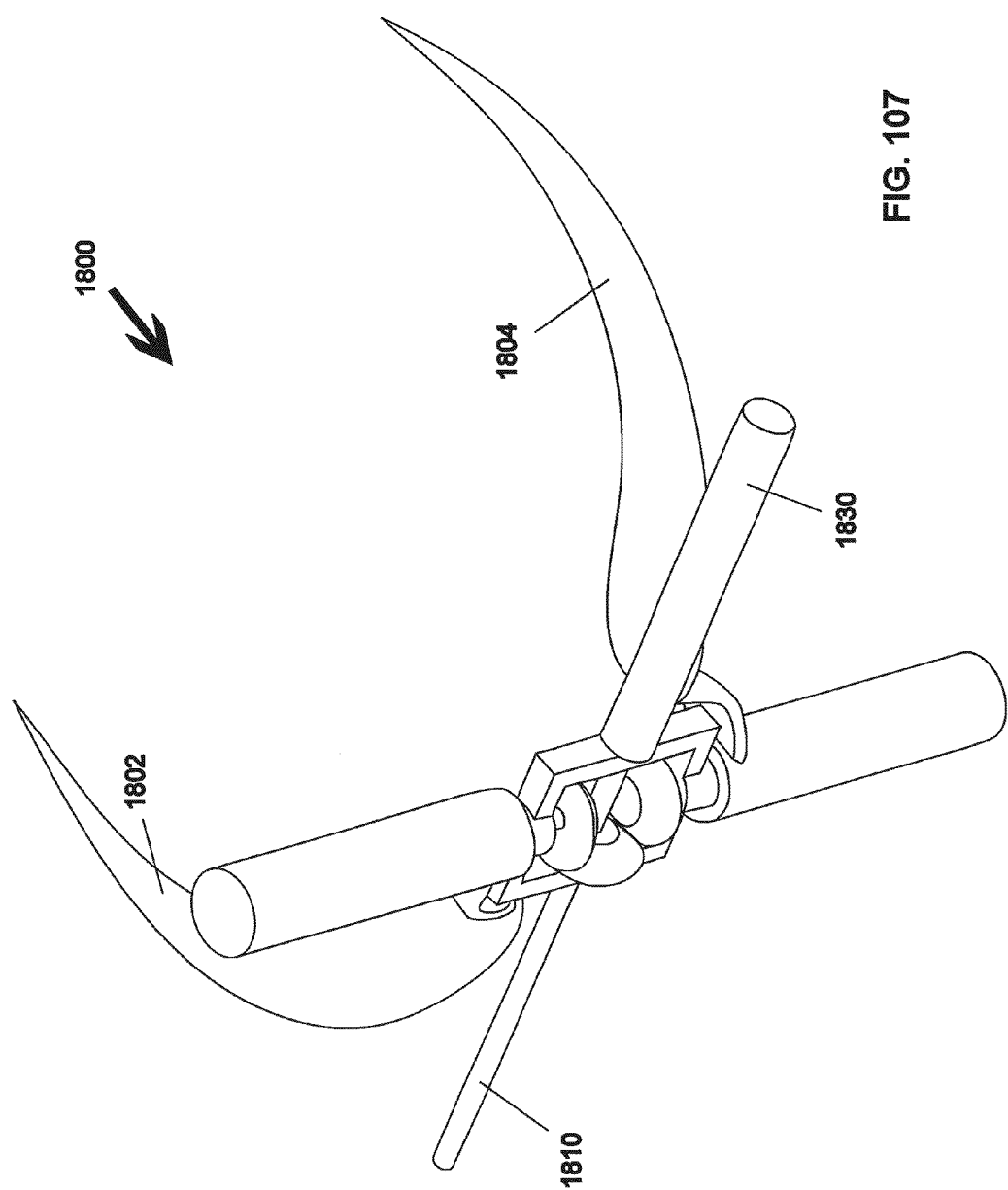
FIG. 107 illustrates the turbine of FIG. 104 at yet another position in its cycle in the same perspective view of FIG. 104.
Figure 108:
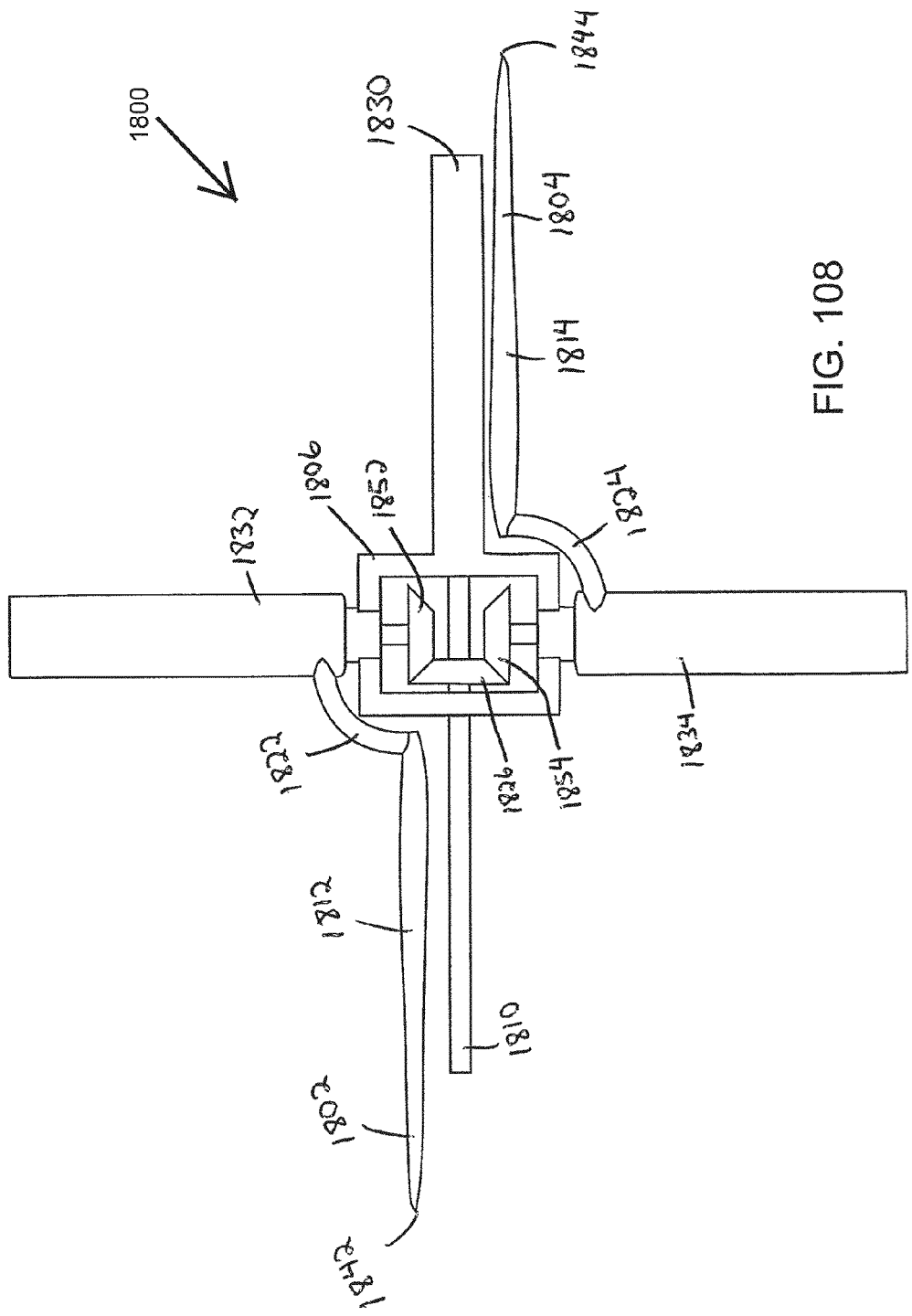
FIG. 108 illustrates a front view of the turbine of FIG. 104 at the position in its cycle of FIG. 104.
Figure 109:
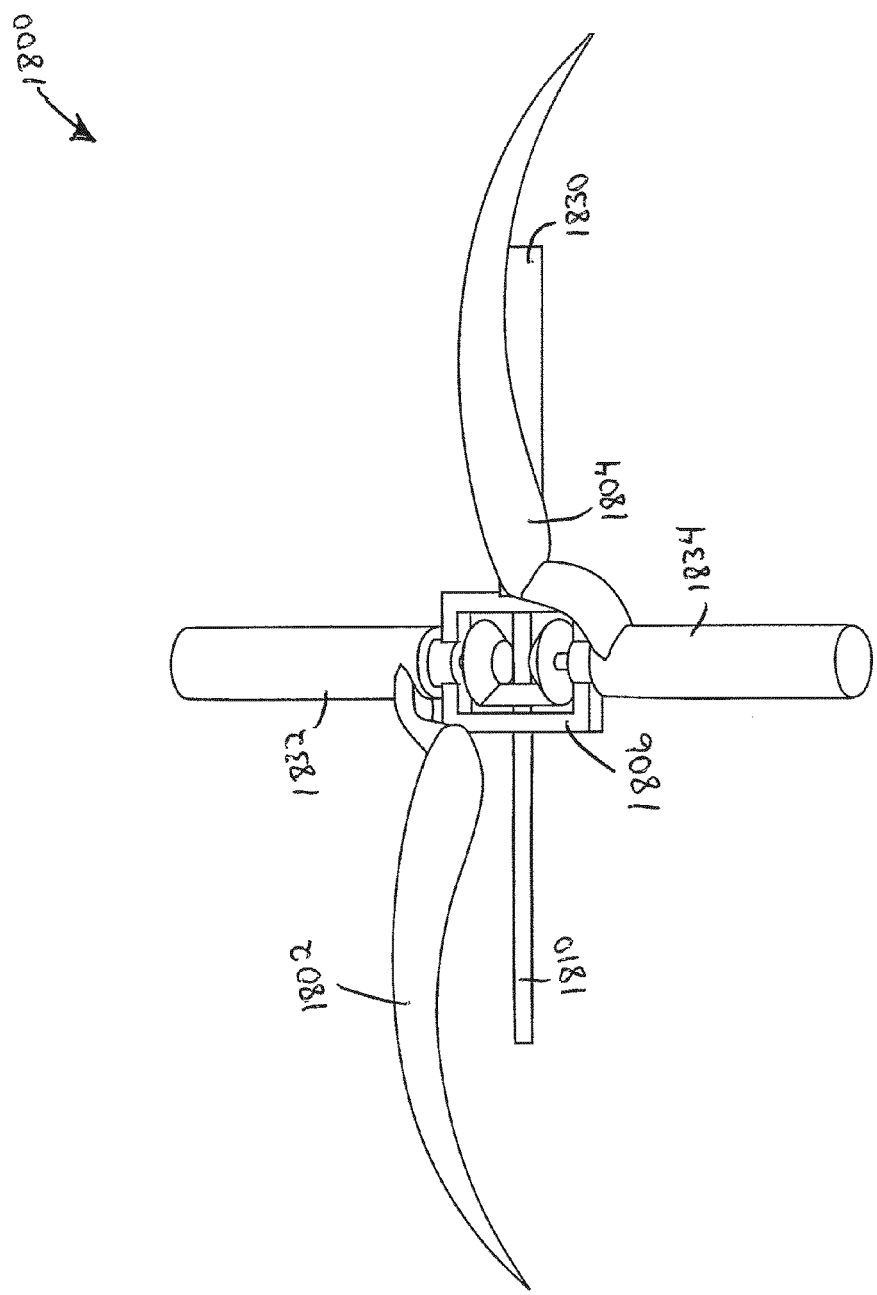
FIG. 109 illustrates the front view of the turbine of FIG. 104 at another position in its cycle.
Figure 110:
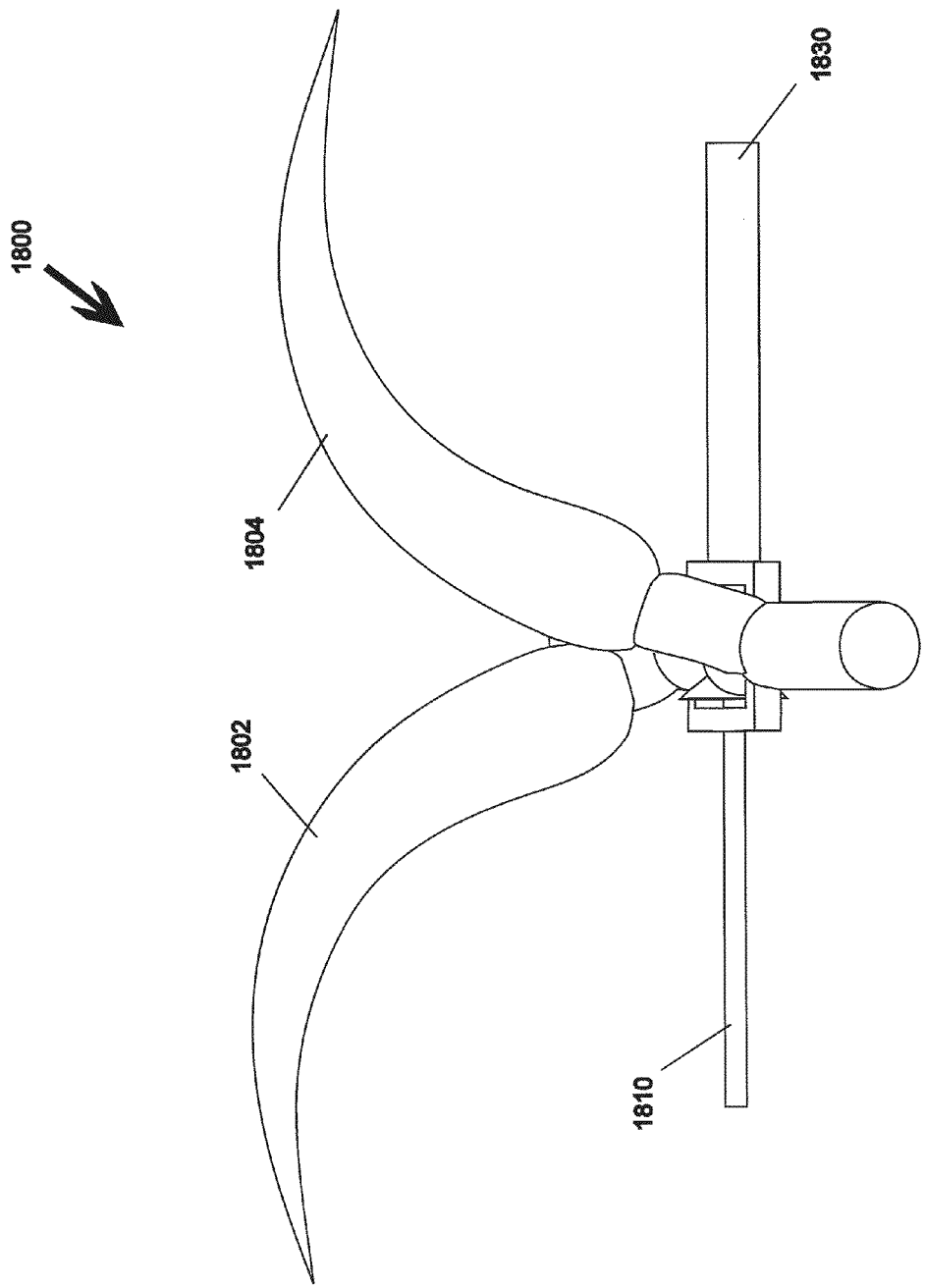
FIG. 110 illustrates the front view of the turbine of FIG. 104 at still another position in its cycle.
Figure 111:
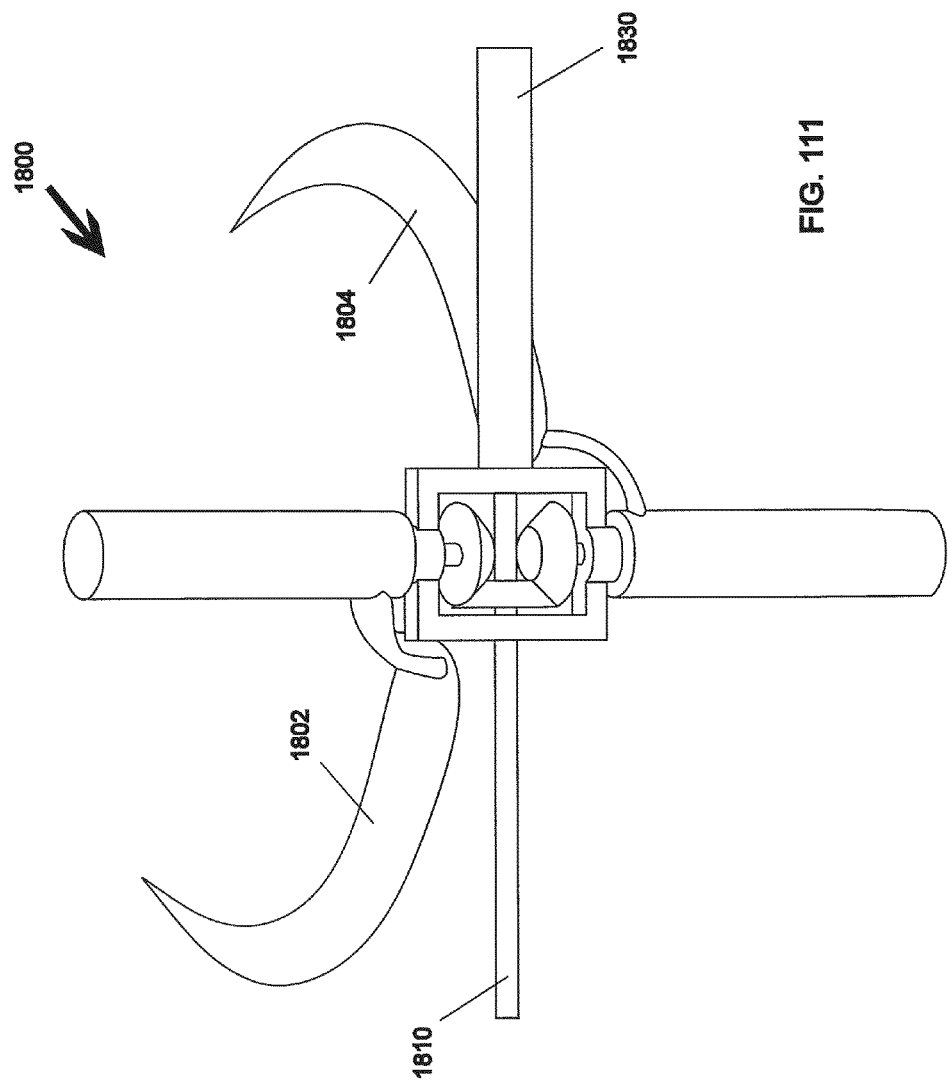
FIG. 111 illustrates the front view of the turbine of FIG. 104 at yet another position in its cycle.
Figure 112:
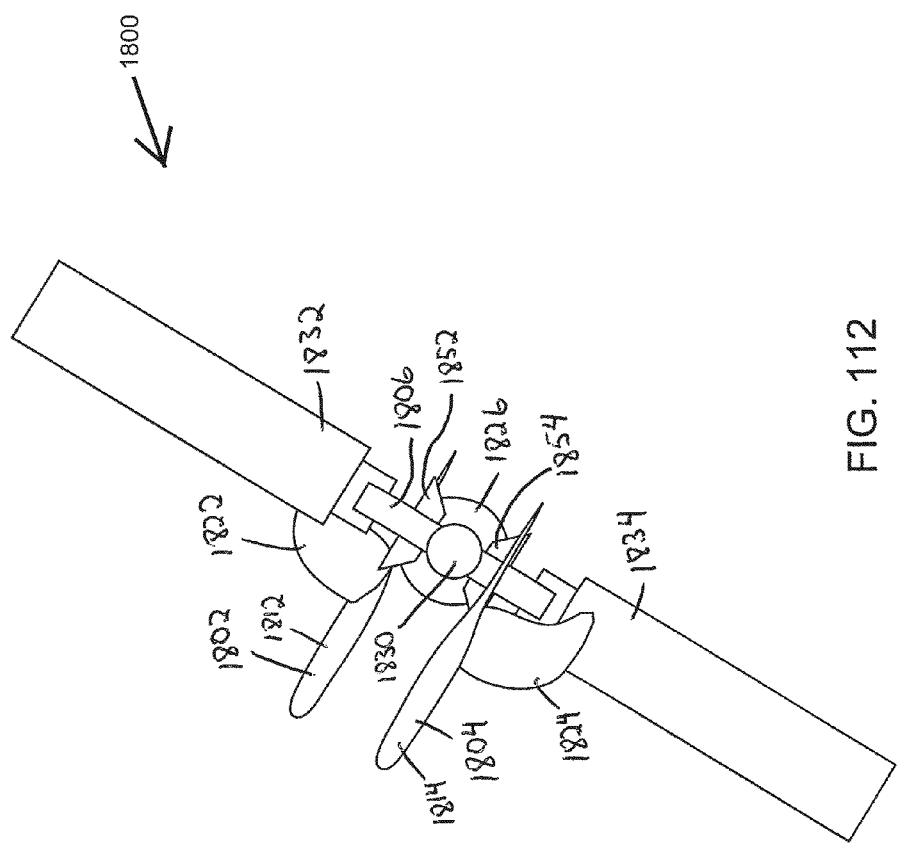
FIG. 112 illustrates a side view of the turbine of FIG. 104.

At the part of the cycle of the turbine 1800 shown at FIGS. 104 and 108, the blades 1802, 1804 can produce a substantial amount of aerodynamic lift. In particular, the airflow can flow across upper and lower surfaces of the airfoils 1812, 1814 and thereby develop a force centered at a center of lift on the airfoils. As the turbine 1800 progresses through its cycle from this position in the rotational direction 1828, the angle of attack of the blades 1802, 1804 increases as shown at FIGS. 105 and 109. The aerodynamic lift powers the turbine 1800 by rotating the turbine 1800 in the rotational direction 1828. At the part of the cycle of the turbine 1800 shown at FIGS. 106 and 110, the blades 1802, 1804 produce a substantial amount of aerodynamic drag. In particular, the airflow can impinge on the airfoils 1812, 1814 and thereby develop a force centered at a center of pressure on the airfoils. The aerodynamic drag powers the turbine 1800 by rotating the turbine 1800 in the rotational direction 1828. At the part of the cycle of the turbine 1800 shown at FIGS. 107 and 111, the blades 1802, 1804 produce a substantially lesser amount of aerodynamic lift and aerodynamic drag allowing the blades 1802, 1804 to return to the portion of the cycle of the turbine 1800 shown at FIGS. 104 and 108 without generating a large reverse torque on the turbine 1800. The aerodynamic lift and the aerodynamic drag can be substantially produced at the same position in the cycle of the turbine 1800 and combine to power the turbine 1800. For example, the airfoil shape of the blades 1802, 1804 produces a sideways (lift) force in addition to the backwards (drag) force in the positions shown in FIGS. 106 and 110. The airfoils 1812, 1814 can result in the turbine 1800 smoothly transitioning from cycle portions of high lift to cycle portions of high drag to cycle portions of low lift and low drag as the turbine 1800 cycles.

As shown at FIG. 104, the blades 1802, 1804 follow a pattern that looks similar to FIG. 47 from a side view and that sweeps a semi-circular path across the upper area above the fixed and rotating horizontal shafts 1816, 1830 as viewed from the front. This blade movement creates a FIG. 8 pattern as viewed from the top. The movement of the blades 1802, 1804 provides both lift force as the blades 1802, 1804 sweep across perpendicular to the wind direction A and drag force as the blades move front to back parallel with the wind direction A. The blades 1802, 1804 can vary in shape, including having an airfoil type shape that can curve and taper out from the center as shown.

FIG. 113 illustrates a first blade hub baffle 1872 and a second blade hub baffle 1874. The blade hub baffles 1872, 1874 can be mounted on the blade hubs 1832, 1834 respectively. The blade hub baffles 1872, 1874 can rotate with the blade hubs 1832, 1834 in certain embodiments. In other embodiments, the blade hub baffles 1872, 1874 can orbit about the axis A101 of the turbine 1800 with the hub 1806 but not rotate about the axes A103, 104 with respect to the hub 1806. The blade hub baffles 1872, 1874 can include aerodynamic shapes 1882, 1884 respectively. The aerodynamic shapes 1882, 1884 can result in power conversion from the blade hubs 1832, 1834 and thereby contribute power to the turbine 1800. As depicted, the aerodynamic shapes 1882, 1884 catch the wind when moving with the general wind direction A and cut through the wind when moving against the general wind direction A. In certain embodiments, the aerodynamic shapes 1882, 1884 aerodynamically interact with the airfoils 1812, 1814 and/or the blades 1802, 1804 to improve the efficiency of the turbine 1800.

An output shaft 1830 is rotationally coupled (e.g., rotationally connected) to the hub 1806. The output shaft 1830 can be coupled to a generator. As mentioned above, the output shaft 1830 can be connected to a motor and thereby produce a fluid flow generating device.

The general wind direction A, as shown in the figures and described above, is a nominal wind direction and/or a baseline wind direction. In practice, the wind direction can vary, for example as the wind gusts, is turbulent, as weather patterns change and develop, etc. The orientation of the turbines with respect to the general wind direction A can be adjusted, tuned, fine-tuned etc. from that shown in the figures to provide optimal operating efficiency for the turbines. For example, at FIGS. 37-42 the general wind direction A is shown as substantially horizontal on the page. Upon testing, it may be determined that the turbine 810 performs optimally when steered clockwise or counterclockwise into the wind relative to the position shown at FIGS. 37-42. The optimal turbine steering orientation can vary with wind speed, and the turbine 810 can be steered into the general wind direction A differently depending on the current wind speed. For example, a controller or control system can measure wind speed, wind direction, wind speed variation, and/or other characteristics of the wind. The turbine 810 can be steered into the general wind direction A with a goal of optimizing the efficiency of the turbine 810 under these and other current conditions.

Figure 114:
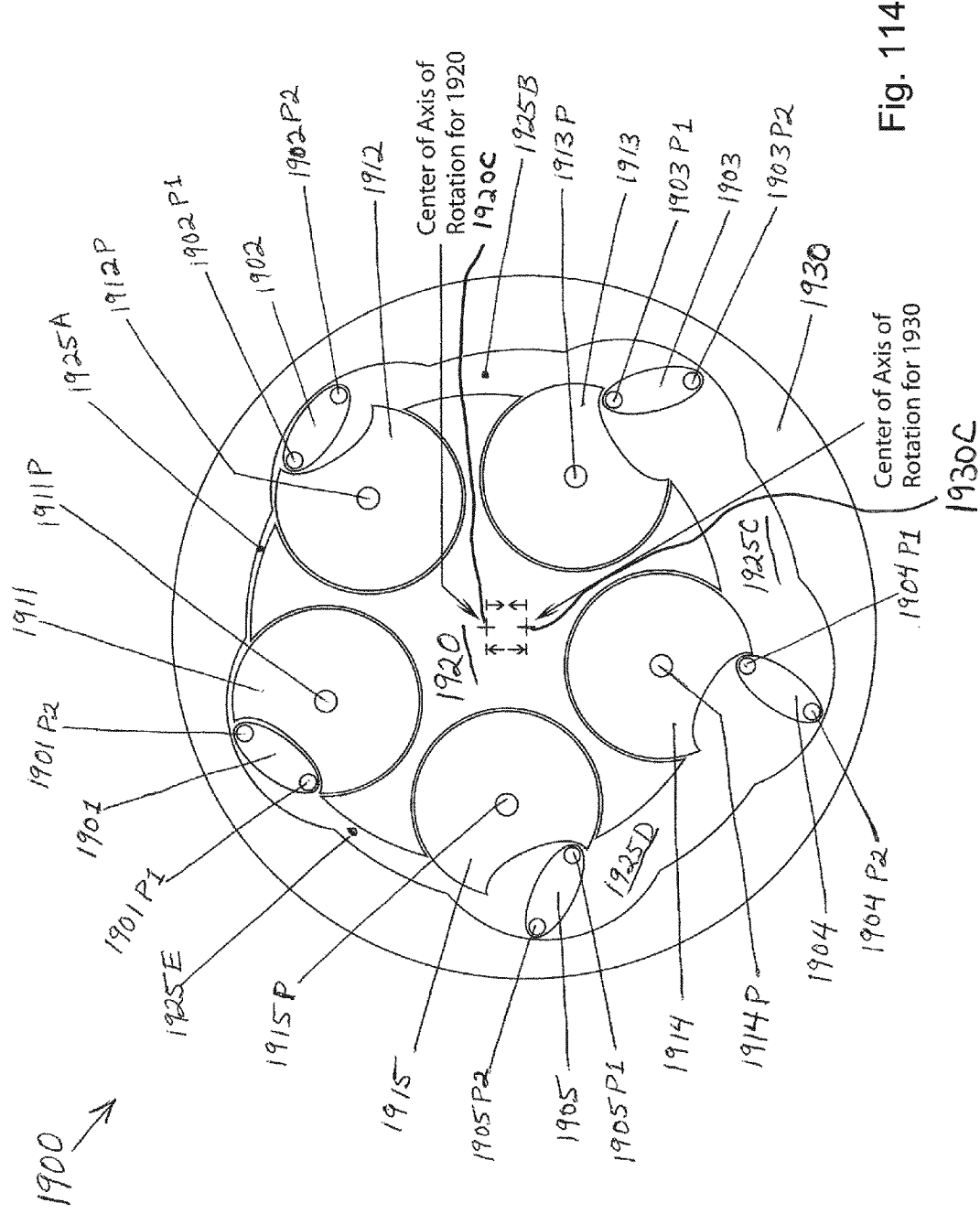
FIG. 114 illustrates a side cross-sectional view of a twentieth embodiment of a rotary pump having features that are examples of inventive aspects in accordance with the principles of the present disclosure, the rotary pump shown with five vanes turned by a linkage that changes the orientation of the vanes with respect to the vanes' orbital position about the rotary pump.
Figure 115:
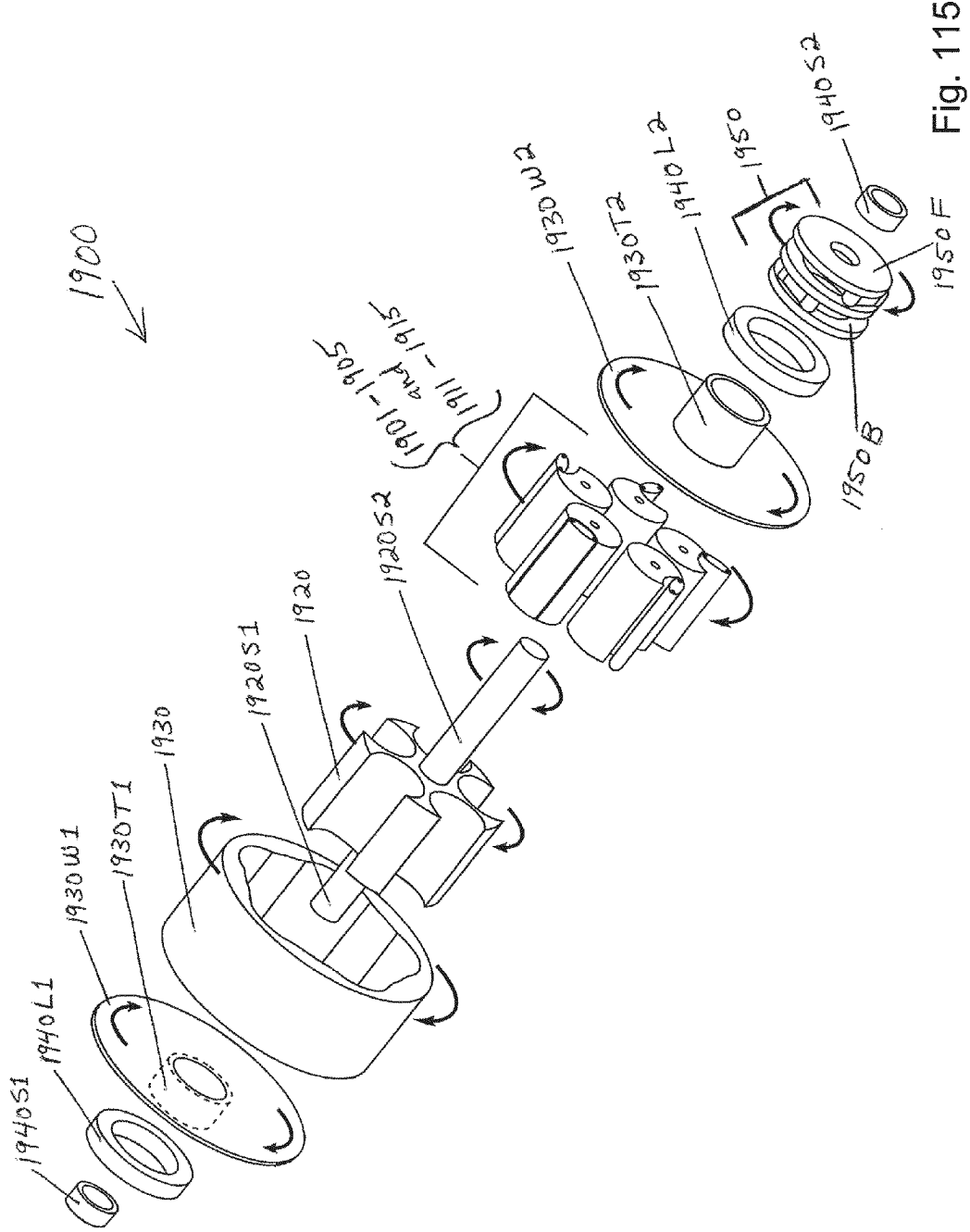
FIG. 115 illustrates an exploded perspective view of the pump of FIG. 114.
Figure 116:
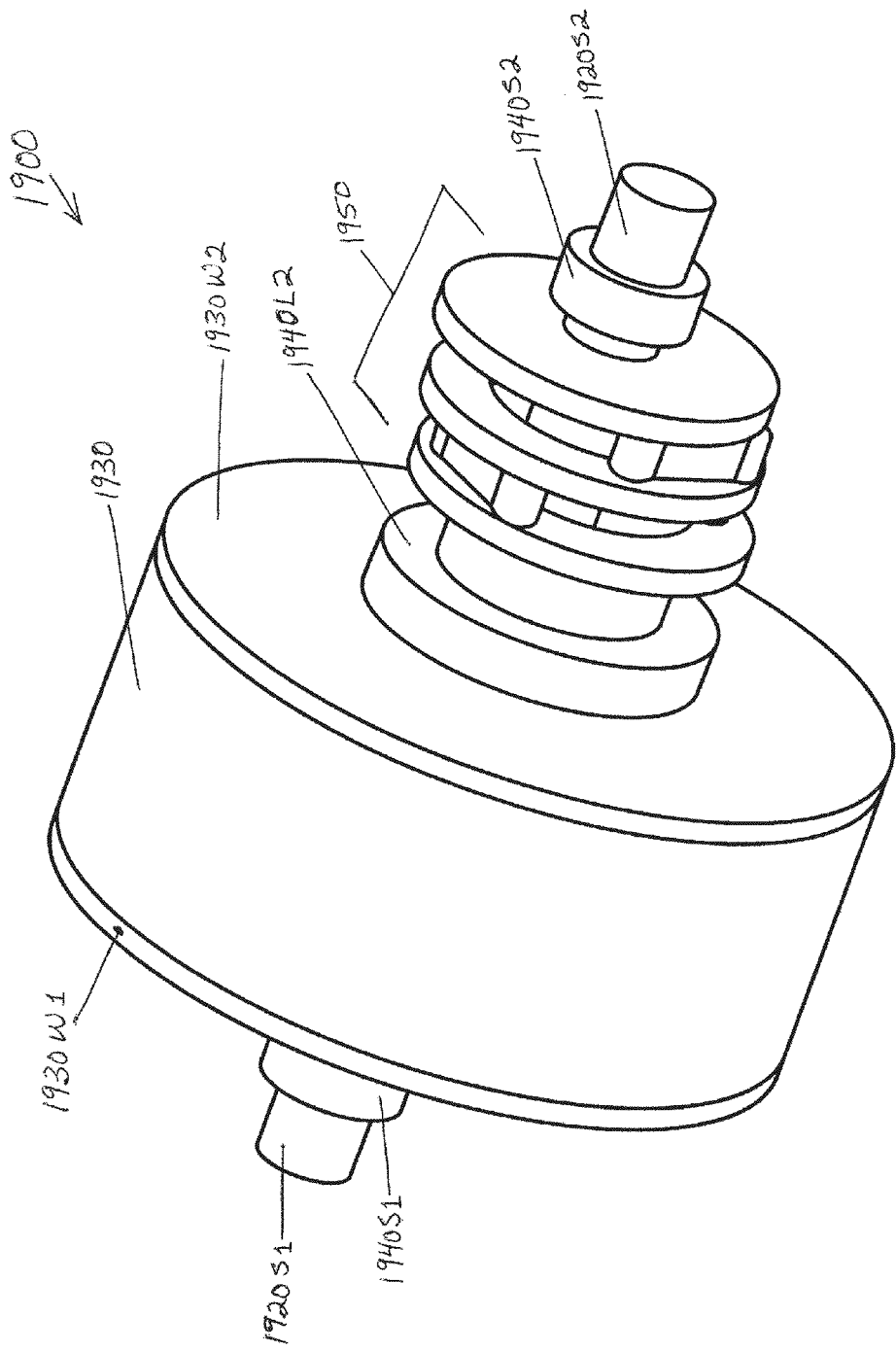
FIG. 116 illustrates a perspective view of the pump of FIG. 114.
Figure 117:
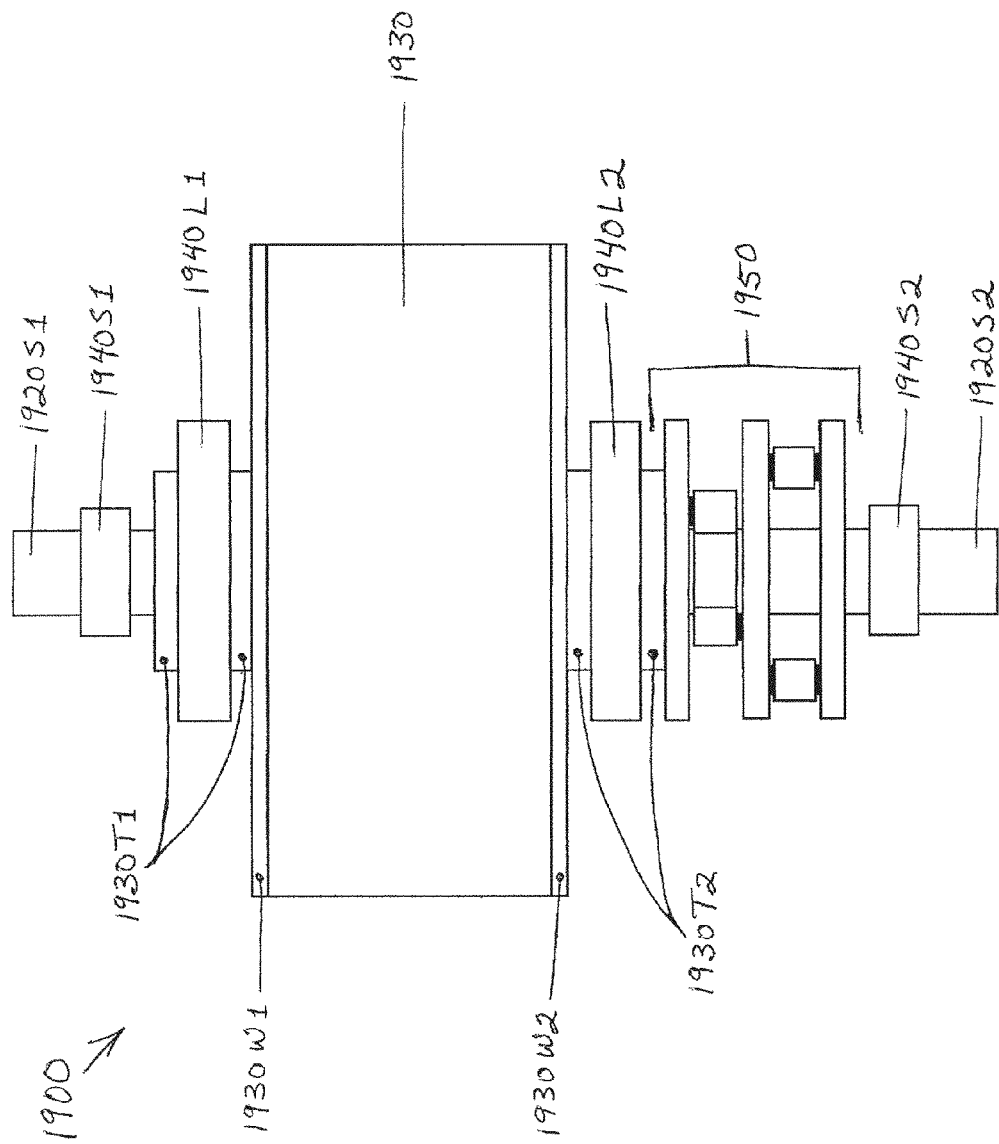
FIG. 117 illustrates a top view of the pump of FIG. 114.
Figure 122:
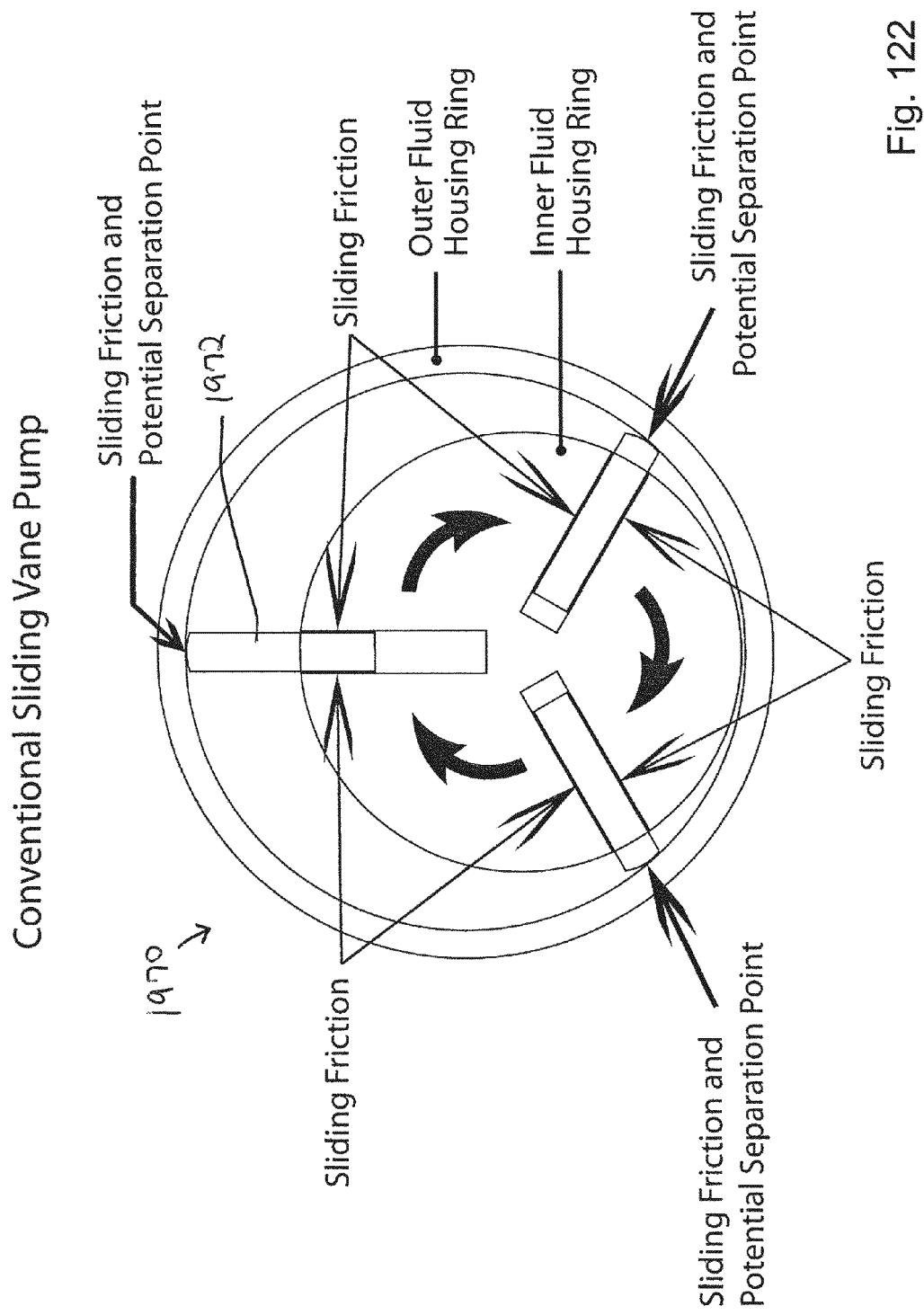

FIGS. 114-121 illustrate a twentieth embodiment, rotary pump/motor (i.e., a fluid handling device) 1900, having features that are examples of inventive aspects in accordance with the present disclosure. The rotary pump/motor 1900 is a variable positive displacement pump/motor. In the following discussion, the rotary pump/motor 1900 will be described primarily as a pump 1900. However, the pump 1900 can be used as and/or converted to a motor 1900. FIG. 114 depicts a side view of internal components of the pump 1900. FIG. 115 depicts an exploded isometric view of the pump 1900. FIG. 116 depicts an isometric view of the assembled pump 1900. FIG. 117 depicts a top view of the assembled pump 1900. FIGS. 118-120 depict the side view of the internal components and illustrate how pump displacement is varied on the pump 1900. FIG. 121 illustrates an example of an inlet port 1962 and an outlet port 1964 arrangement for the pump 1900. And, FIG. 122 depicts a conventional sliding vane pump/motor to which the pump 1900 will be compared. As mentioned in many of the prior embodiments, the inventive aspects of the present disclosure can be used in any fluid flow producing or capturing application, including fluid pumps and motors—the category into which the pump 1900 best fits.

The rotary pump 1900 is similar to the rotary turbines 810 and 910 of FIGS. 37-46 and the rotary turbines 1400 and 1500 of FIGS. 87-100 in that the vanes 1901, 1902, 1903, 1904, 1905 (in this case extruded oval links that function as pump/motor vanes) of the rotary pump 1900 are oriented with respect to the rotary pump 1900 by a five bar linkage. As discussed above, the rotary turbines 810, 910, 1400, 1500 use a four bar linkage to orient their blades. The extra degree-of-freedom provided by the five bar linkage of the rotary pump 1900 is removed by a coupling 1950, as will be further described below. A first link of the five bar linkage of the pump 1900 is formed by a hub 1920 between a center 1920C of the hub 1920 and a center 1911P of a rotatable member 1911 rotatably connected to the hub 1920 at the center 1911P. A second link of the five bar linkage of the pump 1900 is formed by the rotatable member 1911 between the center 1911P and a pivot point 1901P1 of a vane 1901 rotatably connected to the rotatable member 1911 at the pivot point 1901P1. A third link of the five bar linkage of the pump 1900 is formed by the vane 1901 between the pivot point 1901P1 and a pivot point 1901P2. The pivot point 1901P2 of the vane 1901 is rotatably connected to a pump housing 1930 at the pivot point 1901P2. A fourth link of the five bar linkage of the pump 1900 is formed by the pump housing 1930 between the pivot point 1901P2 and a rotational center 1930C of the pump housing 1930. A fifth link of the five bar linkage of the pump 1900 is formed between the center 1920C of the hub 1920 and the rotational center 1930C of the pump housing 1930. The fifth link of the five bar linkage of the pump 1900 can be varied in length and thereby vary the pump displacement of the pump 1900, as will be further described below. In certain embodiments, the five bar linkage of the rotary pump 1900 can have characteristics of a crank and rocker mechanism. The five bar linkage of the vane 1901 is similarly repeated for vanes 1902, 1903, 1904, and 1905. In other embodiments, more than five vanes and five five bar linkages can be used. In other embodiments, fewer than five vanes and five five bar linkages can be used. The pivot points 1901P1, 1901P2, 1911P, 1902P1, 1902P2, 1912P, 1903P1, 1903P2, 1913P, 1904P1, 1904P2, 1914P, 1905P1, 1905P2, and 1915P at FIG. 114 can be formed of a pin and/or other rotatable structures, represent the pivot points for their corresponding linkages, and can be considered hinge pins (with or without bearings, bushings, etc. to reduce friction) that act to rotatably couple the vane 1901 and the rotatable member 1911, the vane 1902 and the rotatable member 1912, the vane 1903 and the rotatable member 1913, the vane 1904 and the rotatable member 1914, the vane 1905 and the rotatable member 1915, the hub 1920, and the pump housing 1930 together.

Although similar to the rotary turbines 810, 910, 1400, and 1500, the shapes and interrelated positions of various parts of the rotary pump 1900 create sealed cavity areas 1925A, 1925B, 1925C, 1925D, 1925E within the pump 1900, that encapsulate fluid entering and exiting the cavities 1925A, 1925B, 1925C, 1925D, 1925E in such a way as to function as a positive displacement fluid pump and/or motor. A cylindrical shape of the rotatable members 1911, 1912, 1913, 1914, 1915 provides a continuous seal with the hub 1920 even as the rotatable members 1911, 1912, 1913, 1914, 1915 rotate about their respective pivot points 1911P, 1912P, 1913P, 1914P, 1915P. Rounded ends of the vanes (e.g., extruded oval links) 1901, 1902, 1903, 1904, 1905 also create a seal between the pump housing 1930 and the respective rotatable members 1911, 1912, 1913, 1914, 1915 to which each of the extruded oval vanes 1901, 1902, 1903, 1904, 1905 are rotatably coupled, even as these vanes 1901, 1902, 1903, 1904, 1905 pivot about the pivot points on either end of each vane 1901, 1902, 1903, 1904, 1905. The sealed enclosure of each cavity 1925A, 1925B, 1925C, 1925D, 1925E is completed by sidewalls 1930W1 and 1930W2, which fit up against flat side surfaces of the internal parts—the rotatable members 1911, 1912, 1913, 1914, 1915, the vanes 1901, 1902, 1903, 1904, 1905, the hub 1920, the pump housing 1930, and possibly the hinge pins (but only if the hinge pins are designed to protrude through the vanes 1901, 1902, 1903, 1904, 1905 and/or the rotatable members 1911, 1912, 1913, 1914, 1915 to the sidewalls 1930W1 and 1930W2, which they do not necessarily need to do). As with typical positive displacement fluid pumps and motors, the sealed cavity areas 1925A, 1925B, 1925C, 1925D, 1925E require a hole or port through one or more of the encapsulating surfaces of each cavity 1925A, 1925B, 1925C, 1925D, 1925E to allow the fluid to enter and/or exit each cavity area 1925A, 1925B, 1925C, 1925D, 1925E as that area expands and contracts through each cycle. An example of such an inlet port 1962 and an outlet port 1964 is illustrated at FIG. 121.

Even though FIGS. 114 and 115 show the pump 1900 with five vane linkages and consequently five sealed cavities, the pump 1900 can include any number of vanes and cavities. In addition, the size and shape of the components may vary considerably without departing from the spirit and scope of the embodiment and the advantages that it offers, as herein described. And also, the rotatable members 1911, 1912, 1913, 1914, 1915 can be rotatably coupled to the hub (i.e., the inner fluid housing) 1920, as depicted at FIGS. 114 and 115, or can be rotatably coupled to the pump housing (i.e., the outer fluid housing) 1930 with the vanes (i.e., the extruded oval links) 1901, 1902, 1903, 1904, 1905 connecting the rotatable members (i.e., the cylindrical links) 1911, 1912, 1913, 1914, 1915 respectively (rotatably coupled to the pump housing 1930) to the hub 1920. (A configuration having the rotatable members 1911, 1912, 1913, 1914, 1915 rotatably coupled directly to the pump housing 1930 is not shown.) Lastly, a combination wherein some of the rotatable members 1911, 1912, 1913, 1914, 1915 are tied directly to the hub 1920 and some of the rotatable members 1911, 1912, 1913, 1914, 1915 are tied directly to the pump housing 1930 is also possible. (This combined configuration is also not shown.)

Although the design of the pump 1900 can be made so that most of the components rotate as shown at FIG. 115, the design of the pump 1900 can also be made so that most of the components do not rotate about their axes but rather either the hub 1920 (and the rotatable members 1911, 1912, 1913, 1914, 1915 if coupled directly to the hub 1920 as shown at FIGS. 114 and 115) simply orbits around its axis without rotating or the pump housing 1930 simply orbits around its axis without rotating. This is accomplished by coupling the pump housing 1930 and/or the hub 1920 to a cranking mechanism (not shown) with bearings that allow either the hub 1920 and/or the pump housing 1930 to orbit without rotating. An example of such orbiting action including a crank is provided at U.S. Pat. No. 6,065,289 to Phillips, issued May 23, 2000, which is hereby incorporated by reference in its entirety. The unbalanced nature of this configuration would likely require counterbalancing to reduce vibration and wear in many applications. This configuration also provides additional engineering challenges, although not insurmountable, when making the design capable of varying its fluid displacement setting.

When designing the pump 1900 so that most of the components rotate as shown at FIG. 115, bearings, bushing, or other friction reducing component can be used to minimize friction between the rotating components and an outer shell or a fixed housing for the entire mechanism (not shown). Bearings or bushings 1940S1 and 1940S2 can be mounted between an inner housing shaft 1920S1, 1920S2 and the outer shell. Bearings or bushings 1940L1, 1940L2 can be mounted between outer housing sidewall tubes 1930T1, 1930T2 and the outer shell.

The linkages between the hub 1920 and the pump housing 1930 (i.e. links 1901 and 1911, links 1902 and 1912, links 1903 and 1913, links 1904 and 1914, and links 1905 and 1915) allow only a limited amount of variance in rotation between the hub 1920 and the pump housing 1930. Consequently, the hub 1920 and the pump housing 1930 must be synchronized or approximately synchronized in rotation. However, because the linkage will allow some variance in rotation, the mechanism will function best if this variance is controlled by coupling the hub 1920 and the pump housing 1930 in a manner that limits the extent to which these two different members 1920, 1930 vary in rotation within each revolution, (i.e., keeping the members 1920, 1930 at either an identical rotational position or at least nearly identical so that the links 1901, 1911, 1902, 1912, 1903, 1913, 1904, 1914, 1905, 1915 are not inadvertently forced into a position that locks the rotation of one of the members 1920, 1930 against the rotation of the other member 1930, 1920, creating backlash (i.e., a sudden violent movement or reaction), seizing, or other undesirable stresses on the mechanism. To control the rotational variance between the members 1920 and 1930 an additional coupling mechanism can be used. The additional coupling mechanism removes one of the two degrees-of-freedom in each of the five bar linkages described above. Each of the five bar linkages therefore is left with a single degree-of-freedom that is coupled to a cycle position of the pump 1900.

FIGS. 115-117 show a double linked coupling 1950 (sometimes referred to as a Schmidt Coupling) which couples the hub 1920 (by way of shaft 1920S2 which is fixedly attached to the hub 1920) to the pump housing 1930 (by way of sidewall tube 1930T2 which is fixedly attached to sidewall 1930W2 which it is fixedly attached to the pump housing 1930). A front side disc 1950F of the Schmidt coupling 1950 fixedly attaches to the hub shaft 1920S2, and the back side disc 1950B of the Schmidt Coupling 1950 fixedly attaches to the pump housing sidewall tube 1930T2. The operational nature of the double linked Schmidt Coupling 1950 allows center axes of two rotating components to be either centered or off-centered (with infinite variability between being centered or off-centered to the couplings maximum allowable eccentricity) while maintaining a relatively constant comparative velocity of the two rotating components. Coupling the hub 1920 with the pump housing 1930 by using a coupling like the Schmidt Coupling 1950 allows the center axis of rotation of the hub 1920 to be in line with or variably parallelly offset from the center axis of rotation of the pump housing 1930 while keeping the two members 1920, 1930 identically or nearly identically synchronized throughout each revolution of the cycle of the pump 1900.

When the axes of rotation for the two members 1920, 1930 are in line with each other, no fluid displacement occurs because all of the fluid cavities 1925A, 1925B, 1925C, 1925D, 1925E remain the same size throughout the cycle of the pump 1900 (see FIG. 118). When the axes of rotation for the two members 1920, 1930 are offset from each other, fluid displacement occurs because the fluid cavities 1925A, 1925B, 1925C, 1925D, 1925E change in size throughout the cycle of the pump 1900 (see FIGS. 119 and 120). For fixed displacement designs, the axis of rotation for the hub 1920 can be offset from the pump housing 1930 a specific distance and remain offset that distance. For variable displacement applications, the offset distance of the axis of rotation for the hub 1920 from the axis of rotation for the pump housing 1930 can be designed to vary from zero (in line) to the maximum offset distance the mechanism is designed to achieve (see FIG. 120). Varying this distance can be done by translating, perpendicular to the axes of rotation, either the hub 1920 by translating the hub shaft 1920S1, 1920S2 to which it is attached or by translating, perpendicular to the axes of rotation, the pump housing 1930 by translating the pump housing sidewall tubes 1930T1, 1930T2 (and the outer fluid housing sidewalls 1930W1, 1930W2) to which the pump housing 1930 is attached, or by translating, perpendicular to the axes of rotation, both the hub 1920 and the pump housing 1930.

Coupling options that would keep the hub 1920 and the pump housing 1930 of the rotary pump 1900 synchronized or approximately synchronized while at the same time allowing varying amounts of parallel offset from zero to the maximum offset include, but are not limited to, rigid couplings like the Schmidt Coupling or Oldham Coupling, linked gear couplings, dual flexible couplings, dual U-joints or dual CVU-joints, dual chain and sprocket couplings, double drives (electrical, mechanical, etc.) of matching speed, etc. Many coupling options will allow the pump 1900 to provide either fixed or variable fluid displacement per revolution of the pump 1900 by simply increasing, decreasing, or maintaining relative eccentricity between the hub 1920 and the pump housing 1930. FIG. 114 shows the comparative axes of rotation for the hub 1920 and the pump housing 1930. By varying the relative distance between the center of axis of rotation 1920C for the hub 1920 and the center of axis of rotation 1930C for the pump housing 1930 the size of the cavities 1925A, 1925B, 1925C, 1925D, 1925E, will vary from being the same size when the two axes are co-linear (see FIG. 118) to being the most different when the two axes are as far apart as the mechanism will allow (see FIG. 120). The ways in which the distance between these two axes 1920C, 1930C can be varied are numerous and not material to the inventive aspects herein disclosed. What is material to this disclosure is that the distance between these two axes 1920C, 1930C can be varied while the pump 1900 is moving or stopped, and the pump 1900 can also be made with the distance between these two axes 1920C, 1930C fixed, producing a fixed fluid displacement per revolution.

The pump 1900 is designed to have less wear than conventional sliding vane pumps 1970 (see FIG. 122) and motors because it eliminates sliding friction between the vanes 1972 and inner and outer fluid housing rings (see FIG. 122). Since sliding friction is replaced with pivoting linkages, wear at these friction points is reduced and can be further reduced with various bearing or bushing type components at pivot points 1901P1 and 1901P2 and 1911P, 1902P1 and 1902P2 and 1912P, 1903P1 and 1903P2 and 1913P, 1904P1 and 1904P2 and 1914P, 1905P1 and 1905P2 and 1915P (see FIG. 114). Although some sliding friction still occurs between the sidewalls 1930W1, 1930W2 and other parts of the mechanism (the vanes 1901, 1902, 1903, 1904, 1905 and one or both of the members 1920, 1930), this friction is less of a concern because it is happening free of any pressure induced force loads. In addition, this friction can be further reduced by designing the mechanism to keep the sidewalls 1930W1, 1930W2 fixed to either the hub 1920 or the pump housing 1930. Although the Figures and descriptions of the pump 1900 have focused on the sidewalls 1930W1, 1930W2 being attached to the pump housing 1930, these sidewalls 1930W1, 1930W2 can, alternatively, be attached to the hub 1920, which may present advantages over attaching them to the pump housing 1930.

The pump 1900 is designed to have other significant advantages over conventional sliding vanes pumps (e.g., the pump 1970) and motors, as well. In addition to reducing wear, the reduced friction of the pump 1900 also improves system efficiency by reducing the resultant heat losses and the potential auxiliary cooling needs that friction produces. Another benefit of the pump 1900 over conventional sliding vane pumps and motors is its ability to more easily accommodate higher pressures by eliminating the need to increase force at sliding friction points to maintain a good seal between vane and ring where they could potentially separate. Additional friction increasing forces need not be applied because gapping between vane and ring is not possible with the vanes 1901, 1902, 1903, 1904, 1905 being linked to both the hub 1920 and the pump housing 1930.

As is common for fluid pump/motors, applications for the pump 1900 are very broad. In no way an exhaustive list, some samples include the following:

1. Moving fluid from one location to another or simply keeping the fluid in motion within a contained area for any given purpose;
2. Blowing or vacuuming fluids;
3. Compressing or expanding fluid for such common purposes as heating or cooling or the filling of receptacles like tires or LP gas containers, etc;
4. Operation of Rankine Cycle engines, combustion engines, or all other fluid based engines;
5. Operation of hydraulic or pneumatic cylinders or related devices common to construction machinery, farm machinery, industrial machinery, and the like;
6. Purely fluid (hydraulic or pneumatic) hydrostatic transmissions commonly configured with a pump and motor combination wherein usually one or both of the components have variable fluid displacement capability;
7. Combination fluid-mechanical, fluid-electrical, or fluid-mechanical and electrical transmissions wherein forces are transmitted through a combination of mediums as opposed to transmission through fluid only.

(As in descriptions of the other embodiments, the term "fluid" is being used in this description of the twentieth embodiment in its broadest sense and may be applied to the lightest physical particles or gasses, heavier solid particles that have fluid qualities when amassed in number like flour or blown insulation, or semi-solid substances like ground meat, bread dough, uncured wet cement, or toothpaste. In other words, the term fluid is meant to refer to anything substance that can be moved in a manner that is the same or similar to more common fluid substances like air, water, or oil.)

The features of the various embodiments of the present disclosure can be combined with each other and thereby form additional embodiments. For example, a rotary turbine can include a crossed axis blade steering mechanism and a gear train that combine to control the rotary turbine's blade angle.

Although in the foregoing description, terms such as "top", "bottom", "front", "back", "right", and "left" were used for ease of description and illustration, no restriction is intended by such use of the terms. The rotary turbines described herein can be used in any orientation, depending upon the desired application and the fluid flow direction.

The above specification, examples and data provide a complete description of the manufacture and use of the inventive features of the disclosure. Many embodiments of the disclosure can be made without departing from the spirit and scope of the disclosure.

What is claimed is:

1. A fluid interacting device for interacting with a moving fluid, the fluid interacting device comprising:
    a first shaft defining a first axis;
    a fluid interacting element, wherein a first point on the fluid interacting element defines an orbital path about the first axis of the first shaft as the fluid interacting element progresses through a cycle of interaction with the moving fluid, wherein bulk movement of the fluid generally defines a first direction, wherein a portion of the fluid interacting element that is spaced from the first point varies an orientation with respect to the orbital path and with respect to the first direction as the fluid interacting element progresses through the cycle; and
    a u-joint like control arrangement operably connected to the fluid interacting element, the u-joint like control arrangement adapted to cyclically vary the orientation of the fluid interacting element with respect to the orbital path and with respect to the first direction as the fluid interacting element progresses through the cycle, the control arrangement including:
- a first steering group including the first shaft, the first steering group rotatably mounted about the first axis of the first shaft, and the first steering group defining a second axis; and
- a second steering group with a second shaft defining a third axis, the second steering group rotatably mounted about the third axis, and the second steering group defining a fourth axis;

wherein the angle of the fluid interacting element stays constant relative to the fourth axis as it pivots about the fourth axis; and wherein during a return portion of the cycle the fluid interacting element is oriented by the first and second steering groups of the control arrangement with respect to the first direction at a first orientation resulting in minimal interaction between the fluid interacting element and the moving fluid;

wherein during an active portion of the cycle the fluid interacting element is oriented by the first and second steering groups of the control arrangement with respect to the first direction at a second orientation resulting in maximal interaction between the fluid interacting element and the moving fluid; and wherein the third axis of the second steering group is angularly offset from the first axis of the first steering group, wherein the first axis and the second axis of the first steering group are substantially perpendicular to each other, wherein the third axis and the fourth axis of the second steering group are substantially perpendicular to each other, and wherein the first axis, the second axis, the third axis, and the fourth axis intersect each other at a point.

2. The fluid interacting device of claim 1, wherein oscillating movement occurs about the second and fourth axes and rotational movement occurs about the first and third axes.

3. The fluid interacting device of claim 1, wherein the fluid interacting device comprises a fluid flow producing device.

4. The fluid interacting device of claim 1, wherein the fluid interacting device comprises a fluid flow energy harvesting device.

5. The fluid interacting device of claim 4, further comprising a steering arrangement that generally maintains the first and the second orientations of the fluid interacting element with respect to the first direction as the bulk movement of the fluid changes and thereby changes the first direction.

6. The fluid interacting device of claim 1, wherein the fluid interacting element is rotatably mounted to the first shaft about the second axis, wherein the control arrangement includes a variable ratio drive component operably connected between the first shaft and the fluid interacting element, and wherein a second rotational speed of the fluid interacting element about the second axis cyclically varies with respect to a first rotational speed of the first shaft about the first axis.

7. The fluid interacting device of claim 1, wherein the fluid interacting element directs the moving fluid in two or more different directions during the cycle of interaction.

8. The fluid interacting device of claim 1, wherein the fluid interacting element is oriented over a range of angles and thereby defines a corresponding set of directions of the moving fluid.

9. The fluid interacting device of claim 1, wherein the fluid interacting element is dynamically varied in orientation and thereby dynamically interacts with different directions of the moving fluid during the cycle of interaction.

10. A fluid interacting device for interacting with a moving fluid, the fluid interacting device comprising:
- a first shaft defining a first axis;
- a fluid interacting element, wherein a first point on the fluid interacting element defines an orbital path about the first axis of the first shaft as the fluid interacting element progresses through a cycle of interaction with the moving fluid, wherein bulk movement of the fluid generally defines a first direction, wherein a portion of the fluid interacting element that is spaced from the first point varies an orientation with respect to the orbital path and with respect to the first direction as the fluid interacting element progresses through the cycle; and
- a u-joint like control arrangement operably connected to the fluid interacting element, the u-joint like control arrangement adapted to cyclically vary the orientation of the fluid interacting element with respect to the orbital path and with respect to the first direction as the fluid interacting element progresses through the cycle, the control arrangement including:
  - a first steering group including the first shaft, the first steering group rotatably mounted about the first axis of the first shaft, and the first steering group defining a second axis; and
  - a second steering group with a second shaft defining a third axis, the second steering group rotatably mounted about the third axis, and the second steering group defining a fourth axis;

wherein the angle of the fluid interacting element stays constant relative to the fourth axis as it pivots about the fourth axis; and wherein during a return portion of the cycle the fluid interacting element is oriented by the first and second steering groups of the control arrangement with respect to the first direction at a first orientation resulting in minimal interaction between the fluid interacting element and the moving fluid;

wherein during an active portion of the cycle the fluid interacting element is oriented by the first and second steering groups of the control arrangement with respect to the first direction at a second orientation resulting in maximal interaction between the fluid interacting element and the moving fluid; and wherein the third axis of the second steering group is angularly offset from the first axis of the first steering group, wherein the first axis and the second axis of the first steering group are at an acute angle with respect to each other, wherein the third axis and the fourth axis of the second steering group are substantially perpendicular to each other, and wherein the first axis, the second axis, the third axis, and the fourth axis intersect each other at a point.

11. The fluid interacting device of claim 10, wherein oscillating movement occurs about the fourth axis and rotational movement occurs about the first, second, and third axes.

12. The fluid interacting device of claim 10, wherein the fluid interacting element is rotatably mounted to the first shaft about the second axis, wherein a second rotational speed of the fluid interacting element about the second axis averages half of a first rotational speed of the first shaft about the first axis.

13. The fluid interacting device of claim 10, wherein the fluid interacting device comprises a fluid flow producing device.

14. The fluid interacting device of claim 10, wherein the fluid interacting device comprises a fluid flow energy harvesting device.

15. The fluid interacting device of claim 14, further comprising a steering arrangement that generally maintains the first and the second orientations of the fluid interacting element with respect to the first direction as the bulk movement of the fluid changes and thereby changes the first direction.

16. The fluid interacting device of claim 10, wherein the fluid interacting element is rotatably mounted to the first shaft about the second axis, wherein the control arrangement includes a variable ratio drive component operably connected between the first shaft and the fluid interacting element, and wherein a second rotational speed of the fluid interacting element about the second axis cyclically varies with respect to a first rotational speed of the first shaft about the first axis.

17. The fluid interacting device of claim 10, wherein the fluid interacting element directs the moving fluid in two or more different directions during the cycle of interaction.

18. The fluid interacting device of claim 10, wherein the fluid interacting element is oriented over a range of angles and thereby defines a corresponding set of directions of the moving fluid.

19. The fluid interacting device of claim 10, wherein the fluid interacting element is dynamically varied in orientation and thereby dynamically interacts with different directions of the moving fluid during the cycle of interaction.

20. A fluid interacting device for interacting with a moving fluid, the fluid interacting device comprising:
   an inner hub defining a first axis;
   a fluid interacting element, wherein a first point on the fluid interacting element defines an orbital path about the first axis of the inner hub as the fluid interacting element progresses through a cycle of interaction with the moving fluid, wherein bulk movement of the fluid generally defines a first direction, wherein a portion of the fluid interacting element that is spaced from the first point varies an orientation with respect to the orbital path and with respect to the first direction as the fluid interacting element progresses through the cycle of interaction;
   a control arrangement operably connected to both the inner hub and the fluid interacting element, the control arrangement adapted to cyclically vary the orientation of the fluid interacting element with respect to the orbital path and with respect to the first direction as the fluid interacting element progresses through the cycle of interaction;
   an outer hub rotatable about a third axis, wherein the first axis and the third axis intersect each other at a point, wherein the first axis and the third axis are angularly offset from each other, wherein the inner hub and the outer hub are rotationally coupled to each other by a drive arrangement, and wherein the outer hub rotates about the inner hub about the first axis as the outer hub rotates about the third axis;
   wherein during a return portion of the cycle of interaction the fluid interacting element is oriented with respect to the first direction at a first orientation resulting in minimal interaction between the fluid interacting element and the moving fluid;
   wherein during an active portion of the cycle of interaction the fluid interacting element is oriented with respect to the first direction at a second orientation resulting in maximal interaction between the fluid interacting element and the moving fluid; and
   wherein the drive arrangement produces a figure-8-like movement of the fluid interacting element.

21. The fluid interacting device of claim 20, wherein the fluid interacting element is moved through a compound movement by the inner and the outer hubs and wherein lift and drag on the fluid interacting element both act during the active portion of the cycle of interaction.

22. The fluid interacting device of claim 20, wherein the fluid interacting element is moved through a compound movement by the inner and the outer hubs and wherein lift on the fluid interacting element acts during the return portion of the cycle of interaction.

23. The fluid interacting device of claim 20, wherein the first axis and the second axis are substantially perpendicular to each other.

24. The fluid interacting device of claim 20, wherein the drive arrangement that rotationally couples the inner and outer hubs includes a variable ratio drive component that produces a variation in relative velocity of the inner and outer hubs over the cycle of interaction.

25. The fluid interacting device of claim 24, wherein the variable ratio drive component includes an overall 1 to 1 ratio over the cycle of interaction.

26. The fluid interacting device of claim 24, wherein the variable ratio drive component includes a linkage.

27. The fluid interacting device of claim 24, wherein the variable ratio drive component includes a variable ratio gearing.

28. The fluid interacting device of claim 20, wherein the drive arrangement that rotationally couples the inner and outer hubs includes a fixed ratio gearing.

29. The fluid interacting device of claim 28, wherein the fixed ratio gearing produces a constant relative velocity of the inner and outer hubs over the cycle of interaction with an overall 1 to 1 ratio over the cycle of interaction.

30. The fluid interacting device of claim 2, wherein the fluid interacting element is an airfoil.

31. The fluid interacting device of claim 30, wherein the airfoil is a swept airfoil.

* * * * *